United States Patent [19]

Cota et al.

[11] 4,041,467
[45] Aug. 9, 1977

[54] TRANSCRIBER SYSTEM FOR THE AUTOMATIC GENERATION AND EDITING OF TEXT FROM SHORTHAND MACHINE OUTLINES

[75] Inventors: Dan E. Cota, Los Angeles; Ted R. Charter, Santa Ana; Robert M. Beeson, Palos Verdes Estates, all of Calif.; Robin D. Kinkead, Dallas, Tex.

[73] Assignee: Xerox Corporation, Stamford, Conn.

[21] Appl. No.: 636,268

[22] Filed: Nov. 28, 1975

[51] Int. Cl.² ............... G06F 3/02; G06F 3/10; G06F 3/14
[52] U.S. Cl. ............................. 364/900; 178/21; 197/9
[58] Field of Search .............. 340/172.5; 178/17.5, 178/21; 179/100.1 DR; 197/9

[56] References Cited

U.S. PATENT DOCUMENTS

| 3,372,865 | 3/1968 | Pellegrini | 178/21 X |
|---|---|---|---|
| 3,557,927 | 1/1971 | Wright et al. | 197/9 |
| 3,558,820 | 1/1971 | Baisch et al. | 178/21 X |
| 3,597,538 | 8/1971 | Binenbaum | 178/17.5 |
| 3,654,611 | 4/1972 | Bluethman et al. | 340/172.5 |
| 3,665,115 | 5/1972 | Snook | 178/21 |
| 3,731,278 | 5/1973 | Eldridge et al. | 340/172.5 |
| 3,810,107 | 5/1974 | Goldman et al. | 340/172.5 |
| 3,892,915 | 7/1975 | Budworth et al. | 178/21 |
| 3,944,042 | 3/1976 | Gremillet | 197/9 X |
| 3,648,249 | 3/1972 | Goldsberry | 340/172.5 |

OTHER PUBLICATIONS

Galli, E. J.; "The Stenowriter-A System for the Lexical Processing of Stenotypy" in Ire Transactions on Electronic Computers, Apr. 1962, pp. 18 7-199.
"Speeding up Trial Transcripts" in Business Week, Nov. 30, 1974, p. 80.

Primary Examiner—Melvin B. Chapnick
Attorney, Agent, or Firm—James J. Ralabate; Franklyn C. Weiss; Ronald L. Taylor

[57] ABSTRACT

A transcriber system for the automatic translation of stenographic notes from phonetic outlines produced on a shorthand machine to text displayed or printed out. The basic components of this system are the recording station comprising a shorthand machine, and a tape recorder; and the transcriber station comprising a computer, a disk file, a keyboard-display for editing the original translation into its final form, and an automatic typewriter. The editing process is facilitated by a word cursor which identifies the particular word on display which may be manipulated by the System Editor. However, this cursor also is correlated to the original shorthand machine outlines. Thus, the translation of a term peculiar to the job being processed, or to an individual shorthand machine operator, may be remembered so that subsequent correct translations of these particular outlines will proceed automatically.

5 Claims, 122 Drawing Figures

COLLECTS STENOGRAPHIC NOTES – ELECTRONICALLY
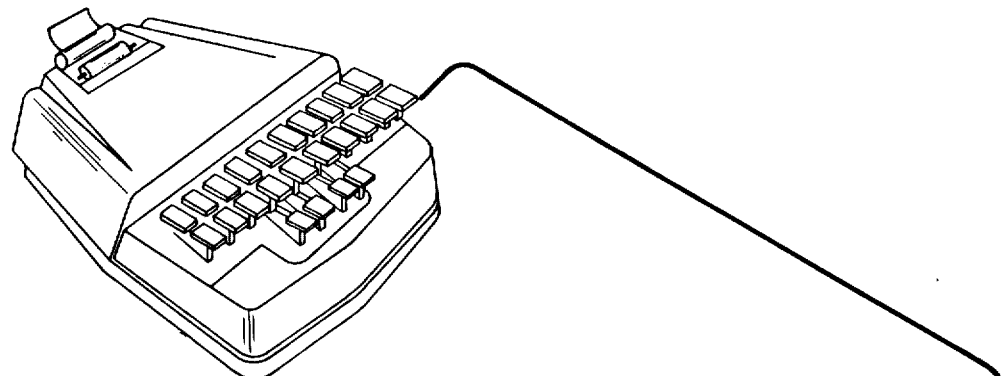
STORES NOTES ON TAPE
TRANSLATES NOTES INTO ENGLISH
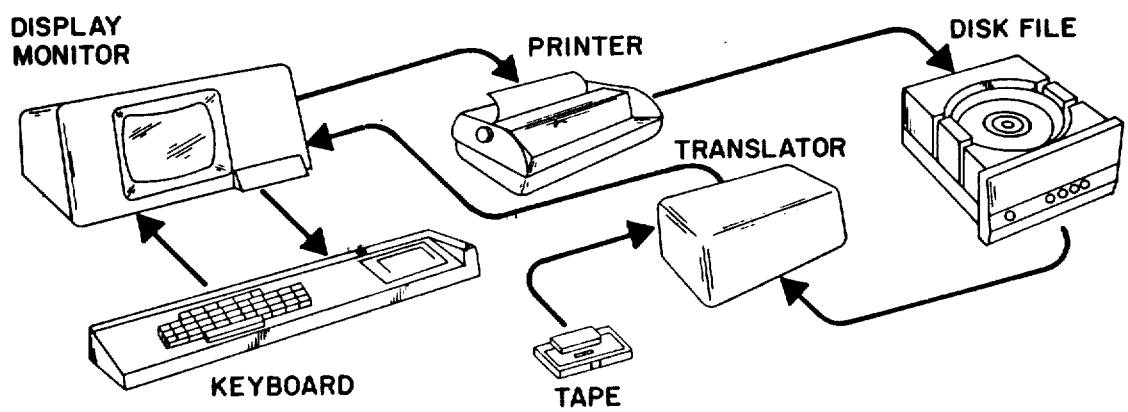
ALLOWS EDITING AND CHANGES TO BE MADE AT ANY TIME
FIG.1

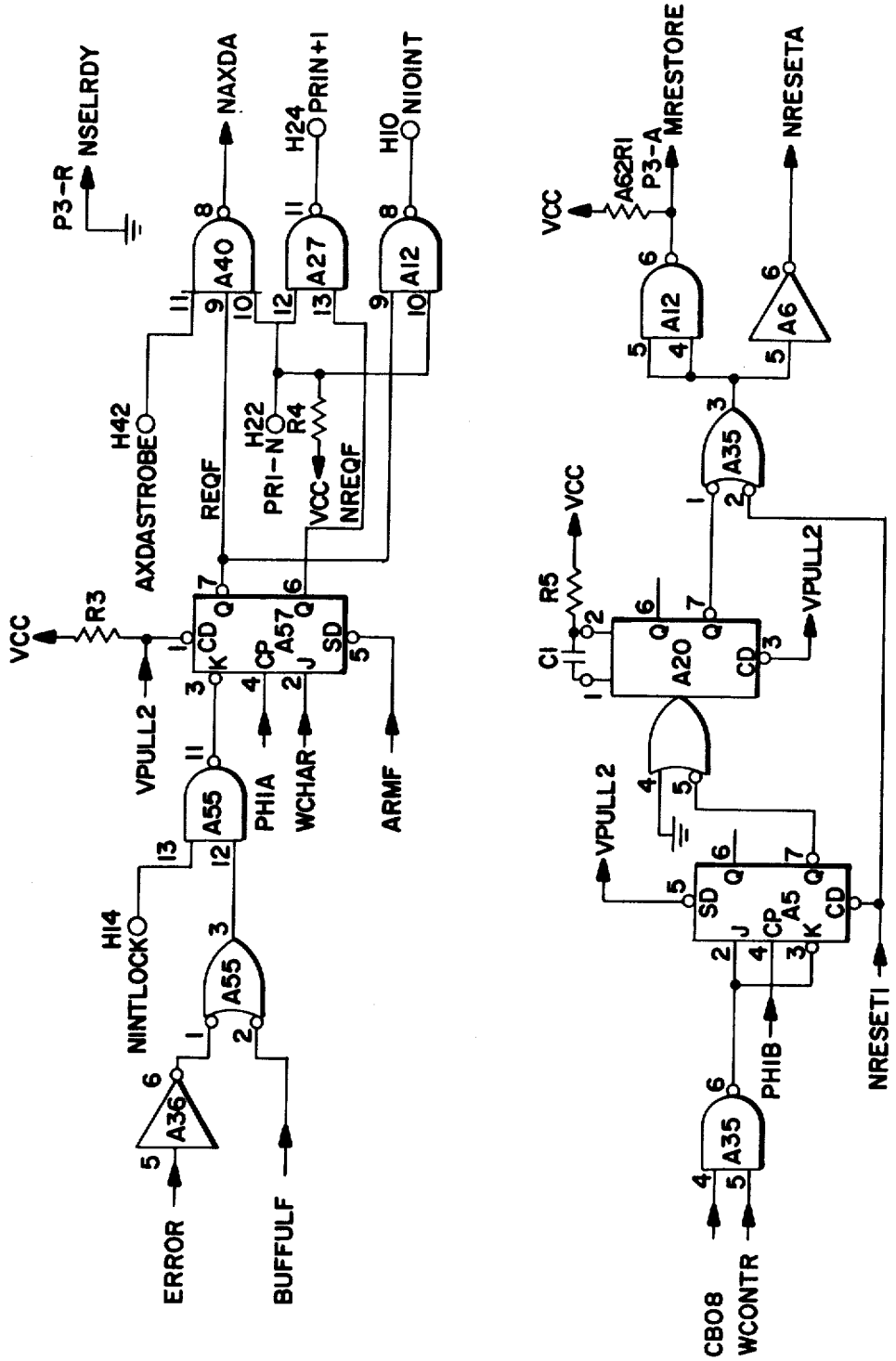
FIG.I2Af

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| HORIZONTAL INCREMENT | 0 | 1 | – | – | – | O(R) I(L) | 512 | 256 | 128 | 64 | 32 | 16 | 8 | 4 | 2 | 1 |

CARRSTROBE = PLOTF NCHROOF CHROIF STBTMF SEQ8CTF

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VERTICAL INCREMENT | 0 | 0 | – | – | – | O(Do) I(Dp) | 512 | 256 | 128 | 64 | 32 | 16 | 8 | 4 | 2 | 1 |

PAPERSTROBE = PLOTF NCHROOF NCHROIF STBTMF SEQ8CTF

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CHARACTER FORMAT | 1 | X | – | – | – | – | – | – | – | ←——— ANSCII CODE ———→ | | | | | | |

CHARSTROBE = PLOTF CHROOF STBTMF NSEQ8CTF

FIG. 15

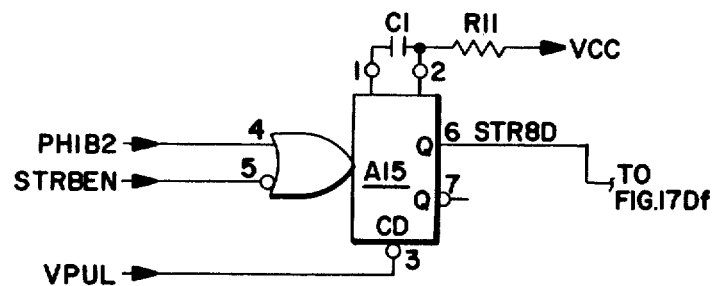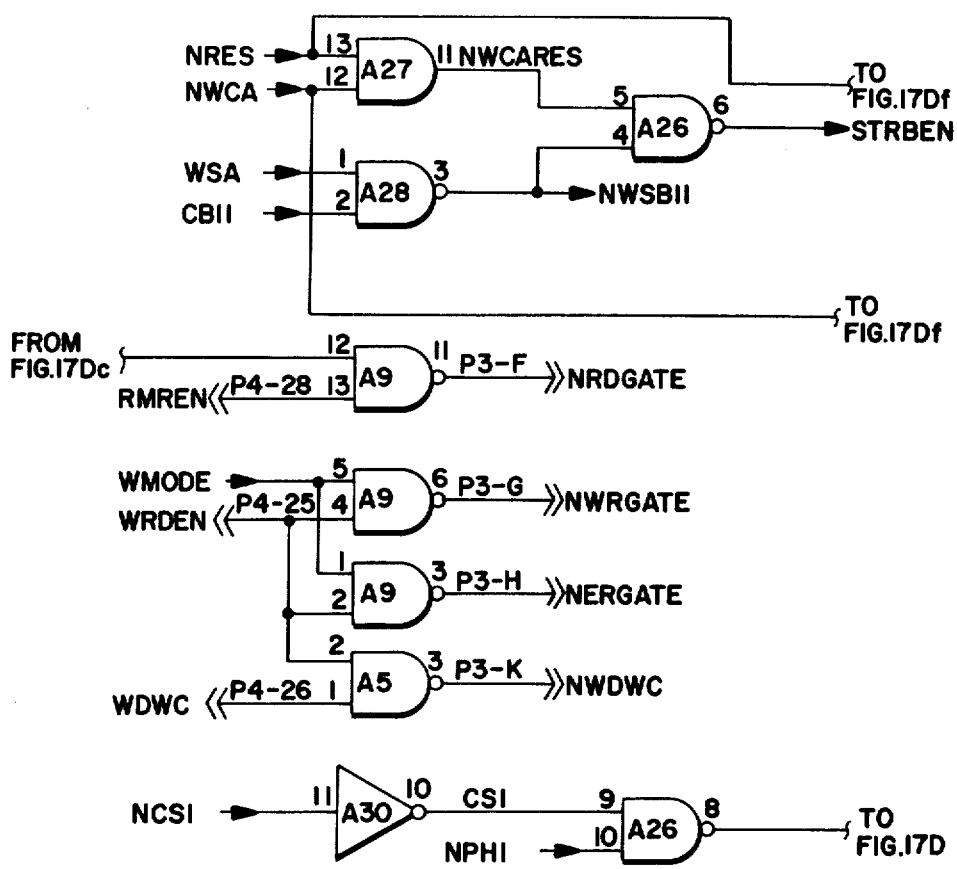
FIG.17Dd

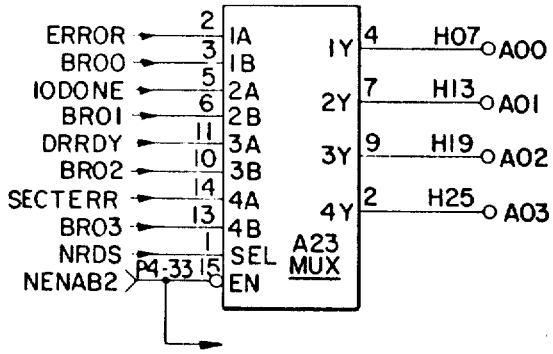
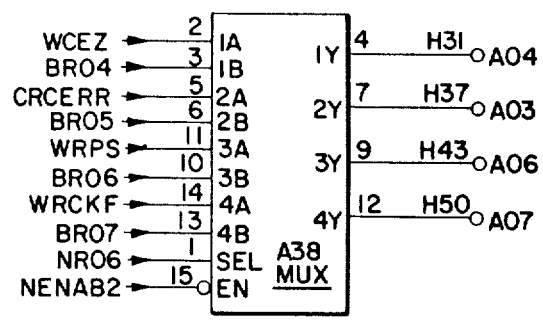
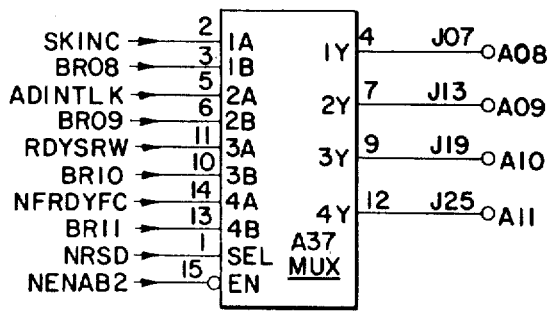
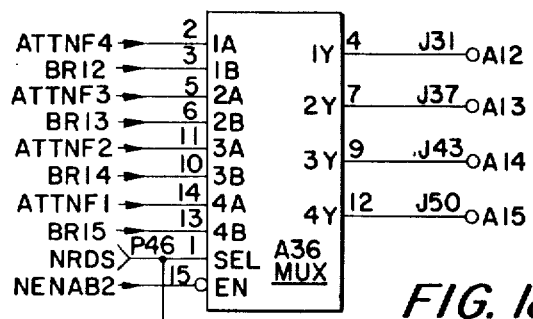
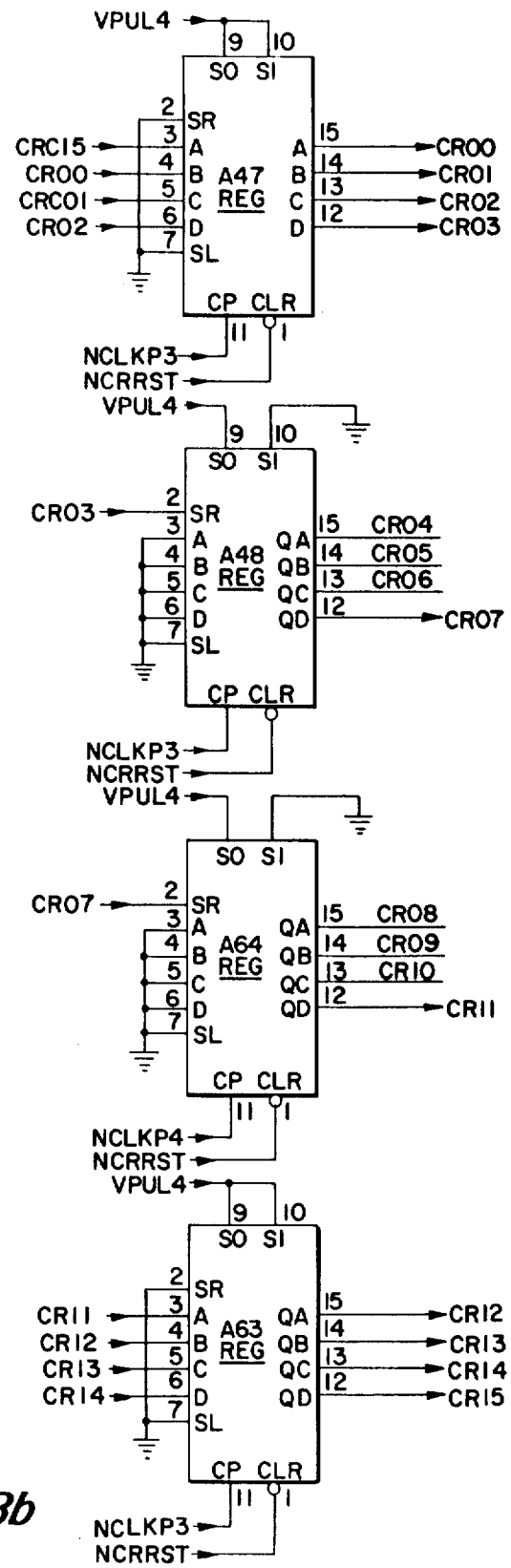
FIG. 18Bb

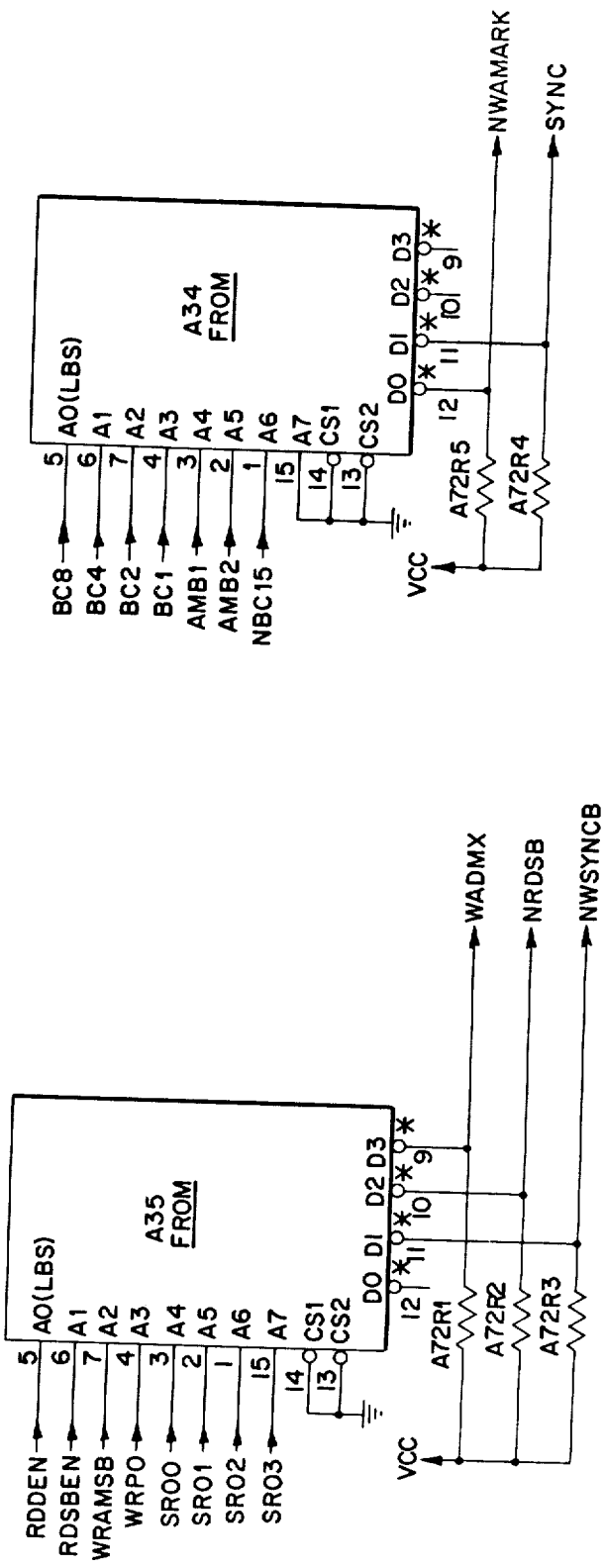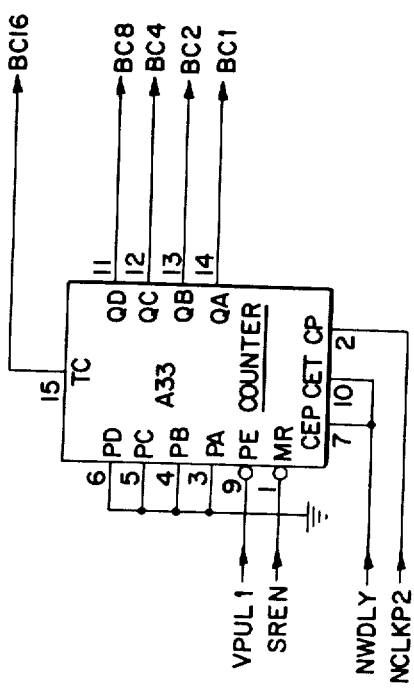
FIG. 18Cd

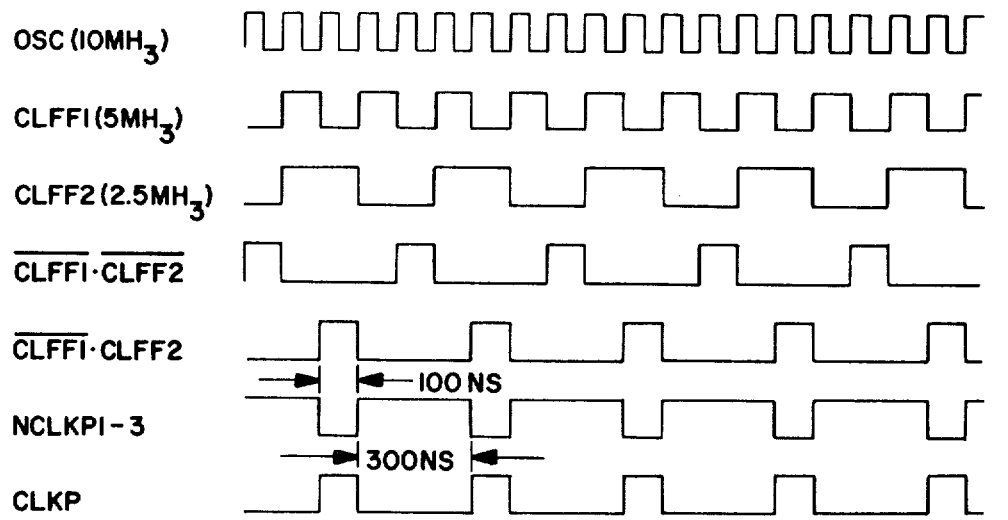
WRITE DATA AND CLOCK
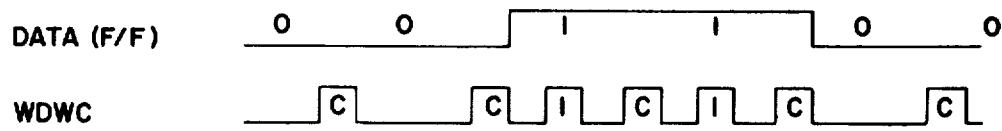
READ DATA AND CLOCK
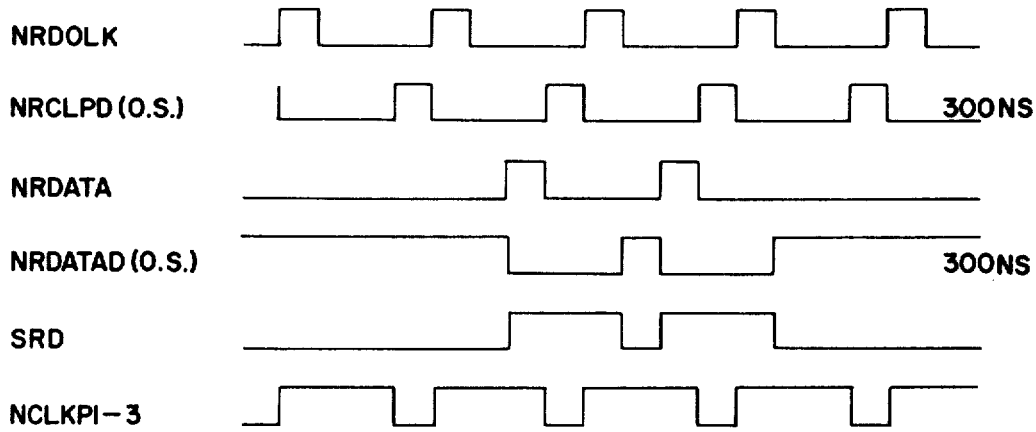
FIG.21

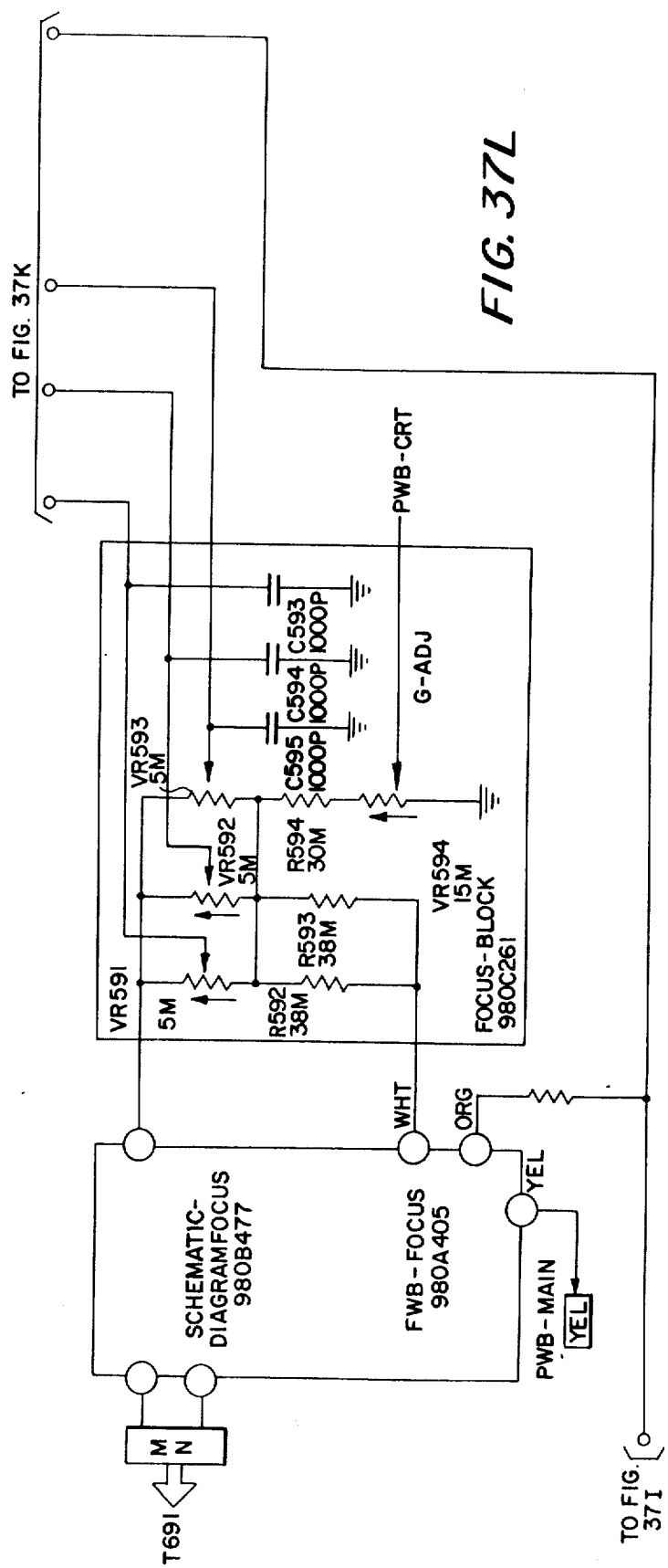

TRANSCRIBER SYSTEM FOR THE AUTOMATIC GENERATION AND EDITING OF TEXT FROM SHORTHAND MACHINE OUTLINES

The present invention also relates to an invention disclosed in co-pending application, U.S. Ser. No. 636,234, to the present inventors entitled, "Word Oriented Text Editor for Soft-Display Systems". This patent application is assigned to the assignee of the present invention.

BACKGROUND OF THE INVENTION

1. Field of the Invention

This invention relates to word processing systems, and more particularly to a system for the computer translation, editing and print out of English text from outlines or notes generated by the use of a shorthand machine.

2. Description of the Prior Art

This Transcriber System is an improved word processing system for use by a secretary in a general office environment, or by a court reporter.

The staff of a typical office routinely engages in the production of letters, memoranda, and reports. The original words may be dictated to a secretary, recorded on one of a variety of magnetic tape recorders or written in longhand, and given to a secretary for rough draft typing. The draft, thus produced, is then changed and/or corrected and resubmitted to the secretary who types the memorandum in final form. Final corrections or changes, if required, result in the possibility of a third typing.

A similar process is initiated during the taking of notes by a court reporter during court proceedings, or by a reporter at any meeting requiring a transcription of the verbal record. In this case, a reporter records the verbal proceedings on a shorthand machine which results in a series of paper tape notes. These notes are typed into rough draft form by a trained note reader, proofread by the reporter, and typed into a final transcript. Alternatively, a reporter, reading from the original paper tape notes, may dictate the information onto magnetic tape which would then be typed by a typist who need not be trained in the reading of the shorthand machine notes. The rough draft thus produced is proofread by the reporter and the typist makes final corrections. In this case the typist need not be capable of reading the original shorthand machine notes, but more of the reporter's time is required for the dictation step. A third method of reducing the court proceedings from paper tape note form to a final transcript is for the reporter to type directly from the paper tape notes. Of course, this requires more of the reporter's time, time that he cannot use recording additional original notes.

In all of the above cases the reduction of verbal proceedings to final transcripts or memoranda is a time-consuming and costly process, and many aids have been developed to reduce the time and work content of these final transcripts and/or memoranda.

One variety of hardware system used to speed the creation of memoranda is the "word processing system." In this case as the typist or note reader creates a rough draft, the encoded information is simultaneously recorded in some kind of magnetic memory. Thereafter, when errors or corrections are required to be made to the original dictation, as shown on the rough draft, only those parts of the recorded information need be changed or corrected. This is normally done by directing the attention of the word processing system to that particular word or sentence that requires change, and then changing that word or sentence in memory. Finally, the word processing system can type out the entire document in its corrected form automatically without intervention by the system operator. In this way the entire document need be typed only once. Thereafter, only corrections and additions need be processed. See U.S. Pat. No. 3,786,429 for a representative system. It can thus be seen that savings of labor is achieved since correct portions of the original transcript do not need to be retyped.

A more efficient form of word processing system is equipped with a Cathode Ray Tube or other device, which, under operator control, can display any portion of the original typed draft. With this system, the operator can access any page of the transcript and correct or change any portion thereof. Finally, when the entire transcript is in its final form, it may be typed out automatically by the equipment. This system is more flexible and more efficient than the equivalent word processing system without a soft display in that all parts of the transcript may be viewed and corrected rapidly and in any order. In contrast, a word processing system without a display must type out each page in order to present visual information to the operator.

In either of the above two versions of word processing systems, a sophisticated controller is required to implement all of the display and editing functions, which must either be a large and complex set of digital circuits or a small dedicated processor.

It can be seen that the above-described systems have increased the efficiency with which a rough draft can be reduced to a final transcript or memorandum. However, the work content of the translation from verbal information to the original rough draft has not been reduced by these systems. More specifically, a rough draft cannot be produced at voice speeds. Either information is dictated to a secretary at voice speeds, then typed into a final draft at typing speed which is considerably slower, or the dictation is verbally recorded on a magnetic tape, and the typist produces a rough draft from this tape, again at typing speed.

In the case of transcribing court proceedings, the time required to produce a transcript of the day's court proceedings using standard court reporter techniques and processes is unacceptable by present standards. Several weeks are commonly required to produce court transcripts and trials are frequently hampered by the delay. On the other hand, lawyers frequently require that transcripts be produced the same day, so that the day's proceedings may be studied with a view toward preparing for the next day's appearance in court. The existing process can be used to develop transcripts but at the cost of using a team of reporters and typists which increases the cost of transcripts significantly.

What is needed, then, in both the office and courtroom environment is a method of reducing a verbal transaction to a rough draft at voice speeds and at lower costs in terms of work input as well as time required for production.

To produce this result computer-aided systems have been proposed. One such system is produced by Steno Comp, Inc. and comprises a standard shorthand machine fitted with a magnetic tape recorder which will magnetically record the stenotype notes, and a computer containing a special program for converting these magnetically recorded notes into a rough draft. See U.S. Pat. Nos. 3,557,927 and 3,892,915.

A standard shorthand machine has a special set of keys for recording alphanumeric data on a continuous strip of paper tape. The keyboard is set up so that a plurality of keys can be struck simultaneously and the information is coded so that the operator can record information at the syllable or word level on each stroke. The resultant alphanumeric information printed on the paper tape is coded in such a fashion that it is not understandable as English, but it can be translated into English by one trained in note reading. This is the standard note-taking process that is normally seen in the courtroom environment. In the case of a computer-aided translation, the identical alphanumeric information is simultaneously recorded on a magnetic tape which may then be transported to a computer. The computer will then act as an equivalent of the note reader in the usual process.

The computer translation of these magnetic notes is not a simple conversion since the sounds recorded are not one-to-one equivalents of the words as they will finally be typed in the rough draft. This is because there are many words which sound and are recorded identically but which must be spelled differently, such as "meat" and "meet". Additionally, spaces between words are not recorded in the original notes so that the computer has no indication of when one word stops and the next word starts. Furthermore, there are a large number of idiosyncracies and variable stroking patterns associated with each individual reporter or secretary operating the shorthand machine. For instance, every shorthand machine operator will typically hit extra keys under some circumstances, fail to hit other keys under certain circumstances, and will invariably have his/her own personal set of brief forms and abbreviations which he/she uses habitually. In addition, each particular subject being discussed will have a large number of technical words associated with the subject and will contain the proper nouns corresponding to the names of the people and places pertinent to the subject matter. It is because of these and other problems associated with the raw notes produced by an operator that the computer translation of these notes becomes an almost unmanageable problem.

One commercial process requires that, along with his magnetically recorded stenotype notes, the reporter should prepare and submit to the system a key-punched mini-glossary of idiosyncratic strokes, proper names and unusual spellings, which the system temporarily integrates into its main translation facility. Of course, other forms of ambiquities based on idiosyncracies and errors of the notetaker cannot be compensated for and the resultant rough draft produced by this process will contan errors. These are corrected by the reporter who edits the first draft output, keypunching his corrections and keying them to the text by line and word numbers. The resulting correction deck along with the first draft output is again submitted to the computer which applies the corrections and produces a final draft of the text. This process may seem cumbersome but it does in fact produce a transcript of a court proceeding more quickly than it would otherwise have been produced using the ordinary transcription process.

To minimize the number of errors in the rough draft generated by the idiosyncracies of each court reporter, each reporter is provided with his own "dictionary" which each reporter can use to store any words that are peculiar to his recording. Thus, if over a period of months, a notetaker realizes that he/she has a tendency to stroke a particular set of words incorrectly in the same way or uses abbreviations that are not standard to notetakers in general, he/she can record these idiosyncrasies in his/her personal dictionary and the computer will invoke this personal dictionary when translating the particular reporter's notes. However, there always will be an irreducible number of pure random errors which cannot be compensated for by the computer and therefore there always will be an error correction process involving keypunching corrections keyed to the text line and word numbers. A result of this is that the process will always include at least two submissions to the computer; the first being a submission of the original notes and the second being a submission of the correction desk. This process, although faster than the ordinary transcript production process, is still costly and time-consuming. What is required is a computer controlled system available at the site where the recording is being done, either the office building or the court house, to which the notes can be submitted, and a system which will display to the system operator an instant rough draft and be available for instantaneous edition and production of the final transcript.

SUMMARY OF THE INVENTION

The present invention comprises a shorthand machine coupled to a magnetic tape recorder for recording the stenographic outlines, and an on-site computer controlled Transcriber Station for translating these machine-readable notes into a rough draft and displaying it on a soft display. This Transcriber Station comprises a Keyboard Display to present the translated text for editing, an automatic typewriter for printing out the final copy, and a disk file for mass storage in addition to the computer memory for controlling the above equipment.

This system accomplishes the two main objectives set forth for word processing systems, that the translation from voice to rough draft be accomplished at voice speeds and that the editing process resulting in a final transcript from the rough draft be accomplished immediately and at the operator's location without the necessity of keypunching corrections or submitting jobs in a batch mode to a remote computer. This system thus produces a final transcript from the original voice transaction with a minimum amount of work and time input.

The translation system for progressing from shorthand machine notes to rough draft relies upon a main dictionary containing practically all the words in the English language as well as a personal dictionary for each note taker which contains his/her preferred abbreviated forms, an outline of his/her typical error modes, and a list of proper nouns and technical words associated with the verbal proceedings being processed. These dictionaries may be conveniently stored in a disk file which is part of the system.

Using this system, a court reporter can produce final transcripts from court proceedings the same day by spending a majority of the day taking notes which are recorded on magnetic tapes. For the remainder of the day he or she will play back each magnetic tape onto the soft display, correcting errors and omissions through the editing process inherent in the system. The final step is an automatic printout of the final transcript which is a process that can be carried out by the computer with the help of a non-skilled operator to load paper into the printer and to command the typing of the final transcript; it is a process that does not require the presence of the court reporter. This then is a system for the rapid production of error-free transcripts.

In the office environment, a similar process would be used. A secretary, trained in the use of a shorthand machine would take dictation resulting in notes which would simultaneously be recorded on paper tape and magnetic tape.

The magnetic tapes would then be inserted into the translator station and would there be translated into a rough draft which would be visible on the soft display. Editing and printing would be similar to the process described above.

When this system is used either by court reporters or office secretaries, it is likely that the transcriber station will be used by each individual a very few hours of the entire day. It is therefore understood that a number of secretaries and/or court reporters, each using his/her own shorthand machine, will be able to do their translation at a single Translator Station, thus minimizing the hardware cost per individual user. Of course, the Transcriber Station memory unit, which is a disk file in the preferred embodiment, must be large enough to contain the work in progress for this plurality of users and a personal dictionary for each user, as well as the main dictionary of the English language which will be used by all users.

An additional advantage of this system over previous systems is that the person originating the memorandum can be presented with an instant draft printed out by the Translator Station printer. This is accomplished by cabling the shorthand machine directly to the Translator Station. Then, as the dictation is recorded, the phonetic outlines are processed immediately by the Translator Station and printed up directly on the printer into hard copy. In this way the document originator can see immediately a rough draft of the memorandum as he/she is generating it. This is an advantage since the person doing the dictating may now be able to read the previous sentence or paragraph in order to phrase the next sentence or paragraph more accurately. This is another function that has not been possible on previous word processing systems.

Another unique aspect of this system is that it is a "perfect speller". This is because words are generated not a letter at a time but a word at a time; in that strings of syllables are used to look up entire words and these words in their entirety are displayed or printed. Since these words are correctly spelled in the dictionary they will automatically be correctly spelled in the rough draft or soft display. Thus, it is impossible for the system to produce an incorrectly spelled word. Of course, because of stroking errors, operator idiosyncrasies, proper nouns or novel abbreviated forms, the system may be unable to develop a word at all or may develop the wrong word. However, under no circumstances will the system produce an incorrectly spelled word.

A further advantageous characteristic of this system is that is can be used for any language, since the shorthand machine records sounds and since the dictionary can be changed to any other language.

Another characteristic of this system which results in greater system efficiency is that the editing and translating systems are interactive. A cursor is produced which not only specifies on the keyboard display which word or phrase may be edited, but which also specifies, internally, the original stroke outline from which the keyboard display word has been produced. Therefore, if the editing process is used to correct a translation error based on the unavailability in the standard dictionary of a proper name, a rare technical word, or an abbreviation peculiar to the instant system operator, the system can store the correct translation for that particular outline. Thus, the operator need make such corrections only once; thereafter, the system will process these particular outlines automatically.

It is thus an object of this transcriber system to provide an on-site means for automatically generating a rough draft directly from shorthand machine outlines stored on magnetic tape and to provide on-site editing and printing capabilities for the generation, from this rough draft, of a final transcript.

It is also an object of this invention to be able to produce a rough draft instantly at voice speeds for immediate use by the person originating the information.

It is also an object of the invention to provide a Transcriber Station for performing the translation, editing, and printing functions which may be shared by a plurality of users each of whom has a shorthand machine coupled to a magnetic tape recorder or equivalent.

It is also an object of the invention that the operation of the Transcriber Station be fast to learn and easy to do. The station is designed for multiple users who will have to do some of the operations on it infrequently, yet these operations must be performed without reference to a training manual and without frequent procedural errors. To this end the station was designed to be self-instructing, to make the current status of any operation obvious to the operator, and to display all options and alternative methods of operation during any routine.

BRIEF DESCRIPTION OF THE DRAWINGS

FIG. 1 is an illustration of the recording, translating, and editing process.

FIG. 15 shows the format of the Vertical/Horizontal and Character Control Words.

FIGS. 20 through 23 timing diagrams of the Cartridge Disk Drive Controller.

DETAILED DESCRIPTION OF THE PREFERRED EMBODIMENT

Figure 2A:
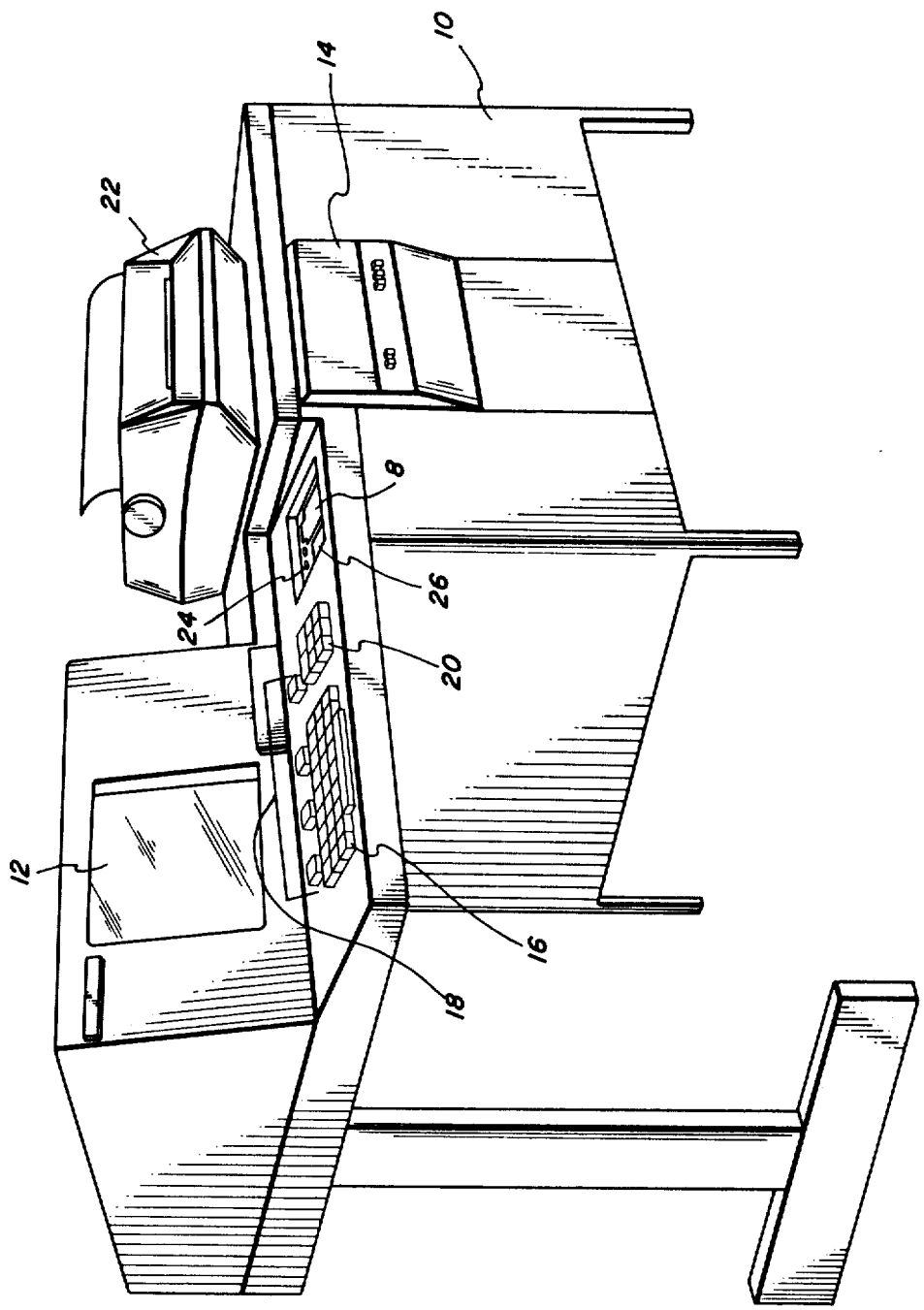
FIG. 2a shows the location of the various components comprising the Translator Station.

This transcriber system captures machine shorthand (stenotypy) in electronic form on digital magnetic tape cassettes. A modified Stenoprint or Stenograph machine is used to record the verbal communication and is modified to be able to translate this information into a digital signal which is sent to a magnetic tape recorder. This tape recorder produces a magnetic tape record that corresponds in information content to the paper tape record that is automatically produced at the Stenoprint or Stenograph machine. These magnetic tape cassettes are then processed by the Transcriber System at the Transcriber Station whenever they are needed or it is convenient to do so, and the Transcriber Station converts these digital shorthand notes into English text. The English translation can be typed out immediately as it is translated and is also stored in the Transcriber Station's electronic memory. This internal storage ensures that translated material is accessable for subsequent document editing and revision. A document can be edited any number of times, incorporating changes from one revision to the next, until the text is ultimately resolved into its final form. For extremely short documents and special work such as addressing envelopes, the transcribing station also can be used as a conventional work processing system using a standard typewriter keyboard as the text input medium.

FIG. 1 is an illustration of this process. The central element of the Transcriber System is an electronic storage unit comprising a removable magnetic disk cartridge which contains working storage for up to 14 individual users. UP to 600 pages of document storage are available and can be shared amount all users of each disk. Any number of disks can be used on a Transcriber System. Consequently, the amount of document storage is limited only by the number of magnetic disks available for each user.

Each user is supplied with a small electronic device which serves as a user identifier. This user identifier must be inserted into the transcriber system in order to operate the system. Furthermore, there must be a match between the user identifier and an authorized user list that is uniquely associated with each removable disk cartridge. This feature assures that each individual user is restricted to the capability of retrieving and reviewing only his/her own material, and cannot access, alter, or destroy text that is being processed by another user.

The Transcriber System will adapt to each user's individual stenotyping style. This adaptive capability insures that individual differences in stenotyping as well as specialized brief forms or abbreviations can be translated by the Transcribing System. Once a stenotype outline has been "defined", it can be used just that one time; or the outline can be used for a single document; or the outline can be made a permanent addition to the memory unit of the Transcribing System.

The color Display Monitor is similar to a television display and presents data for editing prior to printing. This color Display is used to display not only the text but also information to the operator, guiding the operator through whatever sequence of steps are required to specify, perform, or complete a task.

The internal vocabulary stored in the disk file is comparable in scope to the contents of a typical college dictionary and contains considerably more than one million English words, comprising about one hundred thousand basic words and all the grammatical variations.

A special mode of operation permits English to be typed out a few seconds after each word is stenotyped. This capability permits draft of copy to be ready for review by its originator immediately upon completion of the origination process. The prime purpose of this instant translation capability is to make a draft copy available for review as rapidly as possible. When operating in this mode, stenotypy is transmitted directly from the stenotype machine keyboard to the Transcriber Station. The recording on magnetic tape does not take place. The Transcribing Station translates the material immediately and presents the translated text. This information is typed on the Printer. If this instant printing mode is used, the turnaround time between dictation and printing is eliminated. The originator can therefore concentrate on the matter at hand and not have the train-of-thought process interrupted by the delay between dictation and transcription. Thus, the originator has a real-time printed record of everything that has been said to that point in time.

There are no procedures that must be memorized in order to use this transcribing system. The transcriber itself will guide the operator through whatever choices or actions are needed for, or appropriate to, the situation at hand. The system does this by displaying a message on the editing screen whenever operator action is required. Due to the fact that the Transcriber takes the lead in communicating with the operator, the operator's interface becomes one of indicating which one of several alternatives presented by the transcriber should be taken. The operator cannot instruct the system to do something impossible, since the Transcriber System will not have presented that alternative. Therefore, the Transcriber System itself ensures that choices are always specified in the correct sequence.

The Transcriber System will present choices or alternatives on the color Display Monitor screen along with explanatory text whenever necessary. The displayed message will then lead the operator to take a choice. When a choice has been made by the operator, the Transcriber System then takes the next logical step in the selected process. This next step may initiate a process, perform a single specific function, or result in a display that requests further information or choices from the operator.

Above the standard Keyboard keys are six function keys. See FIG. 2b. These keys are used to control the flow of information, direct the activities of this Transcribing System, and resolve unusual situations. These keys are controlled by the computer and provide different functions at different operating times. The Display screen is used to indicate what function, if any, is controlled or selected by the key immediately under the message. The messages or labels will change as the Transcriber moves from one activity to another or between steps within one activity. For example, the keys are labeled differently during the system start-up than they are when the operator is editing text on the Display Screen. Thus, the Display itself always clearly states the function of each key at any particular moment in time.

Pressing any one of the keys will instruct the Transcriber System to take the action or to use the choice indicated by the message displayed immediately above that key on the Display. If key is pressed that has no label displayed above it, the key stroke is ignored and the Transcriber waits for a correct key to be pressed. Pressing the "Finish" (last) key causes the Transcriber System to complete the current activity and to return to the next major function step that is to be performed; that is the only function of the last key. FIG. 2b is an indicationof a typical display showing the functions of the various function keys.

The Display presents information concerning sequencing and control, text display or stenotype notes display. Each display has its own format.

Sequencing and control information is usually in the form of a message that tells the operator what is happening and/or to describe what information is needed. The message presented when power is turned on or when a user identifier is inserted into its receptacle are examples of this type of display. These displays are typically the first messages that a user/operator will encounter when using this Transcriber System.

The stenotype note display format is used to display both stenotype notes relevent to a portion of translated text identified by the cursor and the resulting English text. This would be an aid to the editor in that the original notes could be inspected for indications as to what the proper English text ought to be without forcing the editor away from the display to consult the paper tape shorthand machine output.

Color is used to enhance the meaning of information displayed. The use of color is generally guided by the following principles. Text and most messages are displayed in white. Items requiring attention are displayed in red. Those items include problems arising in the translation process such as homonyms that connot be resolved by the translation procedures and words which cannot be translated at all. This last category consists of outlines that have no counterpart in the transcriber dictionary that relates stenotype outlines to English. These outlines are converted into phonetic English, to approximate a written version of what might have been heard and stenotyped, and they are called transliterations. Questionable translations, or any text that might require a review, are rendered in yellow indicating caution. In text editing operations, the current place or cursor at which editing can occur is indicated in green. Information that can be edited is indicated by a cursor. The cursor points to that place on the display screen where editing actions, if performed, will take place. The pointing action is implemented by displaying the material pointed to by a cursor in the color green or by underlining in white. Only one work or contiguous group of words in the text area will be displayed in green since the cursor can only be in one place at any given time. An operation that adds or inserts text always takes place immediately prior to the position pointed to by the cursor. An operation that removes or deletes text removes all material pointed to by the cursor.

A separate group of ten keys is located immediately to the right of the standard typewriter keyboard. These ten keys are defined as the edit control keys and are illustrated in FIG. 2b. These editing control keys play a major role in controlling the editing process. While the transcriber is reading stenotype outlines, it translates them into English and exhibits them on the display screen.

The "Edit" key controls whether or not text is to by typed immediately upon translation, producing draft output at full speed. The Transcriber System automatically produces draft copy if no intervening action occurs. However, once the "Edit" key is pressed, the Transcriber System will pause after a screen full of new text has been displayed in order that the translated text can be reviewed and edited if desired. This key acts as a toggle switch; that is, its first depression stops the "Draft" mode and converts the system operation into a "Translate and Edit" mode. The next depression of this key causes the Transcriber System to return to its Draft mode. Another depression reinstates Translate and Edit, etc. The current status will be displayed at the top of the screen. The Stop key is used to stop all system activity. It is used in exceptional situations such as when a sheet of paper in the printer is skewed. When this key is depressed all system activity stops; processing is reinitiated by a function control key.

This Transcriber System is a true "work processing system" in that the basic unit of information is a word and not a letter. Word orientation is consistent with stenotype principles where an outline corresponds to a word, a phrase, a punctuation mark or formating information. In a formal sense, a transcriber "word" is the translation of a stenotype outline and consists of either a word or group of words terminated by space or a punctuation mark, a punctuation mark if and only if the symbol is followed by one or more blank characters or a blank line separating two paragraphs. This concept of word manipulation is important with respect to the editing capabilities of this Transcriber System. First, information shown on the display screen is accessed on a word basis. At any point in time, information at a specific place on the display screen can be referenced. This feature is accomplished by using a cursor or "pointer" to the information that can be accessed by the operator. The cursor is positioned on the display screen by using one of the four keys shown in FIG. 2b as containing an arrow pointing to the left, right, up and down. The use of these keys is described as follows.

The key showing an arrow pointing to the right causes the cursor to move to the next word; it moves one word to the right. When the cursor points to the last word in the line of text, pressing this key causes the cursor to move to the first word (left-most) of the next line. The cursor cannot be moved beyond the last word of text on the screen.

Depressing the key showing an arrow pointing to the left causes the cursor to move one word to the left. If the cursor is pointing to the left-most word on the line of text, the cursor will be moved to the last word of the preceding line. This feature enables rapid correction of a cursor-right movement that overshot its intended resting place. The cursor cannot be moved to position preceding the first word of the text displayed on the screen.

Depressing the key with an arrow pointing upward causes the cursor to be moved to the first word (left-most) on the preceding line. The cursor cannot be moved to a position preceding the first word of the first line.

Depressing the key containing a downward pointing arrow causes the cursor to move the first word of the next (lower) line of text. This activity is analogous to the carriage return function on a typewriter. The cursor cannot be moved beyond the first (left-most) word of the last line of the text by this key. The cursor canbe moved to the start of a new paragraph, to blank a line, or to the first of a group of spaces generated by a tab character. When the cursor is self-positioned, this fact will be indicated by a blinking green underlined character. Another key, labeled "Extend" and having an arrow pointing to the right, is associated with the cursor. Pressing this key extends the scope of the cursor to include the next succeeding word. Thus, multiple words can be combined into a single entity for purposes of editing, such as adding, replacing, deleting or defining a new term. Any number of successive words can be combined into a single entity for purposes of editing by using this key repetitively.

The Insert key alerts the Transcriber System to the fact that information is to be added or inserted. This information will be added immediately in front of the word that is pointed to by the cursor. Every time this key is pressed, a blank line is created by moving the line of text beneath the cursor, and every succeeding line, down by one full line. This procedure provides a full line of blank space to contain the material that is being inserted. At the conclusion of the insertion operation, the display screen is reformatted to eliminate all unused blank space that was introduced when insertion was initiated. Once Insert has been pressed, the Transcriber System will accept characters from the console Keyboard. These characters are assembled and displayed as they are typed. The back space key will cause the last-typed character(s) to be deleted. This feature permits the correction of input errors made during typing. Insertion is terminated by one of two means, a cursor movement or depressing the Delete key.

Pressing the Delete key causes all material under the cursor to be deleted. This function can include any number of consecutive words, provided the words to be treated and deleted as a group have been previously linked together by the Extend function. Each depression of Delete is treated as a separate delete function. When a word is deleted, the Display screen is reformated to eliminate the space that the deleted material had occupied. The cursor will then point to the word following the word that was deleted. Pressing Delete again causes the next word, now under the cursor, to be deleted.

Pressing the Remember key causes the preceding editing operation to be automatically applied in future instances. This function is normally used to change the meaning or translation of a specific stenotype outline. For example, if no outline exists in the transcriber system dictionary corresponding to the sequence of strokes contained in the shorthand machine notes, these strokes would be transliterated and displayed in red on the Display screen in their phonetic equivalents. The Transcriber System can be instructed to equate the previous stenotype outline with the desired word by positioning the cursor over the first of the transliterated characters, pressing the Extend key until the entire transliterated word is included, pressing the Insert key and typing in the correct text, pressing the Delete key to remove the transliterated characters from the display and finally pressing the Remember key so that the next time this particular sequence of strokes is encountered the correct word will again be placed on the screen without the editing process being repeated. This procedure will replace the transliterated text with the intended English text and will instruct the Transcriber System to permanently equate the outline defined in the preceding example with the final word.

The Transcriber System is separable into two main groups of components, the Recording Station and the Translator Station. The Shorthand Machine, a part of the Recording Station, is shown in FIG. 2c and used by the note taker to record verbal data at voice speeds.

Any standard shorthand machine may be used in this system. For instance, the Stenograph shorthand machine manufactured by Stenographic Machines, Inc. is shown in FIG. 2c. The machine comprises a Main Assembly 1, a Paper Tray 3, and a three-part Shell Assembly 5. Paper is fed up through and around the Roller 6 mechanism and is advanced one line at a time whenever one or several Keys 2 are depressed. The keys are coupled through a mechanism to a Font 4 similar to typewriter print so that for each stroke of one or several letters will be printed on a line on the paper. Each set of strokes corresponds to one or several syllables of a word. It is this ability to record entire syllables or words in one stroke that results in a distinct speed advantage of the shorthand machine over a standard typewriter which must record one letter at a time. A complete mechanical and functional description of this shorthand machine is contained in a *Service Manual and Parts List,* Catalog NO. 945M, published by Stenographic Machines, Inc. in 1965.

These Shorthand Machines are modified with the addition of a mechanical contact below each Key 2 so that an electrical indication of each set of Key strokes is provided. These electrical signals are coupled through cabling to a carrying case containing a Magnetic Tape Recorder and a Battery to allow for portable operation. Thus, the note taker carries the recording equipment and Shorthand Machine to the work station for recording dictation.

Figure 2B:
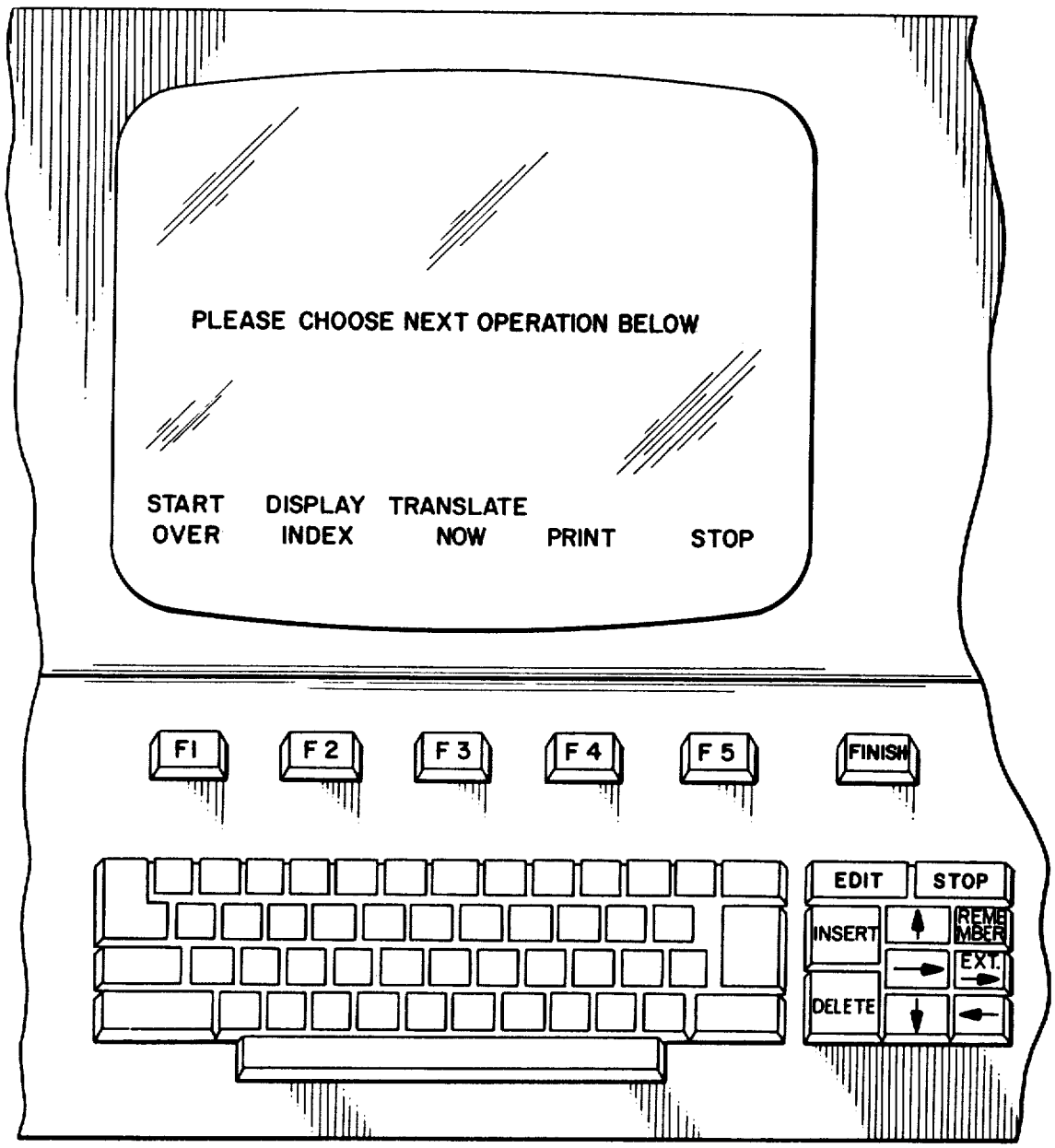
FIG. 2b is a pictorial representation of the Keyboard Display with sample function switch labels being displayed.
Figure 2C:
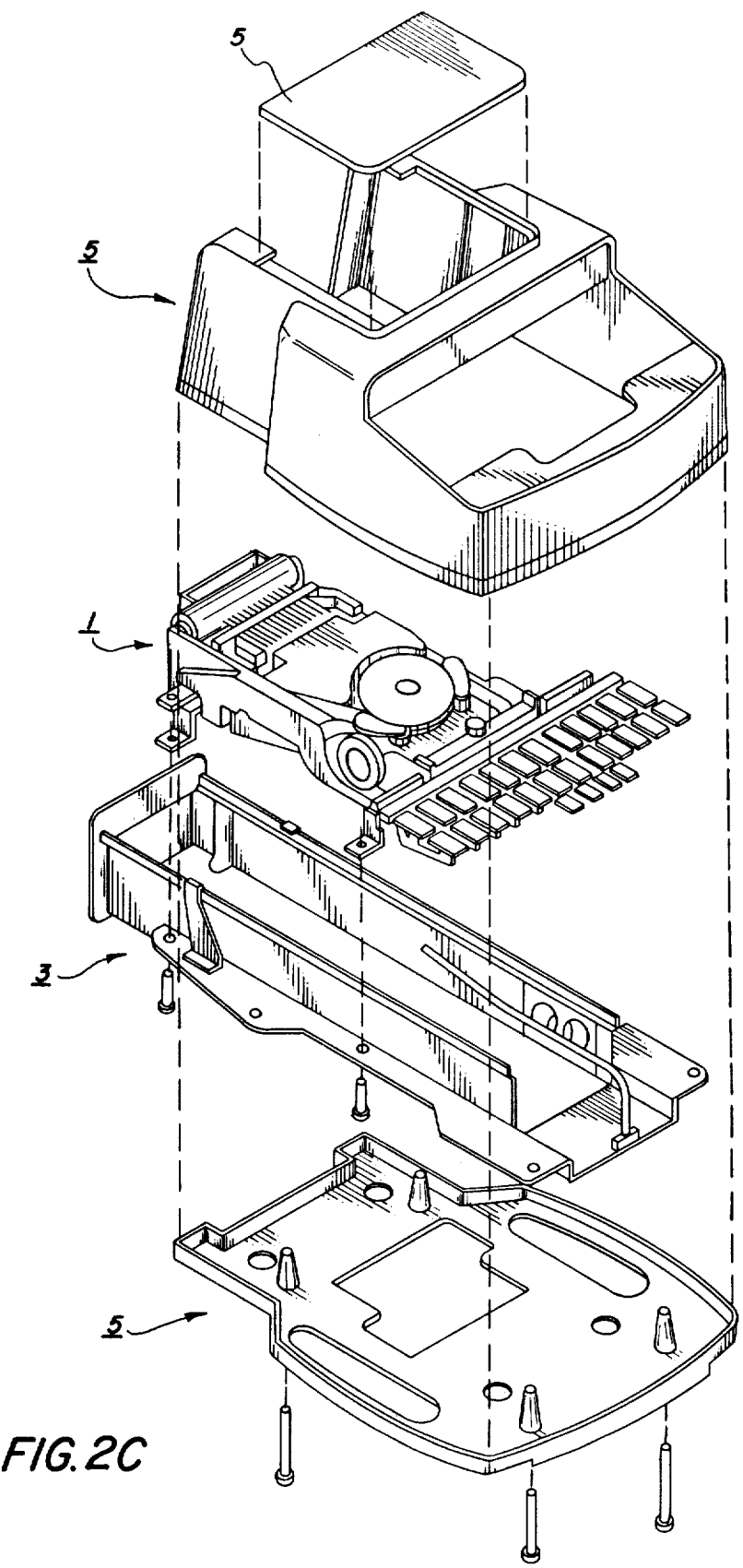
FIG. 2c is an assembly diagam of the Stenogaph Shorthand Machine.

FIG. 2a shows the physical arrangement of the components comprising the Translator Station. In norml use the Magnetic Tape produced during recording is unloaded from the recording equipment and mounted into the Cassette Transport 8 for playback. This information is processed by a computer inside the Covering Panel 10 and a rough draft is produced at the Color Display Monitor 12. The Disk File 14 is used to store the personal dictionary of each operator as well as the main English dictionary, all of which are accessed by the Computer during the translation fo the data from outlines recorded on the Magnetic Tape to the rough draft displayed on the Color Display Monitor 12. A standard Keyboard 16, Function Keys 18, and Editing Control Keys 20 are provided so that individual words, sentences, or paragraphs may be changed, deleted or added from the information shown on the Color Display Monitor. When the information on the Display Monitor is in its final corrected form, a final transcript may either be printed out automatically on the Printer 22 or stored back into the Disk File for later printing.

An Operator Switch Panel 24 contains the Transcriber Station Power On Switch and the Operator Key Receptacle 26 receives an internally switch-coded operator key which identifies the particular operator to the Translator Station.

The Keyboard Display subsystem includes the following major commercial components: Model M346 Color Display Monitor manufactured by Mitsubishi Electric Company, Kyoto, Japan; Model 880-554A Keyboard, manufactured by Cherry Electrical Products Company, Waukegan, Illinois; and Model SC 442A Keyboard/Display Controller manufactured by Xerox Corporation. The display has a cpacity of 20 text lines per page and 80 display characters per line. The characters are generated by a 7 × 9 dot matrix which generates the 63 alphanumeric presentations obtained from the USASCII Code Practice Manual. This character set includes numerals and punctuation marks as well as upper and lower case characters. Since the keyboard display is a color cathode ray tube, these characters can be displayed in any of four colors - yellow, red, green or white. The sets of characters may also be underlined or may be caused to blank by the appropriate operator action. The result is a display containing white text on a black background with those words which the system feels ought to be brought to the operator's attention being presented in one of three colors, each color signifying a particular word status to the operator as will be described in detail hereinbelow.

In the remainder of this specification, each system component and its interaction with the other elements of the system will be discussed in detail.

The Computer used in the preferred embodiment of this Text Editing System is the Xerox System Control Unit (SCU). However, any equivalent mini-computer could be used for this purpose.

The Xerox System Control Unit is a modular microprogrammable data processor designed to interface with a hardware system. As shown in the simplified block diagram, FIG. 3, this unit consists basically of Input/Output Interfaces 102, General Registers 104, Microcontrol Elements 106, 108, and 110, an Arithmetic Logic Unit 112 and a Scratch Pad/Main Memory 114. These elements are connected between three sixteen bit data buses used in common, the A-Bus 116, the B-Bus 118 and the C-Bus 120. The Input/Output Interface 102 connects the rest of the Text Editing System directly to the three Data Buses.

The eight General Registers 104 can be used interchangeably as accumulators or index registers. They can be used to store intermediate results or to move data from the C-Bus to the A or B-Buses.

The microcontrol elements include the Control Memory 108, the Micro Address Register 106, and the Micro Control Register 110. The Control Memory 108 holds a sequence of microinstructions, known alternatively as the microprograms. The Micro Address Register 106 generates the microaddress of the location in Control Memory 108 of the next microinstruction. The Micro Control Register 110 holds the current microinstruction while it is being executed.

The Arithmetic Logic Unit 112 is capable of 32 arithmetical or sixteen logical operations taking its two operands from the A-Bus 116 and B-Bus 118 and placing the results on the C-Bus 120. The Memory section 114 contains a local high-speed Scratch Pad storage which can operate at a system cycle rate of 350 nanoseconds as well as a Main Memory with a 700 nanosecond rate. The local, or Scratch Pad, Memory can be used for intermediate storage beyond the limits of the eight General Registers 104 or for other purposes. The Main Memory can be used to store data and results of previous operations in addition to the main program.

The 32 bit microinstructions contained within the Control Memory 108 are divided into a number of fields that control all the operations of the System Control Unit. For example, the microinstruction determines the source of data for the A-Bus and B-Bus, whether it is from the Input/Output Interface 102 or from a General Register 104. It determines the function to be performed in the Arithmetic Logic Unit 112 on data from the A and B-Buses. It determines if the data from the A-Bus is to be stored in Scratch Pad/Main Memory 114 and at an address contained on the C-Bus. Complete definitions of the microinstruction fields are described in Section 3 of the System Control Unit (SCU) Reference Manual Number 98 04 27A, published in May, 1973 by Xerox Computer Systems, El Segundo, California.

Figure 3:
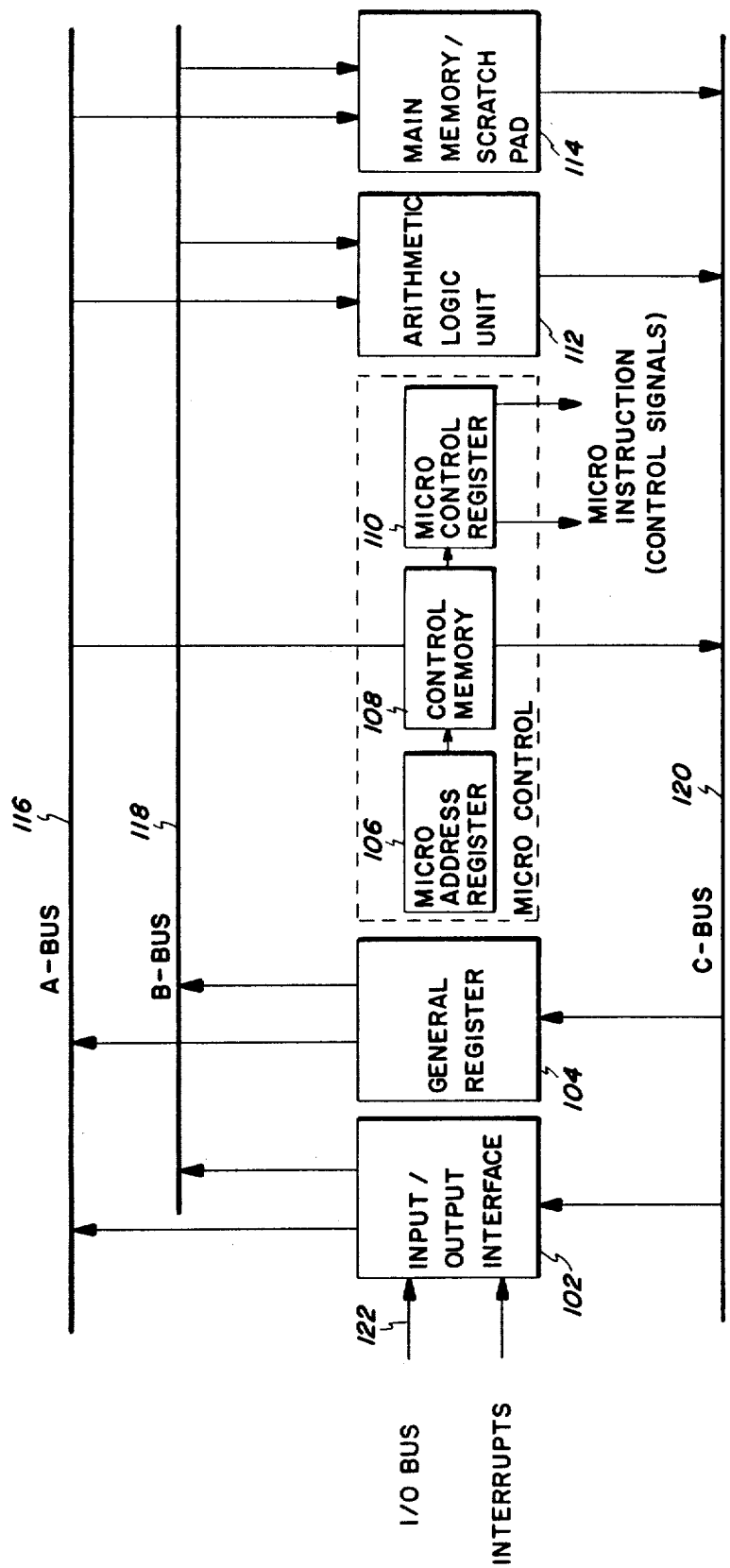
FIG. 3 is a simplified block diagram of the System Control Unit.

It is apparent from FIG. 3 that the microinstructions can direct the flow of data through many paths. Incoming data from the Input/Output Bus 102 for example, can be routed directly to the Scratch Pad or Main Memory 114 or can first be operated on in the Arithmetic Logic Unit 112. Results from the Arithmetic Logic Unit 112 can be transmitted immediately via an Input-Output Interface to the Input/Output Bus 122 or can instead be held in a General Register 504 pending further manipulation within the Unit. Similarly, information from Scratch Pad/Main Memory 114 can be routed to the Input/Output Bus 122 or to a General Register 104.

The General Registers 104 are often used to buffer data between the C-Bus 120 and the A-Bus 116 or B-Bus 118 for further processing or storage within the machine. In a somewhat similar way, the Arithmetic Logic Unit 112 can also be used as a path to move data unchanged from the A or B-Buses to the C-Bus. Thus, multiple fields enable the microinstruction to control a number of operations and to address several locations simultaneously.

The basic Processing Unit is housed in a two-high mounting case containing up to 32 double sized modules. This case holds all standard and optional modules and up to 16K words of Main Memory. A fan case holding two fans is located below the mounting case and power supplies are contained in a separate chassis.

FIGS. 4 through 8 and accompanying specification text describe the hardward in more detail as well as the flow of micro addresses, micro instructions, and data throughout the SCU structure.

The System Control Unit consists of three types of elements: clocked registers or memory units; combinational gating structures, such as 2:1 multiplexers or the Arithmetic Logic Unit; and the three Bus structures, A, B, and C.

The system has a single clock period of 350 nanoseconds, with no clock phases. Thus, each clocked element assumes a state at one clock pulse and holds that state until the next clock pulse appears. During the clock period, the state of each register passes through the intervening gating structures and buses and is ready to enter the following register at the next clock pulse. There is one exception to operation at clock speed, however. The main memory reads/writes at a 700-nanosecond rate, or two clock periods., Therefore, when a main-memory operation is specified, one clock is dropped and the intervening-time period between the two clock pulses is 700 nanoseconds.

The System Control Unit has three formats: micro addresses, micro instructions, and data, as will be explained in relation to FIG. 4.

The micro address consists of 12-bits capable of addressing up to 4096 Control Memory locations. The Micro Address Register 124, Micro Address Bush Stack 126, and related gating operate on a 12-bit basis. When a micro address is routed over one of the three Buses, it occupies the least significant 12 positions of the 16-bit positions.

The micro instruction consists of 32-bits. The Control Memory and the Micro Control Register operate on a 32-bit basis. When a micro instruction is routed over one of the Buses, it is handled in two 16-bit sections.

Data is processed on either a word (16 bits) or byte (8 bits) basis. Input/Output Interfaces, General Registers, the Arithmetic Logic Unit, Scratch Pad, Main Memory, and the three Buses of FIG. 3 operate on either a word or byte basis.

Information flow refers to the path data takes from one register via gating and buses to another register. The flow of information will be described in four categories: micro addresses, micro instructions, data, and interrupts.

Figure 4:
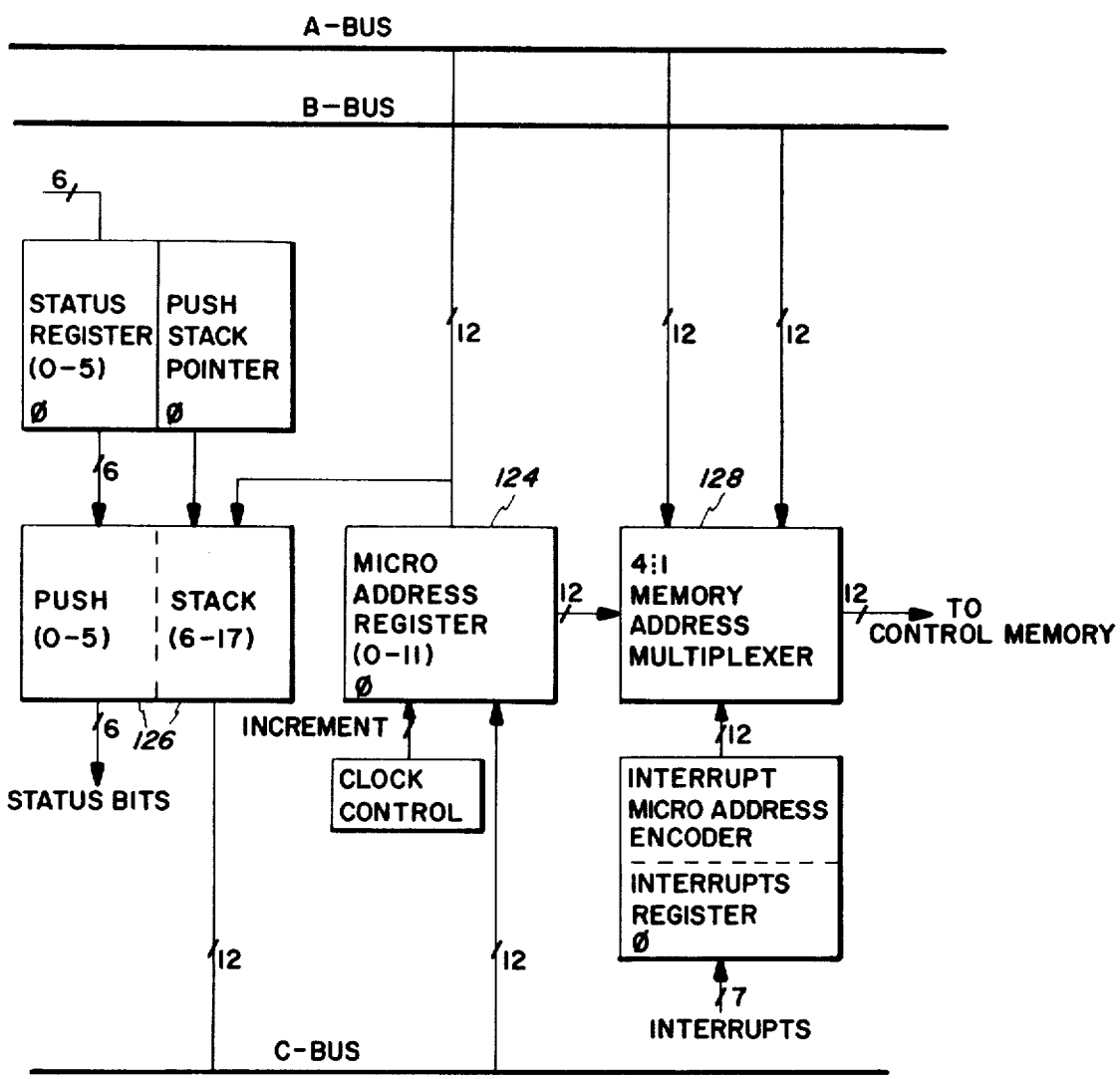
FIGS. 4 through 8 comprise a more detailed block diagram of the System Control Unit.

The micro addresses are normally held in the Micro Address Register, 124 of FIG. 4. From the Micro Address Register they are applied via the 4:1 Memory Address Multiplexer 128 to select the Control Memory location in which a micro instruction is stored. The micro address in the Micro Address Register can be changed in two ways. It can be incremented to the next micro address by the clock, or jumped to another micro address supplied from the C-Bus.

The micro address applied to Control Memory can be multiplexed from the Micro Address Register 124, the A- and B-Buses, and the interrupt logic. The interrupt logic generates micro addresses corresponding to each interrupt.

The current micro address in the Micro Address Register 124 can be stored in the Push Stack 126 and replaced with a micro address from the C-Bus. Also, the micro address from the Push Stack can be routed via the C-Bus to the Micro Address Register. At the same time the micro address is stored in the Push Stack, six status bits are entered into the Push Stack.

Figure 5:
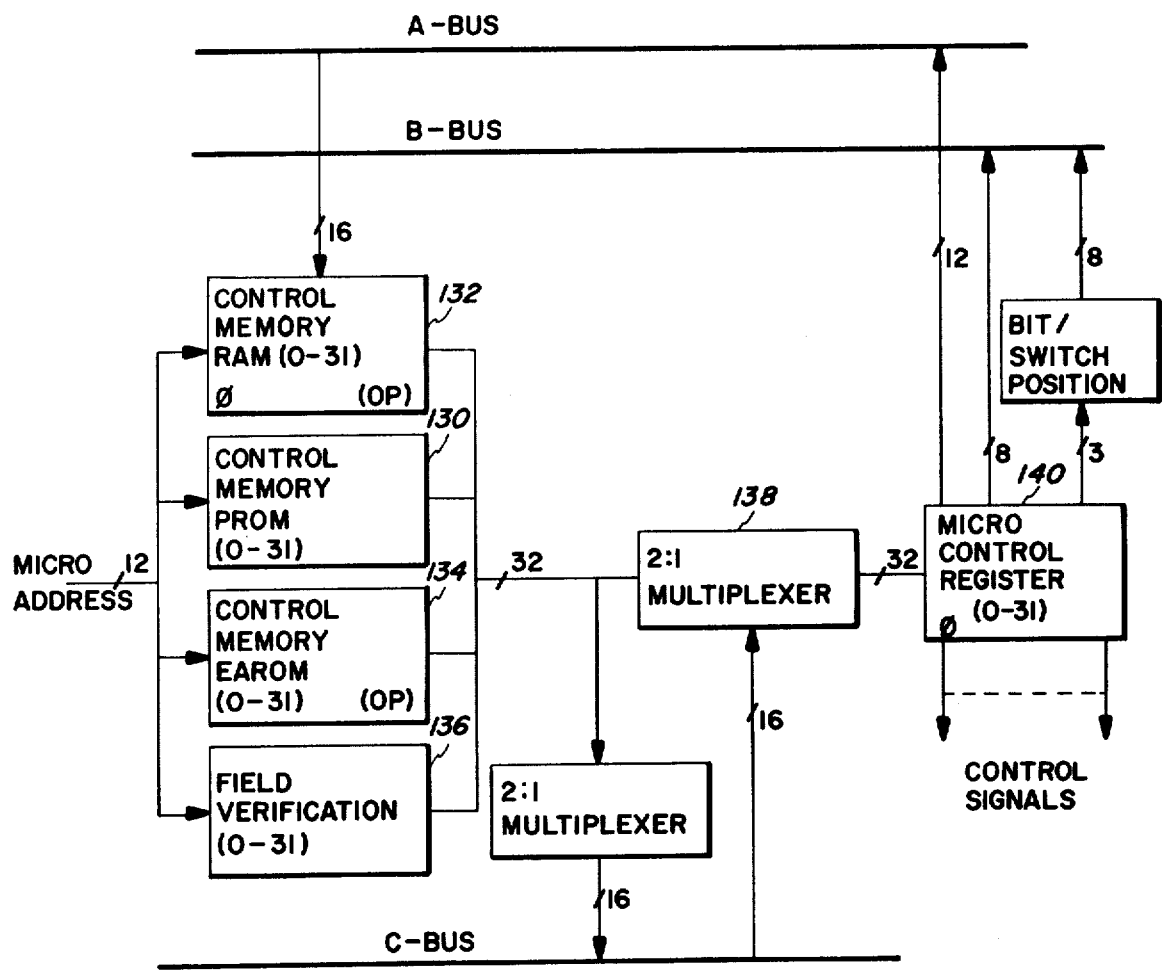

As indicated in FIG. 5, the micro instructions are stored in three types of Control Memory: Programmable Read Only Memory (PROM) 130, Random Access Memory (RM) 132, and Electrically Alterable Read Only Memory (EAROM) 134. In addition, the Field Verification Memory 136 can be considered to by a type of control memory, When addressed by a micro address, a micro instruction is transferred from Control Memory via a 2:1 Multiplexer 138 to the Micro Control Register 140. A micro instruction can also reach the Micro Control Register from the maintenance control panel via the C-Bus and the 2:1 Multiplexer in two 16-bit increments.

In the case of the random-access type of control memory, a new micro instruction can be written into the location addressed by the micro address. The new micro instruction is obtained in two 16-bit increments from the A-Bus. A micro instruction can be read out from any type of control memory via a 2:1 Multiplexer in two 16-bit increments to the C-Bus.

From the Micro Control Register 140, the micro instruction is decoded to provide control signals that direct the flow of data through the system. The last 12 bits of the micro instruction, when used as an immediate micro address, are placed on the A-Bus. Similarly, the last eight bits of the micro instruction, when used as the Emit Field, are placed on the B-Bus.

Figure 6:
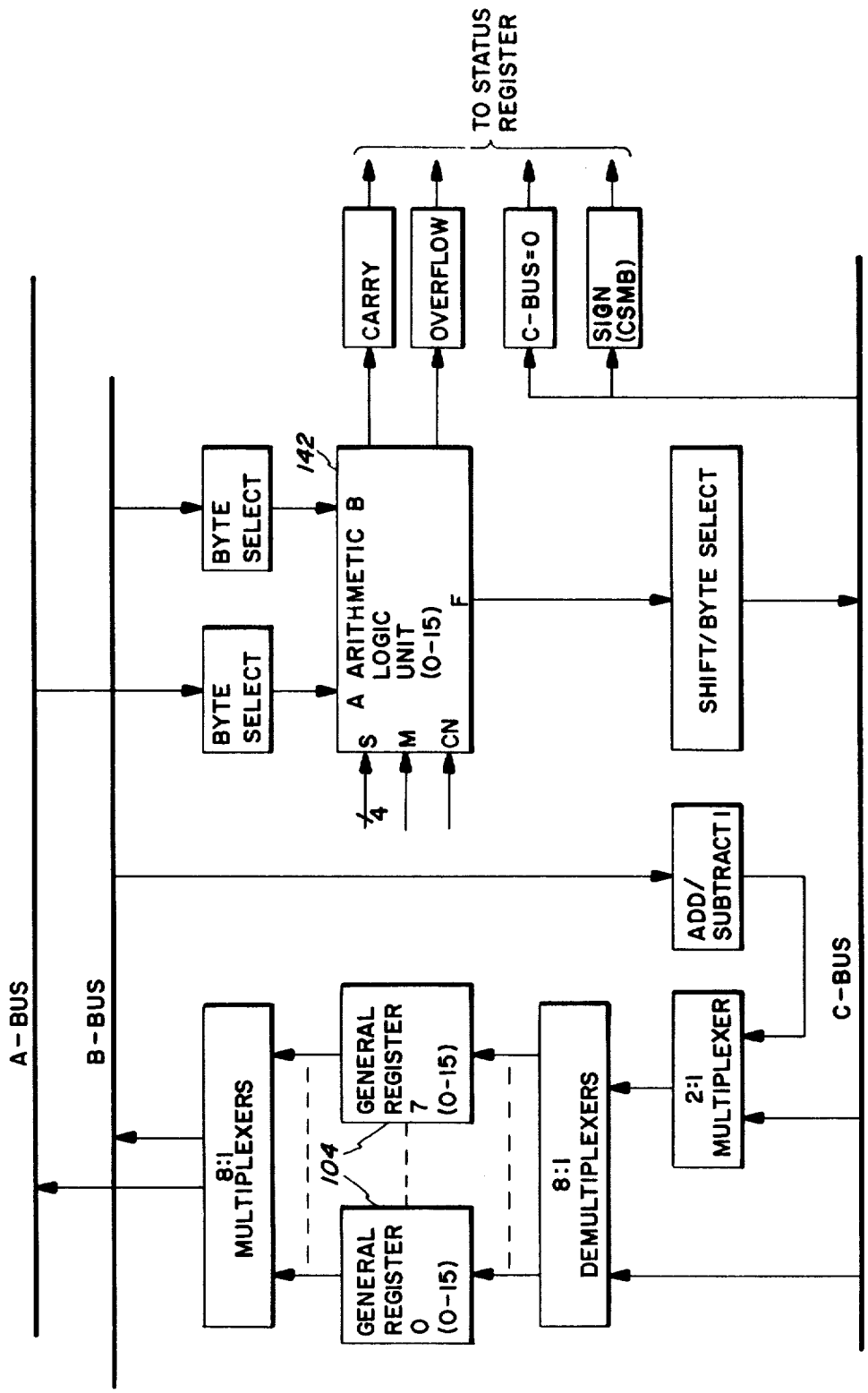

The Arithmetic Logic Unit (ALU) 142 of FIG. 6 accepts a byte or word from the A-Bus and the B-Bus, performs arithmetic or logic operations on the two operands, and outputs the results through shift/byte select logic to the C-Bus. Operand word or byte selection, operation selection, and output shift or byte select are all specified by control signals derived from the micro instruction.

Input byte select applies both bytes, left byte, or right byte, right justified, from the A-Bus to the A operand or from the B-Bus to the B operand.

Arithmetic or logic operation is specified by the Mode signal, M. One of 16 arithmetic or logic operations is selected by the four Select lines, S. Carry-in, Cn, adds one to the result.

The ALU result can be shifted left or right one bit position, or transferred directly to the C-Bus. Also the right byte of the result can be placed in the left byte of the C-Bus.

The eight general registers provide a source for the A- and B-Bus and a destination for the C-bus. See FIG. 6. For example, the A and B operands for the ALU 142 can be taken from General Registers 104 and the ALU result can be stored in a General Register.

Moreover, the value of the B-Bus can be either incremented or decremented by one and the result stored in one of the General Registers.

Six Status bits simplify the checking of results by automatically providing information on current operations without requiring extra instruction execution. Indicators on the Maintenance Control Panel 144 showing the status bits simplify maintenance and debugging operations. Four of the six status bits are derived from arithmetic operations. See FIGS. 4 and 6. The status bits are: Carry, Overflow, C-Bus=0, Sign, Enable I/0 Interrupt, and Control Mode, and have the following functions.

Carry: in word operation, the carry-out from the most significant bit of the ALU (bit 0), or in byte operation, the carry-out from the most significant bit of the byte (bit 8).

Overflow: an arithmetic operation of A and B operands results in a number greater than the largest number than can be processed in the space specified; word or byte. For example, in two's complement format overflow occurs if the sum of tow positive numbers is negative or if the sum of two negative numbers is positive. Conversely, overflow results if the subtraction of a negative number from a positive number gives a negative result, or if the substraction of a positive number from a negative number gives a positive result. C-Bus=0: all bits of the C-Bus are zero. Sign: in word operation, the most significant bit of the word (bit 0) or, in byte operation, the most significant bit of the byte (bit 8). Enable I/0 Interrupt: a command decoded from the micro instruction sets and resets this bit. Control Mode: a command decoded from the micro instruction sets and resets this bit. It is used for additional control of an optional function, such as the macro instruction translator.

The Input/Output Module 144 performs such functions as accepting incoming data and placing it on the A-Bus, transferring outgoing data from the C-Bus to the output, and accepting multiplexed I/0 interrupts and placing their identification on the A-Bus.

Figure 7A:
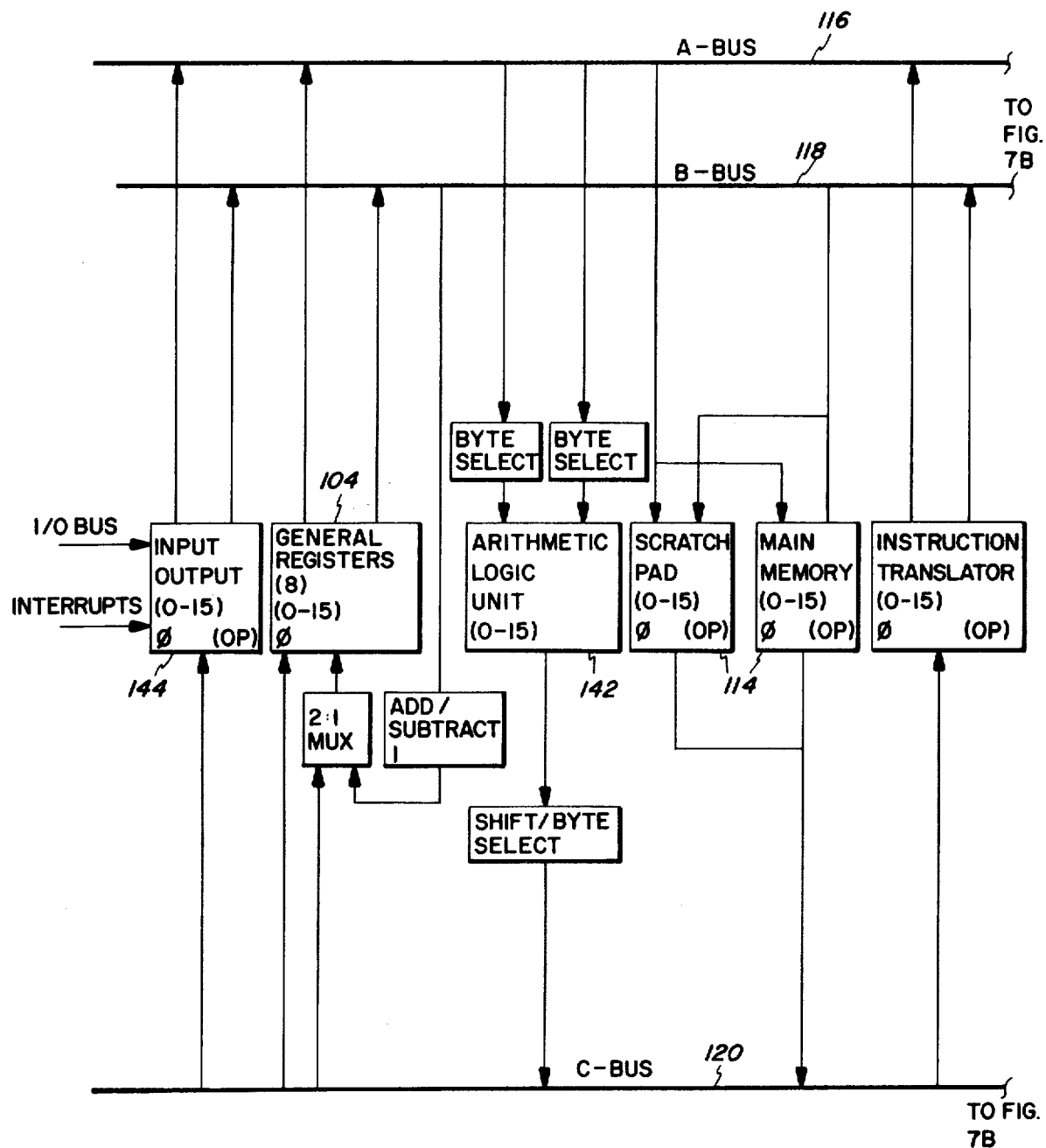
Figure 7B:
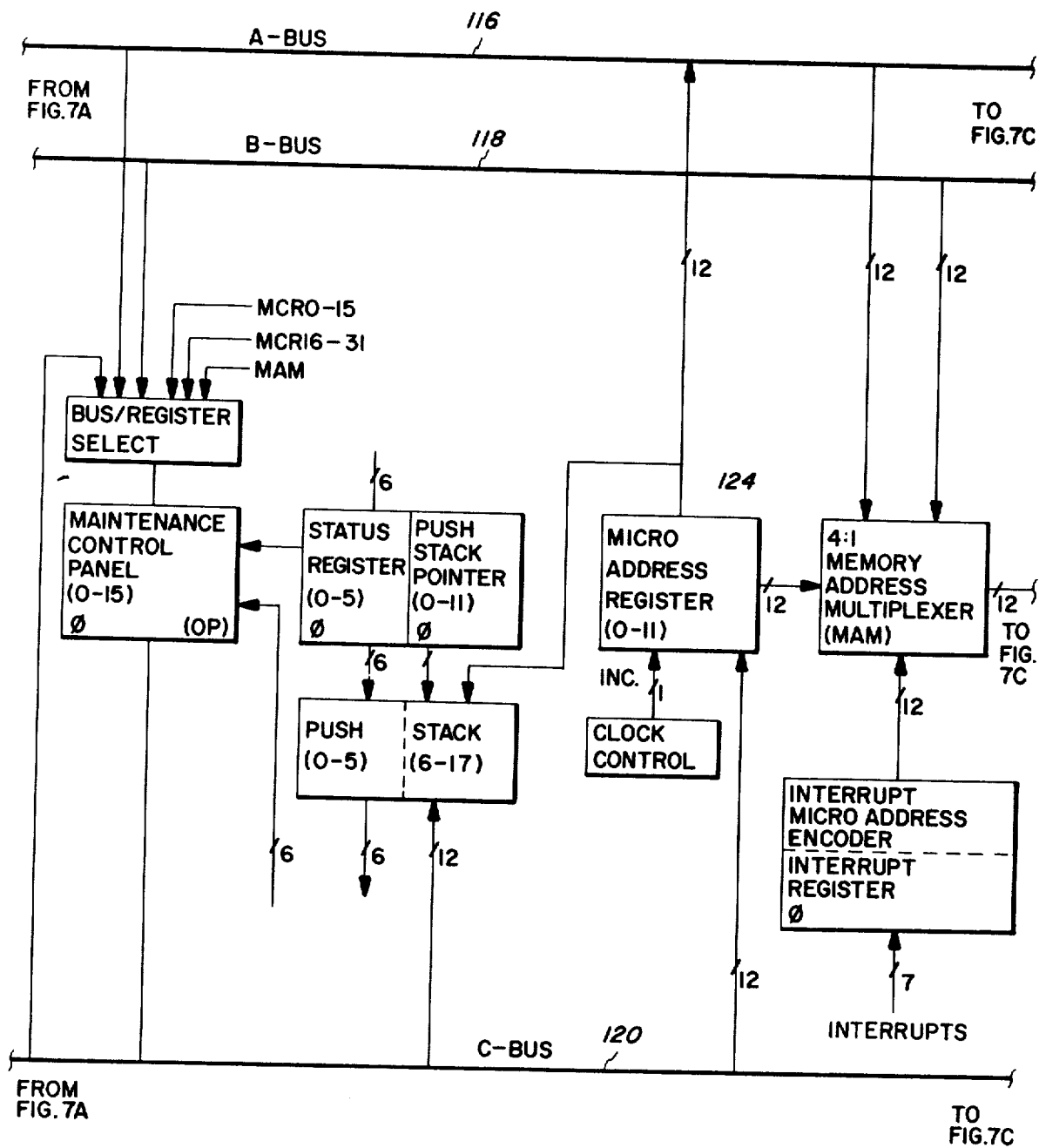
Figure 7C:
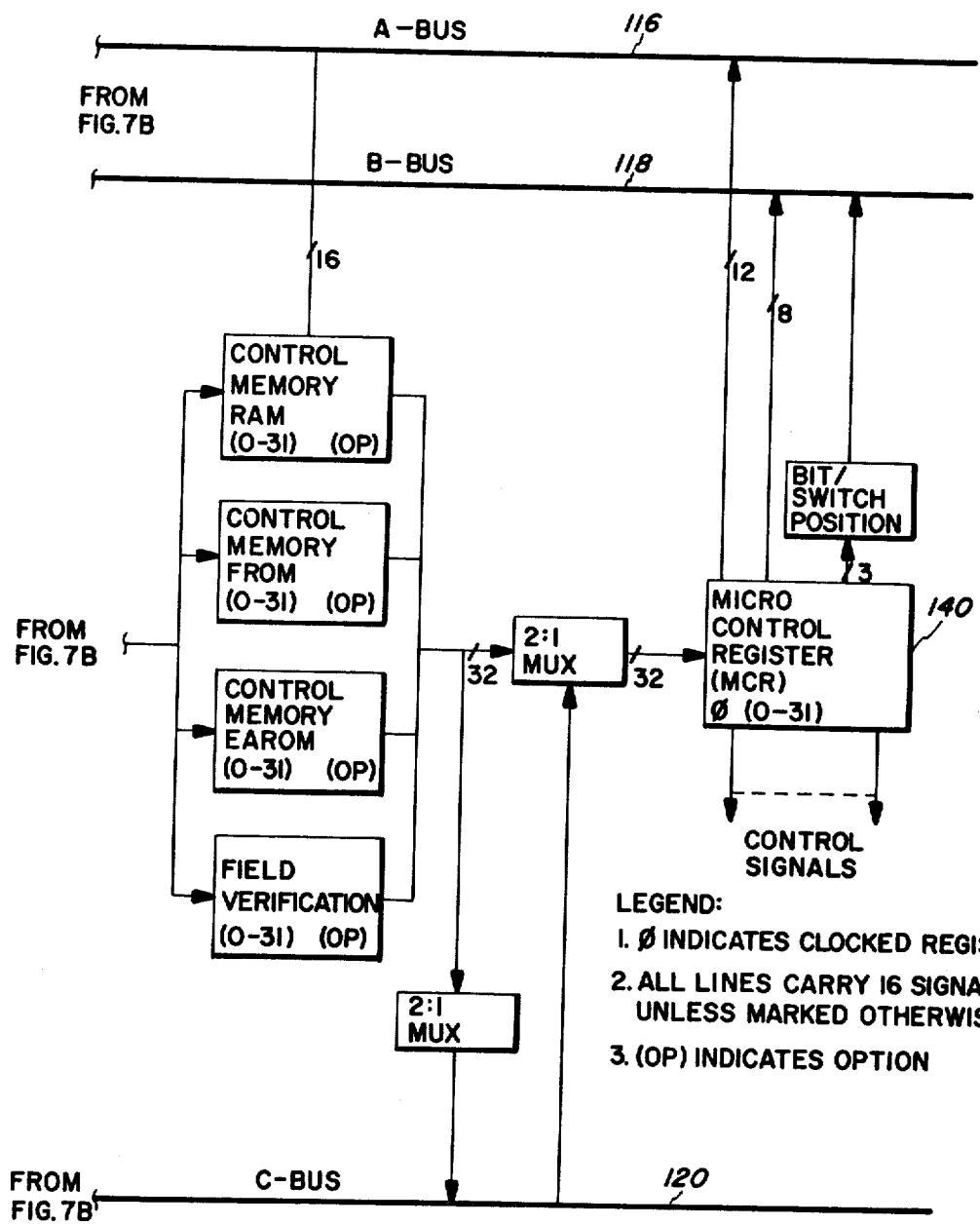

FIG. 7 is a complete block diagram, including a simplified form of input/output. Data is written from the A-Bus 116 into the Scratch Pad/Main Memory 114 at the location addressed by the B-Bus 118. Data is transferred to the C-Bus 120 from the Scratch Pad/Main Memory location addressed by the B-Bus.

The Maintenance Control Panel 146 provides controls and indicators that display the current status of the machine. Change of status can also be made from the Maintenance Control Panel. The controls permit 16 data bits to be placed on the C-Bus 120, in the Micro Control Register 140, or 12 bits in the Micro Address Register 124, Interrupt and status bits are displayed continuously. Register or bus contents can be displayed one at a time.

Figure 8:
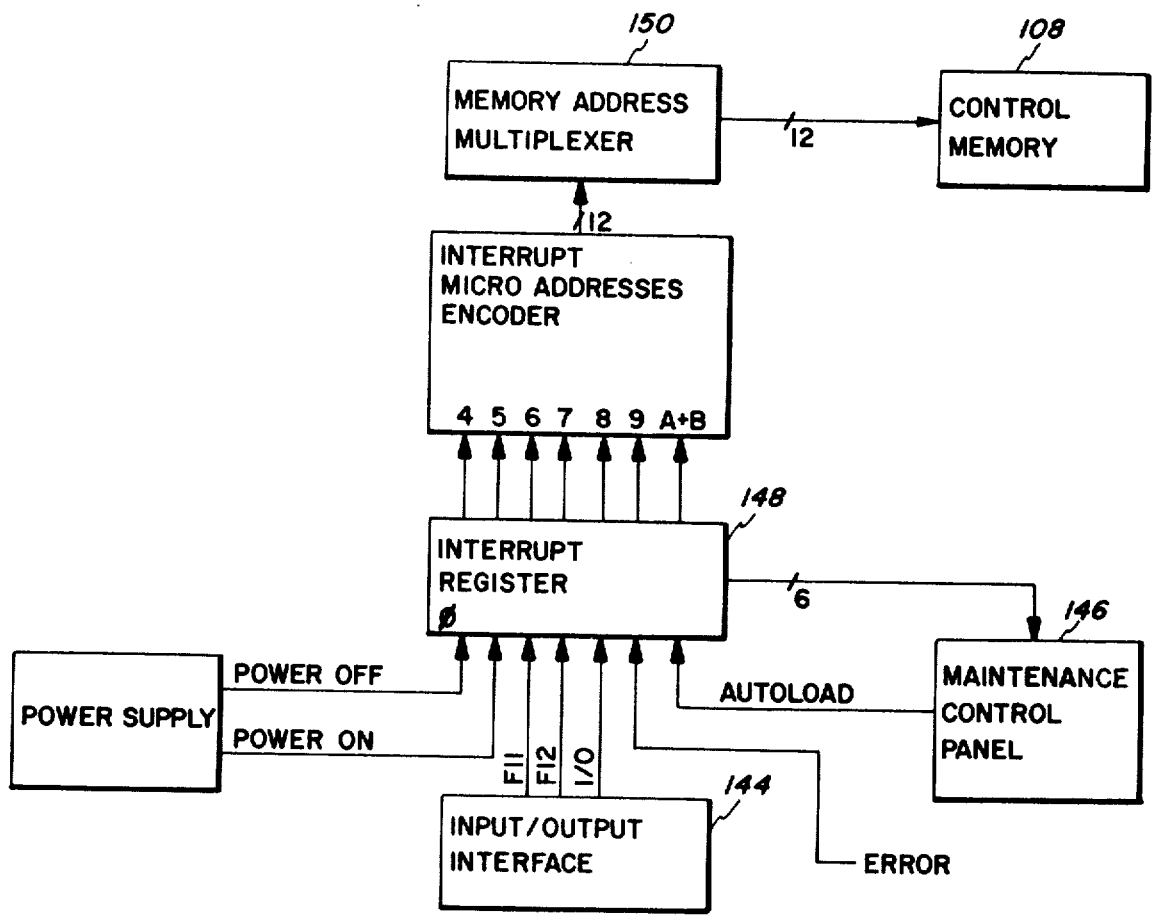

Seven interrupt lines originate in various parts of the unit, as shown in FIG. 8, and terminate at the Interrupt Register 148. When one or more of the interrupt flip-flops is set, the micro address of the interrupt that has the highest priority is applied via the Memory Address Multiplexer 150 to the Control Memory 108. The interrupts are shown in order of priority by micro addresses, $x'4'$ to $x'B'$. Each micro address points to a micro instruction specified by the system programmer initiating a procedure that responds to the interrupt. The contents of the Interrupt Register 148 are displayed on the Maintenance Control Panel 146.

The interrupts perform the following functions: Power off: a logic signal from the power supply that indicates loss of input power (50 per cent or below) 4 milliseconds or less after input powder has dropped. There is sufficient storge in the +5 volt SCU supply to maintain voltage regulation until two milliseconds after the power off signal has gone true. At this time, Main Memory goes into battery backup, locking out further access.

Power On: a logic signal from the power supply that indicates that power is on and the +5 volt logic supply is available. This signal is delayed at least 100 milliseconds after the supply is turned on.

Fast Interrupt 1: a logic signal from the Input/Output Interface 144 directly to the Interrupt Register 148 used primarily for high-speed data transfers to or from user logic via the I/O Interface to or from Scratch Pad/Main Memory. The Interrupt Register returns a hardware response to the I/0 Interface. Fast Interrupt 2: similar to Fast Interrupt 1, except with lower priority. One of the fast interrupts may be used to input data, while the other is used to output data. Input/Output: a logic signal that indicates that a multiplexed input/output interrupt is pending on one or more of the Input/Output Interfaces 144. In response to this signal, the system programmer requests the highest priority I/0 module with an interrupt pending to put its address on the A-Bus. Error: a logic signal that indicates a parity error has occurred in Control Memory 108 or Scratch Pad/Main Memory 114. Autoload: a switch signal from the maintenance control panel used to initiate an automatic loading routine. This signal effects a trap to Control Memory location X'A' if the Run switch is off, or to location X'B' if the Run switch is on. This second use of Run switch serves as a Console Interrupt.

The above details pertain to the computer used in the preferred embodiment of the Transcriber Station. However, any similar small computer adapted to drive a disk file and keyboard display could be used to implement this sytem.

Figure 9:
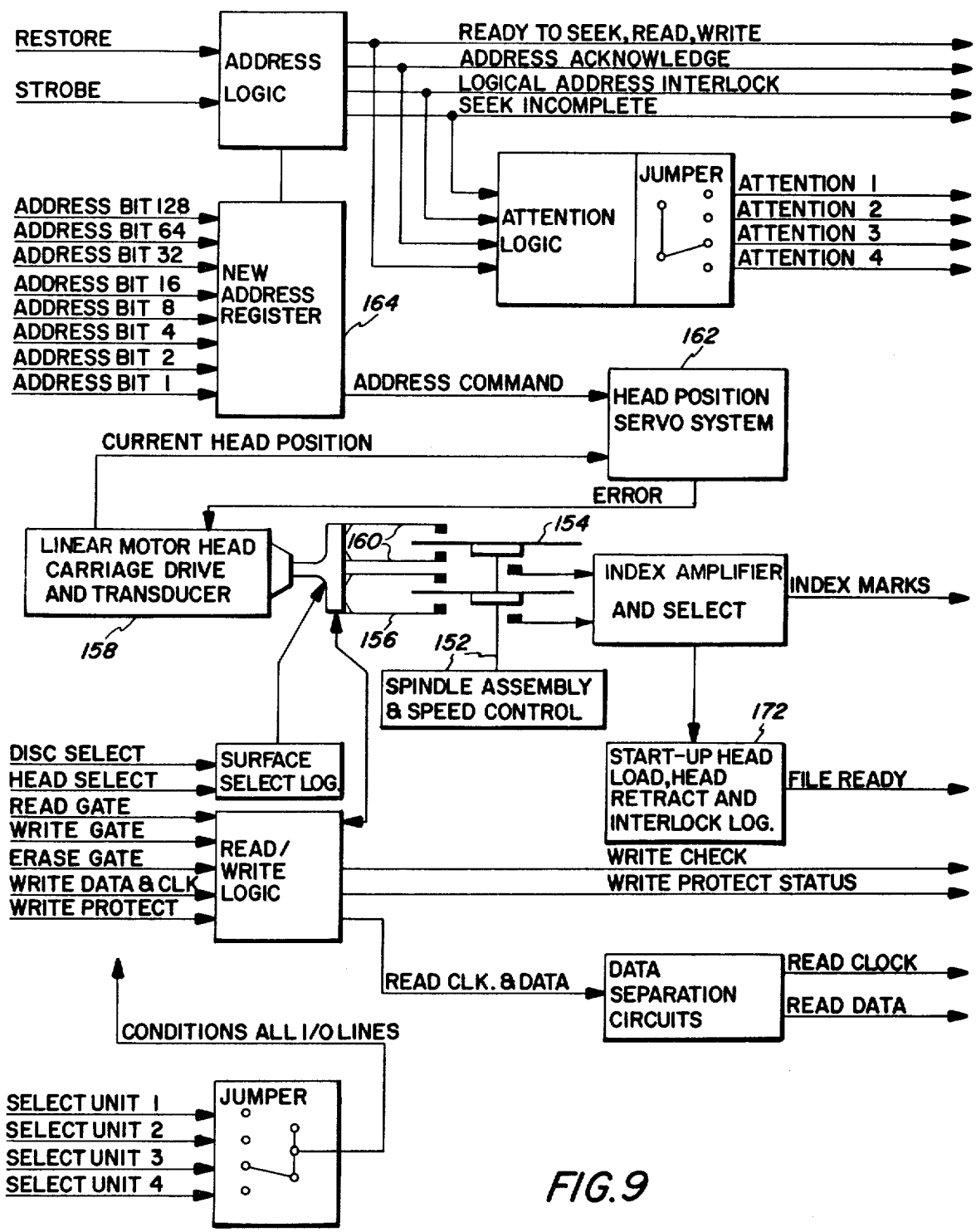
FIG. 9 is a schematic diagam of the Disk Drive and Removable Disk File.

The Disk Drive used in the preferred embodiment of this Transcriber System is the Xerox/Diablo Cartridge Disk Drive, Model 44 shown in FIG. 9. This Disk Drive contains two cartridge disks, one fixed and one removable, and provides a capacity of 4.9 million bytes per cartridge. The transfer rate is 312,000 bytes per second and the average access time is 65 milliseconds.

This Disk Drive consists basically of six major functional groups. The Spindle Assembly 152 rotates the fixed and removable Cartridge Disks 154 at a constant speed and provides ventilation for the Disk Drive. The Read/Write Head Assemblys 156, of which there are four, write data onto each disk surface or read data from the disk surface. The Head Positioner 158 uses a movable coil within a magnetic field to move the heads at high speeds to the disk location commanded by the using system. The electronics assembly processes, generates, and/or supplies the electrical signals, operating voltages, and currents necessary for the disk drive to perform its intended function. The controls, indicators, and interlocks provide the means for front panel operation of the disk drive, and prevent improper operating sequences. Finally, the power supply converts AC line power to the necessary DC operating voltages.

The Spindle Assembly 152, with integral two-phase induction motor, rotates the disks at 2400 rpm. One disk is an integral part of the spindle assembly, while the other disk is contained in a removable disk cartridge. The removable disk is held to the spindle assembly during operation by a magnetic ring. Spindle drive motor speed is maintained with ±2% by means of a crystal-controlled oscillator. The 1.92 MHz output of the oscillator is divided, shaped, and split into two 80 Hz square waves, 90° out of phase with each other. These square waves are amplified and applied as driving power to the spindle motor. Since the spindle motor is very lightly loaded, it runs at its approximately synchronous speed of 2400 rpm. Each disk surface has its corresponding Read/Write Head 156. The surface-select logic receives from the controller interface a DISK SELECT signal and a HEAD SELECT signal which enables the designated head.

Head loading refers to the positioning of the read/write heads at the proper distance from the recording surface, this distance is 2 microns (80 microinches). When loaded, the heads can then be moved to the proper address on the disk surface as explained in the following paragraph. The heads are loaded by a solenoid-operated mechanism, and are maintained there by spring pressure. Initial loading of the heads is controlled by start-up logic, and occurs when the disk reaches 90% of its normal rotational speed. The heads are unloaded is a power failure occurs or if disk rotation drops below normal.

The Heads 156 are mounted on Arms 160 which in turn are mounted on a Head Carriage 158. The Carriage moves the Heads radially from the Disk periphery toward its center. With the Disk rotating and the Head stationary, the position of the Head describes a circular track on the Disk surface. During a write operation, this track is magnetically recorded on the Disk surface. The track consists of data signals and other signals which allow the accurate recording, retrieval, and identification of data.

Similarly, the head can be positioned over a recorded track during a read operation. It can be seen from the representation in FIG. 9 that there are four tracks, and that these tracks are in line vertically. The four circular tracks together describe a cylinder. If the head carriage moves in toward the center of the disks, a smaller cylinder is described by the four tracks. The position of the carriage, then, is referred to as the cylinder address. The combination of the cylinder address, disk select signal, and head select signal constitutes the track address. However, since the address logic is used to position the head carriage, the term "address" is used to mean cylinder address.

Referring again to FIG. 9, the Head Positioner Servo System 162 compares the latest address command with the current cylinder address, and supplies an error signal to the head carriage drive if these two addresses do not correspond. The polarity of this error signal controls direction of head movement. The magnitude of the error signal depends on the distance the Head must move, and decreases as the proper address is approached.

The new address register receives the required address from the controller in a 9-bit binary form (9-bit for 200 tpi). When a new address is strobed into the Address Register 164, an address acknowledge pulse is issued. As a linear motor moves the head carriage, each cylinder centerline is detected by the Head Positioner Transducer 158. An up/down counter in the Head Positioner Servo System 162 is adjusted with each of these centerline detections. As the up/down counted is adjusted, it changes instructions to the servo circuitry, so that the error signal to the drive varies, and the carriage will slow down as the correct address is approached. If an invalid address is received from the controller, a logic address interlock is generated in place of an address acknowledge.

Figure 10:
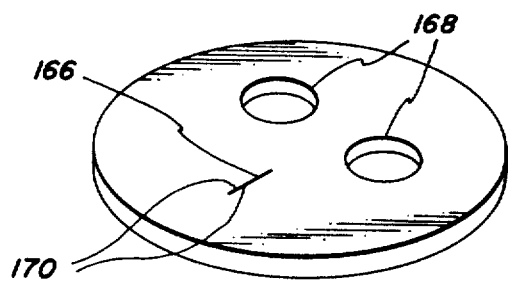
FIG. 10 is a schematic diagram of the Record/Erase Head.

The layout of a read/write head is shown in FIG. 10. The air holes 168 provide the aerodynamic characteristics necessary for the heads to maintain the proper flying position when loaded. Each head assembly contains three separate precisely mounted coils; i.e., two Erase Coils 170 and one Read/ Write Coil 166. The Erase Coils limit the physical width of the data tracks on the disk surface.

In a write operation, a single output line delivers multiplexed clock and data pulses; one complete pulse corresponding to each flux transition. The write circuits, activated by a write gate from the controller, will allow current to pass through the write head and write one flux transistion for each pulse. The Erase Coil, activated by an erase gate, will trim the written track to a nominal 0.0039 inch width (0.007 inch for 100 tpi drives). The Read/Write circuits perform the amplification and signal conditioning necessary for the translation between interface data signal voltages and head currents.

Certain conditions, if they occur, are likely to result in faulty or invalid data being recorded on the Disk. These conditions are monitored and if they should occur, the write check interface line is made true and the CHECK indicator lamp is turned on. A write check condition will occur if the supplied voltage drops below the specified 5% or if certain write or erase current faults are present. A write or erase fault will be present, and the write check conditions will be set, if write or erase current is flowing when the corresponding gate interface line is false, or if write or erase current is now flowing when the corresponding gate interface line is true. The other write check condition is a multiple head selection when the write or erase gate interface line is true. The write check condition caused by a voltage variation will last only for the duration of the faulty voltage. Any other write or erase fault will set an internal latch that is reset by the operator placing the LOAD/RUN switch in the LOAD position and then back to RUN.

The read circuitry is enabled by a read gate from the controller. The flux transitions on the disk surface induce head current pulses as they pass the Head Read/Write Coil. The read circuits amplify, shape, and separate these pulses into distinct clock and data pulse streams before delivering them to the interface lines.

The Start-Up Logic 172 performs two basic functions; it controls operation of the equipment, including the brush cycle and head load operation, during the start-up cycle, and it also controls the operation of various interlocks used to protect data and equipment. When the Disk Drive is placed in the RUN mode, power is applied to the spindle motor, starting disk rotation, and a brush is passed over each disk surface to remove any contamination. The hub of each disk contains an index slot, which is sensed by a stationary transducer as the slot passes the transducer. The index mark outputs of the transducers, therefore, occur once per disk revolution. The frequency of the lower disk index mark is used by the start-up logic to determine when the spindle is rotating at the proper speed, after which time the heads can be loaded. The index mark of the selected disk is also furnished to the controller surface.

The heads are retracted beyond the disk surface when power is initially applied or when the LOAD/RUN switch is in the LOAD position. The interlocks and safety devices controlled by the Start-Up Logic minimize the possibility of accidental data loss, in routine operation or emergency shut-down.

The Write Project Option is used to reduce the possibility of inadvertently writing over recorded information. The option consists of a backlighted momentary-contact front panel switch, an interface intput command line, and an interface output status line. The Write Project Option functions in the following manner. The disk drive, during its start-up cycle, sets write protect on. Write and erase circuits are now inhibited, the PROTECT switch glows red, and the write project status line is true. If writing is to be performed, the operator must depress the front panel PROTECT switch to extinguish its light. This switch depression also sets an internal flip-flop that enables the writing process and the write protect status line is made false, indicating to the interface that the recording surfaces are no longer protected. Write project status may be reestablished at any time by a pulse on the write protect interface line. The write protect feature may be established or reset on the removable cartridge, the fixed disk, or all surfaces. This selection, by a provision on the Read/Write Amplifier PCB, is field changeable.

In addition to the index slot, the disk cartridge is also available with equally spaced sector slots cut around the periphery of the disk hub. The more common numbers of sector slots available are 8, 12, 16, 20, 24, or 32. The fixed disk has 24 sector slots in addition to the index slot. The sector slots are sensed by the index tranducers, and the resulting sector marks are electronically separated from the index marks. With the Sector Counter Option installed, the sector marks from the selected disk are furnished to the controller interface and to a sector counter. The sector counter furnishes to the interface a 5-bit binary coded signal indicating which sector is currently passing under the R/W heads. The sector slots, therefore, divide each trace into a number of equal segments for disk formatting purposes The above-described Xerox/Diablo Cartridge Disc Drive, Model 44 is on sale and is also described in the STX-10 Technical Manual No. 98 04 55A, dated April, 1975, published by the Data Systems Division of Xerox Corporation, and the Series 40 Disc Drive Maintenance Manual No. 81601, dated April, 1974, published by Diablo Systems Inc. However, for the purposes of this Transcriber System, any equivalent Disk Drive may be used.

The Printer Interface Module is a type of Input/Output Module designed to provide the interface between the System Control Unit and the Printer. The Printer Interface Module accepts two ANSCII character codes simultaneously from the System Control Unit and outputs one character code at a time to the Printer.

Figure 11A:
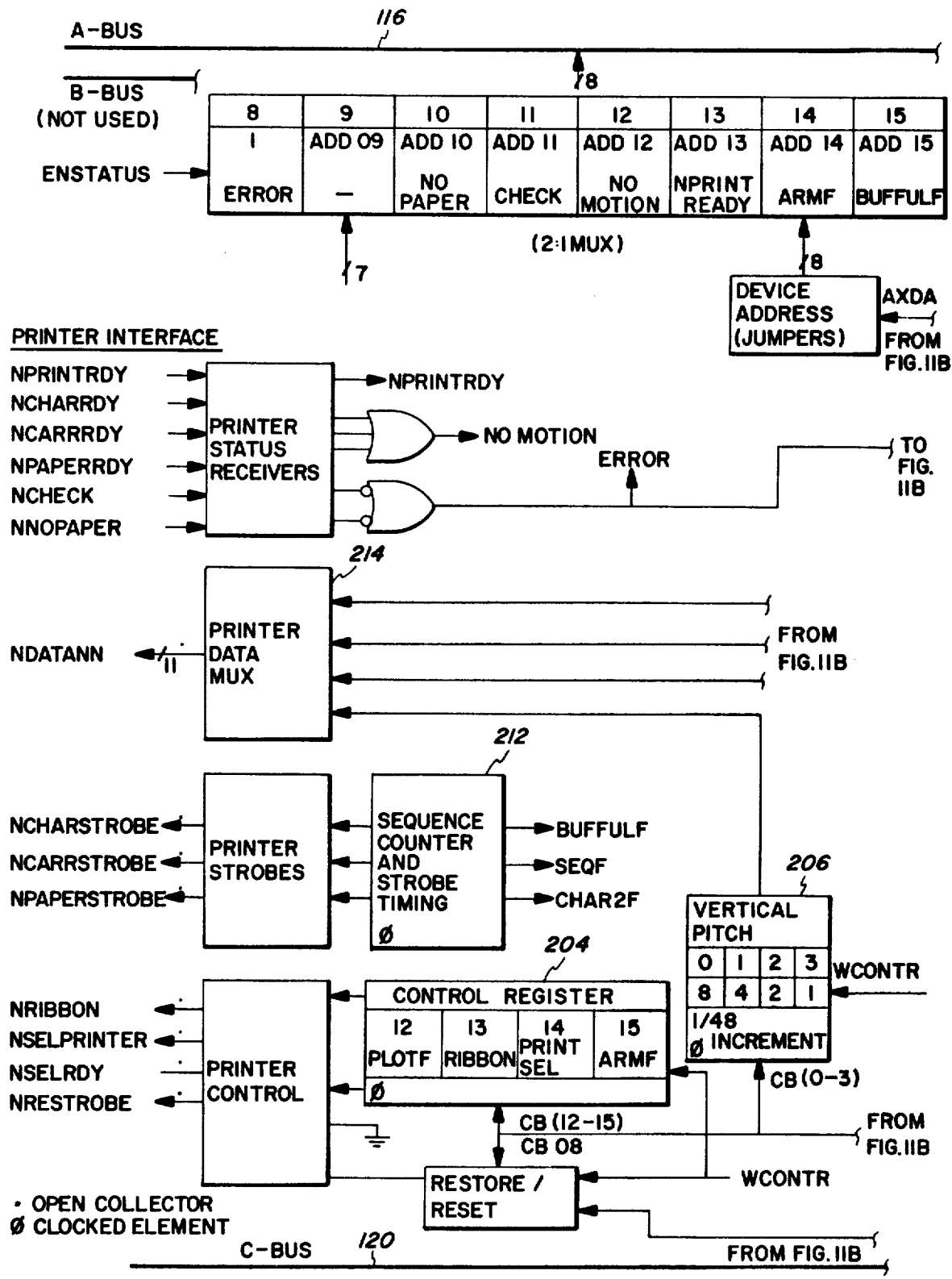
FIGS. 11A through 11B is a simplified block diagram of the Printer Interface Module.
Figure 11B:
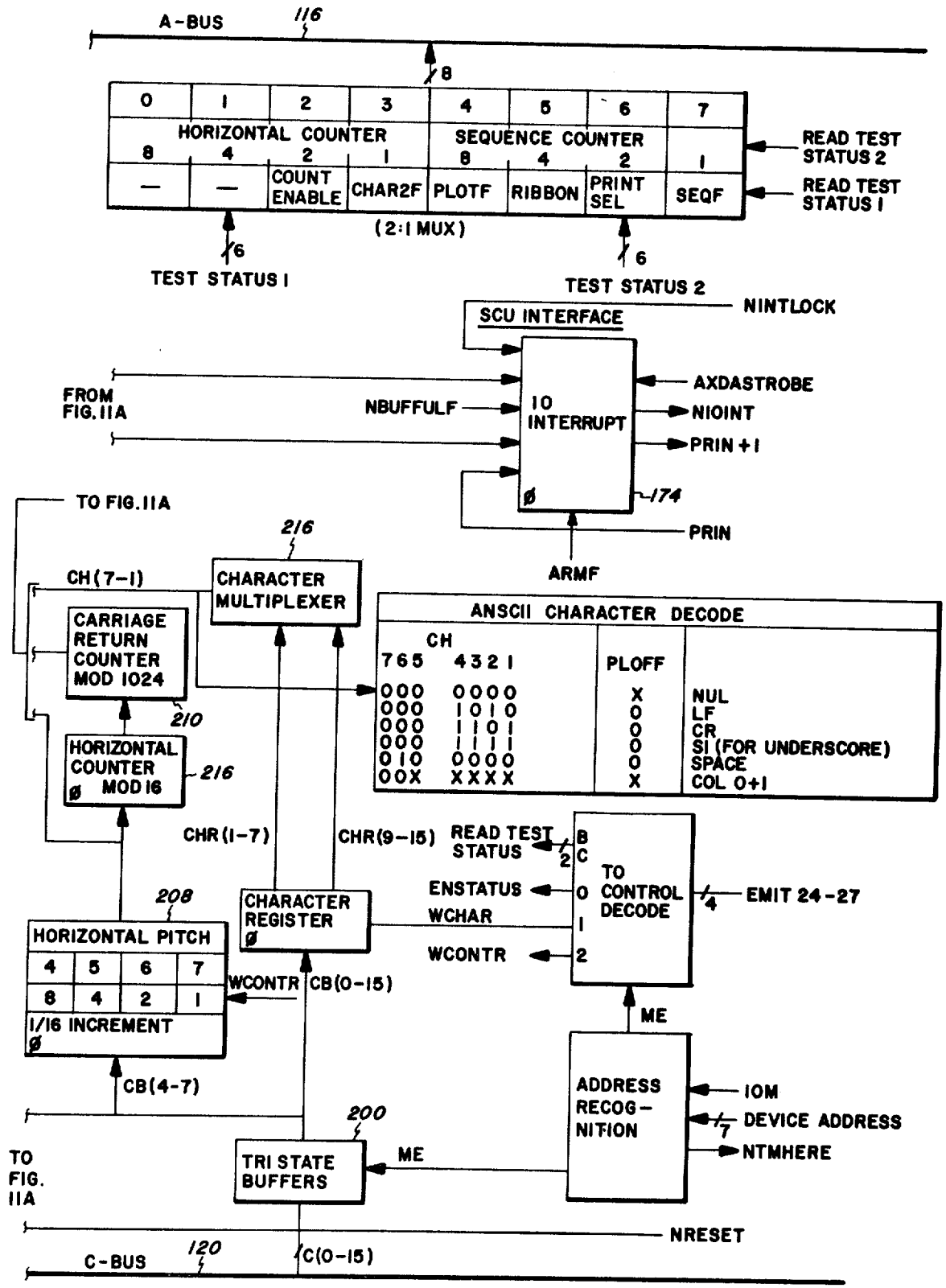

The flow of data through the Printer Interface Module and the principle control relationships are diagrammed in FIG. 11. Information from the C-Bus 120 is transferred through the Tri-state Buffers 200 into the Character Register 202 or to the Control Register 204 and Pitch Registers 206 and 208, as directed by commands decoded from the IO control field of the microinstruction presently being executed in the System Control Unit.

Four categories of data are multiplexed from these registers to the eleven data lines to the Printer. The Character Register 202 data contains two ANSCII character codes which are multiplexed successively to the Printer. The Horizontal Pitch Register 208 data is the number of horizontal increments of 1/60 inch between characters. The Vertical Pitch Register 206 data is the number of vertical increments of 1/48 inch between lines. The Carriage Return Counter 210 data is the number of horizontal increments back to the beginning of the line. Simultaneously, the Sequence Counter and Strobe 212 timing logic generates the corresponding character strobe, carriage motion stroke, and paper feed strobe, used by the Printer to process the data lines. Status data from the Printer, the Printer Interface Module device address or test status data from the Printer Interface Module are multiplexed to the A-Bus under the control of commands decoded from the IO control field of the current microinstruction being executed by the System Control Unit. The implementation of each block on FIG. 11 is described next, using FIGS. 12a, b, c as reference.

The address recognition function consists of address assignment and address compare. The Printer Interface Module is assigned a module address by means of eight jumpers on 16-pin header socket A-31 shown in FIG. 12. Installed jumpers ground the address bit. Pins 8 and 9 represent the jumper for the least significant address bit. Pins 1 and 6 are always left open to provide a 1 in the A-08 position on the A-Bus. The assigned address is used in the process of accepting commands decoded from the IO control field of the microinstruction being processed by the System Control Unit and is also placed on the A-Bus in the course of carrying out an IO interrupt.

The assigned address (ADD09 through 15) is compared by means of set of exclusive - OR gates with the device address supplied by the microinstruction being executed. When the two addresses are the same, and IO mode is true, the module is selected and ME 1 and ME 2 become true. NIMHERE is derived from NME1.

The System Control Unit accept a single I0 interrupt level, NIOINT at the IO Interrupt 174 of FIG. 11. This level is used by the Printer Interface Module to request service under the following conditions. The contents of the Character Register 202 have been passed on to the Printer and the Register is empty, signified by signal NBUFFULF (not buffer full); or the Printer has reported no paper or check, signified by the signal ERROR. Check indicates that a command previously received by the Printer has not been successfully executed because of a Printer malfunction. The IO interrupt function is implemented by a JK flip-flop and associated gates. As shown by the equations in Table 18-1, the flip-flop is permitted to operate only when the arm interrupt bit in the control byte is true. The flip-flop is set by the interrupt conditions described above, provided NINTLOCK is permissive.

TABLE 1

S/REQF = (NBUFFULF + ERROR) NINTLOCK PHIA+ R/REQF = WCHAR PHIA+ CD/REQF = NARMF
ERROR = CHECK + NO PAPER
AXDA = AXDASTROBE REQF PRIn
PRIn+1 = PRIn NREQF
IOINT = REQF PRIn

Signal NINTLOCK, an input to the IO Interrupt 174 of FIG. 11, is derived from the NIOINT Bus; it prevents the acceptance of the interrupt request by the flip-flop if NIOINT is currently low, indicating that an interrupt from some other IO module is pending. The Interrupt Request flip-flop is reset by WCHAR (write character) derived from the IO control field. A particular Printer Interface Module is a link in a priority chain with other IO modules. A Printer Interface Module accepts a priority line PRIn from a previous module and outputs a priority line PRIn+1 to the next module (which is of lower priority). A Printer Interface Module can set the REQ flip-flop regardless of the state of its priority line, but it can place its device address on the A-Bus only when the incoming priority line is high. A Printer Interface Module passes on the priority signal only when it does not have an interrupt request of its own pending.

The IO control field is decoded to provide five commands as summarized in Table 2.

Table 2

| EMITxy | | | | Hex | Signal | Function |
| 24 | 25 | 26 | 27 | | | |
|---|---|---|---|---|---|---|
| 0 | 0 | 0 | 0 | 0 | ENSTATUS | Read printer status byte to A-Bus |
| 0 | 0 | 0 | 1 | 1 | WCHAR | Write output data from C-Bus to PIM |
| 0 | 0 | 1 | 0 | 2 | WCONTR | Write control word from C-Bus to PIM |
| 1 | 0 | 0 | 0 | 8 | — | Read Test Status 1 to the A-Bus |
| 1 | 1 | 0 | 0 | C | — | Read test Status 2 to the A-Bus |

When the module is selected (ME), the content of this C-Bus 120 (C00-C15) is passed to the C-Bus buffer lines (CB00 - CB15). Then, if the IO control field contains the Write Control Register (WCONTR) command, the contents of the C-Bus buffer lines are clocked into the vertical Pitch Register 206, Horizontal Pitch Register 208, and Control Register 204, as shown in FIG. 11. C-Bus bit C08 initiates the restore/reset logic. The Vertical Pitch Register, Horizontal Pitch Register and Control Register are 4-bit integrated circuit devices with the shift-right and shift-left inputs grounded. The mode inputs S0 and S1, are connected to the WCONTR so that when WCONTR is high, the C-Bus buffer lines are parallel loaded into the register devices on the rising edge of negative clock PHIB.

Four control signals are transmitted to the printer. NRIBBON is inverted from the Control Register 204 and is used to raise the ribbon carriage to its upper position. NSELPRINTER is inverted from the Control Register and is used by the Printer to enable the input and output lines of the Printer Interface. NSELRDY is derived from ground and therefore is always active-low enabling three Printer status lines; character ready, carriage ready, and paper feed ready, regardless of the state of NSELPRINTER. NRESTORE is derived from one-shot multivibrator A-20 or the RESET signal from the system control unit. The oneshot is triggered by the leading edge of WCONTR CB08. This signal is used by the Printer to perform a restore sequence.

Three control signals are provided for use on the Printer Interface Module. PLOTF from the Control Register 204 specifies the Teletype mode. ARMF from the Control Register permits the IO interrupt request flip-flop to accept interrupt requests. NRESCTA logically is the same as NSRESTORE, but is used on the Printer Interface Module to clear the following registers; buffer full flip-flop, sequence flip-flop, character 2 flip-flop, carriage flip-flop, sequence counter, carriage return counter, and strobe timing flip-flop. In addition, NRESET from the System Control Unit is used to clear all the following registers; Character Register. Vertical Pitch Register, Horizontal Pitch Register, and Control Register.

The content of the Vertical Pitch Register (VERnF) is applied to the Data Multiplexer 214 for transmittal to the Printer, when selected. This register specifies line spacing.

The content of the Horizontal Pitch Register 208 (HOZnF) is used in two places. First it is applied to the Data Multiplexer 214 for transmittal to the Printer when selected. This register specifies character spacing. Second, it is inverted and parallel-loaded into the Horizontal Counter 216 (HOZnCTF), whenever a character or space is decoded from the ANSCII code currently in process.

In general, the Horizontal Counter counts out the number of positions per character specified by the Horizontal Pitch Register. This count is then accumulated by the Carriage Return Counter 210 so that when the carriage return command is decoded, the Printer Interface Module (PIM) is able to transmit to the Printer the exact number of horizontal positions required to return the print wheel to the initial character position. However, the detailed operation of these two counters is reserved until character timing has been considered.

Two ANSCII character codes are transferred from the C-Bus 120 via the Tristate Buffers 200 to the Character Register 202, multiplexed one character at a time by the Character Multiplexer 216 to the Printer Data Multiplexer 214 and, when selected, passed to the Printer data lines as shown in FIG. 11.

The Character Register 202 is composed of four integrated-circuit devices with the shift-right and shift-left inputs grounded. The mode inputs, S0 and S1, are connected to the write character (WCHAR) command so that when WCHAR is true the contents of the C-Buffer lines are clocked into the register by PHIB.

The Character Multiplexer 216 is composed of two 2:1 multiplexer devices with the Not Enable inputs grounded. The devices pass the left-byte character code when CHAR2F is false and the right-byte character code when CHAR2F is true.

The output lines of the Character Multiplexer (CH7 through CH1) are applied to a 256-word PROM to decode the ANSCII characters for carriage return, feed like, SI (for underscore) and space as shown on the table included in FIG. 11. In addition, NUL and Columns 0 or 1 of the ANSCII code tables are decoded by gate logic. The fact that a character is present is signified by the term CHAR. The equations by which these terms and characters are decoded are included in Table 3.

Figure 13A:
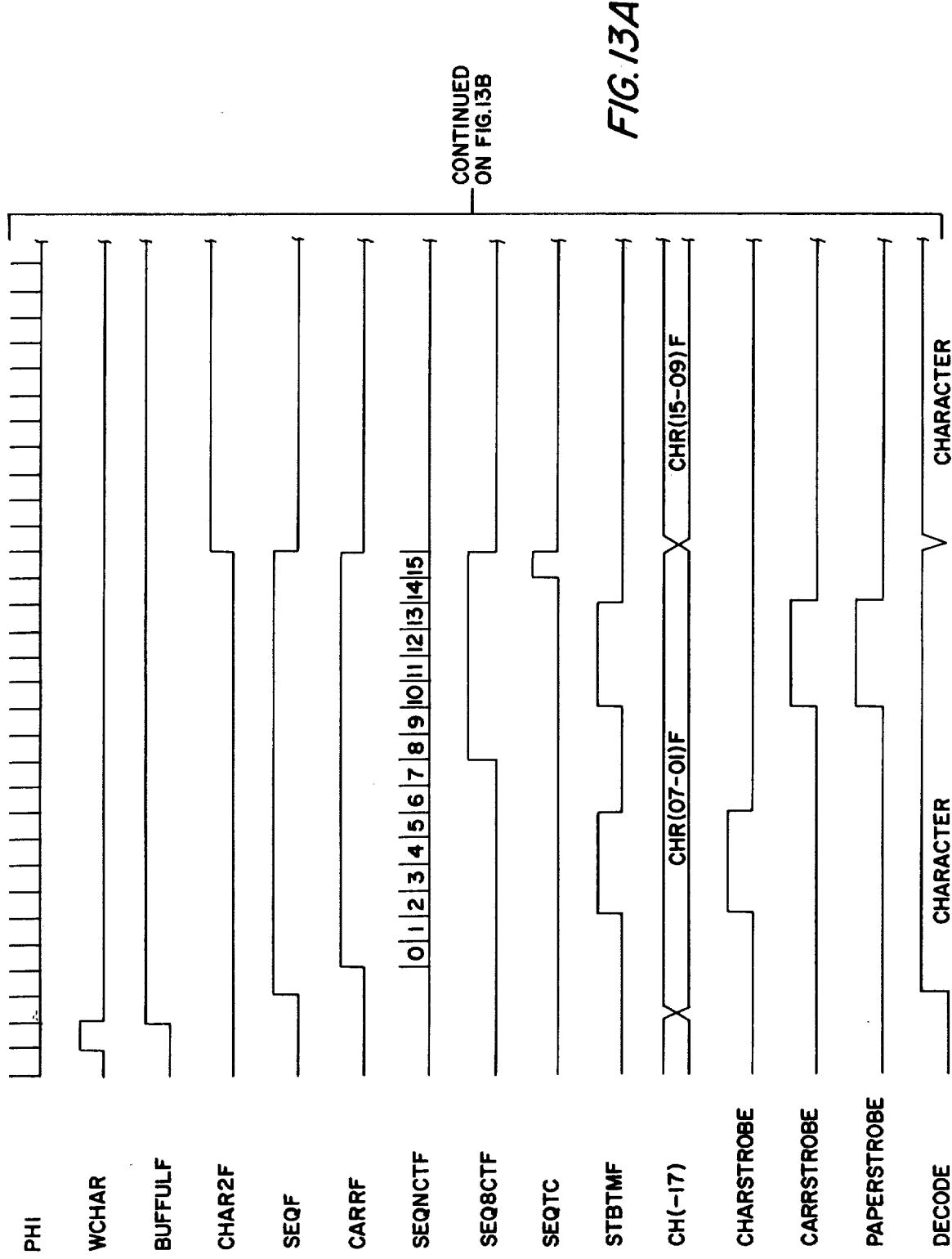
FIGS. 13A through 13B and 14A through 14B are timing diagrams of the Printer Interface Module.
Figure 13B:
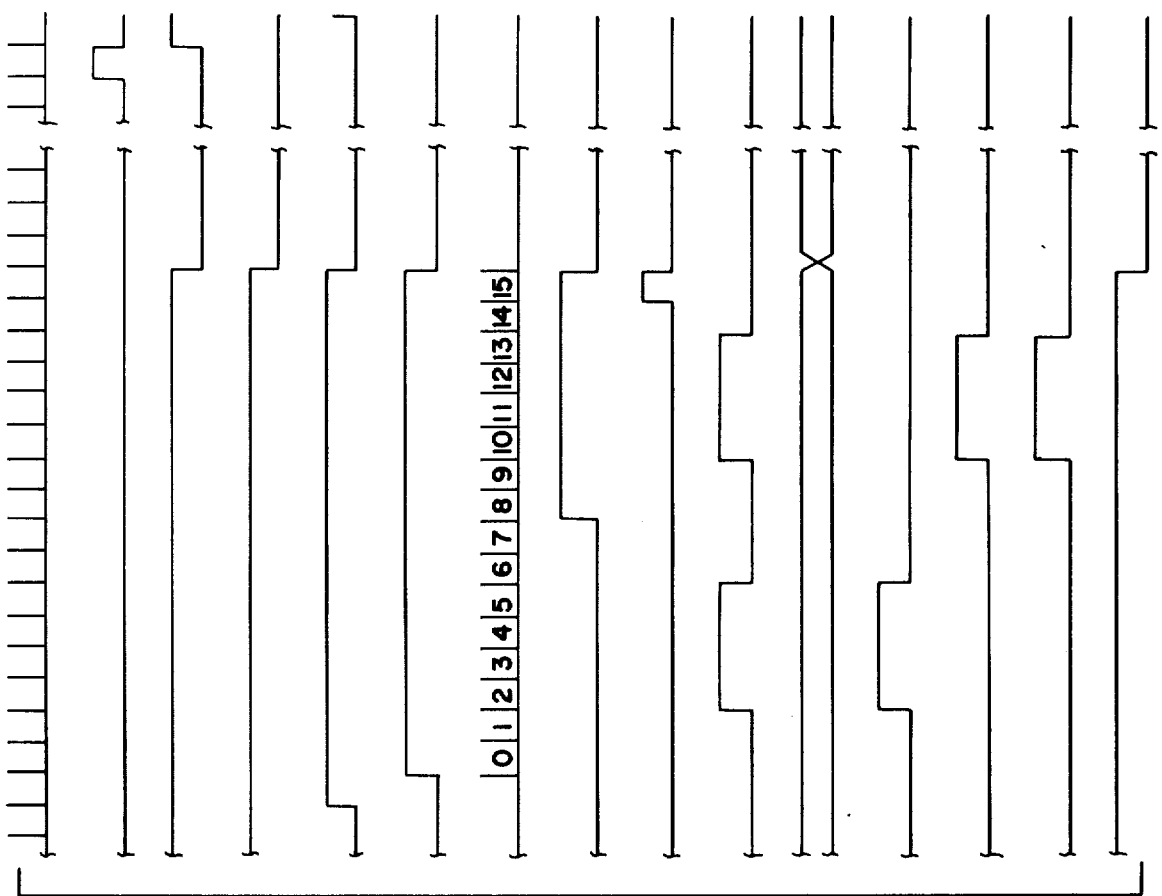

Character timing proceeds in a cycle of two codes transferred to the PIM simultaneously and transferred to the Printer of two successive sequences, as diagrammed in FIG. 13. The logic equations for the signals diagrammed are listed in Table 3.

WCHAR, derived from the IO Control field of the current micro instruction marks the entry of the two-character codes into the Character Register 202 and sets the Buffer Full flip-flop. The character 2 Flip-Flop (CHAR2F) signifies whether the first character or the second character of the pair is to be transferred to the Printer. Initially, CHAR2F is held to reset by NBUFFULF. The removal of NBUFFULF now permits the sequence flip-flop to set. It is assumed, for the purpose of the timing diagram, that the character ready signal from the Printer is true. Similarly, Carriage flip-flop can now set assuming that the carriage ready signal from the Printer is true.

Table 3

| | | |
|---|---|---|
| WCHAR | = | EMIT27 ME2 |
| S/BUFFULF | = | WCHAR PHIA + |
| R/BUFFULF | = | CHAR2F SEQT0 PHIA + |
| CD/BUFFULF | = | RESETA |
| S/CHAR2F | = | SEQTC PHIA + |
| SD/CHAR2F | = | PLOTF |
| CD/CHAR2F | = | NBUFFULF |
| S/SEQF | = | CHARRDY BUFFULF PHIA + |
| R/SEQF | = | SEQTC PHIA + |
| CD/SEQF | = | NBUFFULF |
| S/CARRF | = | CARRDY PHIB + |
| CD/CARRF | = | NSEQF |
| MR/SEQnCTF (n = 1,2,4,8) | = | NSEQF |
| CT/SEQnCTF | = | (CARRF+NSEQ8CTF)PHIA + |
| SEQTC | = | (CARRF+NSEQ8CTF)SEQ1CTF SEQ2CTF SEQ4CTF SEQ8CTF |

Table 3-continued

| | | |
|---|---|---|
| S/STBTMF | = | NNULL SEQ2CTF+ |
| R/STBTMF | = | SEQ2CTF+ |
| CD/STBTMF | = | NSEQF |
| LD/CHR(00-15)F | = | CB(00-15) WCHAR PHIB+ |
| CB(00-15) | = | C(00-15) ME2 |
| CH(7-1) | = | CHR(01-07)F NCHAR2F + CHR(09-15)F CHAR2F |
| CLR/CHR(00-15)F | = | RESET1 |
| CHARSTROBE | = | STBTMF NSEQ8CTF(CHAR+UNDSCORE+PLOTF CHR00F) |
| CARRSTROBE | = | STBTMF SEQ8CTF CARRIAGE |
| CARRIAGE | = | CHAR + SPACE + CR + PLOTF NCHR00F CHR01F |
| PAPERSTROBE | = | STBTMF SEQ8CTF(LF+PLOTF NCHR00F NCHR01F) |
| CR | = | NCH7 NCH6 NCH5 CH4 CH3 NCH2 CH1 NPLOTF |
| LF | = | NCH7 NCH6 NCH5 CH4 NCH3 CH2 NCH1 NPLOTF |
| UNDSCORE | = | NCH7 NCH6 NCH5 CH4 CH3 CH2 CH1 NPLOTF |
| SPACE | = | NCH7 CH6 NCH5 NCH4 NCH3 NCH2 NCH1 NPLOTF |
| COL(0+1) | = | NCH7 NCH6 |
| CHAR | = | NCOL(0+1) NSPACE NPLOTF |
| NULL | = | COL(0+1) NCR NLF NUNDSCORE NPLOTF |

The removal of NSEQF from the master reset pin of the Sequence Counter now enables the Counter to be incremented by PHIA. The purpose of this counter is to time the character, carriage, and paper strobes for the Printer. The terminal count, 15, resets the Sequence Flip-Flop and sets the Character 2 flip-flop, setting the stage for the transmission of the second character code.

The actual strobe timing is a function of the SEQ2CTF signal of the Counter. This signal sets and resets the Strobe Timing Flip-Flop, generating two strobe windows per character. The first window defines the time position of character strobe and the second window, the time position of the carriage motion strobe or the paper feed strobe.

CHAR2F set enables the identical sequence for the transmission of the second code to the Printer, but the beginning of the sequence depends upon the receipt of character ready and carriage ready signals from the Printer.

The functions of the three strobes sent to the printer are as follows:

CHARSTROBE — causes the Printer to load the ANSCII character code from the data lines, CARRSTROBE — causes the Printer to load a carriage movement command from the data lines, and PAPERSTROBE — causes the Printer to load a paper feed command from the data lines.

The timing described above defines when a particular strobe can be sent to the Printer, but whether the strobe is actually generated depends upon the nature of the character code currently being processed. Character strobe is generated if the ANSCII code is denoted to be a character, underscore, or plot character. Carriage motion strobe is generated, following character strobe, if the ANSCII code is decoded to be a character, space, carriage return character, or plot made horizontal movement character. A character strobe followed immediately by a carriage motion strobe is interpreted by the Printer to permit carriage motion to be deferred until the character has been printed. The reason for incorporating this delay in the Printer is that electronic commands can be used on a micro-second basis, but Printer movements are in the millisecond range. Paper feed strobe is generated, following the character strobe, if the ANSCII code is decoded to be a line feed character or a plot mode vertical movement character.

The Printer takes all types of data from the same set of 11 data lines. The Printer interprets the data on the lines as character data, carriage motion data, or paper feed data on the basis of the strobe issued at the same time. The purpose of the Data Multiplexer 214 of FIG. 11 is to pass the appropriate data to the Printer. The Data Multiplexer is composed of two 4:1 multiplexer devices feeding data lines 1, 2, 4, and 8, as summarized in Table 4. In addition, the Data Multiplexer employs two 2:1 multiplexer devices to feed data lines 16, 32, 64, 128, 256, 512, and 1K, also summarized in Table 4.

In the Teletype mode, the Data Multiplexer passes the following types of information from the sources shown to the data lines. Character Register when specified by NSEQ8CTF, defines the first half of the character period, and Horizontal Pitch Register, when a character or space has been transmitted and SEQ8CTF is true, defines the second half of the character period, or Vertical Pitch Register, when a line feed character is present and SEQ8CTF is true, defines the second half of the character period, or Carriage Return Counter, when a carriage return character is present and SEQ8CTF is true, defines the second half of the character period.

Table 4

| Y Passed to Output | B SEQ8CTF NPLOTF (CR + LF) | A SEQ8CTF NPLOTF CARRIAGE |
|---|---|---|
| CH(1,2,3,4) | 0 | 0 |
| HOZ(1,2,4,8)F | 0 | 1 |
| VER(1,2,4,8)F | 1 | 0 |
| CRCT(1,2,4,8)F | 1 | 1 |

In logic equations, simplified:
DATA(1,2,4,8) = CH(1,2,3,4) (NSEQ8CTF + PLOTF + NCR NLF NCARRIAGE)
  + HOZ(1,2,4,8)F SEQ8CTF NPLOTF NCR NLF CARRIAGE
  + VER(1,2,4,8)F SEQ8CTF NPLOTF(CR + LF) NCARRIAGE
  + CRCT(1,2,4,8)F SEQ8CTF NPLOTF(CR + LF) CARRIAGE
DATA16 = (CH5 NCR + CRCT16 CR) EN + UNDSCORE
DATA32 = (CH6 NCR + CRCT32 CR) EN
DATA64 = (CH7 NCR + CRCT64 CR) EN + UNDSCORE
DATA128 = (CHR08F NCR + CRCT128 CR) EN
DATA256 = (CHR07F NCR + CRCT256 CR) EN
DATA512 = (CHR06F NCR + CRCT512 CR) EN
DATA1K = (CHR05F PLOTF NCR + VPULL1 CR) EN
Where:
EN = (NSEQ8CTF MOVESPACE + SEQ8CTF CR + PLOTF) NUNDSCORE

Table 4-continued

MOVESPACE = CHAR + SPACE

The function of the Carriage Return Counter 210 of FIG. 11 is to sum the horizontal positions as characters and spaces are transmitted to the Printer in order to be able to transmit the number of positions to be moved back on receipt of a carriage return character. This function is implemented with two counters and a flip-flop for count enable. The Horizontal Counter is made of one counter device and is capable of counting to 15. The Carriage Return Counter is composed of three counter devices with the terminal count of each device wired to the count enabling trickle input of the next device. Only the first ten outputs of this counter are used, permitting a maximum count of 1023.

Figure 14A:
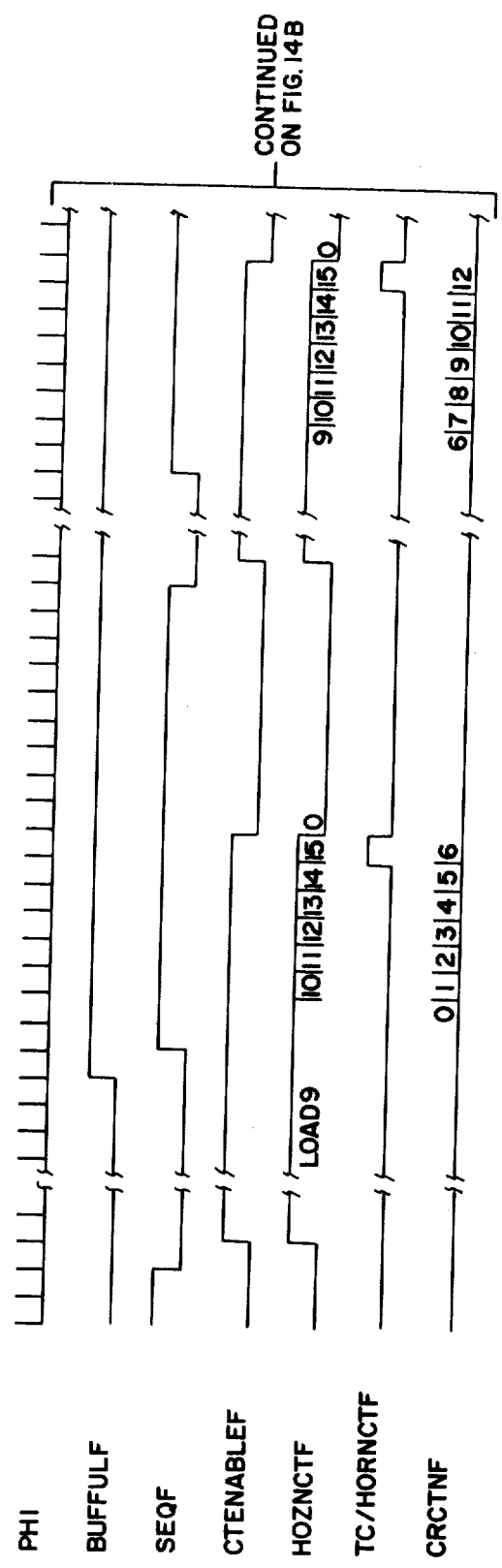
Figure 14B:
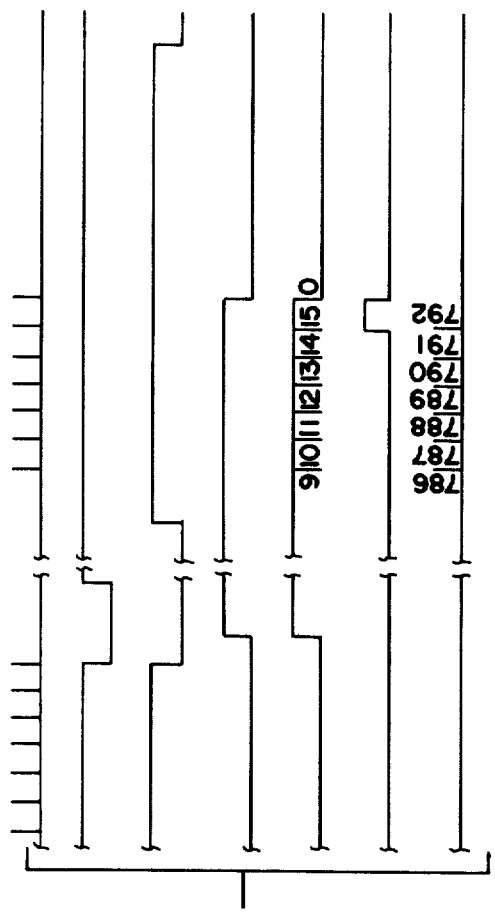
Figure 16:
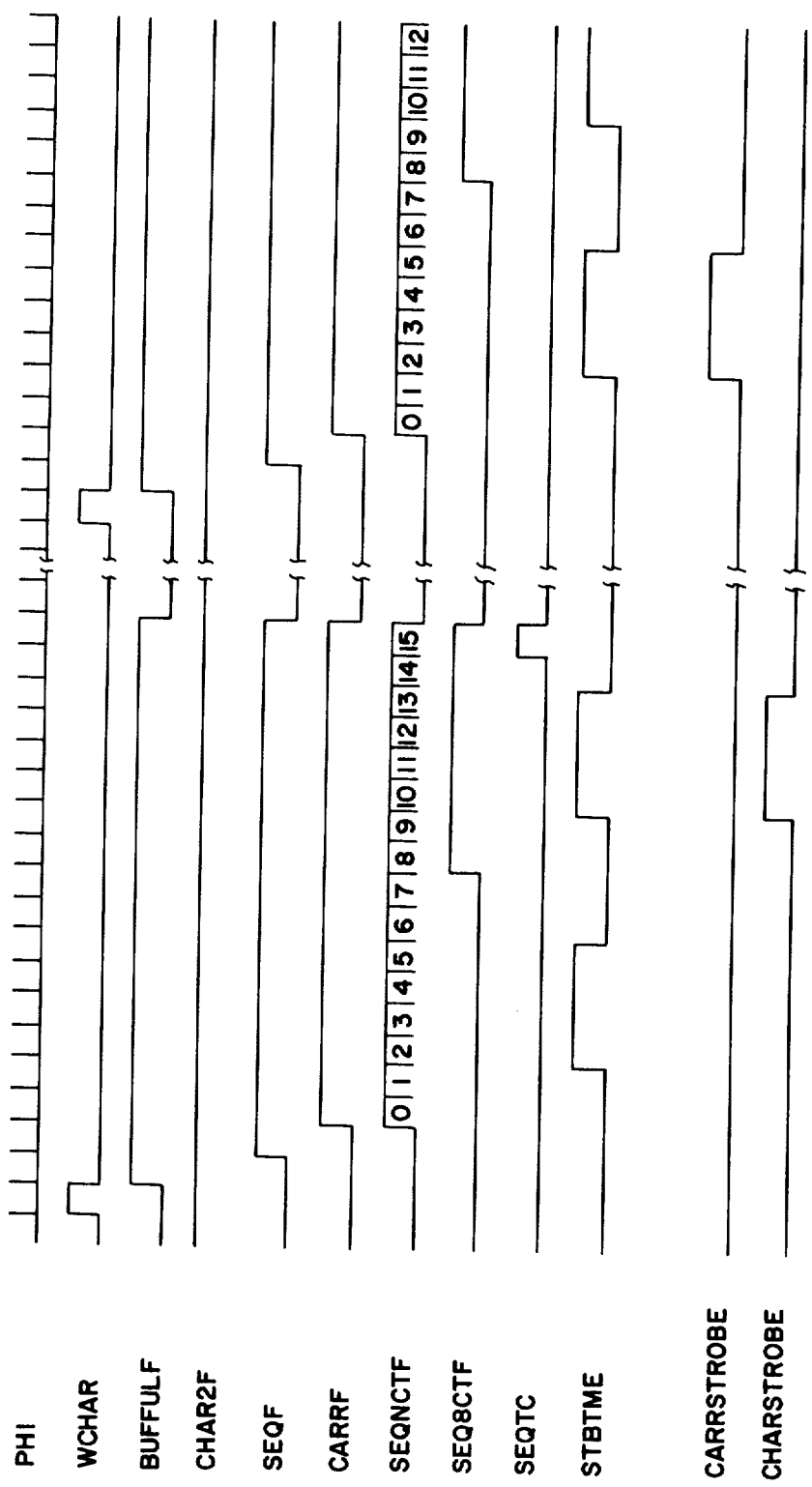
FIG. 16 is another timing diagram of the Printer Interface Module.
Figure 17A:
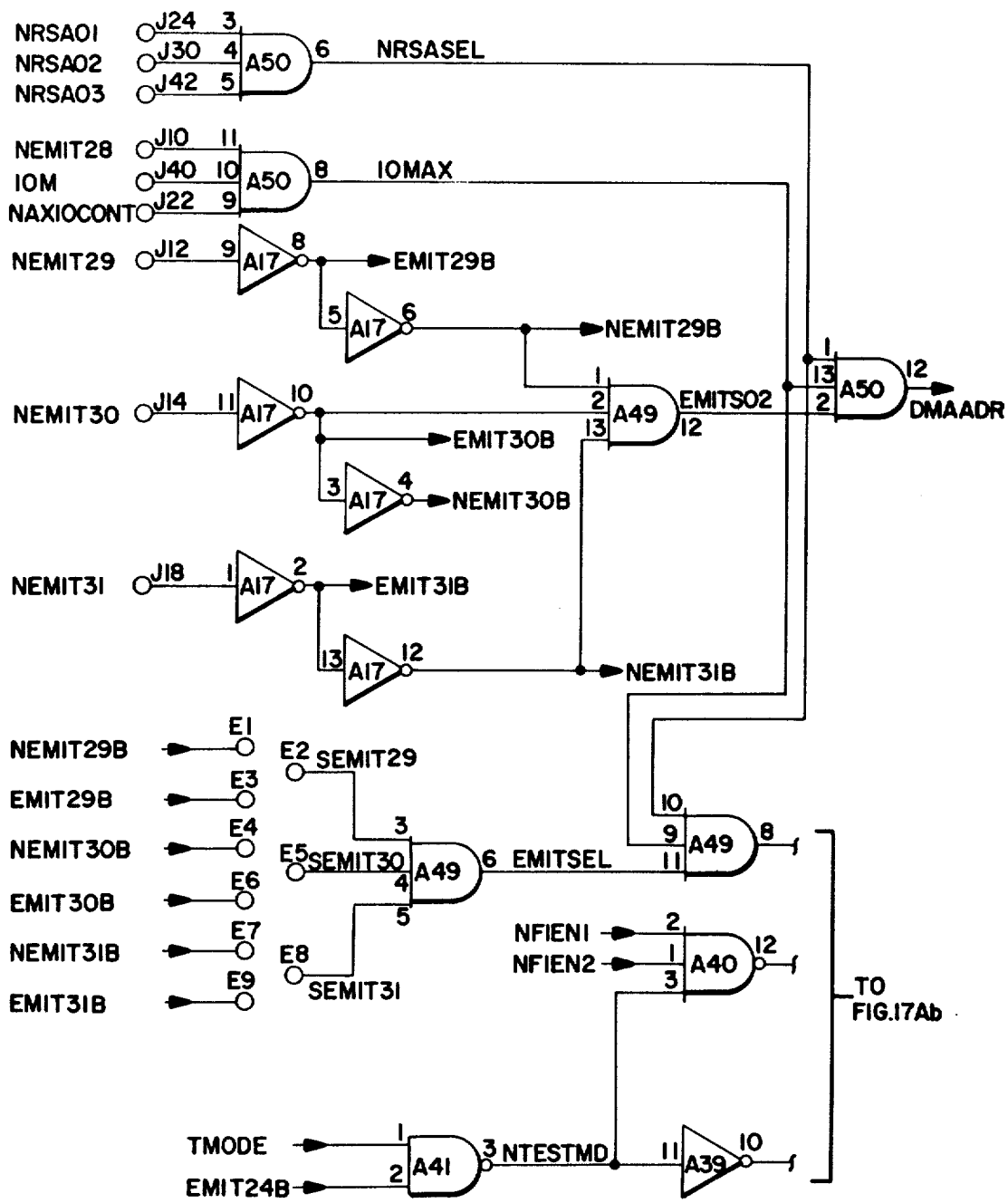
FIG. 17Aa through 17Df is a schematic diagram of the Cartridge Disk Drive Controller Module A.
Figure 17A:
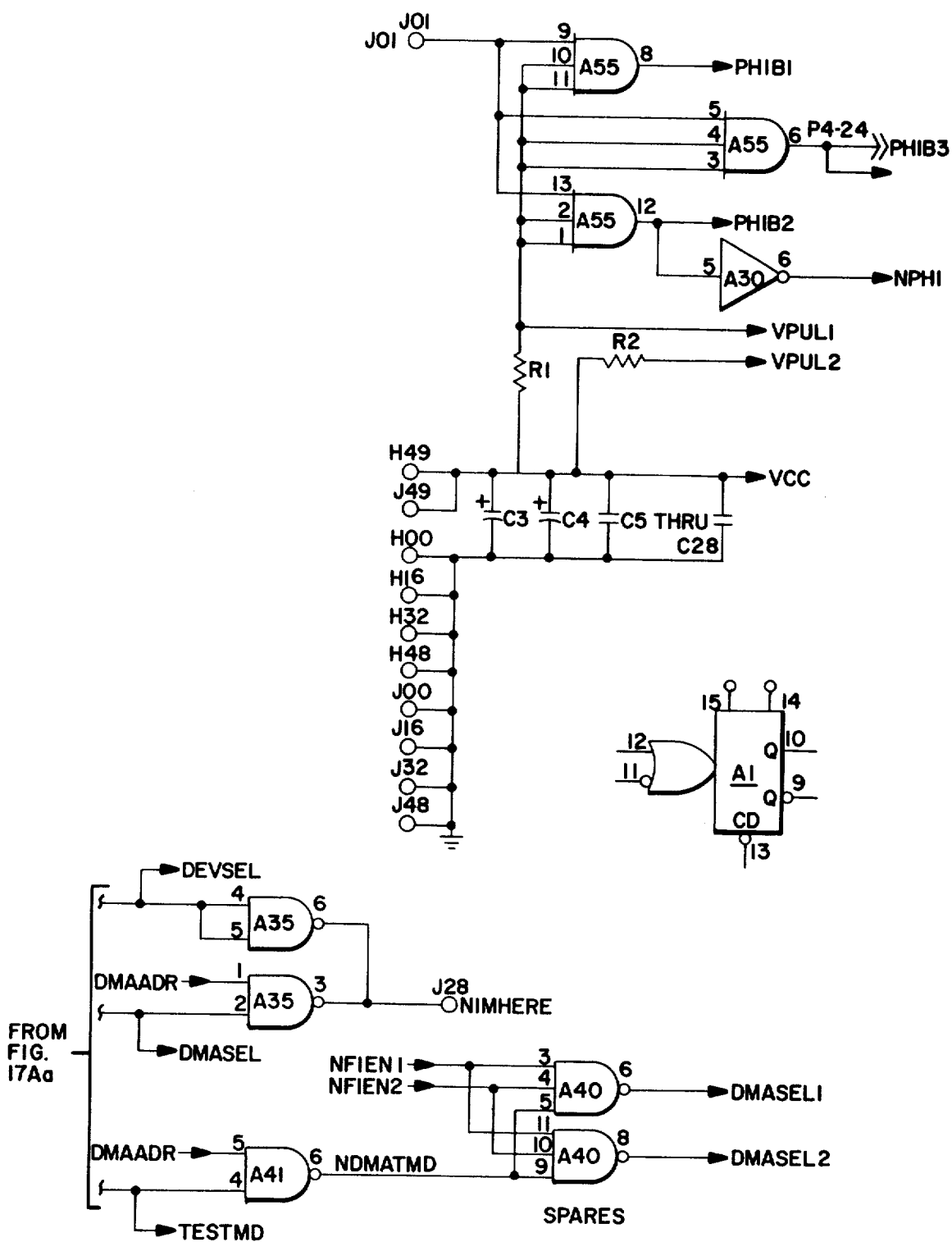
Figure 17A:
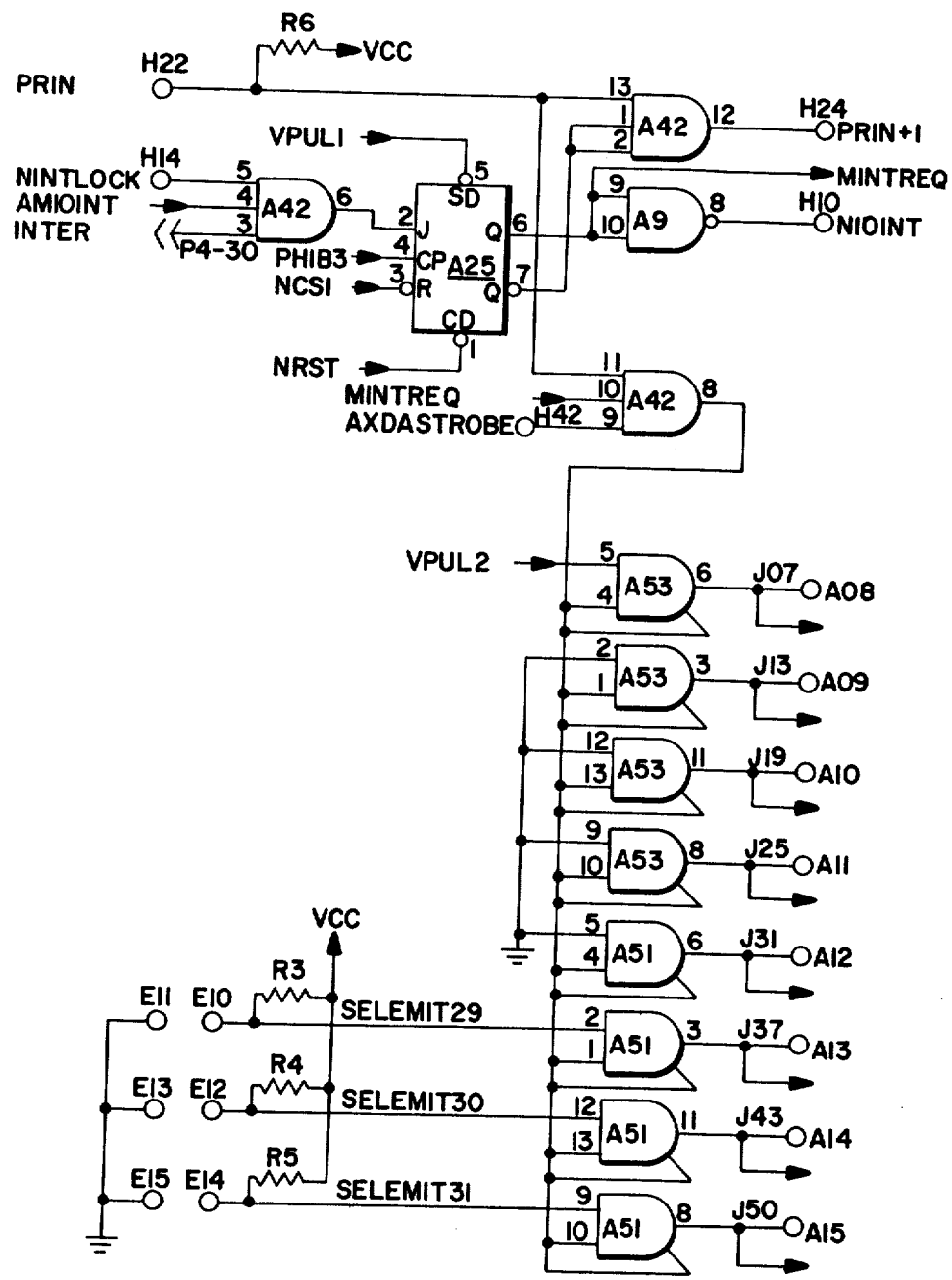
Figure 17B:
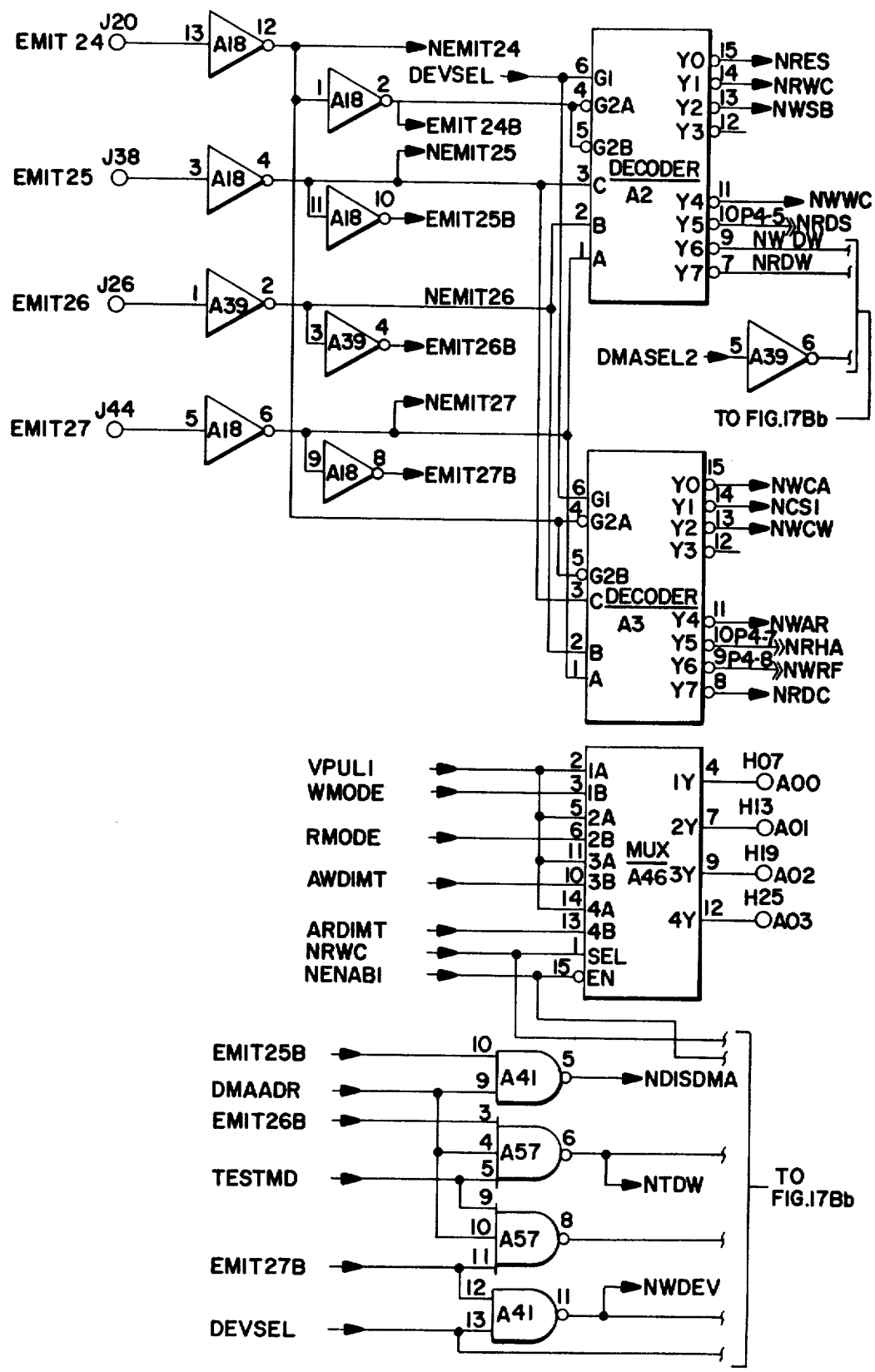
Figure 17B:
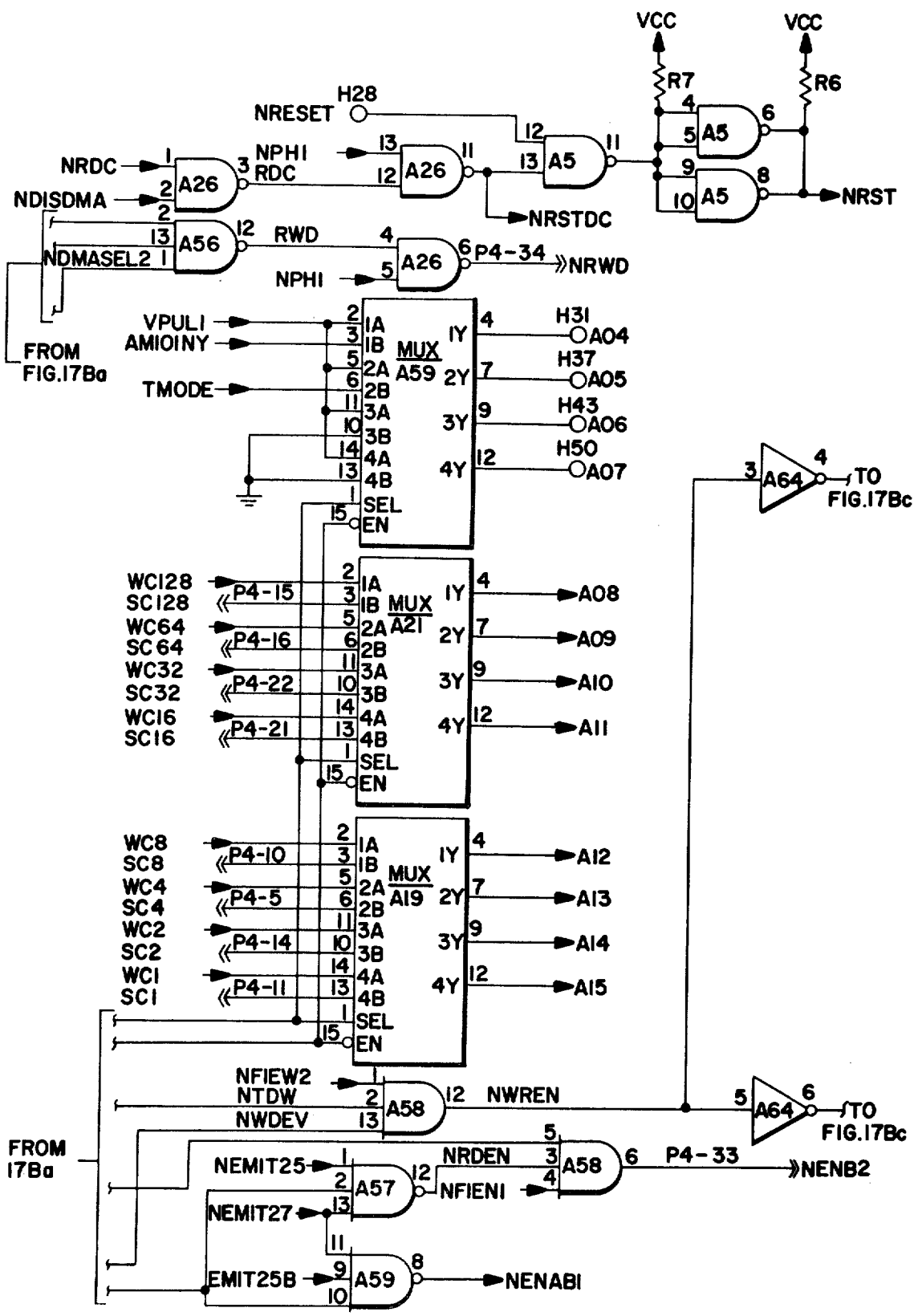
Figure 17B:
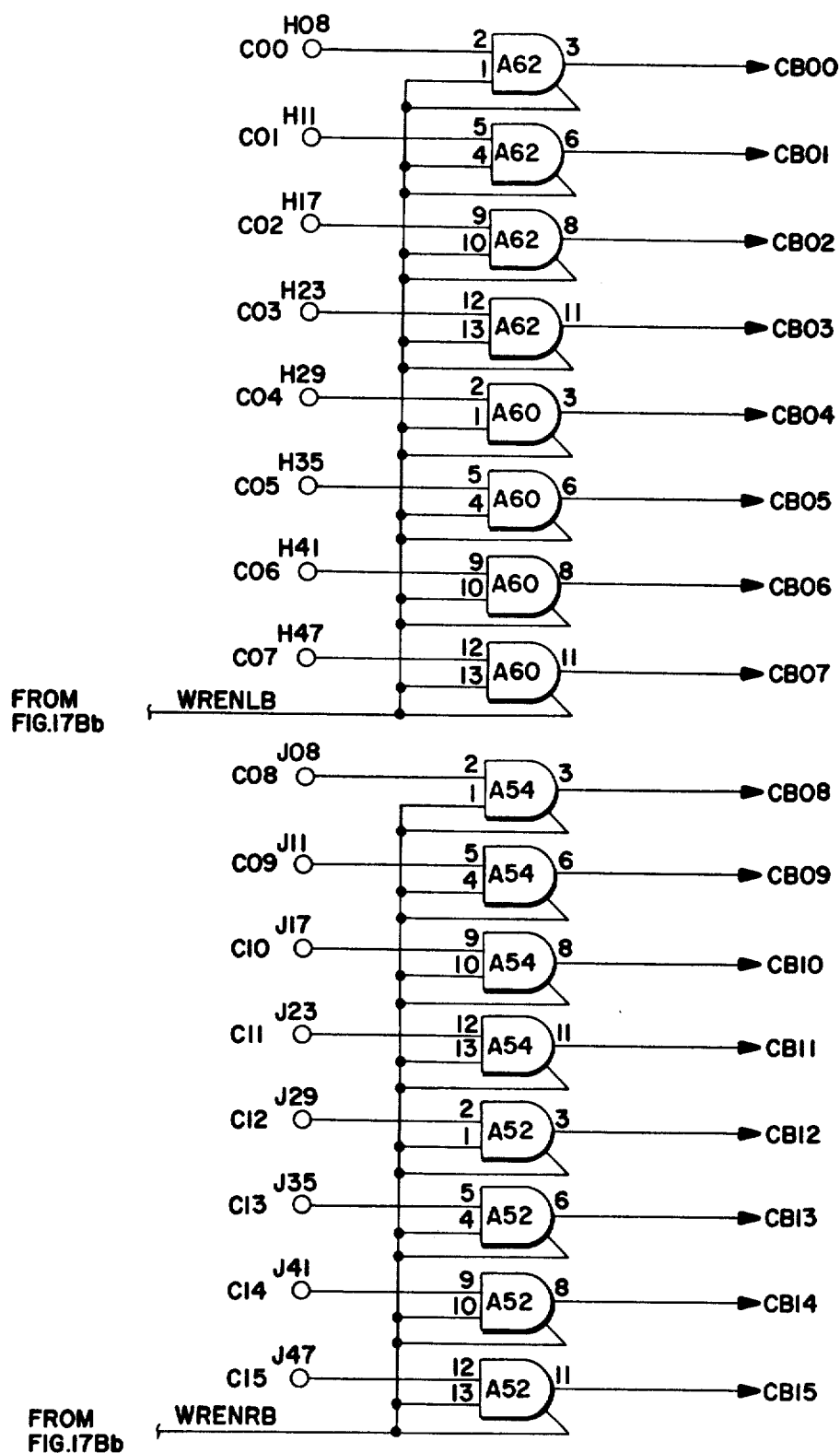
Figure 17C:
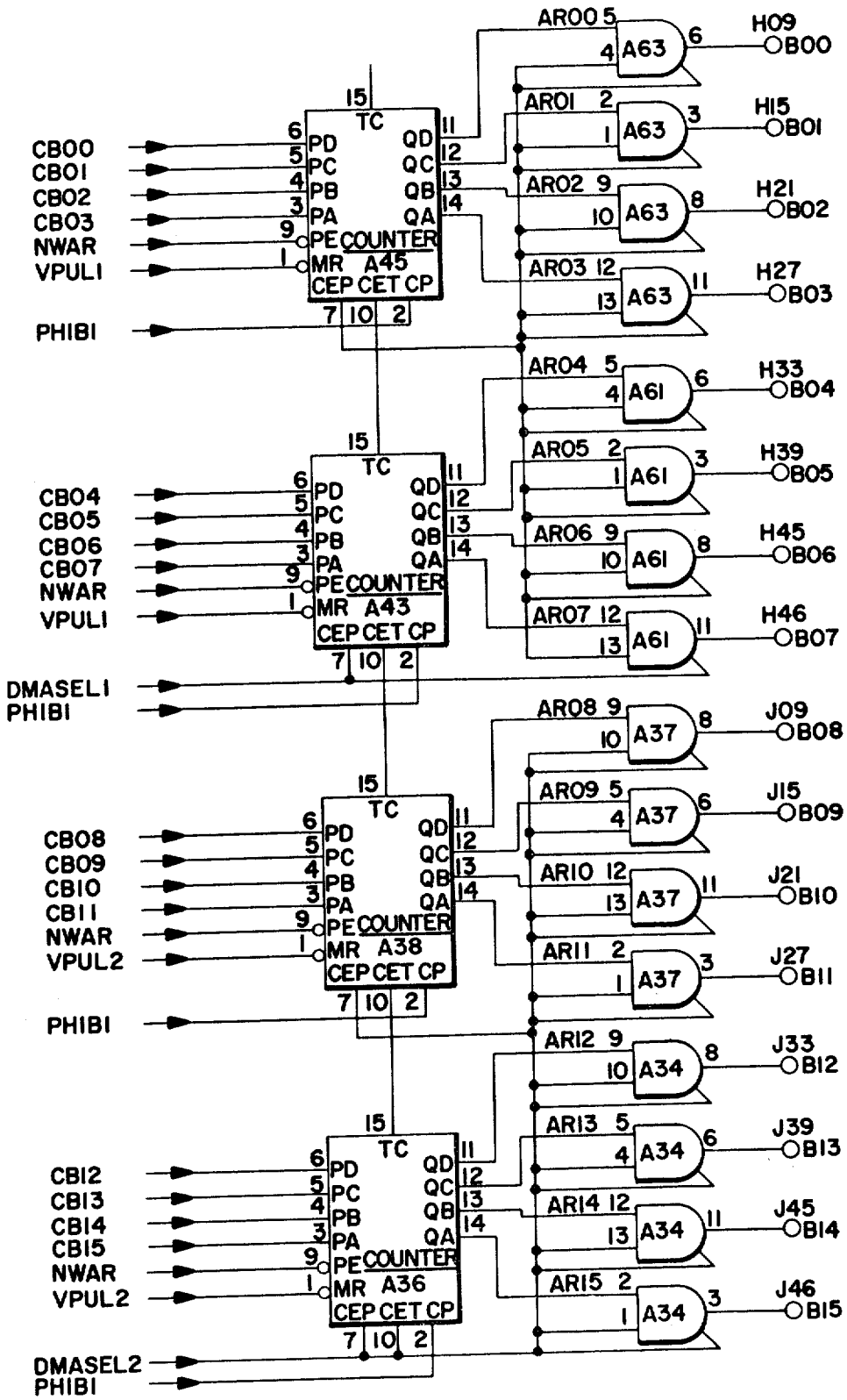
Figure 17C:
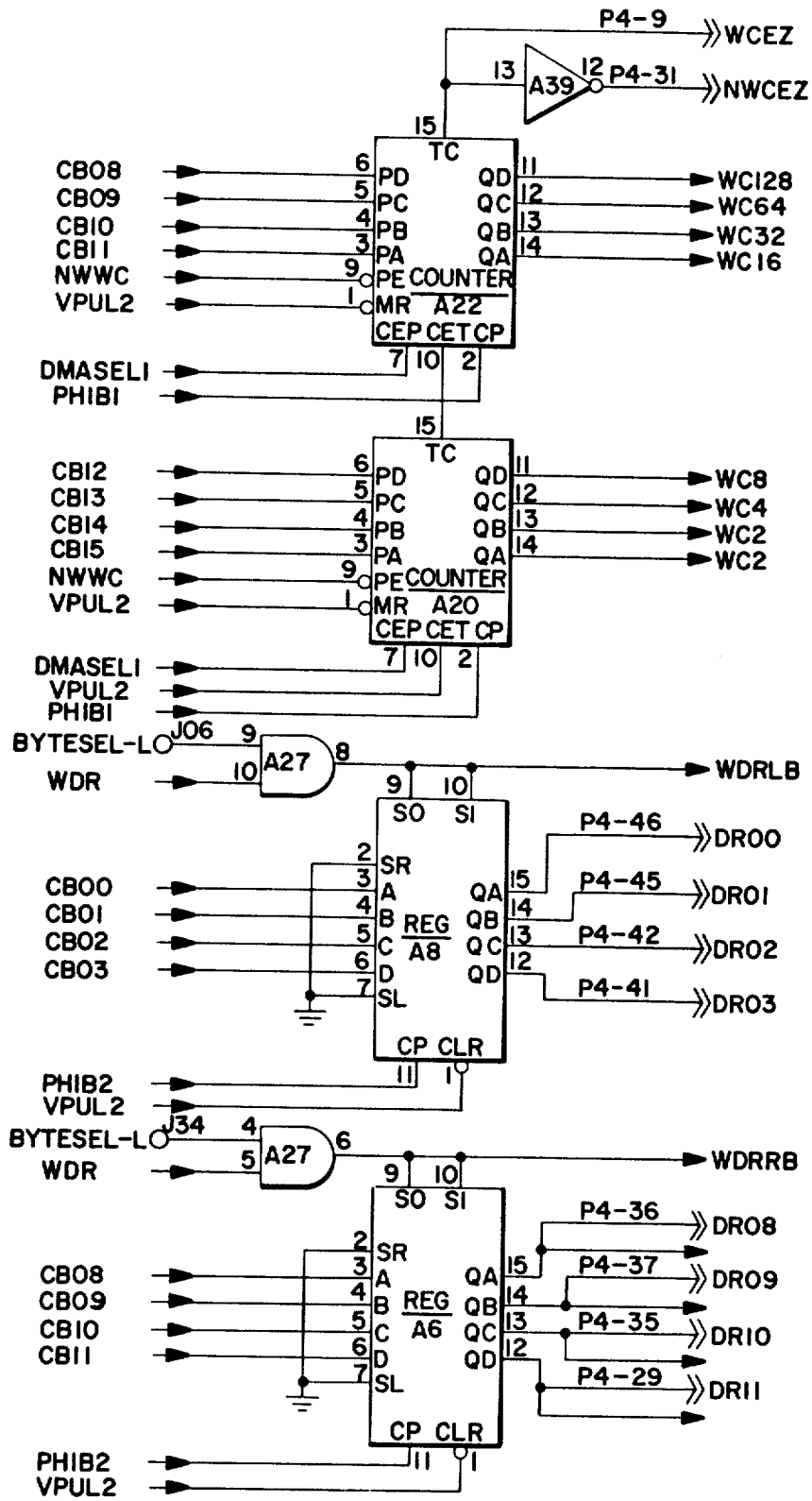
Figure 17C:
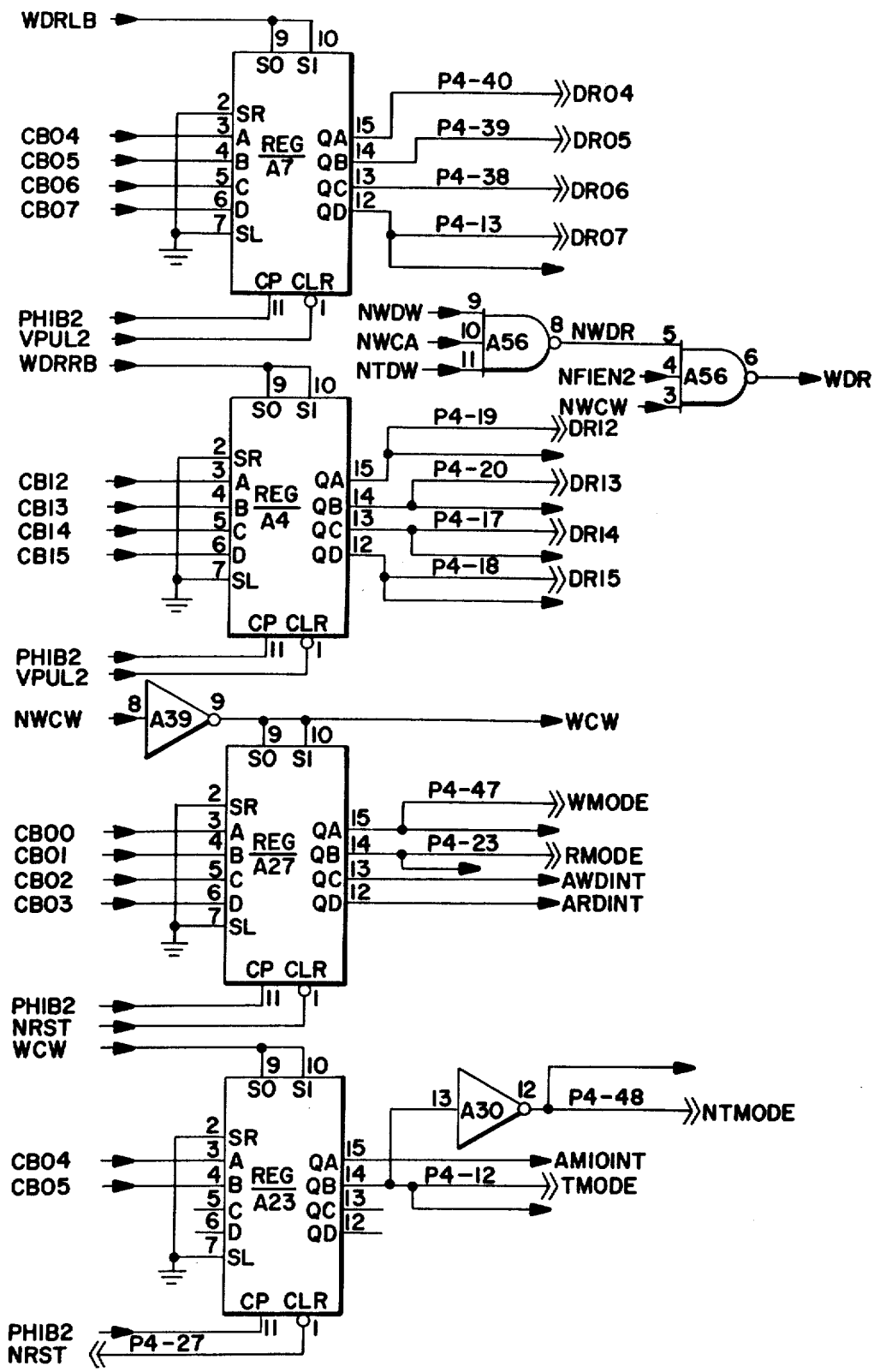
Figure 17D:
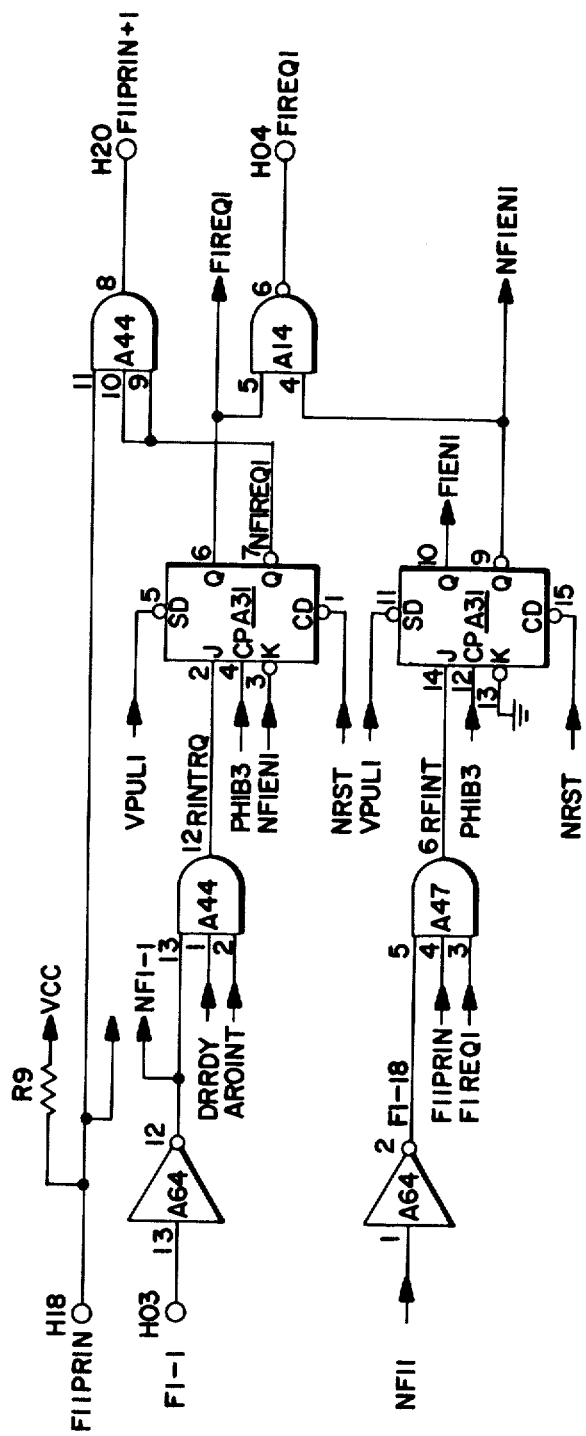
Figure 17D:
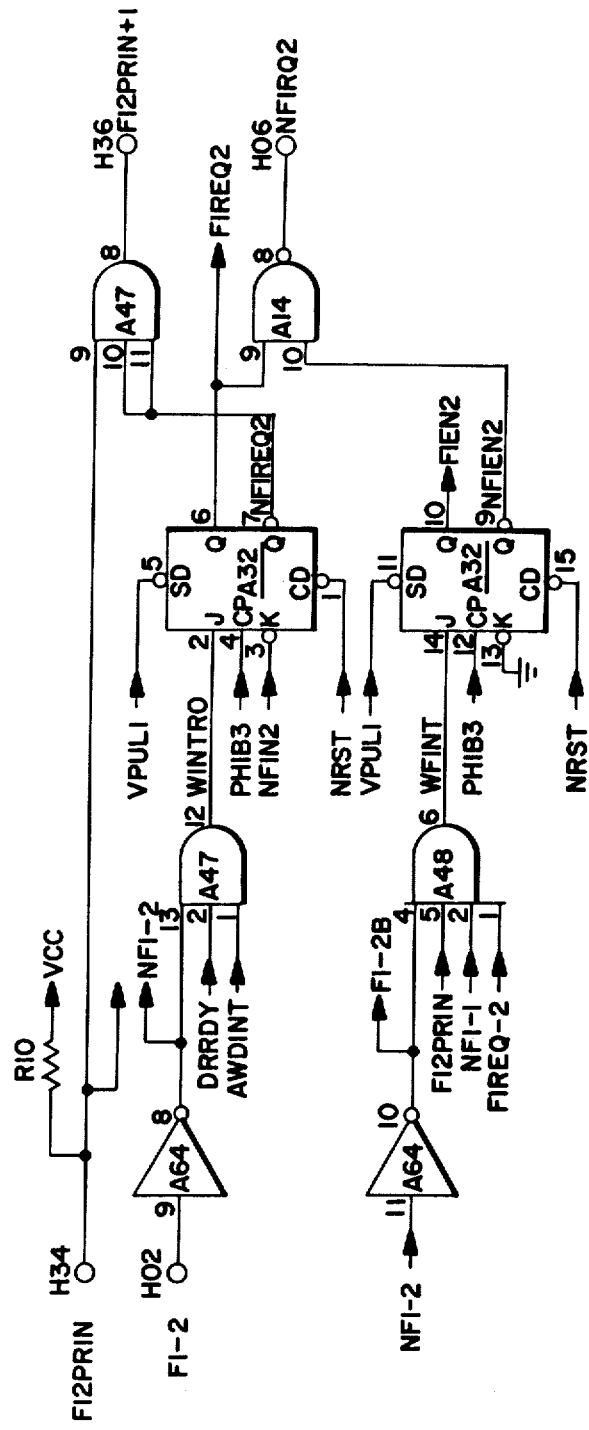
Figure 17D:
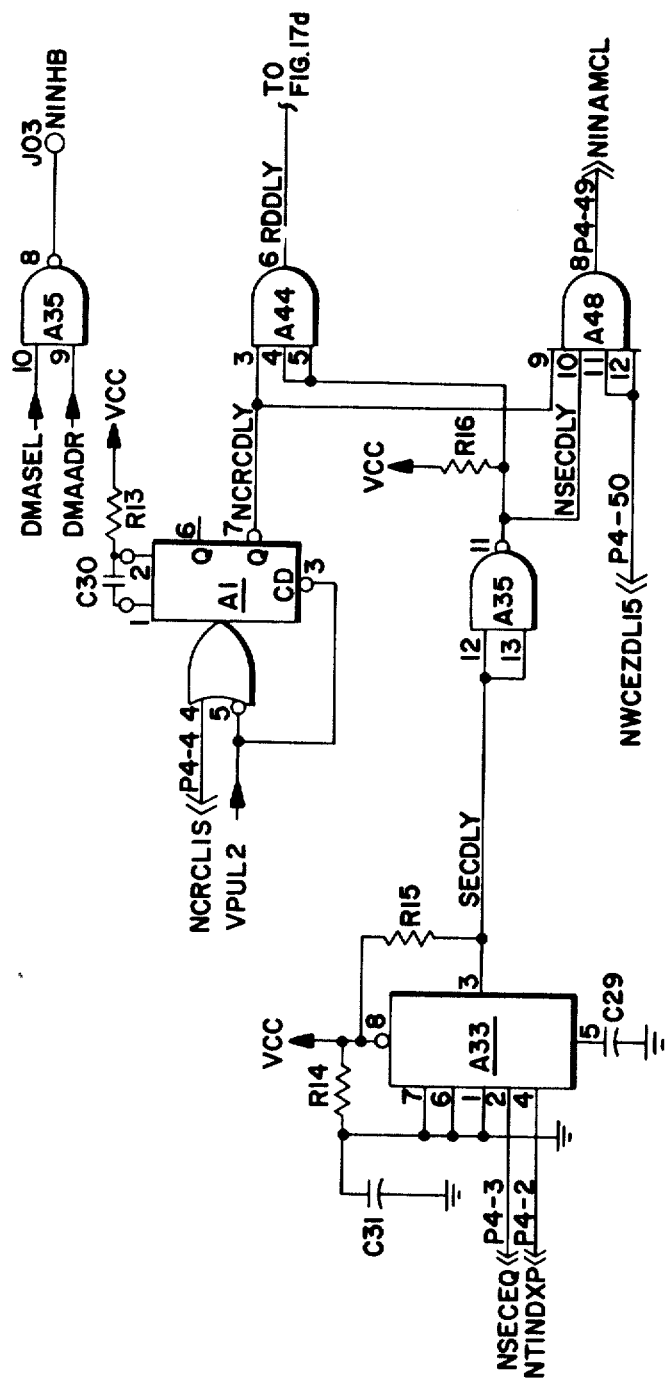
Figure 17D:
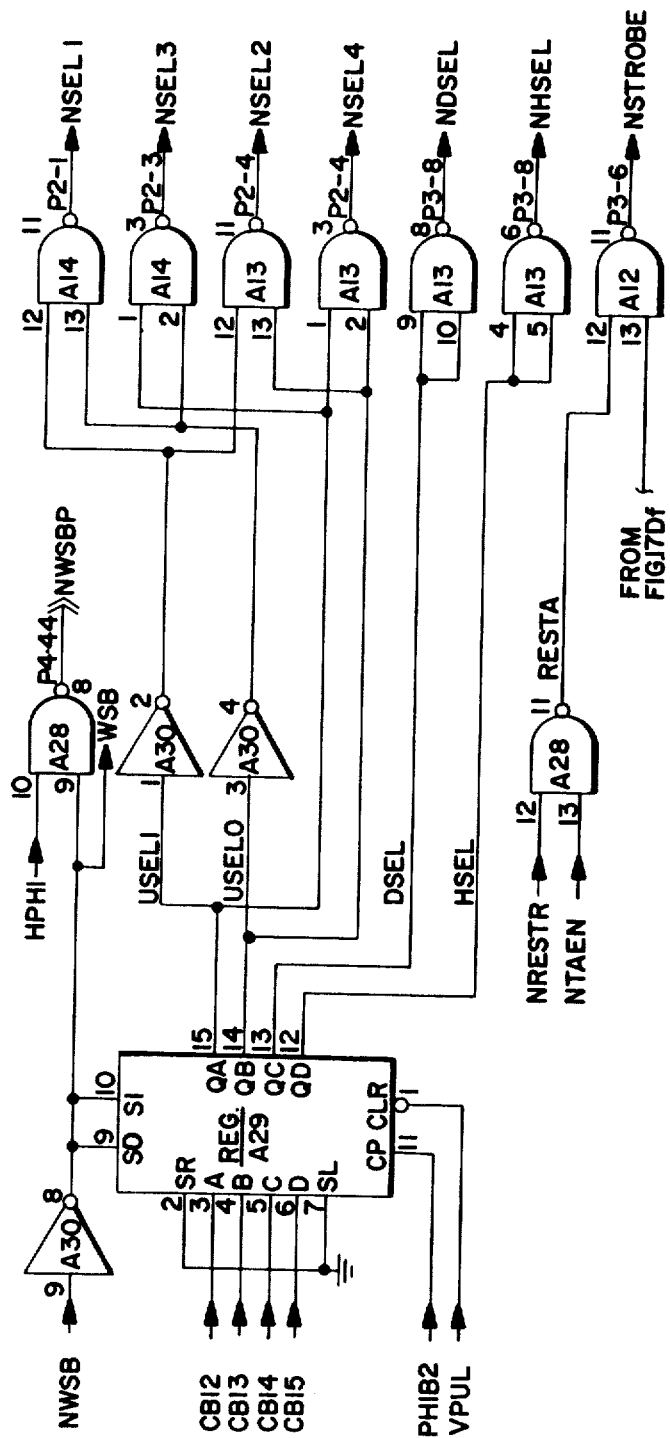
Figure 17D:
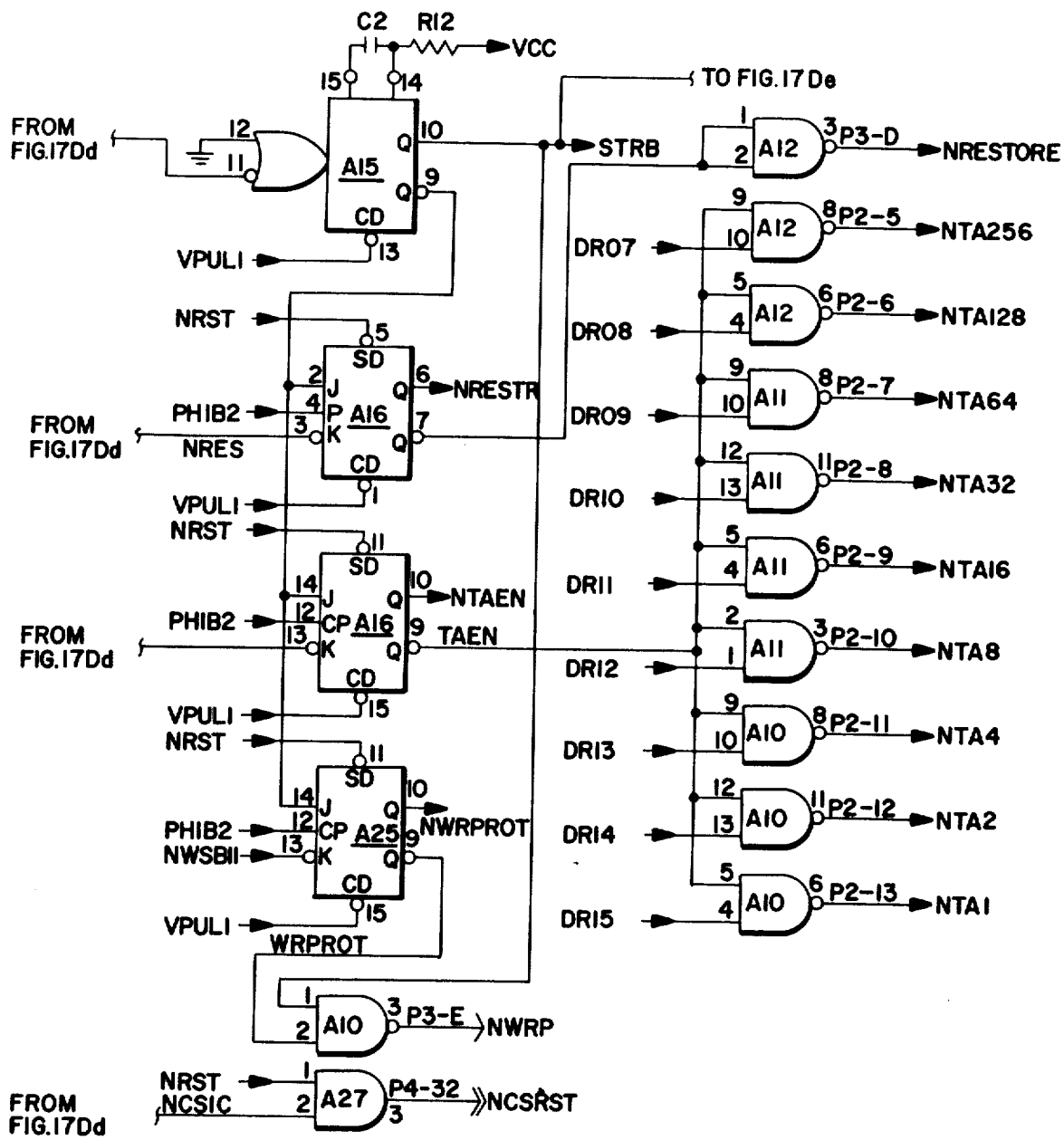
Figure 18A:
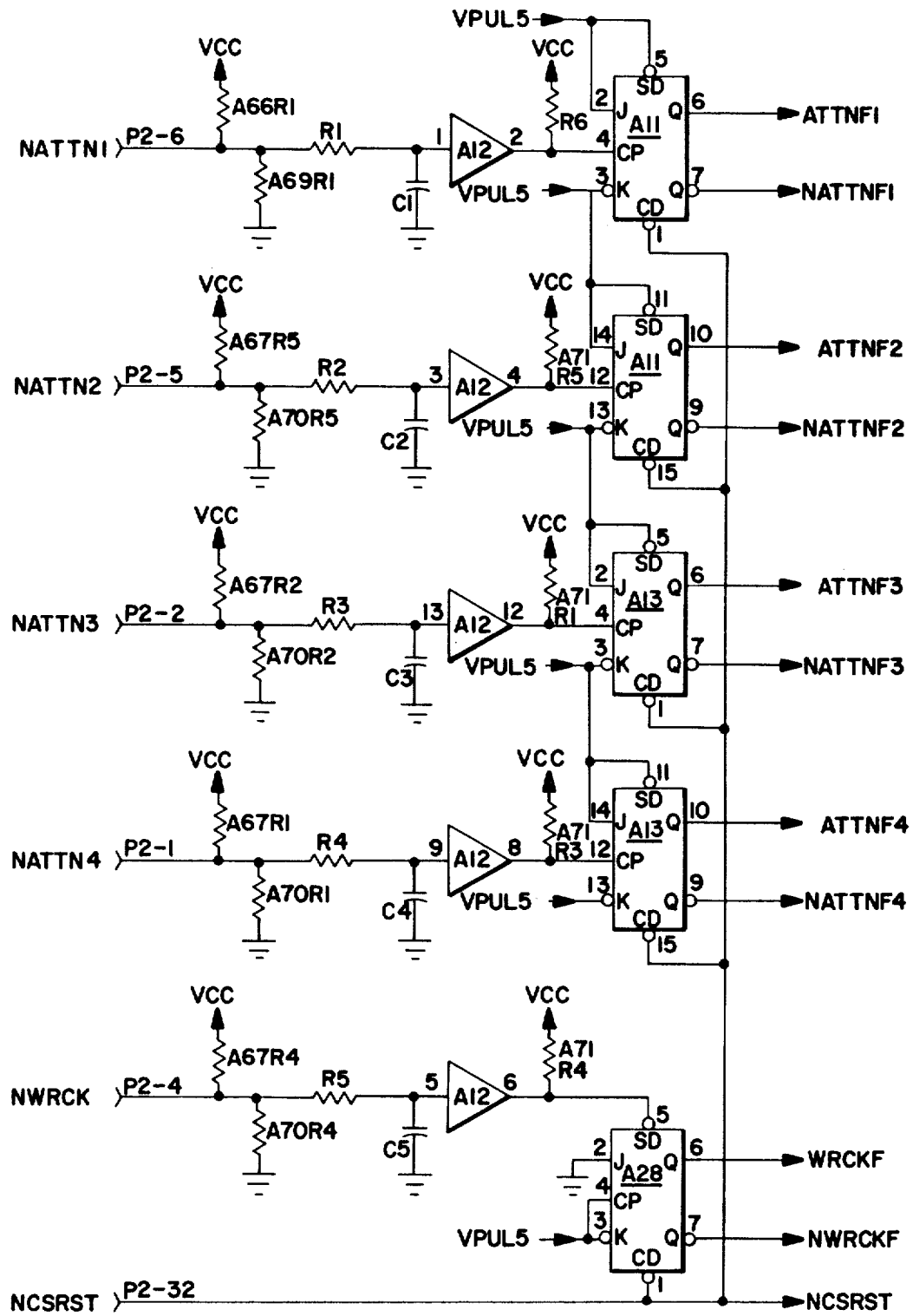
FIG. 18Aa through 18Ee is a schematic diagram of the Cartridge Disk Drive Controller Module B.
Figure 18A:
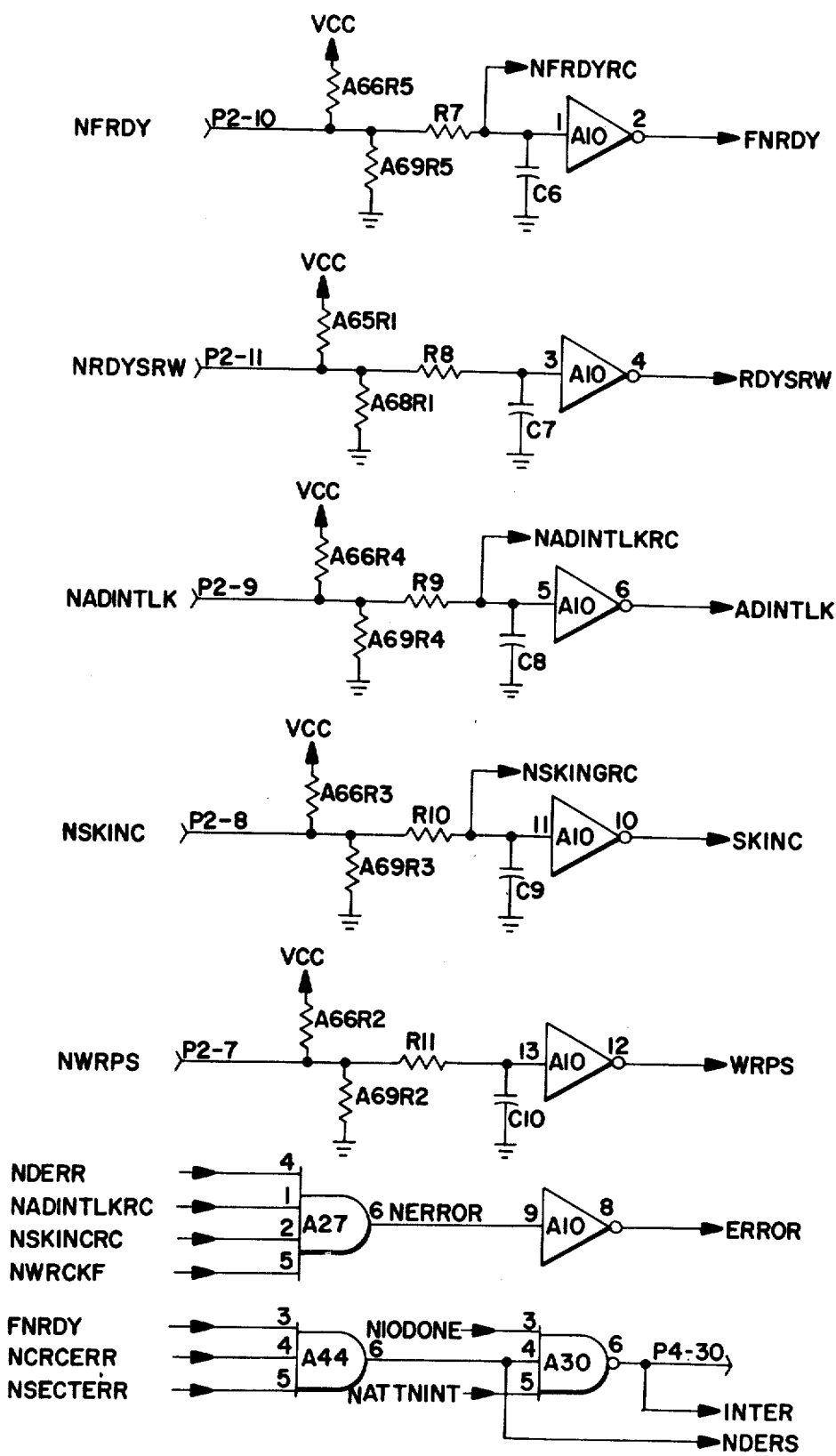
Figure 18A:
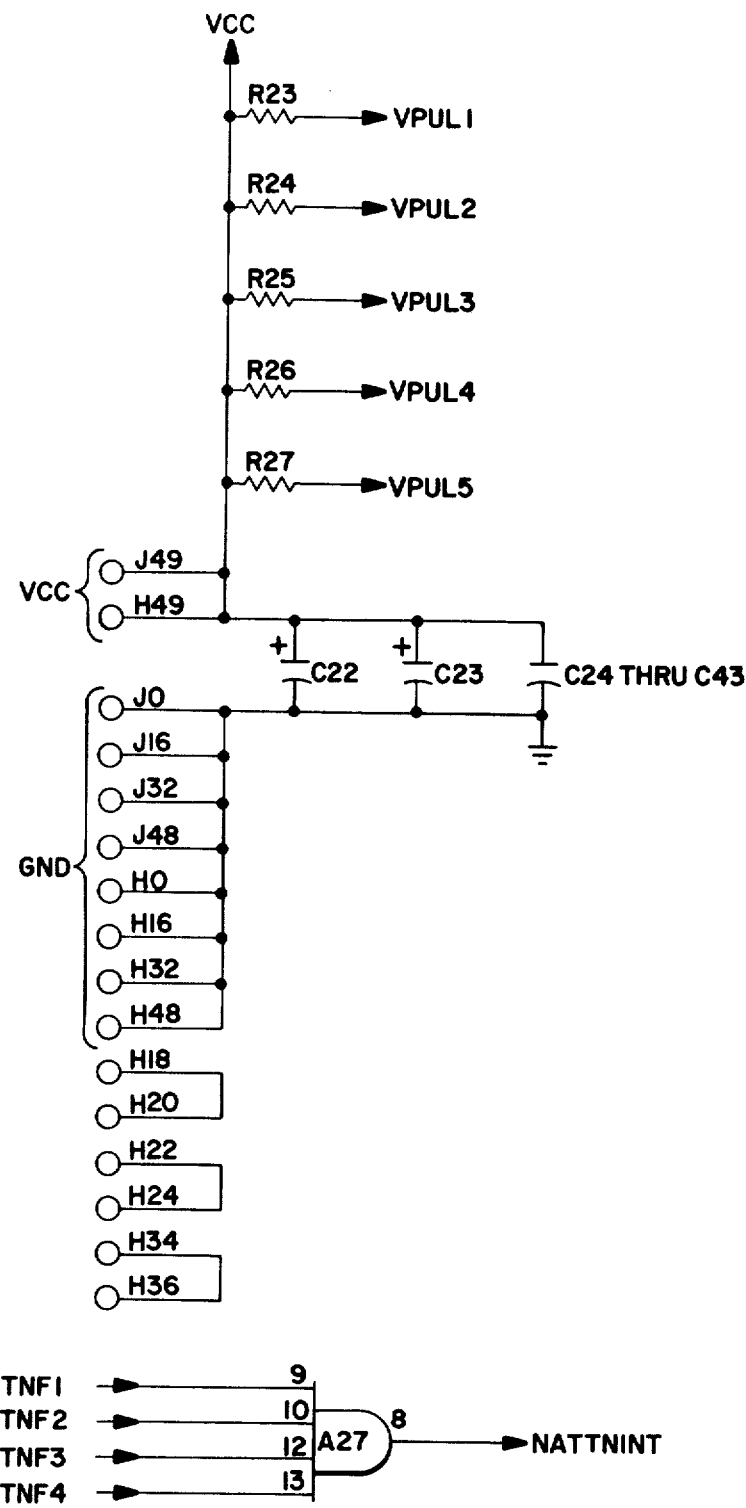
Figure 18B:
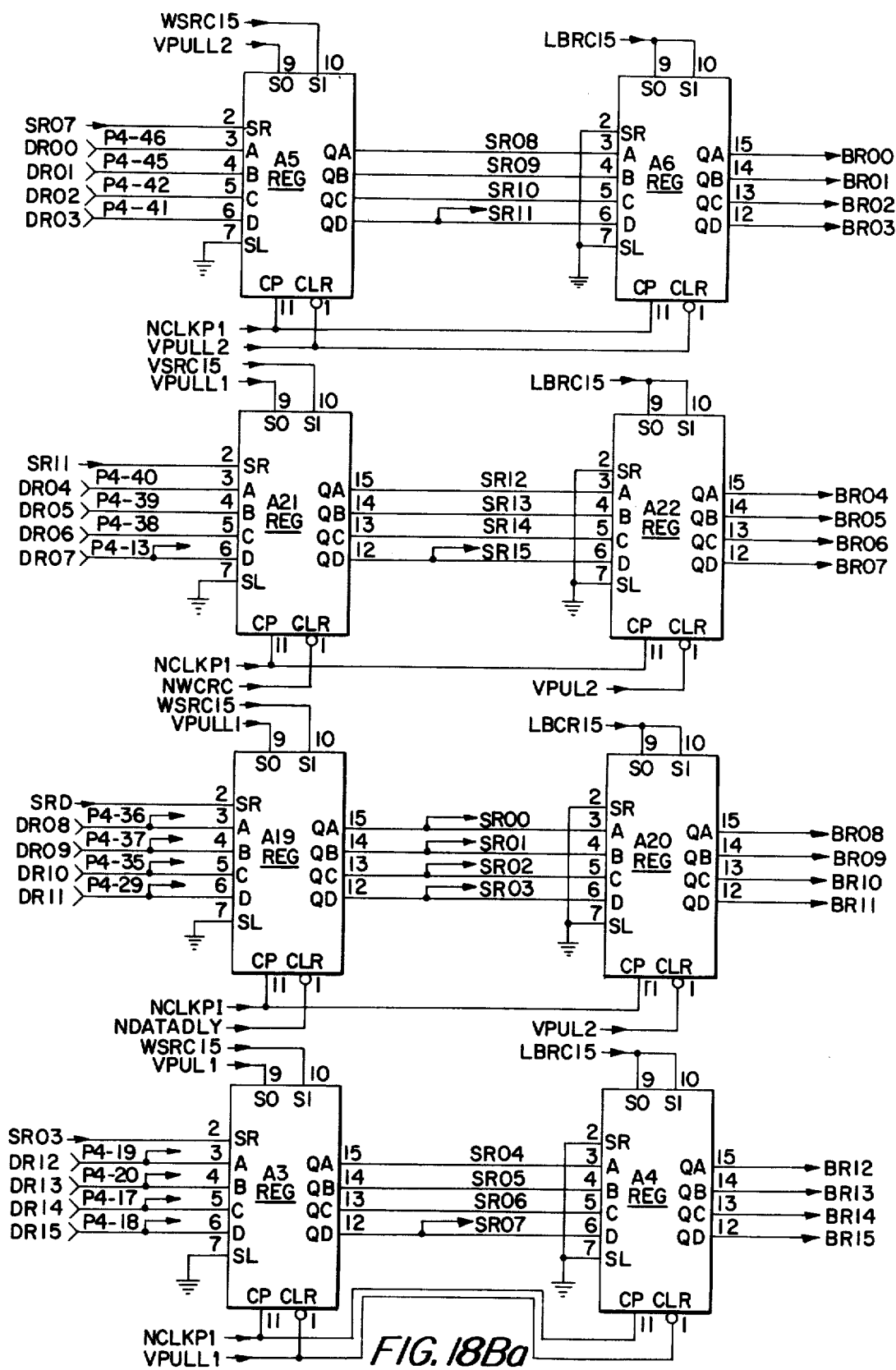
Figure 18C:
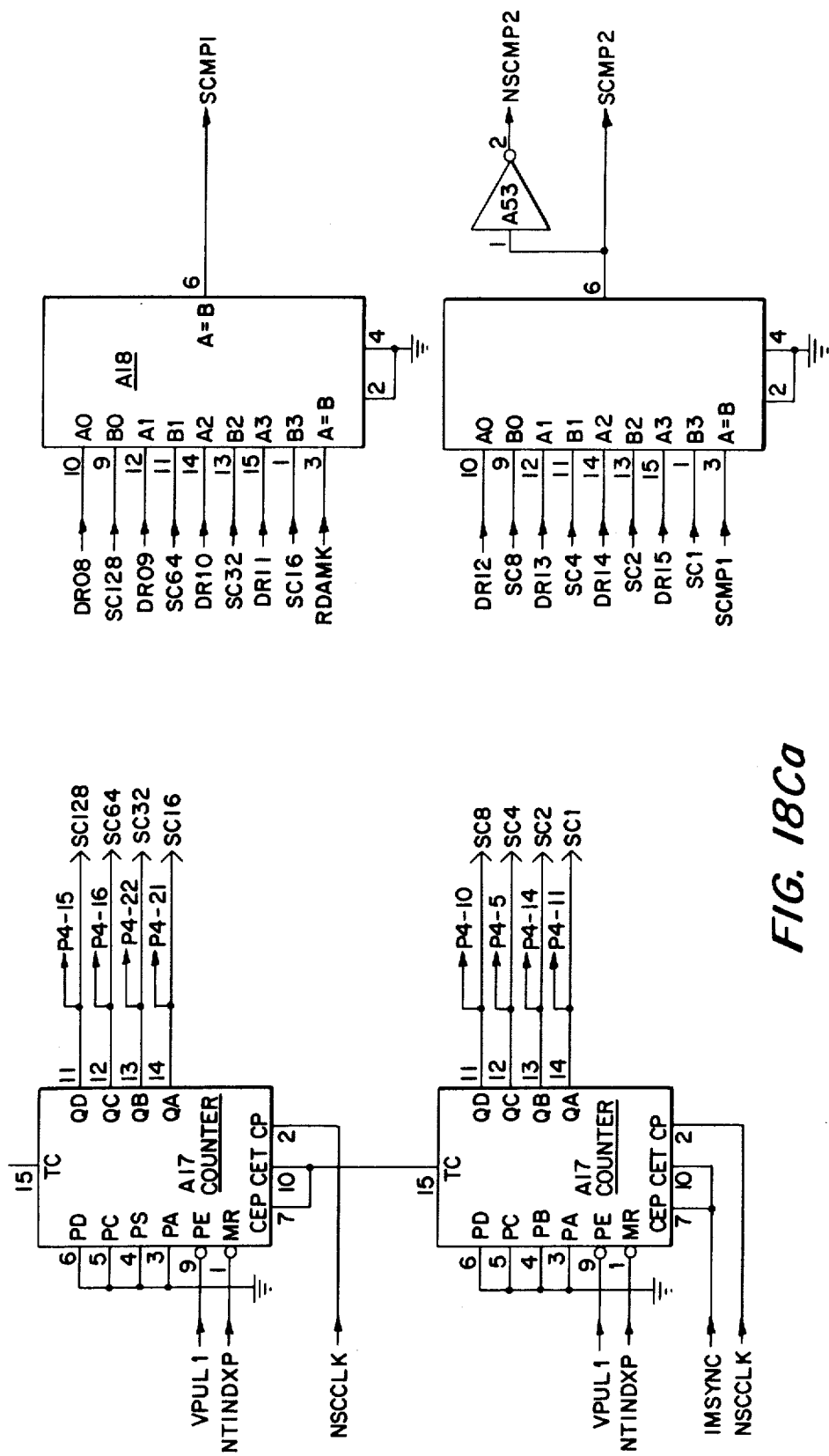
Figure 18C:
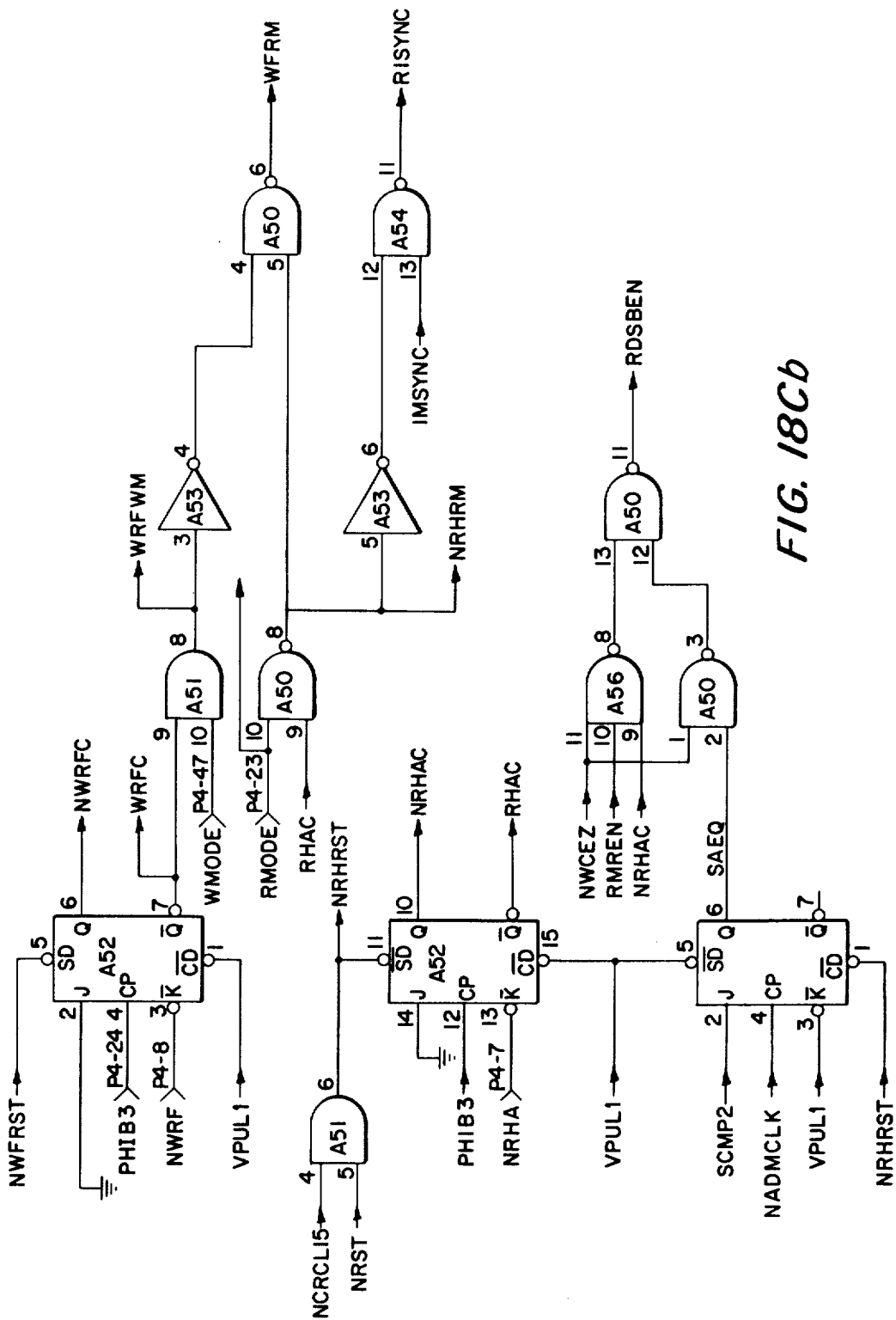
Figure 18C:
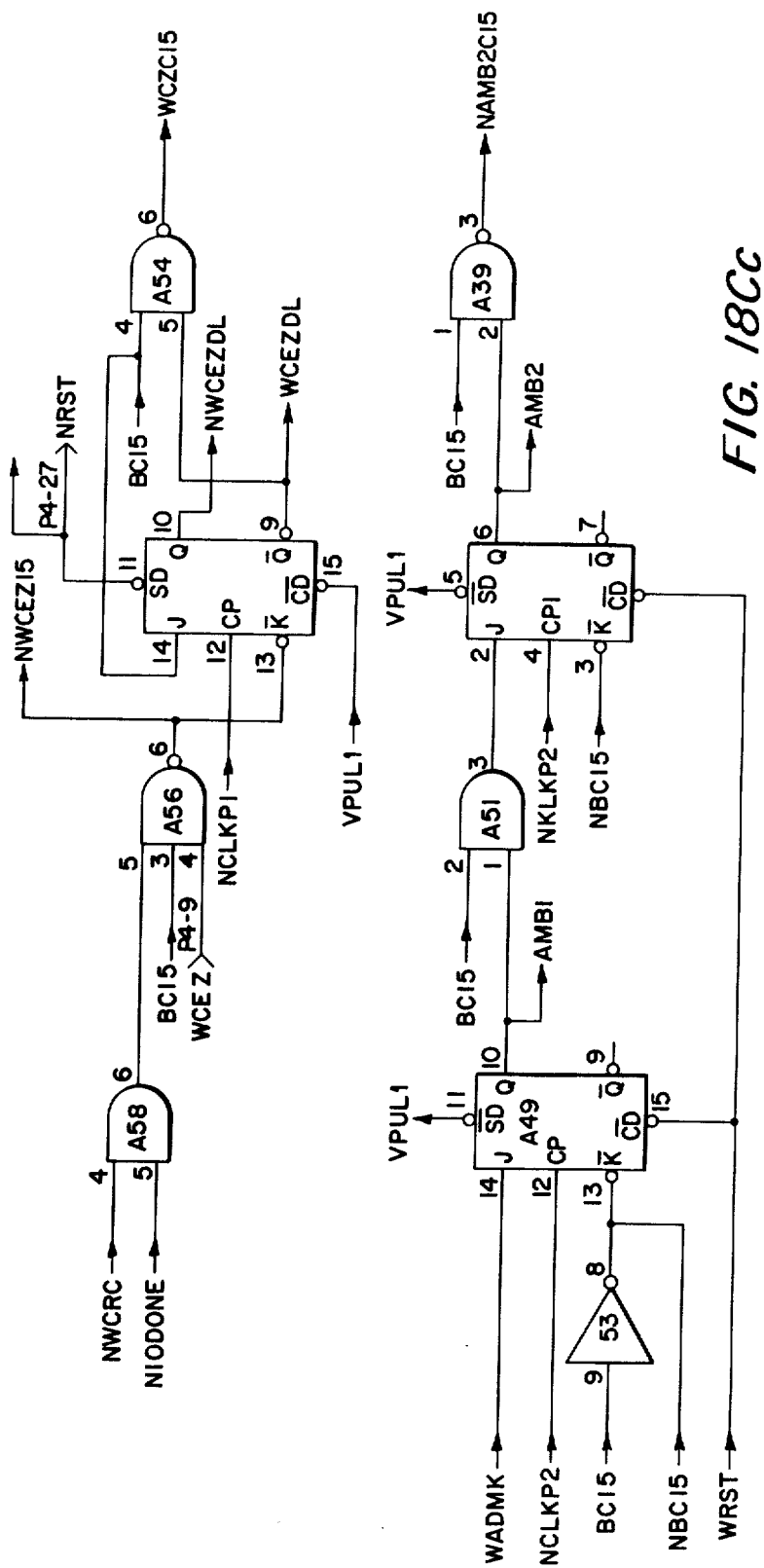
Figure 18D:
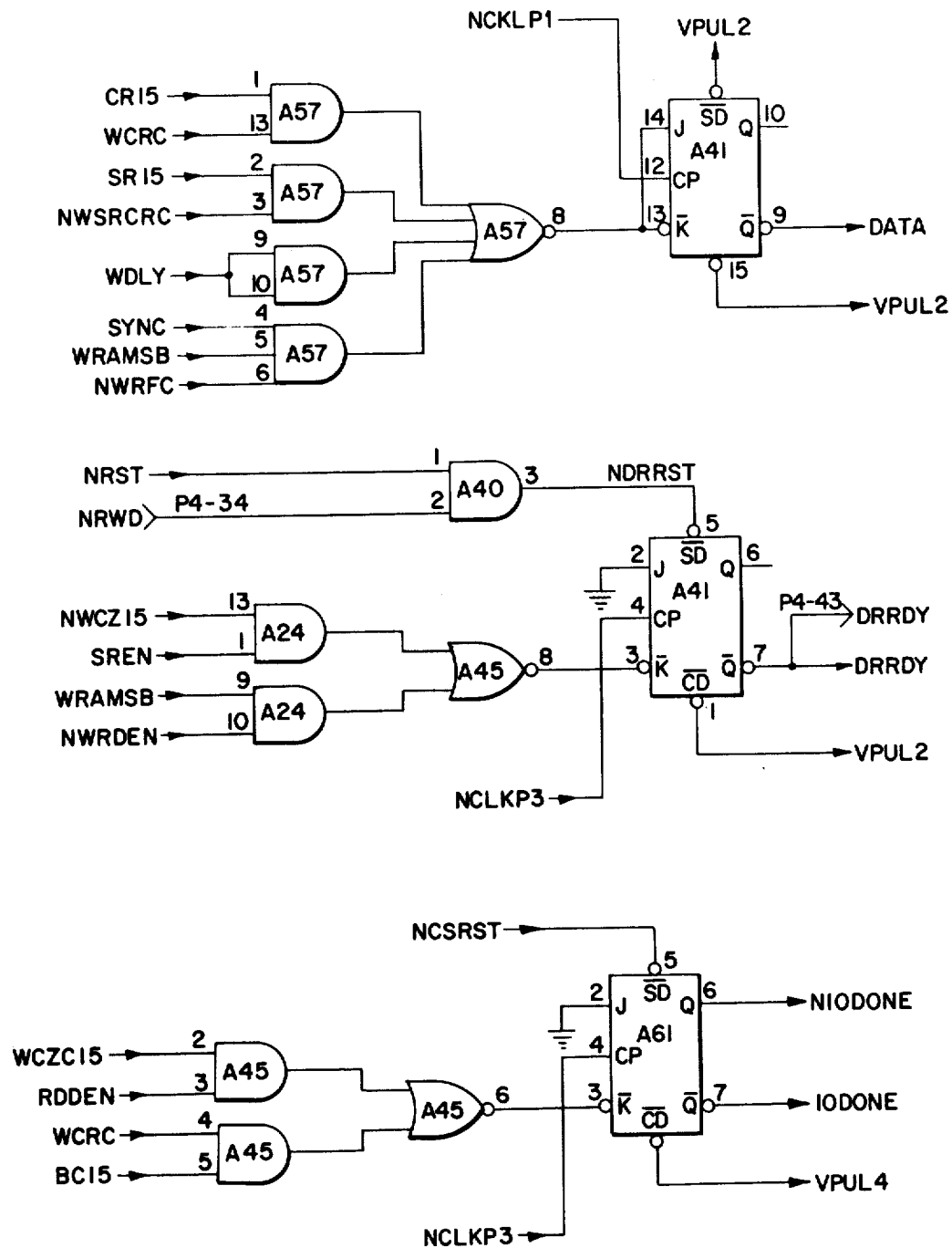
Figure 18D:
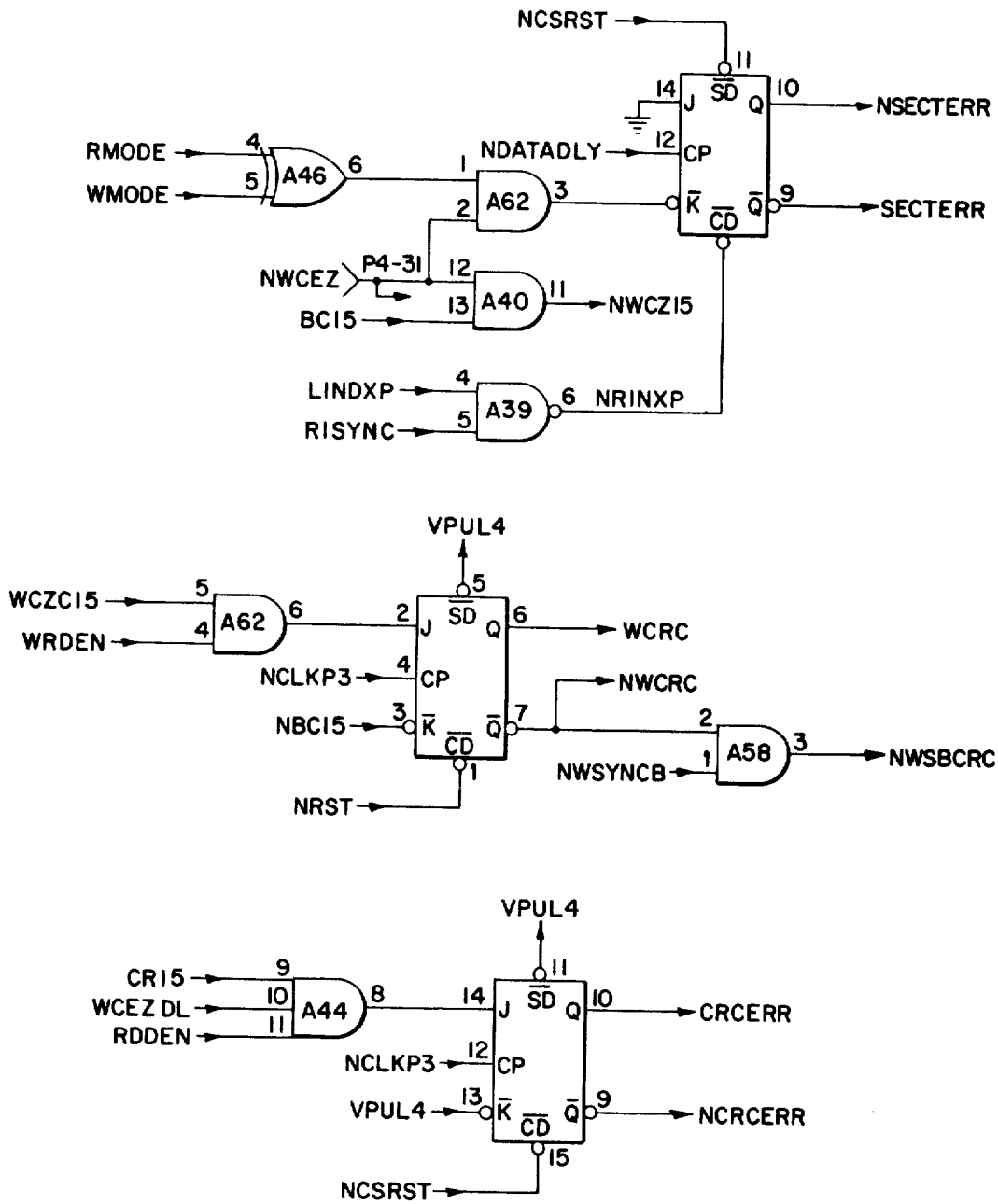
Figure 18D:
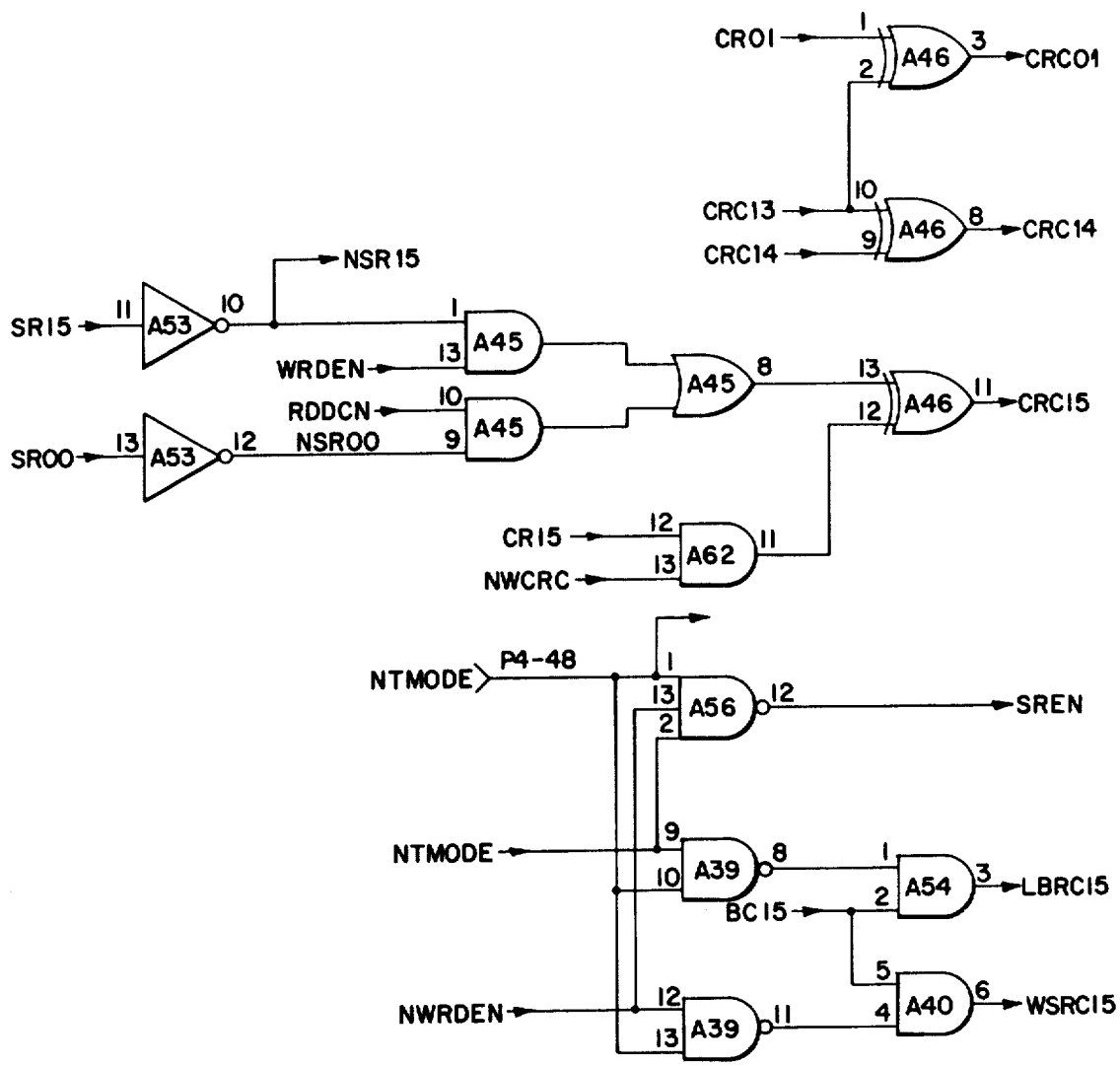
Figure 18E:
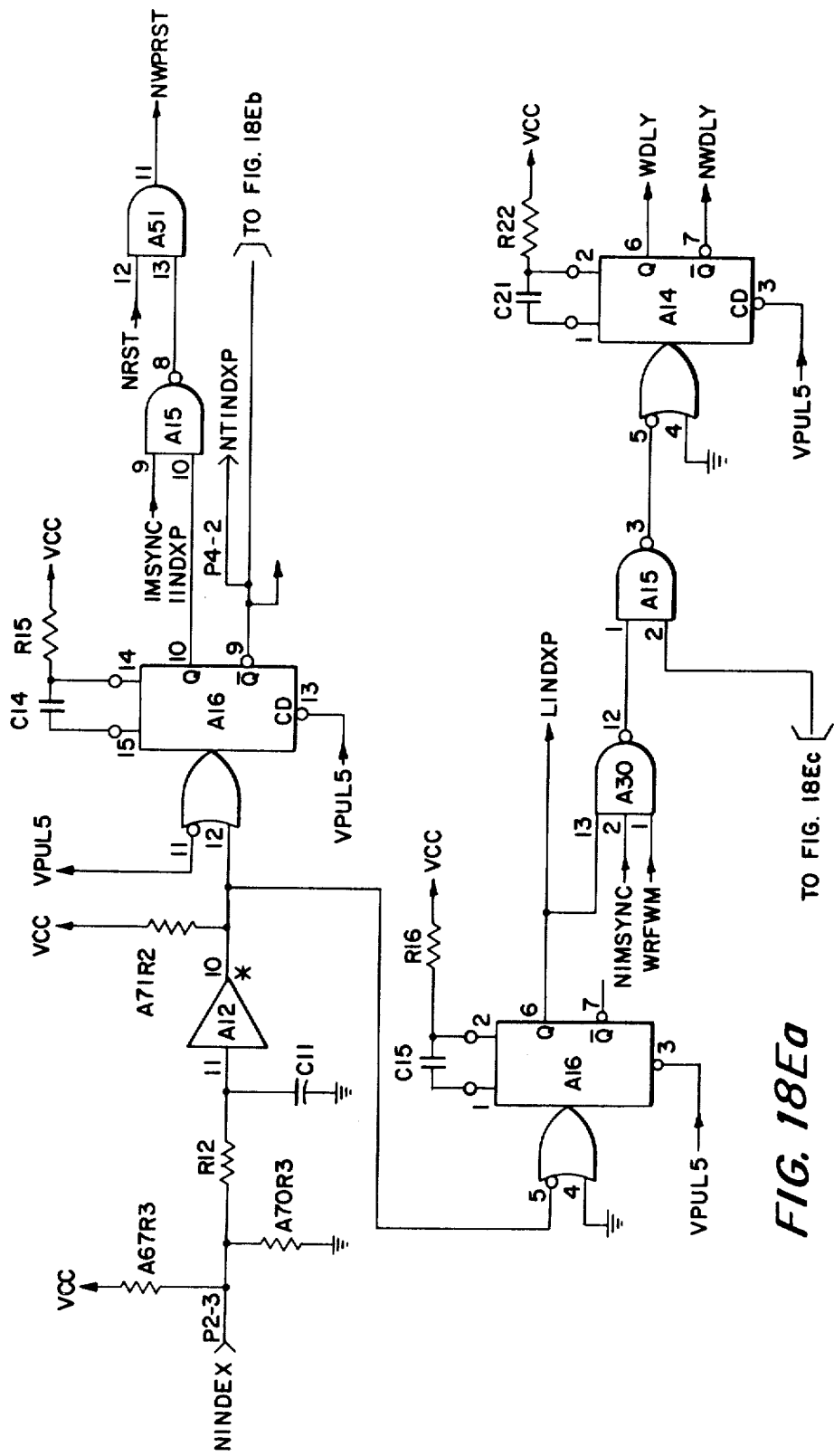
Figure 18E:
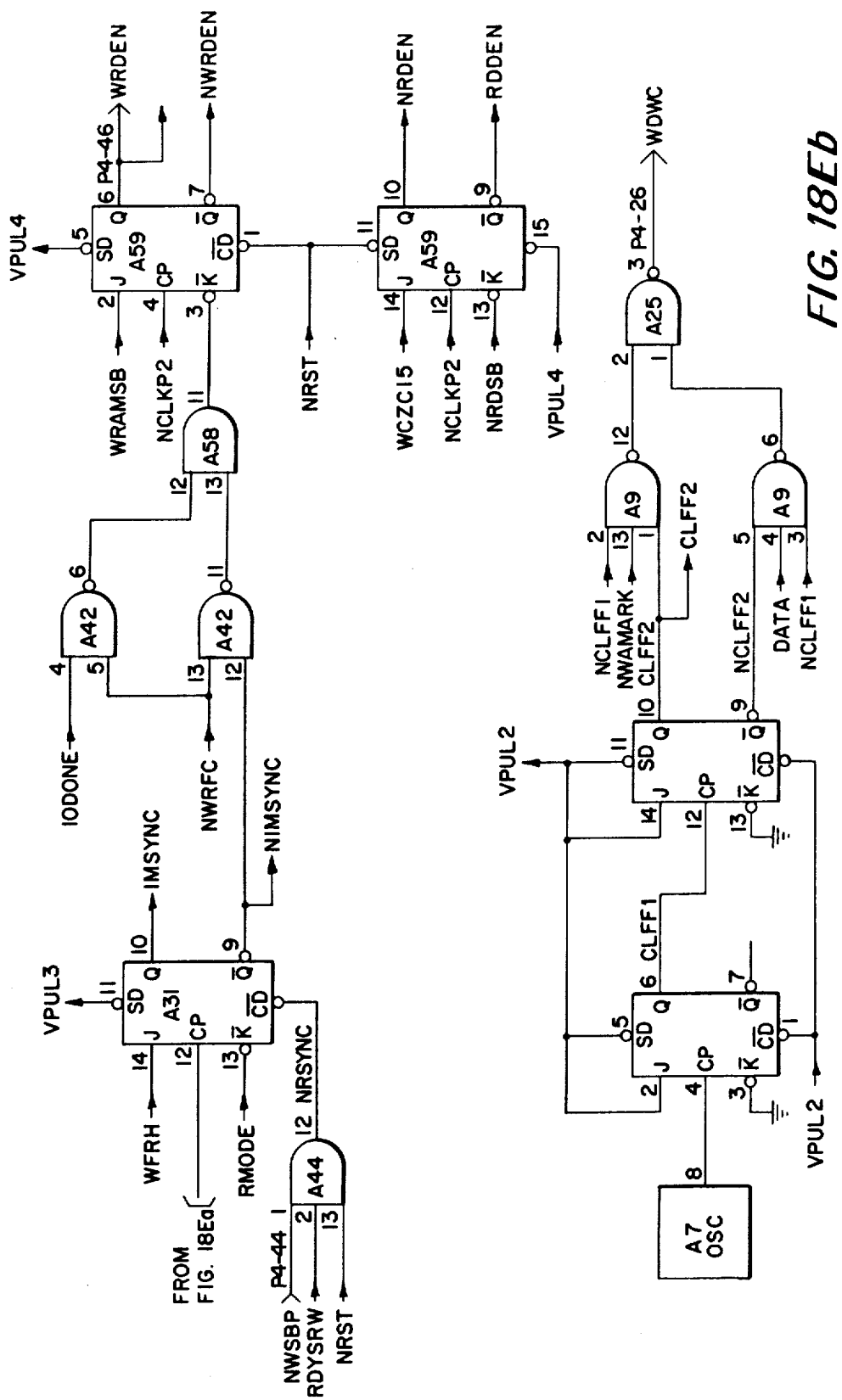
Figure 18E:
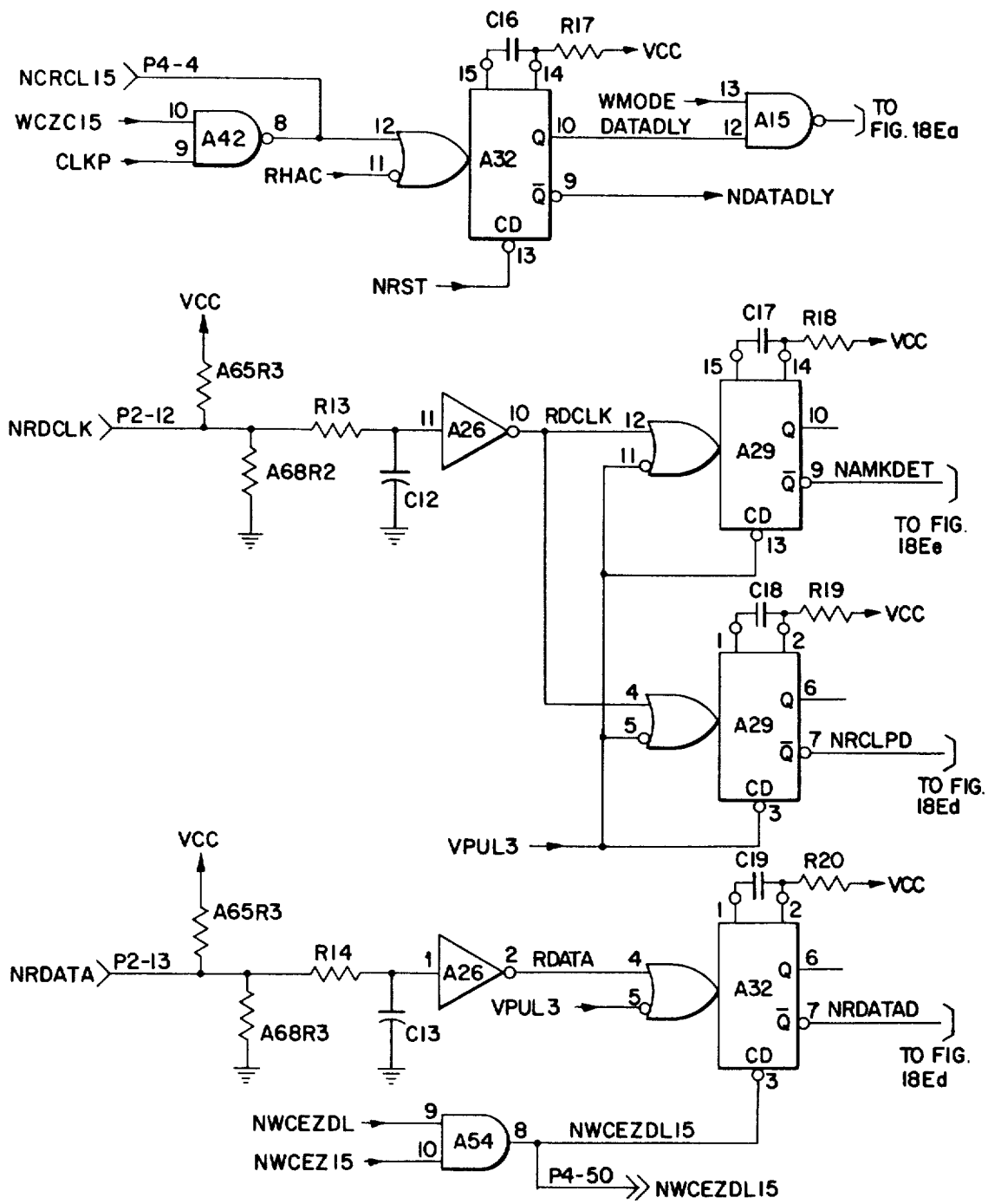
Figure 18E:
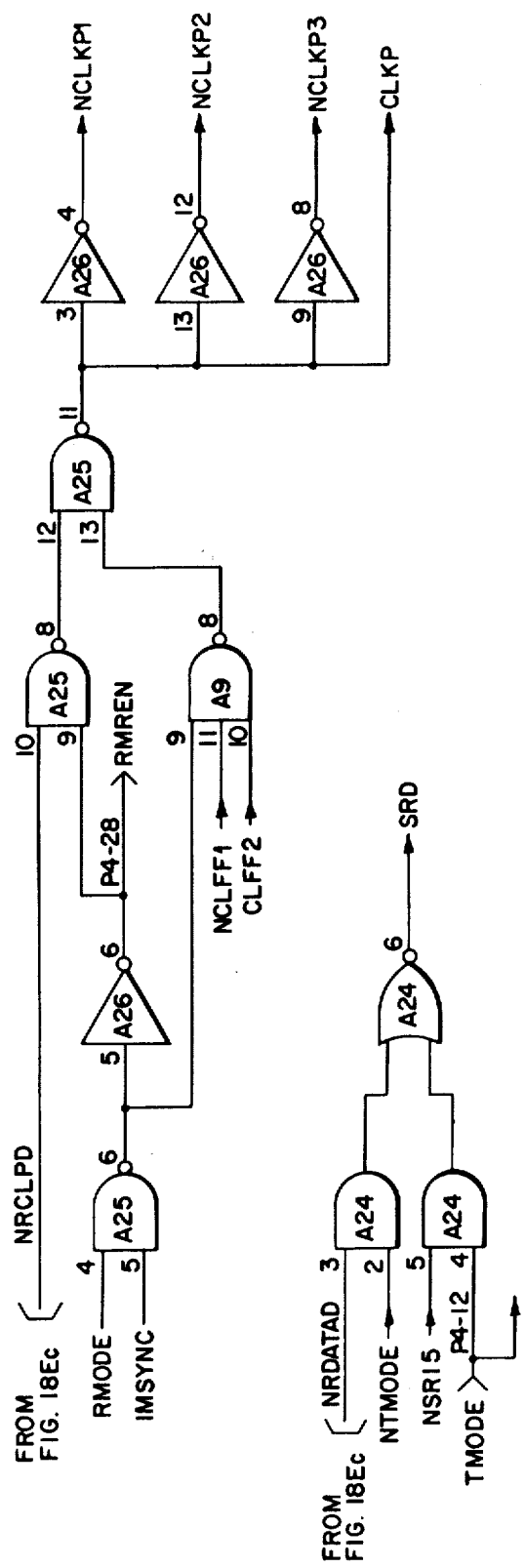
Figure 18E:
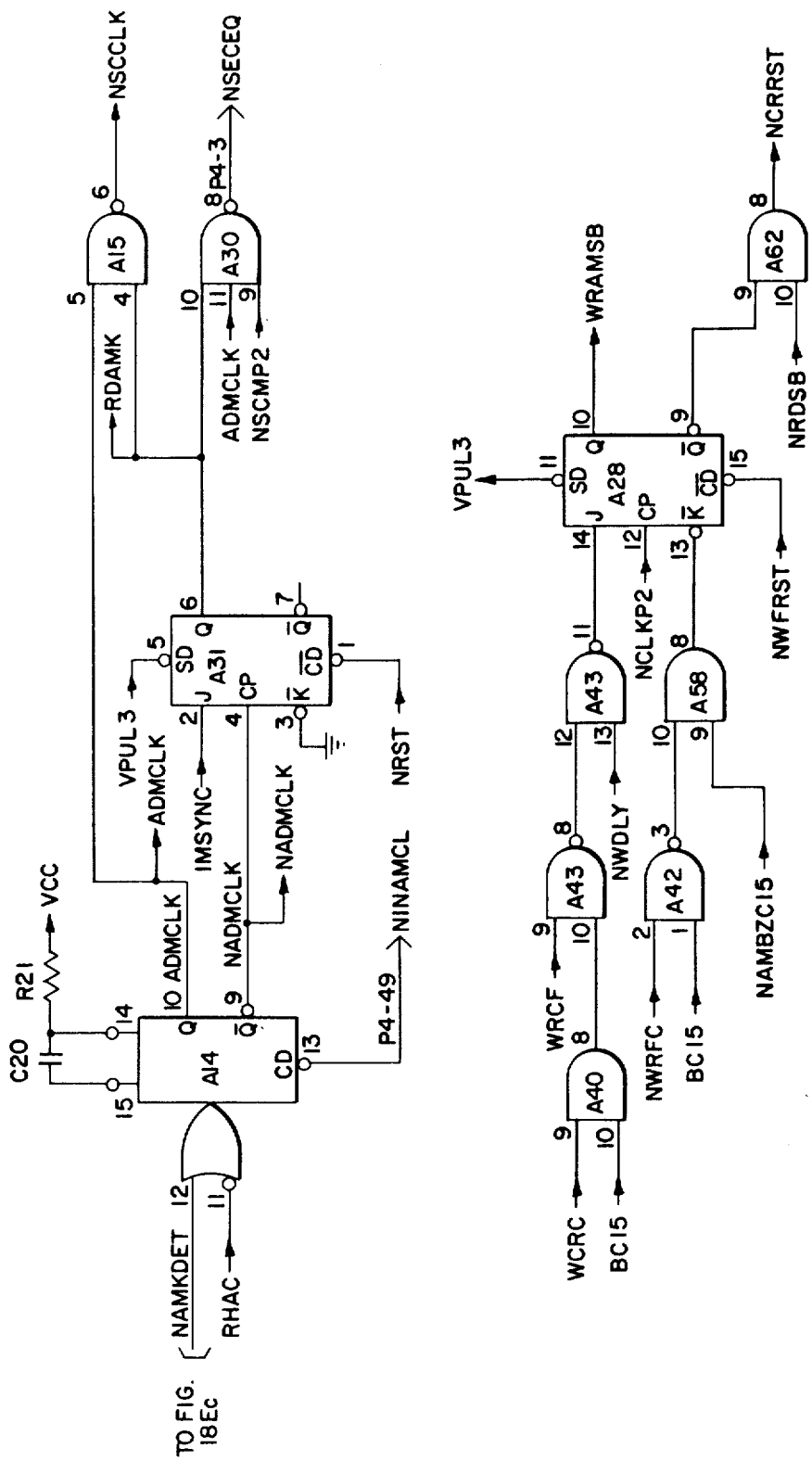

The operation of the two counters is based on the state of the sequence flip-flop. (See FIG. 14). When SEQF goes low, the Count Enable Flip-Flop sets and the inverse of the contents of the Horizontal Pitch Register is parallel-loaded into the Horizontal Counter, as indicated by the logic equations listed in Table 5. For the sake of illustration, a pitch of six is assumed (10 characters per inch), leading to the base 16 inverse, 9, being loaded into the Horizontal Counter. When SEQF goes high, the Horizontal Counter is counted up by PHI to its terminal count (15), and then resets. The same terms enable the Carriage Return Counter to count up to 6. On the next character or space, this process is repeated. The Horizontal Counter is again loaded with 9 and counted to 15. However, the Carriage Return Counter counts from 6 to 12.

This counting procedure continues across the print line until the micro program issues a carriage return character. At this point, the Data Multiplexer passes the contents of the Carriage Return Counter to the data lines and the strobe timing light generates a carriage motion strobe. The carriage return counter resets at SEQTC near the end of the character period and is ready to count the next line. During a carriage return operation, the data line labeled NDATA1K (FIG. 126) is obtained by inverting the VPULL1 input to 2:1 Multiplexer A28. Hence, NDATA1K is always false and represents carriage motion to the left.

The printer outputs six status signals which are combined into four terms contained in the status byte, as follows:

NPRINTRDY, — printer ready, indicates that the Printer is supplied with power, and is applied directly to bit 13 of the status byte.

NCHARRDY, — character ready, indicates that the Printer is ready to accept a new character command.

NCARRDY, — carriage ready, indicates that the Printer is ready to accept a new carriage motion command.

NPAPERRDY, — paper ready, indicates that the Printer is ready to accept a new paper-feed command.

The last three signals are ORed to provide the signal NOMOTION, which is applied to bit 12 of the status byte.

NCHECK, — check, indicates that the Printer has been unable to execute a previously received carriage command because of a machine malfunction. Applied to bit 11 of the status byte. When check is present, the character ready, carriage ready, and paper ready signal lines will be false. The only command which will be accepted by the Printer is restore, which will clear the check condition.

NNOPAPER, — no paper, indicates that the printer is out of paper (if an optional paper sensor is installed in the Printer). Applied to bit 10 of the status byte.

ERROR, — the last two signals are inverted and ORed to provide the signal ERROR, which is applied to bit 8 of the status byte. ERROR is also an input to the IO interrupt. The Printer Interface Module provides two status signals:

BUFFULF, — from the buffer full flip-flop, is applied to bit 15 of the status byte.

ARMF, — from the arm interrupt flip-flop, is applied to bit 14 of the status byte.

The Status Multiplexer, composed of two 2:1 multiplexer devices, multiplexes the status byte or device

Table 5

```
    MR/HOZnCTF  =  NBUFFULF
           (n  =  1,2,4,8)
    LD/HOZnCTF  =  NHOZnF (CHAR + SPACE) NSEQF PHIB+
    CT/HOZnCTF  =  CTENABLEF SEQF PHIB+
    TC/HOZnCTF  =  CTENABLEF SEQF HOZ1CTF HOZ2CTF HOZ4CTF HOZ8CTF
    S/CTENABLEF =  (CHAR+ SPACE) NSEQF PHIB+
    V/CTENABLEF =  TC/HOZnCTF PHIB+
   CD/CTENABLEF =  NBUFFULF
      MR/CRCTnF =  RESETA + CR SEQTC
      CT/CRCTnF =  CTENABLEF SEQF NTC/HOZnCTF PHIA+
```

Signals representing the Printer and Printer Interface Module (PIM) status or the PIM device address can be multiplexed to the right byte of the A-Bus under micro program control. In responding to an IO interrupt, the micro program first obtains the device address and second, the status byte, in order to determine the cause of the interrupt. IO Control = X'O', reads the status byte along to the A-Bus. The status bytes consist of four terms reflecting the state of the Printer and two terms, the state of the PIM.

address to the right byte of the A-Bus. The devices are enabled by the terms (AXDA + ENSTATUS). One or the other set of inputs is selected by the state of NAXDA.

The complete selection equation is as follows: A(8--15) = (ADD (8-15) AXDA + Status Byte NAXDA) (AXDA + ENSTATUS) Thus, when AXDA from the IO Interrupt logic is true, the device address is passed to the A-Bus. When ENSTATUS decoded from the IO Control field is true (AXDA being false), the status byte is passed to the A-Bus.

In both modes signals representing Test Status 1 or Test Status 2 can be multiplexed to the left byte of the A-Bus under micro program control. This test information is not employed in the operation of the Printer. It is intended for use in checkout and troubleshooting. At the same time, the status byte is multiplexed to the right byte of the A-Bus.

The signal Read Test Status 1, decoded from IO Control = X'8', multiplexes Test Status 1 byte to the left byte of the A-Bus. This byte represents six flip-flop outputs, as shown on FIG. 11. Since the code X'8' in binary is 1000, the last two bits, 00, are also decoded to provide the signal ENSTATUS. This signal causes the status byte to be multiplexed to the right byte of the A-Bus.

Similarly, the signal Read Test Status 2, decoded from IO Control = X'C', multiplexes Test Status 2 byte to the left byte of the A-Bus. This byte represents the four outputs of the Horizontal Counter 216 and the Sequence Counter 212, as detailed on FIG. 11. Again, this code generates ENSTATUS also.

When the SCU is in manual mode, both the test data and status data are observable on the REGISTER DISPLAY indicators on the Maintenance Control Panel.

Figure 12A:
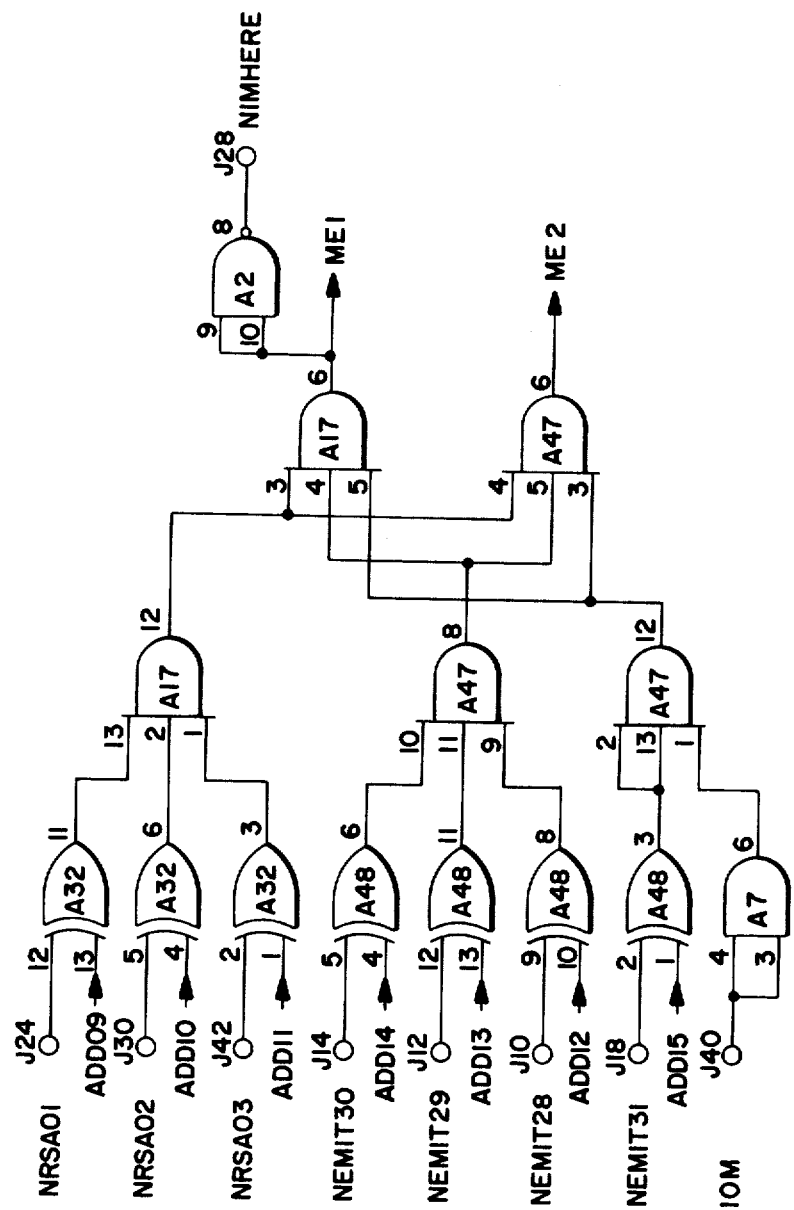
FIGS. 12Aa through 12Ce are schematic diagrams of the Printer Interface Module.
Figure 12A:
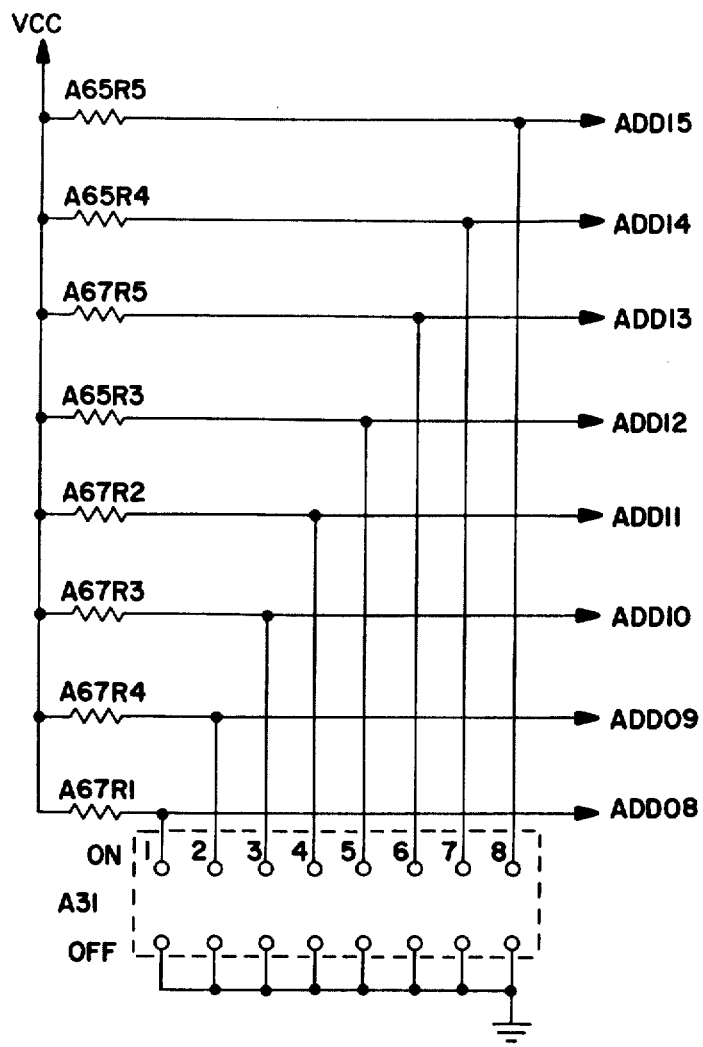
Figure 12A:
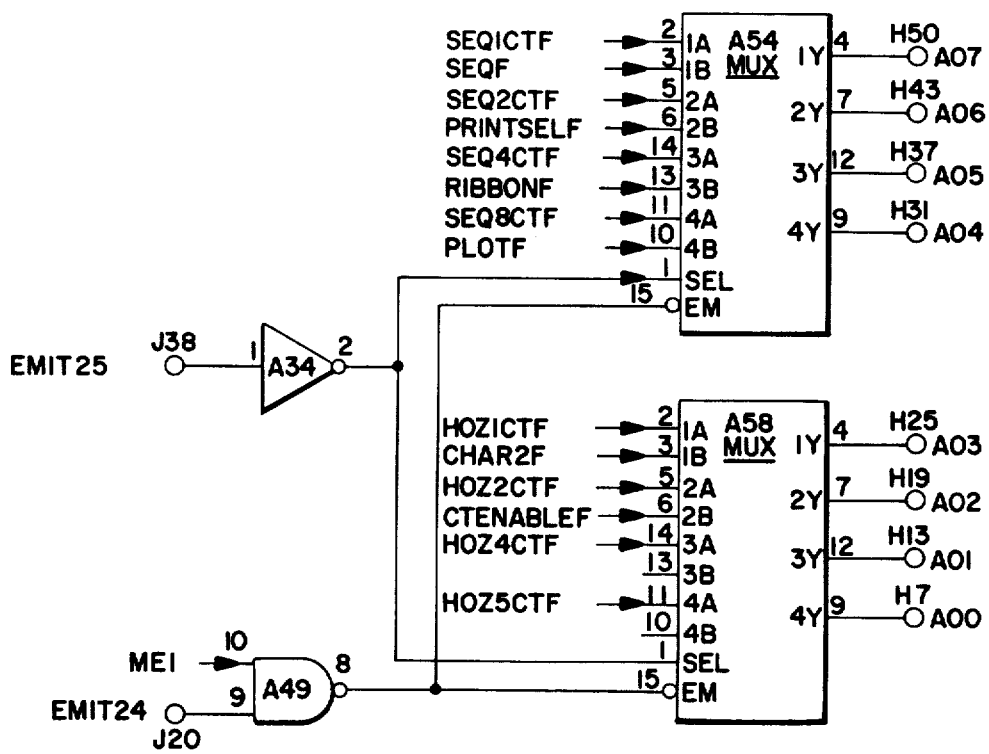
Figure 12A:
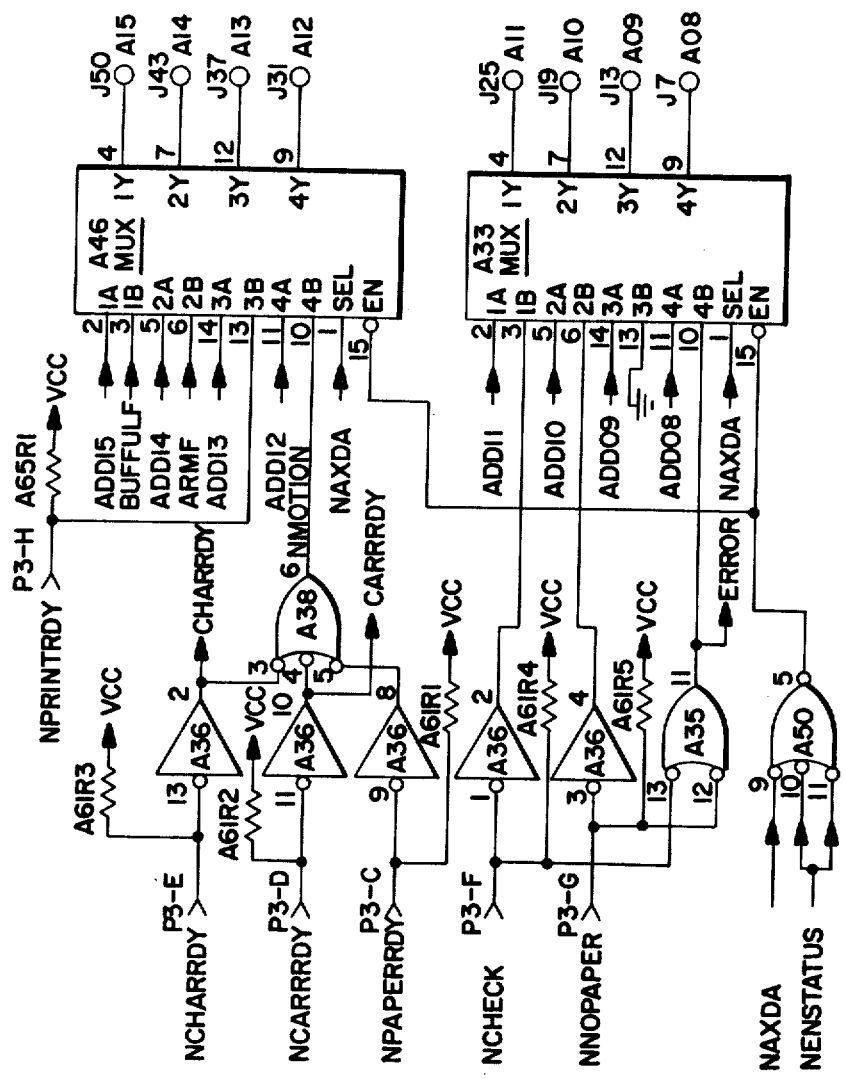
Figure 12A:
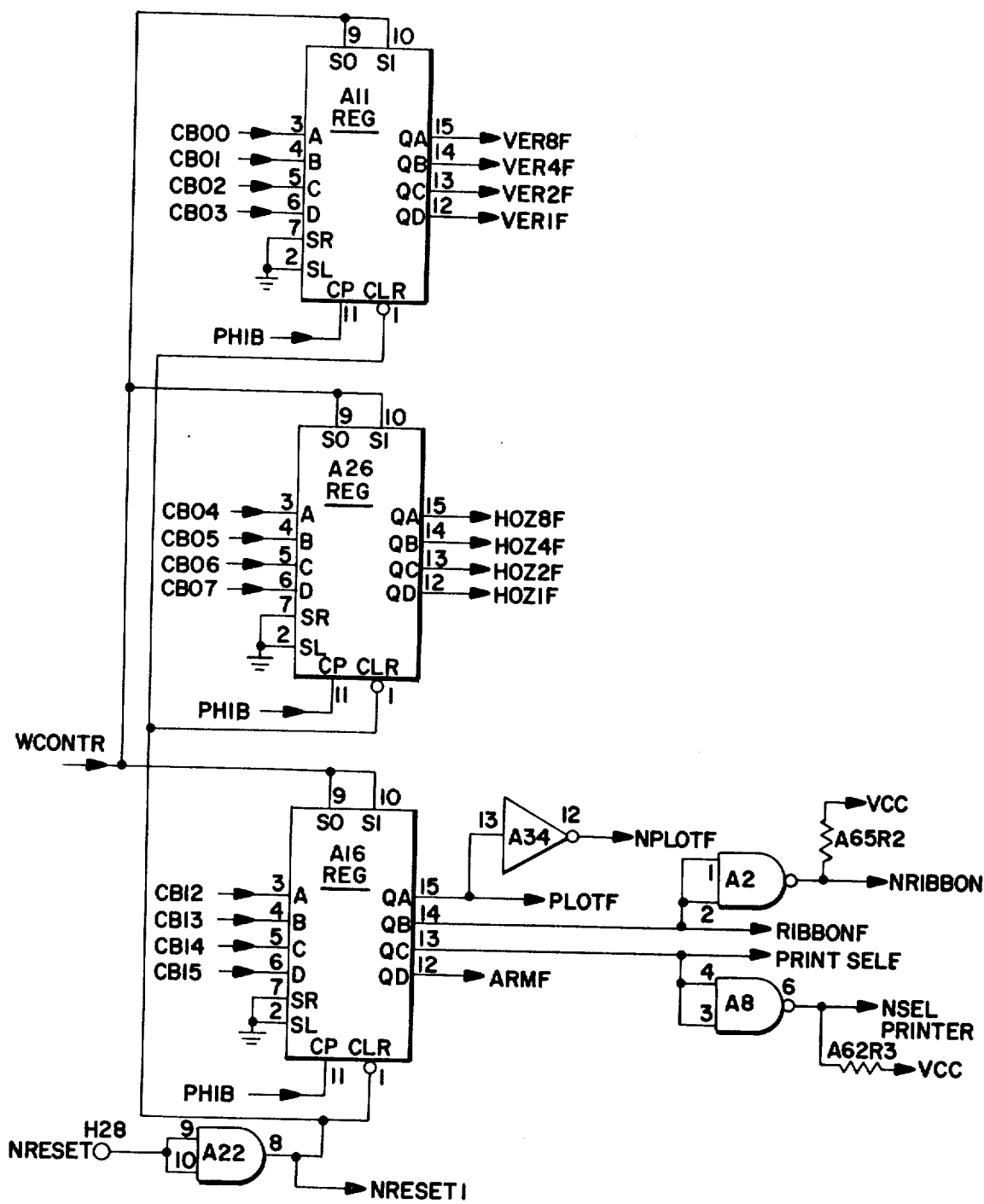
Figure 12B:
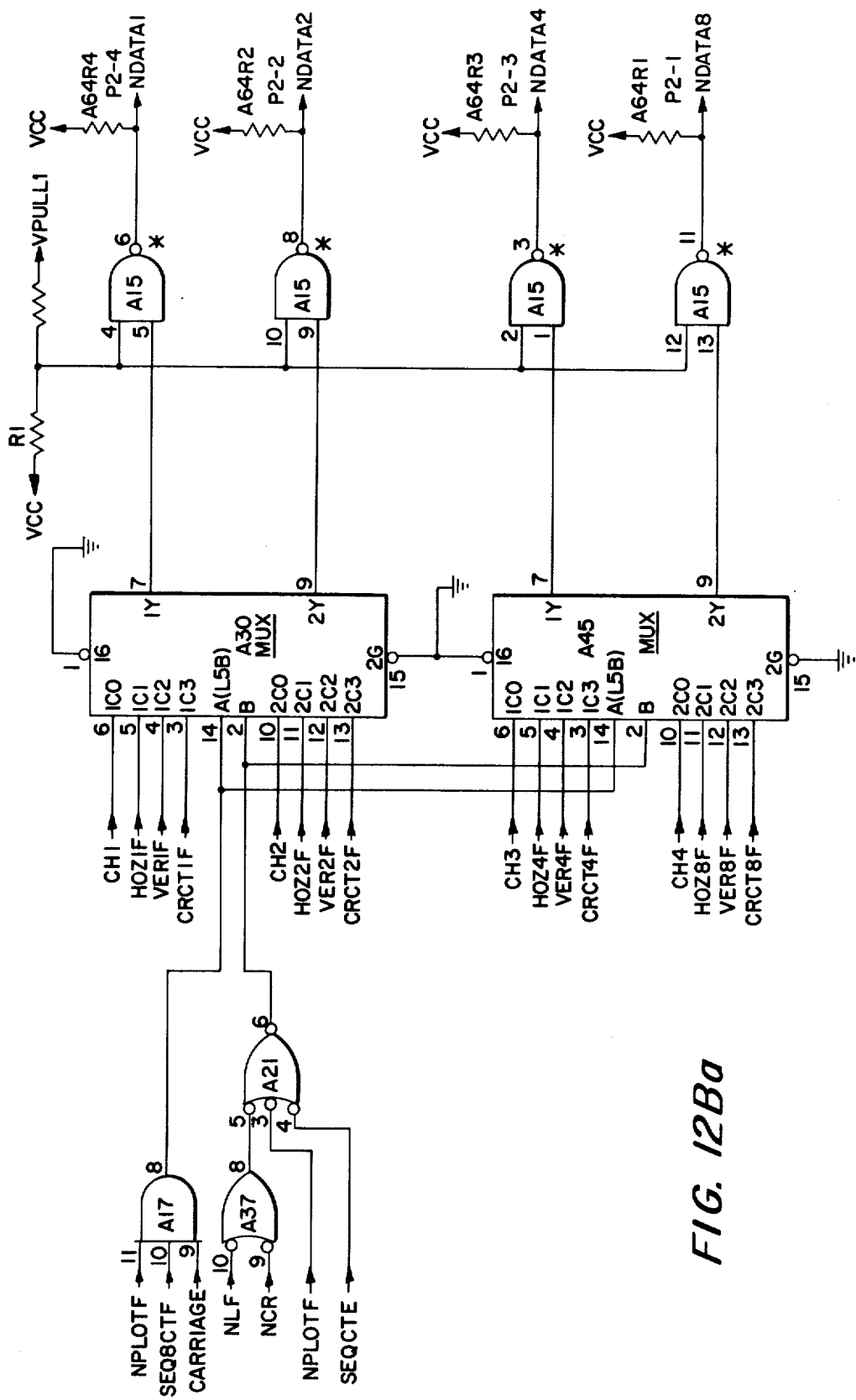
Figure 12B:
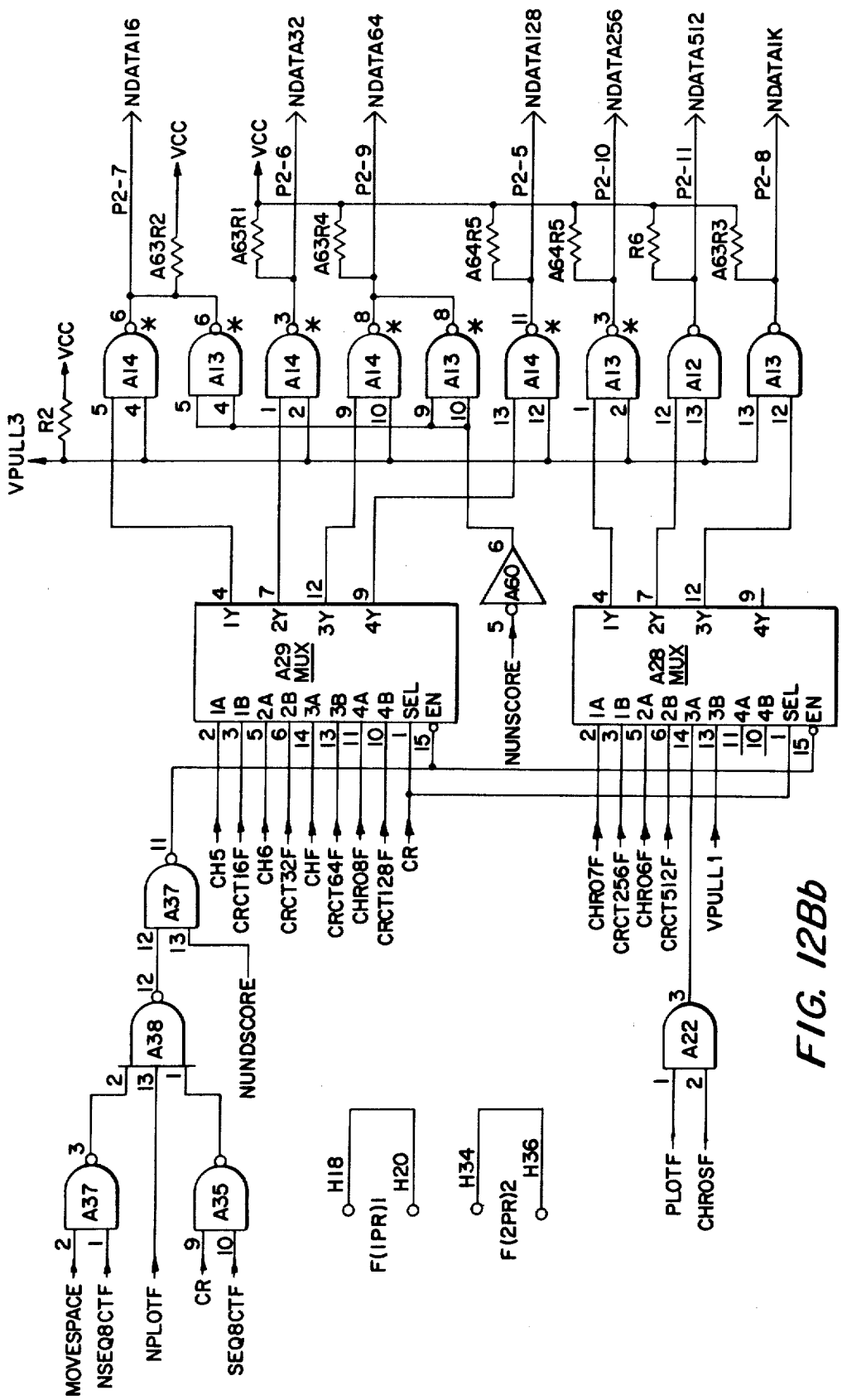
Figure 12B:
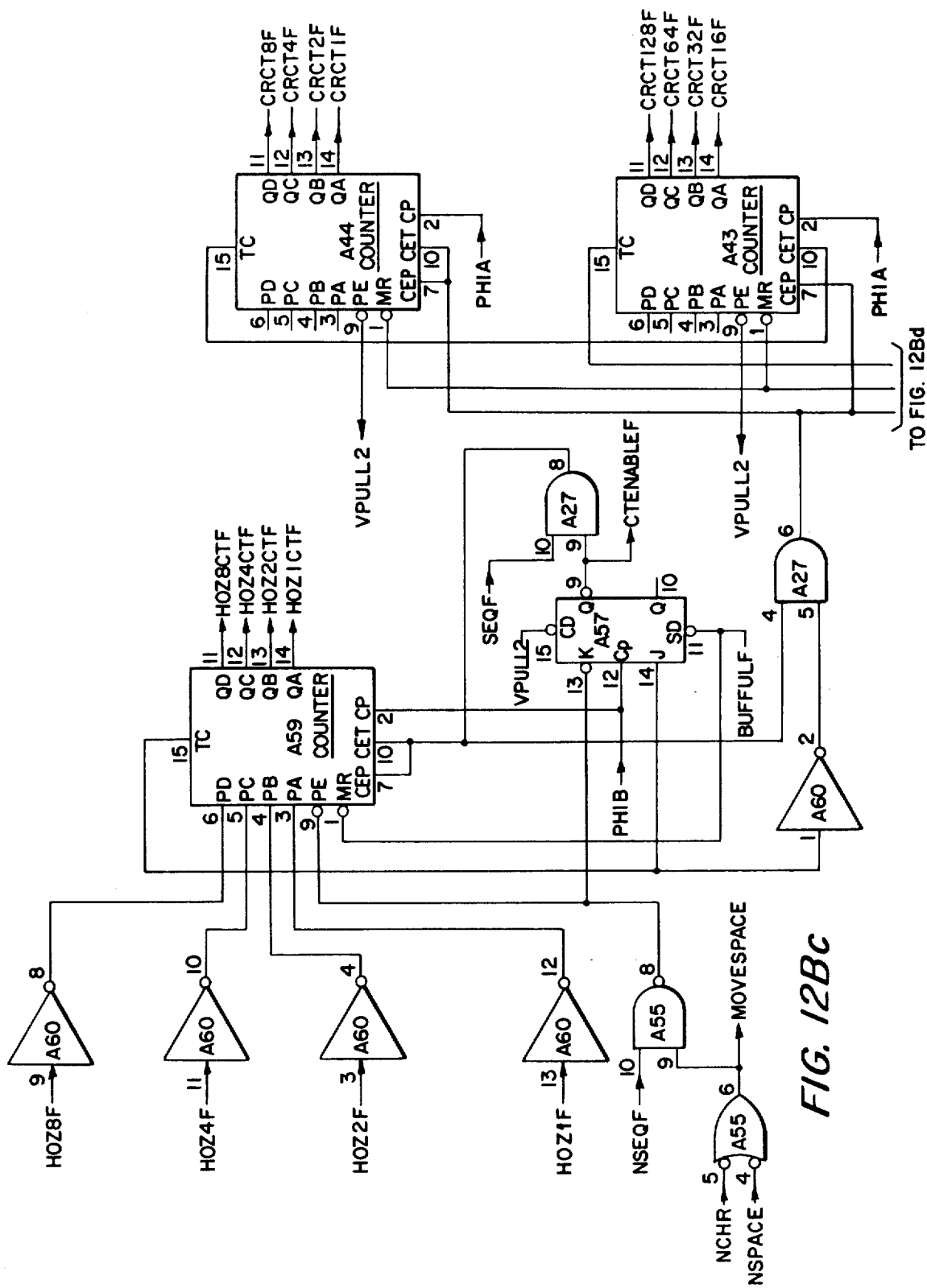
Figure 12B:
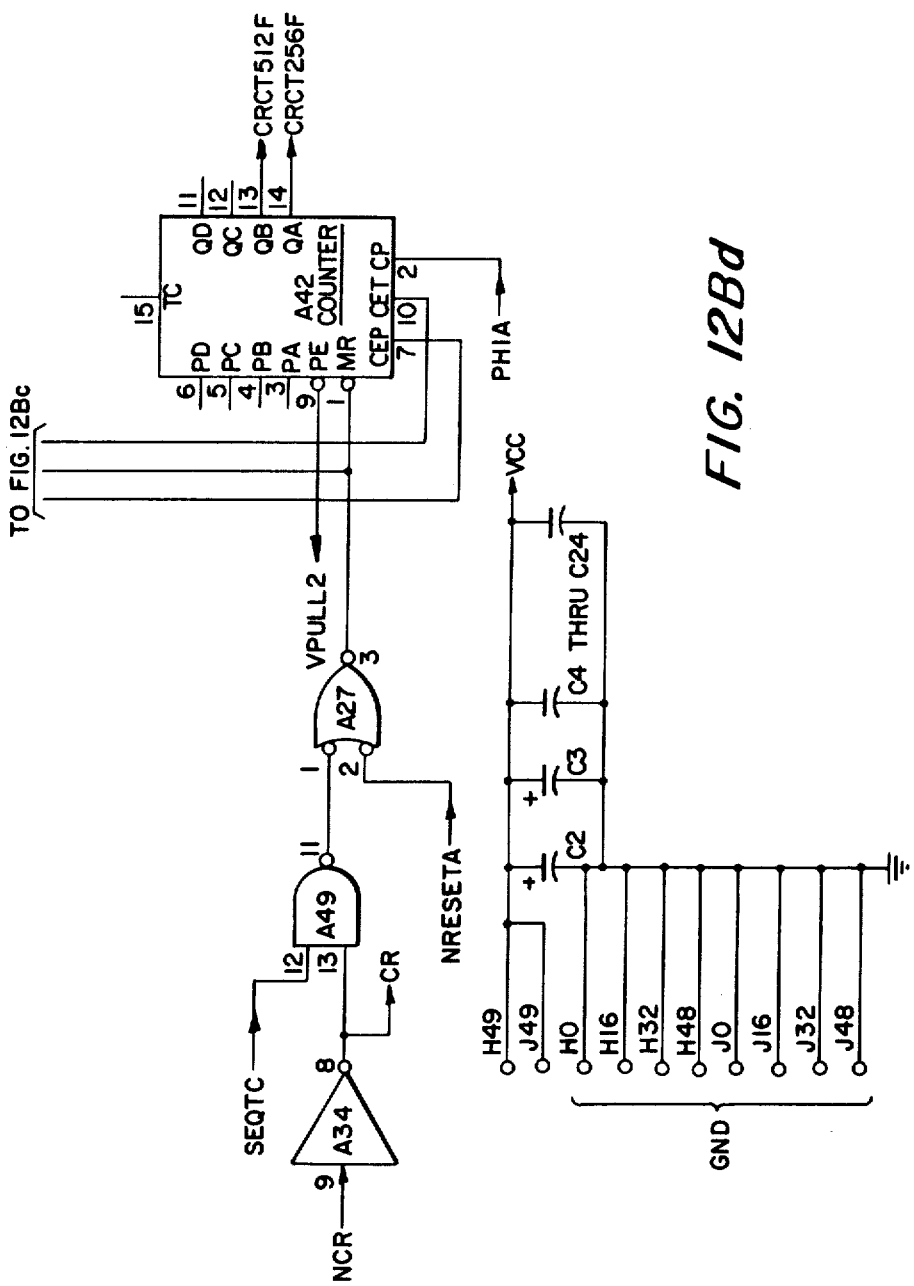
Figure 12C:
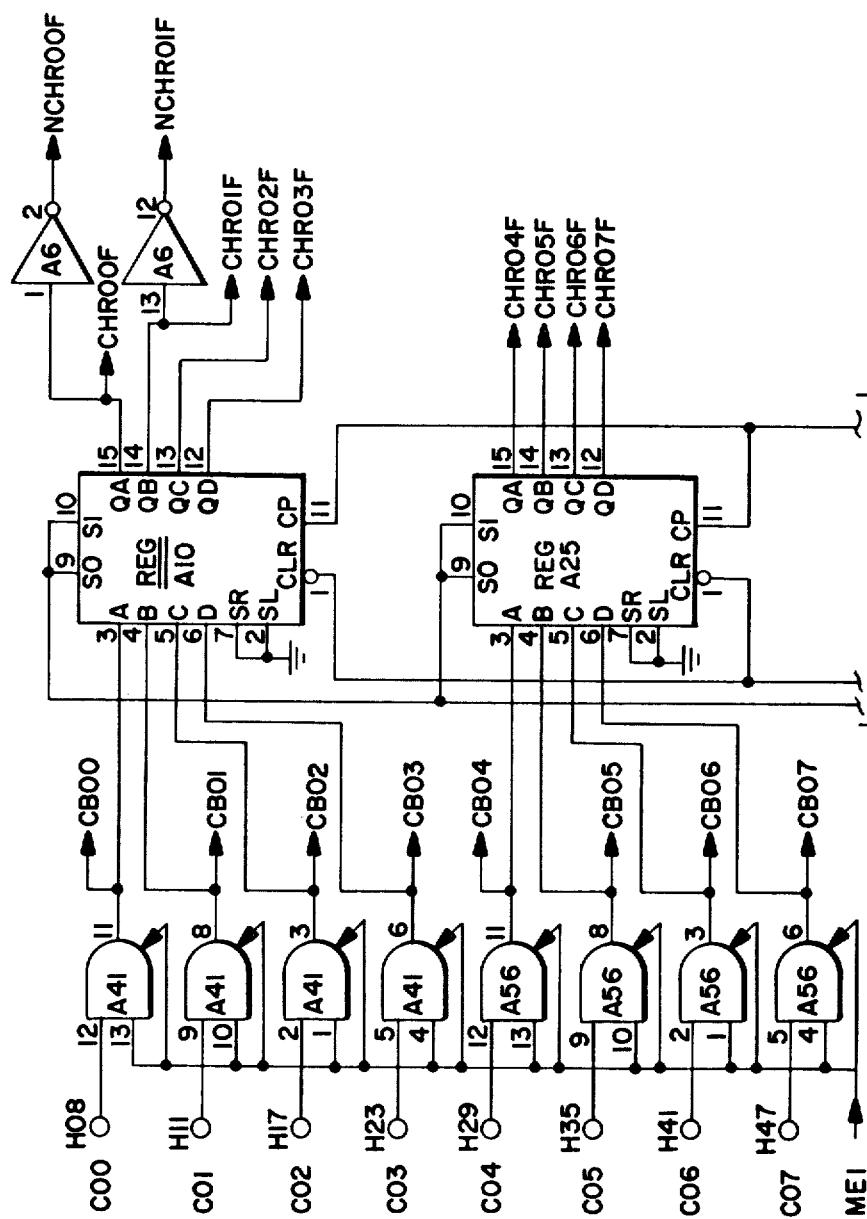
Figure 12C:
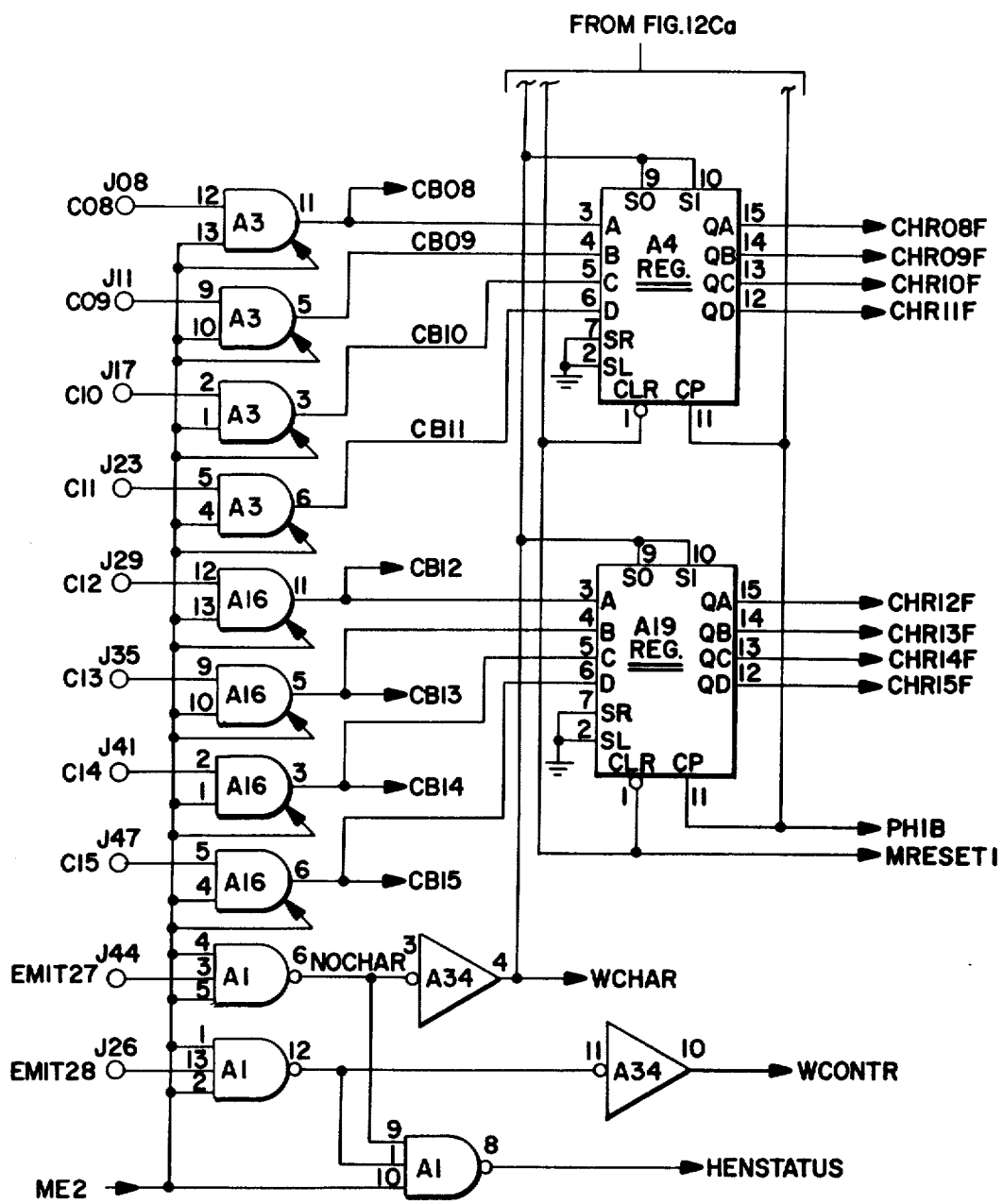
Figure 12C:
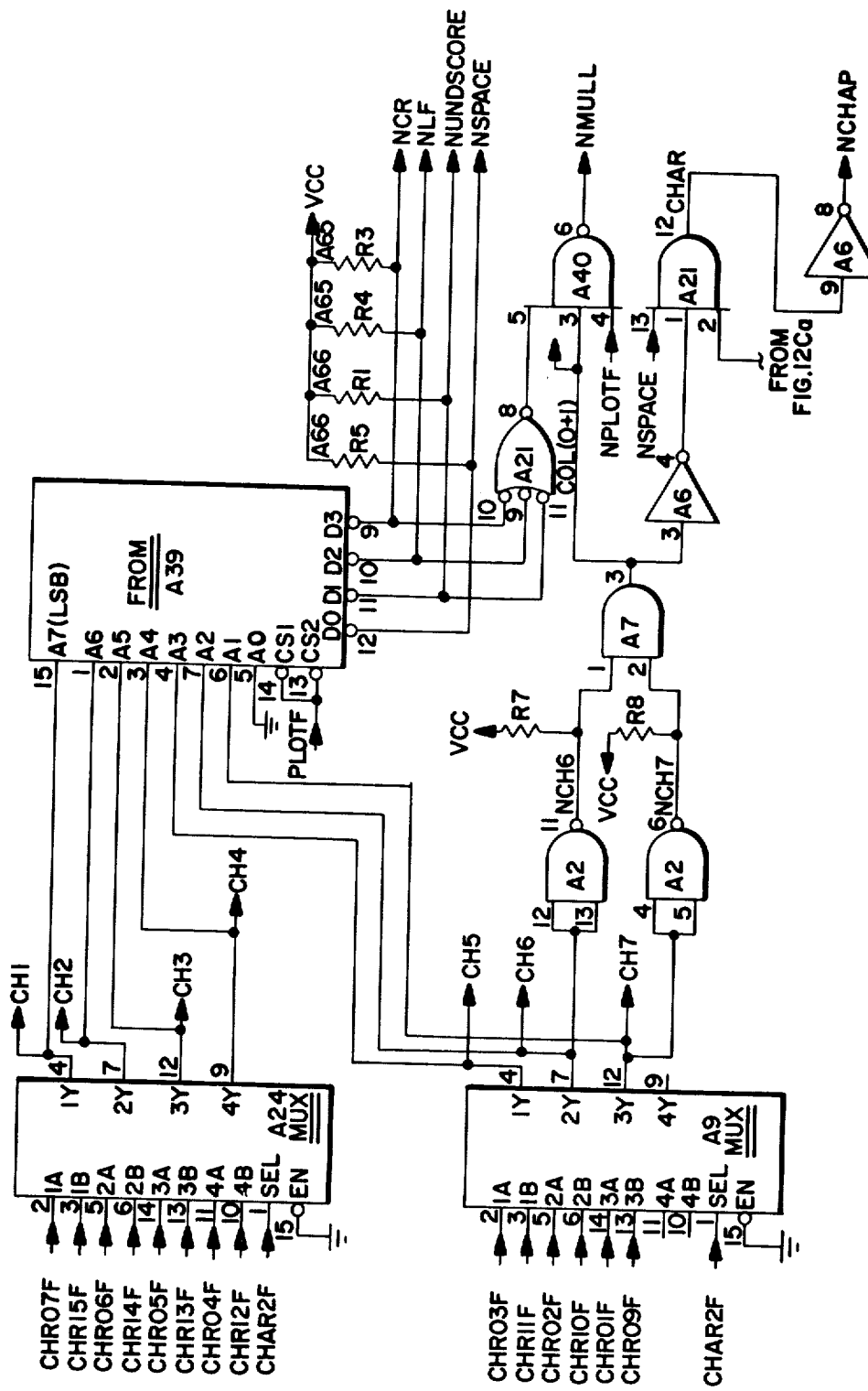
Figure 12C:
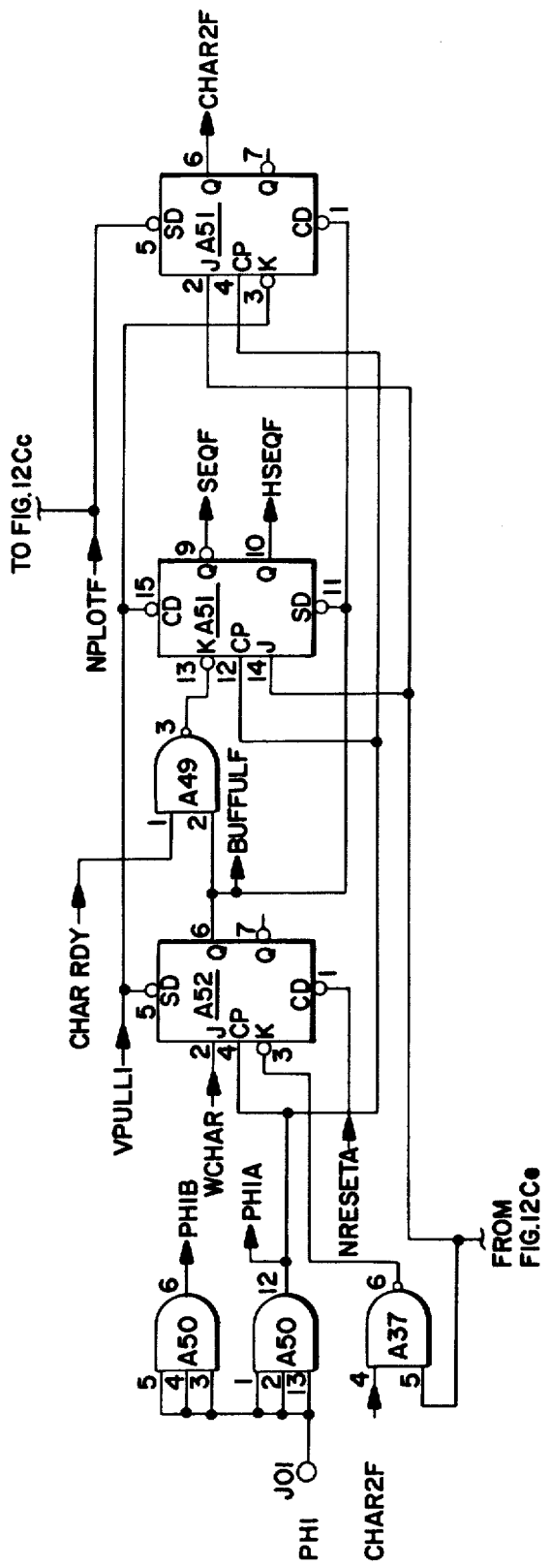
Figure 12C:
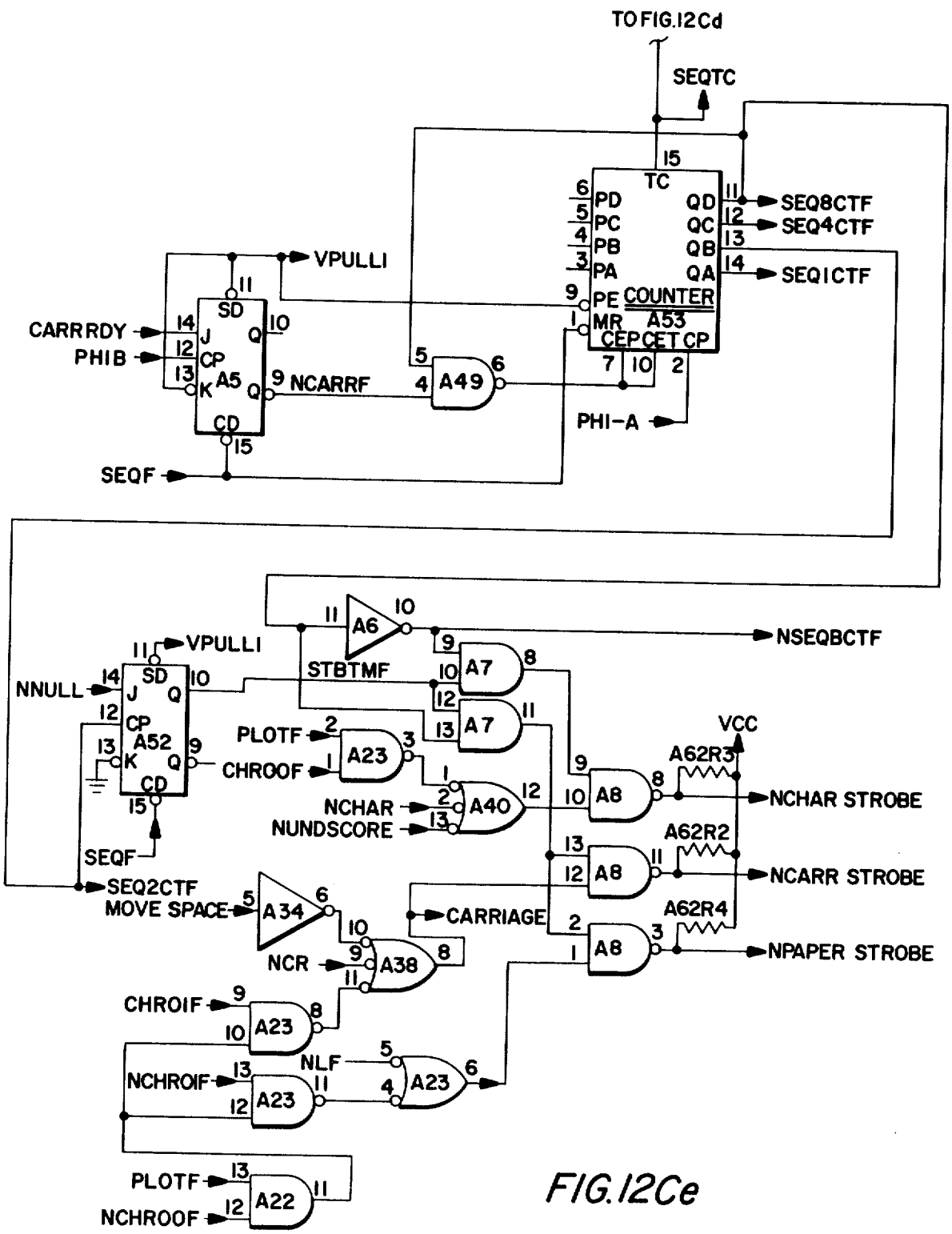

The following Table 6 is a tabulation of the major Printer Interface Module Signal Mnemonics, by signal and function, associated with the logic in FIGS. 12a through 12c.

Table 6

| Signal | Function |
|---|---|
| ADD08 thru ADD15 | Address Signals. The address code is established by jumpers on assembly A31. |
| ARMF | Arm Flip-Flop. Output of control register corresponding to bit C15. Arms IO interrupt request flip-flop to accept interrupt requests. |
| AXDA | Device Address to A-Bus signal. Controlled by priority signal, request flip-flop and strobe from SCU. |
| AXDASTROBE | Device Address to A-Bus Strobe Signal. Generated on MCR1 module of the SCU. |
| A00 thru A15 | A-Bus. Accepts data for transfer to the SCU. |
| BUFFULF | Buffer Full Flip-Flop. True when the character register contains a character code. |
| NCARRRDY | Signal from printer to PIM. When false, indicates that the carriage is ready. |
| NCARRF | Carriage Flip-Flop. Set by signal CARRRDY from printer. |
| CARRIAGE | Carriage signal used with other signals to generate the NCARRSTROBE signal to the printer. |
| NCARRSTROBE | Signal from PIM to the printer. Causes the printer to load a carriage movement command from the data lines. |
| CB00 thru CB 15 | C-Bus Buffer signals. Outputs of TriState buffers that are logically equivalent to C00 through C15. |
| NCHAR | Character signal. When false, it identifies a valid character code. Used to enable character strobe. |
| NCHARRDY | Signal from printer to PIM. Indicates that the printer is ready for a new character. |
| NCHARSTROBE | Signal from PIM to printer. Causes the printer to load the ANSCII character code from the data lines. |
| CHAR2F | Character 2 flip-flop. Indicates that a second character code can be transferred from the C-Bus. |
| NCHECK | Signal from printer to PIM. Indicates that the printer has been unable to execute a previously received carriage command because of a machine malfunction. |
| CHR01F thru CHR15F | Character Register signals. |
| CH1 thru CH7 | Character Decode signals. |
| COL (0+1) | Columns 0 or 1. Related to columns 0 and 1 of the ANSCII code table. |
| NCR | Output of PROM. Indicates carriage return. |
| CRCTnF (n = 1, 2, 4, 8, 16, 32, 64, 128, 256, 512) | Carriage Return Counter signals. |
| CTENABLEF | Count Enable Flip-flop. Controls operation of the carriage return counter and horizontal counter. |
| C00 C15 | C-Bus. Output data from scu. |
| NDATAN )n = 1, 2, 4, 8, 16, 32, 64, 128, 256, 512, 1K) | Data signals from PIM to printer. |
| EMIT24 thru EMIT27 | IO Control field of the micro instruction. Transmit one of five hexadecimal commands to PIM. |
| NEMIT28 thru NEMIT31 | Emit Field of micro instruction, which is used as part of the PIM address code. |
| NENSTATUS | Not Enable Status signal. Generated from inputs EMIT26 and EMIT27 to identify the Read Printer Status Byte to A-Bus command. |
| ERROR | Error signal. True when the PIM reports no paper (signal NNOPAPER) or check (signal NCHECK). |
| HOZnCTF (n = 1, 2, 4, 8) | Horizontal Counter signals. |
| HOZnF (n = 1, 2, 4, 8) | Horizontal Pitch Register signals. |
| NIMHERE | Address recognition signal (Input Module Here). When signal NIMHERE is false, the PIM has been addressed, and so indicates to the SCU. |
| NIOINT | Not IO Interrupt signal. Generated when the request flip-flop is set and the PIM has priority. Indicates to the SCU that some IO module has an IO interrupt pending. |
| IOM | IO Mode bit. Bit 0 of the micro instruction, which indicated that the SCU is in the IO mode. |
| NLF | Output of PROM. Indicates line feed. |
| ME1, ME2 | Module enable signals. Logically equivalent signals that are true if IOM is true and the address code generated by ADD08 through ADD15 matches the address code of the micro instruction. |
| MOVESPACE | Move One Space signal. True when the ANSCII code received was either a character or a space. |
| NNOPAPER | Signal to PIM from printer. Indicates that the printer is out of paper. |
| NNULL | Not Null signal. NULL indicates that the ANSCII code received one of the blank codes in column 0 or 1. |
| NPAPERSTROBE | Output signal from PIM to printer. Causes the printer to load a paper feed command from the data lines. |
| NPAPERRDY | Signal to PIM from printer. Indicates that the printer is ready to accept a new paper-feed command. |
| PHI | Principal clock signal from SCU. A negative-going pulse with a 350 ns period and a 58.3 ns pulse width. One pulse is dropped when a main memory access is in process. |
| NPLOTF | Plot flip-flop. Output of control register corresponding to bit C12. When low, indicates plot mode; when high, indicates teletype mode. |
| NPRINTRDY | Signal from printer to PIM. Indicates that the power has been applied to the printer. |
| PRINTSELF | Printer Select flip-flop. Output of control register corresponding to but C14. Generates signal SELPRINTER to printer. |
| PRIn, PRIn+1 | Priority Signals. When input signal PRIn is true, the PIM has priority for an IO operation. If no IO interrupt is pending in the PIM, signal PRIn+1 is made true for the next IO module in priority sequence. |
| NRESET | Signal from SCU that clears the character register, the vertical pitch |

Table 6-continued

| Signal | Function |
|---|---|
| | register, the horizontal pitch register, and the control register. |
| NRESETA | Used in PIM to reset BUFFULF, SEQF, CHAR2F, CARR, and the sequence counter, the carriage return counter, and the strobe timing flip-flop. |
| NRESTORE | Equivalent to NRESETA. Derived from one-shot A20 or from signal RESET. Causes printer to perform a restore sequence. |
| NRIBBON | Output signal from PIM to printer. When low, raises ribbon cartridge to its upper position. |
| NRSA01 thru NRSA03 | A-Register Select bits. Bits 01 through 03 of the SCU micro instruction, which are used as part of the IO module address. |
| REQF | Request flip-flop. Used for control of IO interrupt. |
| RIBBONF | Ribbon flip-flop. Output of control register corresponding to bit C13. Generates NRIBBON to printer. |
| SELPRINTER | Output signal from PIM to printer. Enables input/output lines of the printer interface. |
| NSELRDY | Output signal from PIM to printer. Always at the ground (false) level to enable for character ready, carriage ready, and paper feed ready, regardless of state of signal SELPRINTER. |
| SEQF | Sequence flip-flop. Controls sequence counter. |
| SEQTC | Sequence Terminal Count signal. True when the four-bit counter reaches its maximum count. |
| SEQnCTF (n = 1, 2, 4, 8) | Outputs of sequence counter. |
| NSPACE | Output of PROM. SPACE indicates that the current ANSCII code is the space code. |
| STBTMF | Strobe Timing flip-flop. Input for gating signals NPAPERSTROBE, NCHARSTROBE, and NCARRSTROBE to printer. |
| NUNDSCORE | Output of PROM. UNDSCORE indicates that the ANSCII code is the underscore code. |
| VERnF (n = 1, 2, 4, 8) | Vertical Pitch Register signals. |
| WCHAR | Write Character Command signal. IO Control field signal generated from input EMIT27 to transfer output data from C-Bus to PIM. |
| WCONTR | Write Control Register command signal generated from input EMIT26 to cause transfer of control word to the control register, vertical pitch register, and horizontal pitch register. |

The Printer Interface Module used in the preferred embodiment has been explained in detail hereinabove, but it is to be understood that any equivalent Printer, System Control Unit and connecting Printer Interface Module could have been used to implement this Transcriber System.

The Cartridge Disk Drive Controller (CDDC) is contained on two interactive digital circuit modules, referred to as Controller A and Controller B, which are connected by a flat 50 conductor ribbon cable (P4). The circuit module schematics are included as FIGS. 17a through d and 18a through e and should be referred to concurrently with the study of the logic equation, flow chart and block diagram descriptions contained hereinbelow.

Figure 19A:
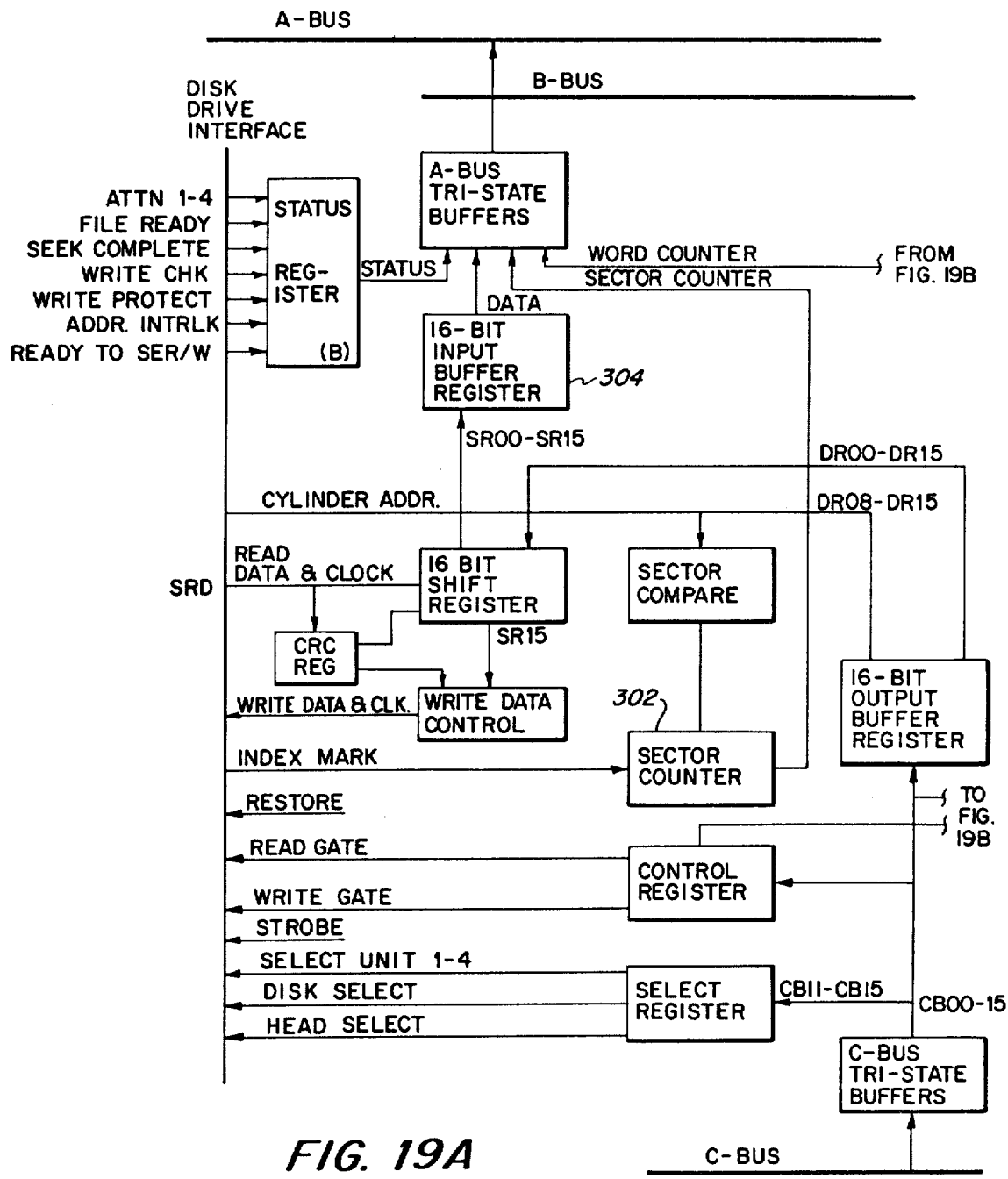
FIG. 19A through 19B is a simplified block diagram of the major components of the Cartridge Disk Drive Controller.
Figure 19B:
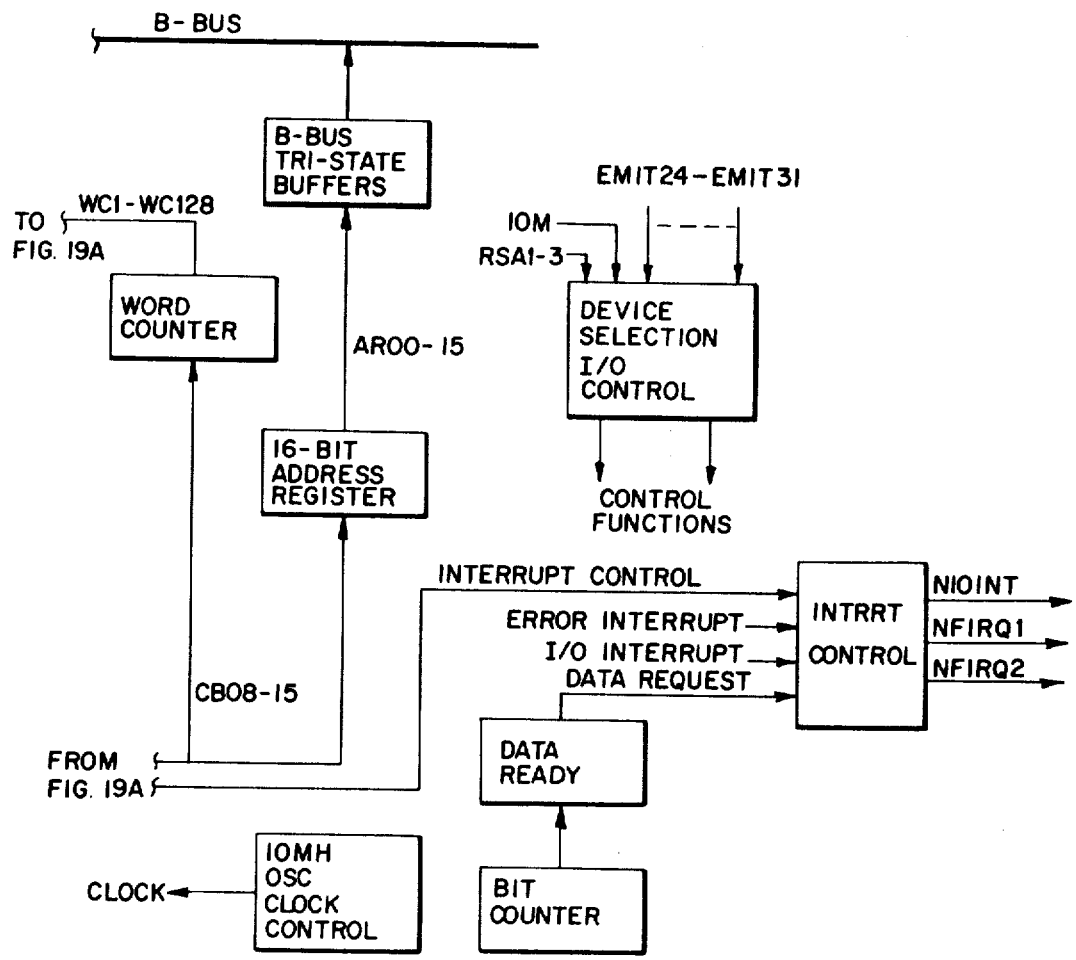

The major components that make up the Cartridge Disk Drive Controller (CDDC), including registers, counters, multiplexers, logic controls and interface circuits, are shown in FIG. 19.

The purpose of the CDDC is to control and buffer data to and from SCU memory to one of four selected disks. Prior to either reading from or writing on the disk, the following parameters must be established by means of one or more control micro instructions. The disk drive unit must be selected. The cylinder must be addressed. One of two disks (fixed or removable) must be selected. The upper or lower surface of the selected disk must be addressed. The appropriate mode (read or write) must be established and appropriate fast interrupts armed. The multiplexed I/O interrupt must be armed. The number of words (in one's complement) to be written or read must be placed in the word counter. The SCU starting memory address for the memory table must be placed in the address counter register. The sector address of the sector to be read or written must be placed in the sector counter register.

All Read Data or Write Data operations must be preceded by a Read Header Address microinstruction in order to locate the selector sector. The Read Header operation waits until the index pulse, which marks the beginning of the track is detected. At this time the Sector Counter 302 is reset to zero. When the address mark of sector 0 is detected, the contents of the Sector Counter are compared to the contents of the sector address register, lines DR08–DR16. If they are not equal, the Sector Counter is incremented by one, the 945 microsecond one-shot SECDLY fires inhibiting the read gate, and the comparison is again made when the address mark of the next sector is detected. This process continues from sector to sector until equality is reached.

Figure 20:
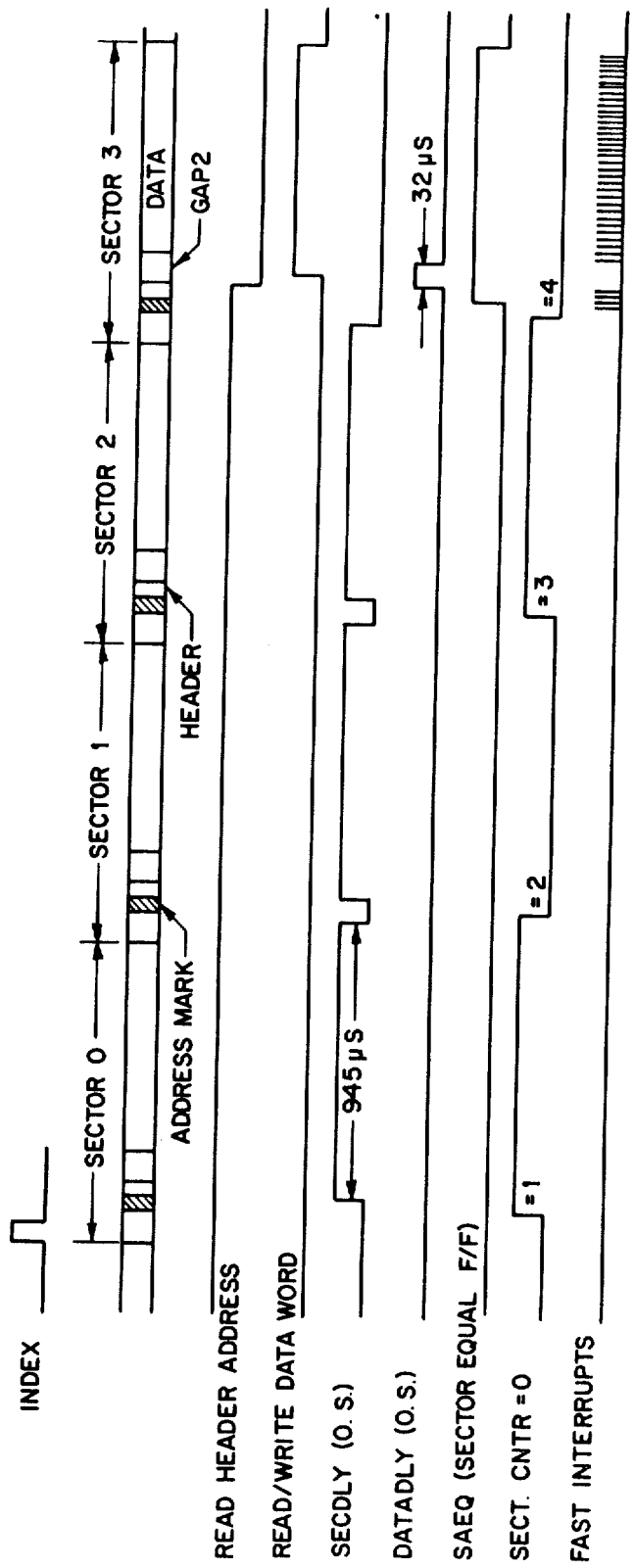

FIG. 20, timing diagram, shows the timing for a read header operation searching for sector 4. After the Read Header Address operation has located the sector, the Read or Write microinstruction must be executed within 32 microseconds; that is, before one-shot DATADLY falls. If it is not, a sector error I/O interrupt occurs.

All data exchanges between the SCU and the CDDC are made by means of fast interrupts.

Data to be recorded on the disk is taken from the C-Bus via the Tristate Buffers CB00–CB15 on FIG. 19, transferred to the 16-bit Output Buffer Register DR00–DR15, and held until the disk is ready to accept it. The data in the Buffer Register is then parallel transferred to the Shift Register SR00–SR15 and shifted serially one bit at a time to the Disk via a single interface line, NWDWC, on which the data has been merged with the CDDC system clock. Data and clock frequencies are 2.5 MHz.

Data read from the disk enters the Shift Register serially under control of the bit counter BC1–BC8. The data and clock which were merged into a single line to the Disk are separated in the Disk electronics and returned to the CDDC on two separate lines. The Disk input clock is used to regenerate the system clock during reading. When the Shift Register holds a complete 16-bit word, its contents are parellel transferred to the Input Buffer Register 304 where, by means of a fast interrupt, the data is then transferred to the A-Bus.

Each time a read or write fast interrupt occurs, the contents of the Address Register AR00–AR15 are transferred to the B-Bus, and the Register is decremented by a count of one.

Each fast interrupt also causes the Word Counter WC1–WC128 to increment by one. When the Word Counter reaches a count of zero (in one's complement) the read or write operation has been completed. At this time, however, a cyclic code character is generated and recorded if a write operation is performed, or is read and checked if a read operation is performed. A CRC error causes an I/O interrupt in the read mode.

Certain functions that are common to all or several operations are described in the following paragraphs. These functions include: addressing the CDDC, command decoding, system Read/Write Clocks, write Data Flow, read Data flow, PROM Gates, cyclic Redundancy Character Check, read/write Cyclic Check Code Timing, timing Pulse Width Requirements, multiplexed I/O Interrupts, and fast Interrupts.

The CDDC fast interrupt address which is common to all devices requiring fast interrupts is X'02'. The Controller accepts this address, provided it is armed and has priority over other devices, by raising the gate DMASDR.

$$\text{DMAADR} = \overline{\text{RSA01}} \ \overline{\text{RSA02}} \ \overline{\text{RSA03}} \ \text{IOM NAXIOCONT} \ \overline{\text{EMIT29}} \ \overline{\text{EMIT30}} \ \text{EMIT31}$$

Whenever the DMA address is in the test mode, or whenever a read or write fast interrupt is enabled, DMASEL1 and DMASEL2 are also raised.

```
DMASEL1 = FIEN1
        + FIEN2
        + DMAADR TESTMD
DMASEL2 = FIEN1
        + FIEN2
        + DMAADR TESTMD
```

The specific address of the CDDC is normally X'03', which is determined by connecting pins on the A Module, FIGS. 17a through d. For an address of X'03', the following pin connections should be made.

E2 to E1
E5 to E6
E8 to E9

Thus, the device address has been selected and any address of X'03' will rasise DEVSEL.
$$\text{DEVSEL} = \overline{\text{RSA01}} \ \overline{\text{RSA02}} \ \overline{\text{RSA03}} \ \text{IOM NAXIOCONT} \ \text{EMIT28} \ \text{EMITSEL} \ \overline{\text{EMITSEL}}$$ is determined by the configuration of the pin connections.

For interrupt response operations in which the unit address is taken from the A-Bus, unit address pins on the A Module must be connected to correspond with the device address. For an address of X'03', pin E10 should be connected to pin E11, and pins E12 and E14 remain unconnected.

The Command Decoder, which consists of two decoder circuits, decodes the output of the I/O Control Field EMIT24 through EMIT27, and are enabled by the device select gate DEVSEL. The decoded microinstructions and their logical output signals are listed.

| Signal | Microinstruction | EMIT 24 | 25 | 26 | 27 |
|---|---|---|---|---|---|
| NRDW | Read Data Word | 0 | 0 | 0 | 0 |
| NWDW | Write Data Word | 0 | 0 | 0 | 1 |
| NRDS | Read Status | 0 | 0 | 1 | 0 |
| NWWC | Write Word Count | 0 | 0 | 1 | 1 |
| — | Read Sector Count | 0 | 1 | 0 | 0 |
| NWSB | Write Select Byte | 0 | 1 | 0 | 1 |
| NRWC | Read Word Count | 0 | 1 | 1 | 0 |
| NRES | Restore | 0 | 1 | 1 | 1 |
| NRDC | Reset CDDC | 1 | 0 | 0 | 0 |
| NWRF | Write Format | 1 | 0 | 0 | 1 |
| NRHA | Read Header Address | 1 | 0 | 1 | 0 |
| NWAR | Write Address Register | 1 | 0 | 1 | 1 |
| — | Read Control Byte | 1 | 1 | 0 | 0 |
| NWCW | Write Control Word | 1 | 1 | 0 | 1 |
| NCSI | Clear Status/Interrupt | 1 | 1 | 1 | 0 |
| NWCA | Write Cylinder Address | 1 | 1 | 1 | 1 |

| Signal | Microinstruction | EMIT 24 | 25 | 26 | 27 |
|---|---|---|---|---|---|
| | and Seek | | | | |

Two microinstructions, Read Sector Counter and Read Control Byte, are not decoded in the Decoder. The A-Bus Multiplexer is controlled by the gate NENAB1 which is high for these two operations. It is also high for Read Word Count and Clear Status. NENAB1 = DEVSEL NEMIT27 EMIT25

The system clock is established during write operations and is generated by a 10 MHz oscillator. The 10MHz output of the oscillator is divided down to 2.5 MHz by the two flip-flops CLFF1 and CLFF2. The system clock during both read and write operations are NCLKP1, NCLKP2 and NCLKP3. These clocks follow the output of NCLFF1 and CLFF2 while writing, and follow the output of the 300 nanosecond one-shot NRCLPD when reading.

$$\text{NCLKP1-3} = (\overline{\text{RMODE IMSYNC}}) \ \text{NRCLPD} + (\text{RMODE IMSYNC}) \ \text{NCLFF1 CLFF2}$$

When writing, data and clocks are merged into a single stream (WDWC - write data with clock), which is gated by the write enable flip-flop NWRDEN to become NWDWC, and is then interfaced directly to the Disk. During write operations the system clocks, NCLKP1 through NCLKP3, are generated by gating the NCLFF1 and CLFF2 flip-flop outputs. See FIG. 21.

During the Write Format operation, two clock pulses are inhibited during the writing of the address mark bytes by the PROM gate NWAMARK. These "missing" clocks are used in the Read Header Address operation to detect the presence of the address mark bytes.

Not all flip-flops or registers are clocked by the CDDC internal clock, however. At times when no system clocks are available, or when the logic must be synchronous with the SCU or other nonsynchronous signals, some flip-flops and registers are clocked by the SCU clock (PHI), or by the trailing edges of one-shots, or directly by interface signals such as the attention lines from the disk unit.

During write operations the data on the C-Bus is transferred in parallel to the Output Buffer Register, DR00 through DR15, and from the output buffer register, again in parallel, to the shift register, SR00 through SR15.

The data is read serially from SR15, gated to the DATA Flip-Flop, and then to the Disk. Thus, bit 7 is the first bit of the 16-bit data word to be written on the Disk, and bit 8 is the last bit of the data word to be written.

Byte 0 is written on the Disk first, with the bits in reverse order, followed by byte 1, also with its bits in reverse order.

Data to be written on the disk is controlled by the DATA Flip-Flop input gating.

```
S/DATA  = WDLY
        + WCRC CR15
        + NWSRCRC SR15
        + NWRFC WRAMSB SYNC
C/DATA  = NCLKP1
```

The DATA Flip-Flop accepts data from the following sources.

From the 9.3 microsecond One-Shot WDLY. When WDLY is true, all ones are written on the Disk, When WCRC is true, DATA flip-flop follows the Output of the CRC Register CR15 when writing the cyclic check word. when NWSRCRC is high WCRC and NWRFC are both low, DATA Flip-Flop follows the data from the output of the Shift Register SR15. When NWRFC is high (not Write Format operation) and WRAMSB Flip-Flop is true during a Write Data Word operation, DATA flip-flop follows the output of the PROM gate, SYNC, to write the sync byte.

The output of DATA flip-flop is gated with the Clock flip-flops NCLFF1 and NCLFF2 and then ORed with a "Not Write Clock" gate to form WDWC.

WDWC = DATA NCLFF1 NCLFF2 + NWA-
    MARK NCLFF1 CLFF2

NWAMARK is a PROM Gate that drops for two clock pulses during the writing of the address marks during a Write Format operation. Thus, NWAMARK is responsible for the "missing" clocks in the address mark bytes.

The "write data with clock" gate, WDWC, is then gated with the output of the Write Enable Flip-Flop WRDEN, is inverted, and becomes the data output signal NWDWC which is interfaced to the DISK.

NWDWC = WDWC WRDEN

The Disk data is read from the Disk in the same order in which it was written - that is, bits 7 through 0 first, followed by bits 15 through 8, and is brought into the Shift Register serially at position SR00 of the Shift Register.

When the data has been completely shifted into the SR Register, it is then transferred in parallel to the Input Buffer Register, BR00 through BR15. This parallel transfer of data re-establishes the original bit and byte placement of the data word.

The input on the data line, NRDATA, is inverted and becomes RDATA. The rising edge of RDATA triggers the 300 nano second one-shot NRDATAD. The false output of the one-shot is then gated with NTMODE to SRD.

RDATA = NRDATA
    T/RDATAD = RDATA
    SRD = NRDATAD NTMODE + TMODE
        NSR15

The input to the Shift Register, SR00, accepts the data serially and the Shift Register shifts the data for sixteen clock times. At the end of sixteen clock times, the data word is in the Shift Register where it is transferred in parallel to the Input Buffer register BR00 through BR15

SR00 = SRD

In the test mode, the data in the Shift Register is "turned around" by taking the output from NSR15 and returning it to the Shift Register via SR00.

The two PROM circuits on the B module are used for address mark and sync byte generation and detection. The following logic is used for these purposes.

NWAMARK = AMB1 BC8 $\overline{BC4}$ BC2 + AMB2
    BC8 BC4 BC2
    SYNC = BC8 $\overline{BC4}$ $\overline{BC2}$ $\overline{BC1}$ + BC8 BC4 NBC15

NWAMARK is true (low) at bit counts 10 and 11 during the first address mark byte when flip-flop AMB1 is true. It is also true at bit counts 2 and 3 during the second address mark byte when flip-flop AMB2 is true. Write clocks are inhibited when this gate is low.

SYNC is true (high) at bit counts 8 and 12 through 14. This term is used to write the sync byte during Write Data Word operations and to detect the sync byte in Read Data Word operations.

WADMK = WRAMSB WRFC $\overline{SR00}$ SR01 $\overline{SR02}$
        SR03
    NRDSB = $\overline{RDDEN}$ SAEQ SR00 $\overline{SR01}$ $\overline{SR02}$ $\overline{SR03}$
        + $\overline{RDDEN}$ SAEQ WRAMSB WRFC SR00
        $\overline{SR01}$ $\overline{SR02}$ SR03
    NWSYNCB = RDDEN NSAEQ WADMK detects the presence of the "2" in the X'F2' address mark by going high. NRDSB detects sync byte bits in Read Data operations. This term is used to set RDDEN flip-flop to start reading data.

NWSYNCB drops during the write operation to prevent writing from the DATA flip-flop while the sync byte is being written. This term is gated with NWCRC to form NWSBCRC. NWSBCRC is low when either the sync byte or the CRC character is being written.

The Cyclic Redundancy Character Generator/Detector Registers (A47, A48, A64 and A63 on Module B in FIGS. 18a through 3) are used to both generate the check character during writing and to check the data during reading.

Both the data and the encoding character are "polynomials" in that each position of the data stream can be thought of as a coefficient of the general polynomial $$f(X) = a_0 + a_1x + a_2x^2 + \ldots a_kx^k.$$

For the binary case, each coefficient is either a one or a zero, and in this context the polynomial $X^{16} + X^{15} + X^2 + 1$ is represented by the binary word 1 1000 0000 0000 0101.

The check character is generated by dividing the data by the encoding polynomial. The remainder resulting from the division then becomes the 16-bit check character. During read operations the data including the cyclic check character is again divided by the same polynominal. If no errors have occured, the result of this division should be "zeros" since adding the check character (remainder) to the message has the effect of making the data evenly divisible by the code polynomial.

Bear in mind that the cyclic redundancy check operation is continually occuring on all data received or transmitted during read or write operations from the very first bit of data to the very last bit, and that the generated code check is written or read after the complete stream of data has ended.

The check character is generated by entering each bit of the data stream into the data input terminal. This effectively divides the data stream by the selected code by means of Control Gates CRC15, CRC01 and CRC14. After the last data bit is entered, the check character is stored on the Disk.

During reading the data is passed through the same circuit and if no errors have occurred, the result should be equal to zero. Thus, during reading operations, a one bit detected in CR15 while the check character is being read, will cause a multiplexed interrupt by setting CRCERR flip-flop true.

S/CRCERR = RDDEN WCEZDL CR15
C/CRCERR = NCLKP3

The cyclic redundancy character check (CRC) is generated by the following logic.

```
CR00 = CRC15
CR01 = CR00
CR02 = CRC01
CR03 = CR02
CR04 = CR03
CR05 = CR04
CR06 = CR05
CR07 = CR06
CR08 = CR07
CR09 = CR08
CR10 = CR09
CR11 = CR10
CR12 = CR11
CR13 = CR12
CR14 = CR13
CR15 = CRC14
CRC01 = CR01 + CRC15
CRC14 = CR14 + CRC15
CRC15 = NWCRC CR15 + (WRDEN NSR15 +
        RDDEN NSR00)
```

Figure 22:
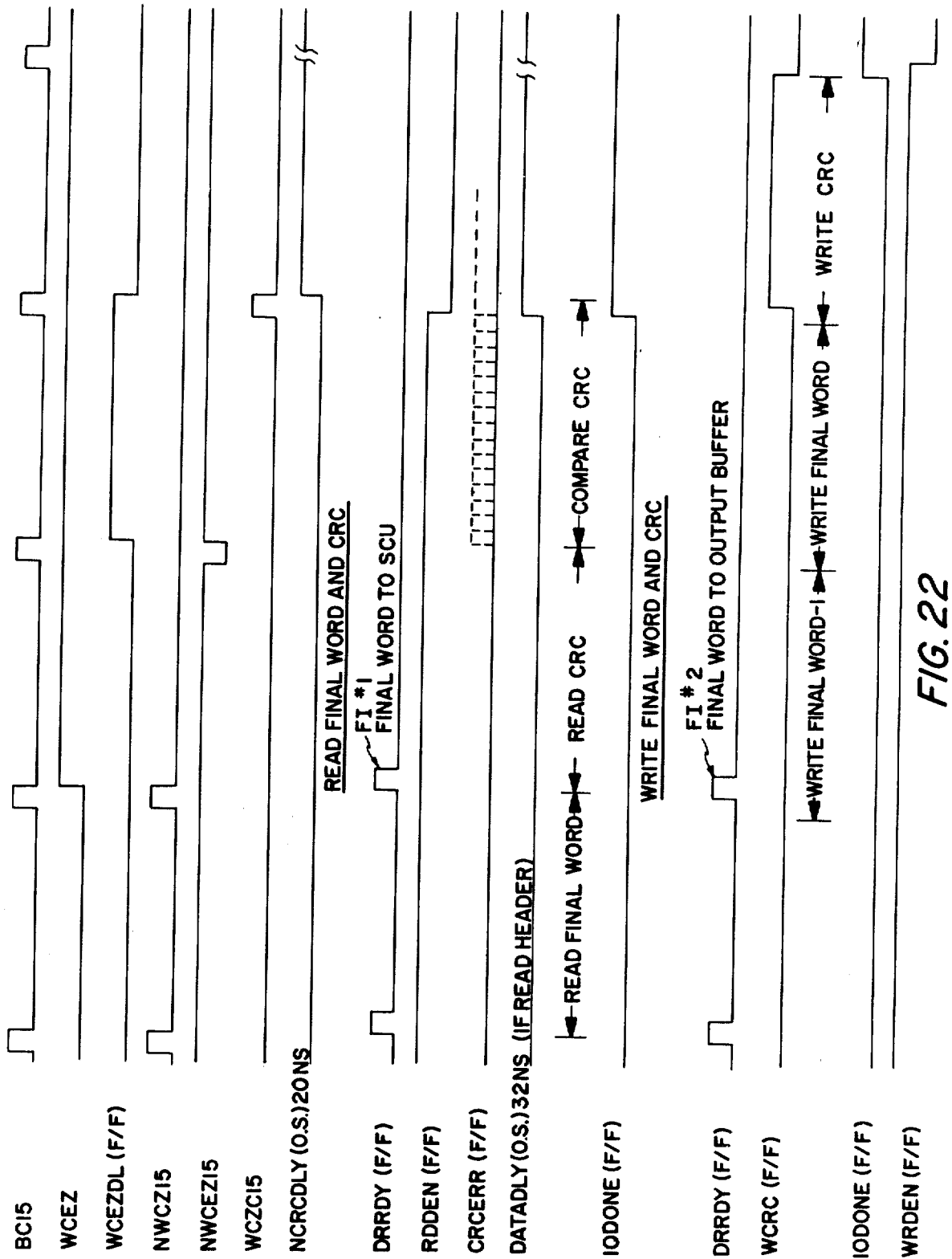

When the final word of a sector is being read from or is being written on the Disk, the Word Counter reaches a count of zero (in one's complement). In either case, the final word is followed by the cyclic check character to be written during a Write operation, or to be read and compared during a Read operation. During a Read Header Address operation, the final word of the alternate address is also followed by a cyclic check character to be read and compared for error. Timing considerations for both Read and Write operations requiring cyclic code functions are shown in FIG. 22.

The word counter is incremented by PHIB1 whenever the DMA address is selected. This occurs each time a fast interrupt is executed.

```
S/WC1     = DMASEL1
C/WC1     = PHIB1
DMASEL1   = FIEN1
          + FIEN2
          + ...
```

When all bits of the Word Counter are ones, the Counter Output Gate WCEZ goes high.

```
WCEZ = WC128 WC64 WC32 WC16 WC8 WC4
       WC2 WC1 With WCEZ high, the CDDC pre-
       pares for either reading or writing the CRC word.

NWCZ15 = NWCEZ BC15
NWCEZ15 = NWCRC NIODONE WCEZ BC15
S/WCEZDL = NWCEZ15
R/WCEZDL = BC15
C/WCEZDL = NCLKP1
NCRCL15 = WCZC15 CLKP
```

In a Read operation WCEZ goes high during the time the final word is placed on the A-Bus as a result of the fast interrupt, and the CRC word is immediately entered serially into the Shift Register. After the CRC word is in the Shift Register, flip-flop WCEZDL is set and remains true for 16 bit times. During the time WCEZDL is true, the CRC Error Flip-flop looks at the output of the CRC Generator/Detector CR15. If CR15 is at one during any bit count when WCEZDL is true, the Error flip-flop CRCERR is set to denote a cyclic code check error and initiates an I/O interrupt.

| S/CRCERR | = RDDEN WCEZDL CR15 |
|---|---|
| E/CRCERR | = NCSRST |
| S/MINTREQ | = CRCERR |
| | + ... |

If there is no CRC error, one-shot NCRCDLY fires for twenty microseconds and IODONE flip-flop sets. IODONE true also requests an I/O interrupt.

| T/CRCDLY | = NCRCL15 |
|---|---|
| NCRCL15 | = WCZC15 |
| S/IODONE | = RDDEN WCZC15 |
| | + ... |

When the cyclic check code character follows the final word of a Reader Header Address operation, DATADLY oneshot is triggered for 32 microseconds.

T/DATADLY = NCRCL15

DATADLY One-Shot falls approximately two thirds into gap 3. If a Read or Write microinstruction is not executed before DATADLY falls, or if a new word count has not been entered into the Word Counter, or if the read and write mode bits are both true, a sector error occurs.

| S/SECTERR | = (RMODE + WMODE) |
|---|---|
| | + NWCEZ |
| C/SECTERR | = NDATADLY |

Flip-flop SECTERR is clocked by the rise of NDATADLY.

During a Write Data Word operation the CRC character is written only after the final data word. WCEZ goes high as the final data word is transferred to the Output Buffer and held there for the sixteen bit times required to shift the previous word out to the Disk. Flip-flop WCEZDL is high as the final word is being shifted to the Disk and then resets.

As the last bit of the final word is shifted out to the Disk, WCRC flip-flop sets and remains true for the sixteen bit times required to write the cyclic code check character. DATA flip-flop follows the output of the CRC Generator Register while WCRC is high to write the cyclic check character.

```
S/WCRC = WRDEN WCZC15
R/WCRC = NBC15
S/DATA = SCRC CR15
```

The following table defines the one-shot pulse widths, tolerances, pin locations and the resistor and capacitor values. The R and C values are fixed values and cannot be changed by manipulation.

| FUNCTION | MOD | LOCATION | PULSE WIDTH | R VALUE | C VALUE |
|---|---|---|---|---|---|
| NCRCDLY | A | A1-7 | 20±2us (Neg) | R13 13K | C30 .0047 uF |
| STRBD | AA | A15-6 | 150±25us | R11 10K | C1 22pF |
| STRB | A | A15-10 | 1.2±.1 us | R12 10K | C2 330 pF |
| SECDLY | A | A33-3 | 945±10 us | R14 10.5K | C31 .082 uF |
| NWDLY | B | A14-7 | 9.3±.5 us (Neg) | R22 35.7K | C21 470 pF |

-continued

| FUNCTION | MOD | LOCATION | PULSE WIDTH | R VALUE | C VALUE |
|---|---|---|---|---|---|
| ADMCLK | B | A14-10 | 100±10ns | R21 5.11K | C20 22pF |
| LINDXP | B | A16-6 | 100±10ns | R16 5.11K | C15 22pF |
| TINDXP | B | A16-10 | 100±10ns | R15 5.11K | C14 22pF |
| NRCLPD | B | A29-7 | 300±30 ns (Neg) | R19 12.1K | C18 47pF |
| NAMKDET | B | A29-9 | 950±100 ns (Neg) | R18 11.3K | C17 220 pF |
| NRDATAD | B | A32-7 | 300±30 ns (Neg) | R20 12.1K | C19 47pF |
| DATADLY | B | A32-10 | 32±3us | R17 23.2K | C16 .0047 uF |

When no interrupts are occuring from any device, SCU priority interrupt line PRIn, which is common to all devices, is high. Under these circumstances, the priority string signal PRIn+1 is also high to each device.

PRIn+1 = PRIn NMINTREQ

The CDDC initiates an I/O interrupt by setting flip-flop MINTREQ true. The priority signals to all device controllers with a lower interrupt priority go low inhibiting lower priority interrupts.

The I/O interrupt flip-flop sets if the I/O interrupt has been armed (AMIOINT true) and the SCU interrupt request inhibit signal NINTLOCK is high.

S/MINTREQ = NINTLOCK AMIOINT INTER
C/MINTREQ = PHIB3

The INTER gate ORes all of the conditions that can initiate an I/O interrupt.

| INTER | = | IODONE | (Input/Output complete) |
|---|---|---|---|
| | + | CRCERR | (CRC error) |
| | + | SECTERR | (Sector error) |
| | + | NFNRDY | (File not ready) |
| | + | ATTNF1 | (Attention from file 1) |
| | + | ATTNF2 | (Attention from file 2) |
| | + | ATTNF3 | (Attention from file 3) |
| | + | ATTNF4 | (Attention from file 4) |

With MINTREQ true, the device address is placed on the A-Bus, bits 8 through 15.

| A08 | = | (PRIn MINTREQ AXDASTROBE) | VPUL2 |
|---|---|---|---|
| A09 | = | (PRIn MINTREQ AXDASTROBE) | GND |
| A10 | = | (PRIn MINTREQ AXDASTROBE) | GND |
| A11 | = | (PRIn MINTREQ AXDASTROBE) | GND |
| A12 | = | (PRIn MINTREQ AXDASTROBE) | GND |
| A13 | = | (PRIn MINTREQ AXDASTROBE) | SELEMIT29 |
| A14 | = | (PRIn MINTREQ AXDASTROBE) | SELEMIT30 |
| A15 | = | (PRIn MINTREQ AXDASTROBE) | SELEMIT31 |

As part of the interrupt subroutine, the program must inhibit further interrupts from the same source by resetting MINTREQ with a Clear Status/Interrupt microinstruction.

R/MINTREQ = NCSI

The I/O interrupt is either armed or disarmed by a Write Control Word microinstruction with a one in bit 4 of the B-Bus to arm it, or a zero in bit 4 of the B-Bus to disarm it.

Figure 23:
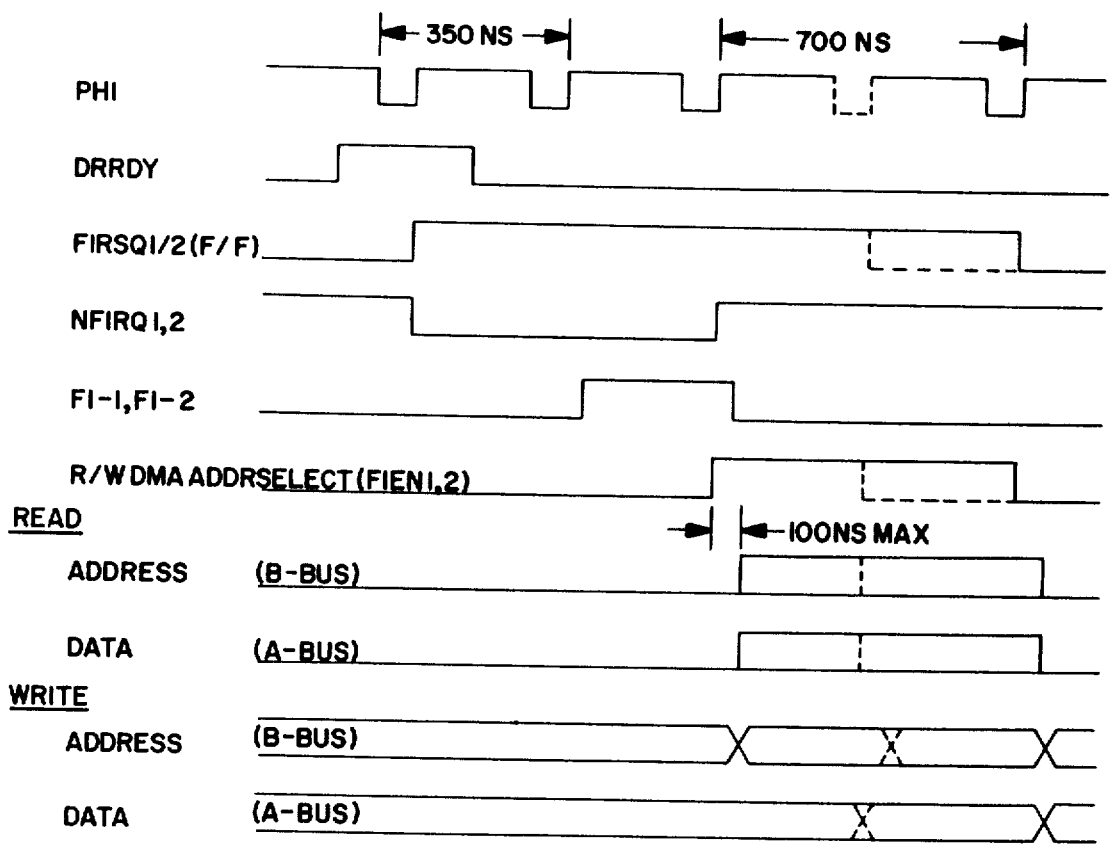

Fast interrupts consist either of a Read or Write interrupt depending upon the mode of operation. During Read operations the Read Fast Interrupt must be armed (ARDINT true). During a Write operation the Write Fast Interrupt must be armed (AWDINT true). There are no conditions under which both Read and Write fast interrupts may be armed simultaneously. In the following paragraphs only the Read fast interrupt is described since both read and write interrupt logic is identical except for the terminology used. Interrupt timing is shown in FIG. 23.

When no fast interrupts are occuring from any device, SCU priority interrupt line, FIPRIn+1 is high to each device. If the read interrupt is armed, flip-flop DRRDY sets the fast interrupt request flip-flop true, drops the request line to the SCU and inhibits lower priority devices by dropping FI1PRIn+1.

S/FIREQ1 = DRRDY ARDINT $\overline{\text{FI-1}}$
NFIRQ1 = FIREQ1 NFIEN1
FI1PRIn+1 = R1PRInNFIREQ1

The SCU responds to the interrupt request by raising the FI-1 response line causing FIEN1 flip-flop to set, and the request flip-flop FIREQ1 to reset.

S/FIEN1 = FI-1 FI1PRIn FIREQ1
C/FIEN1 = PHIB3

The request flip-flop is reset by the next SCU clock.

R/FIREQ1 = NFIEN1
C/FIREQ1 = PHIB3

Since FIREQ1 has been reset, flip-flop FIEN1 remains true only for one clock period and is then reset.

R/FIEN1 = GND
C/FIEN1 = PHIB3

While FIEN1 is high for fast interrupt 1 (or FIEN2 for fast interrupt 2), the direct memory access select gates, DMASEL1 and DMASEL2, are raised and the content of the Address Counter are placed onto the B-Bus. (AR00-AR15 → B00-B15).

| DMASEL1 | = FIEN1 |
|---|---|
| | + FIEN2 |
| DMASEL2 | = FIEN1 |
| | + FIEN2 |

During the read fast interrupt with FIEN1 true, the Input Buffer enable term is also raised to transfer the data to the A-Bus (BR00-BR15 = A00-A15).

| NENAB2 | = FIEN1 |
|---|---|
| | + ... |

During the write fast interrupt with FIEN2 true, the Output Buffer enable terms, WRENLB and WRENRB, are raised to place the data from the C-Bus into the Output Buffer Register (C00-C15 = CB00-CB15).

| WRENLB | = FIEN2 |
|---|---|
| | + ... |
| WRENRB | = FIEN2 |
| | + .. |

The following paragraphs describe the detailed operation of the 16 basic control functions of the Cartridge Disk Drive Controller, and include, where necessary, flow charts and/or timing diagrams to supplement the text.

The Read Data Word microinstruction must be executed within 32 microseconds after the Read Header Address operation has been completed. If the Data Delay One-Shot DATADLY times out without RMODE true (or WMODE true in a write data operation), or with the word count still equal to zero, a sector error has occurred and the Sector Error Flip-flop sets causing an I/O interrupt.

| | | |
|---|---|---|
| S/SECTERR | = | (WMODE + RMODE) |
| | + | WCEZ |
| C/SECTERR | = | NDATADLY |

S/MINTREQ = SECTERR + ...
C/MINTREQ = PHIB3

Figure 24:
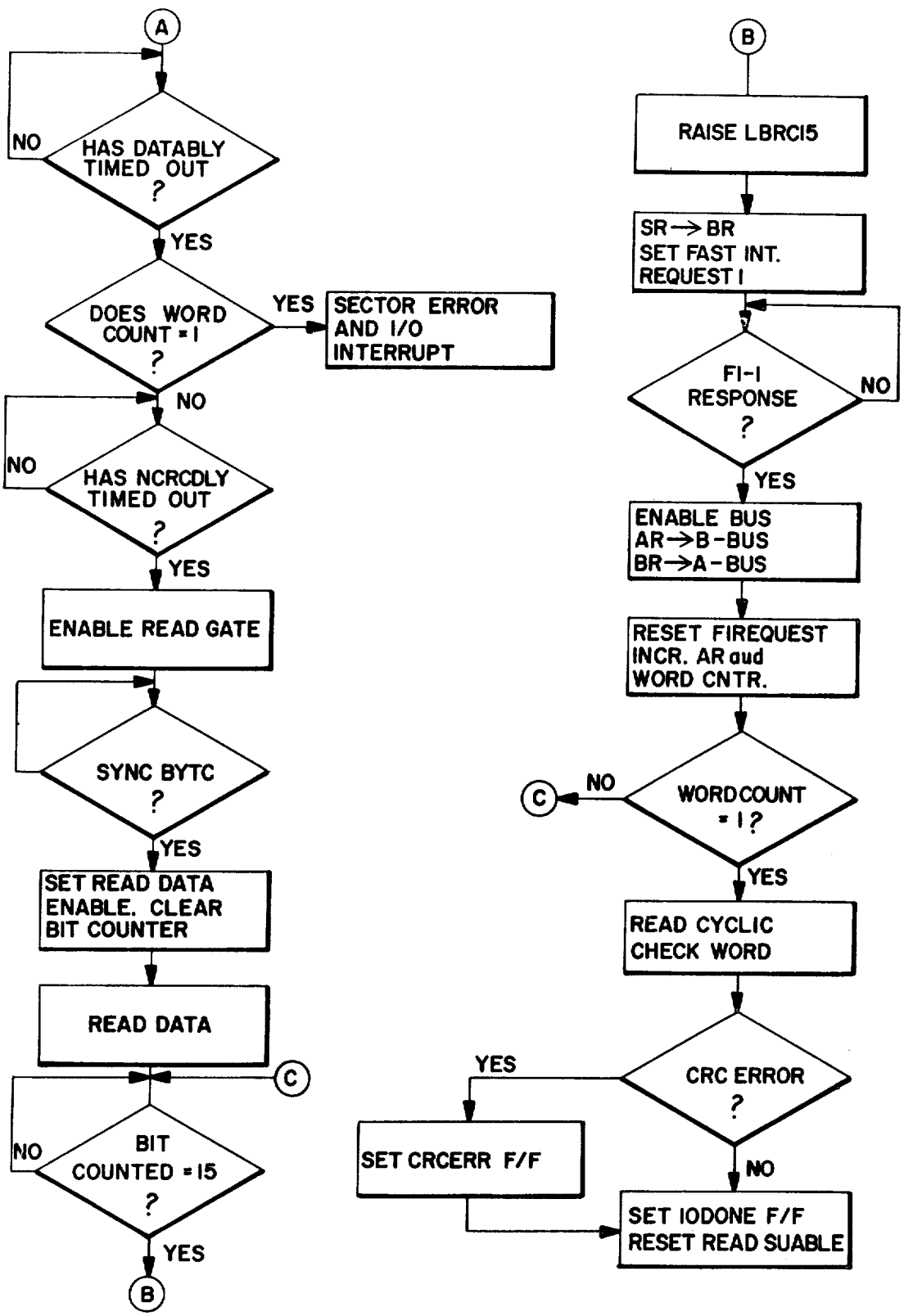
FIG. 24 is a flow diagram of the Read Data Word operation.
Figure 25A:
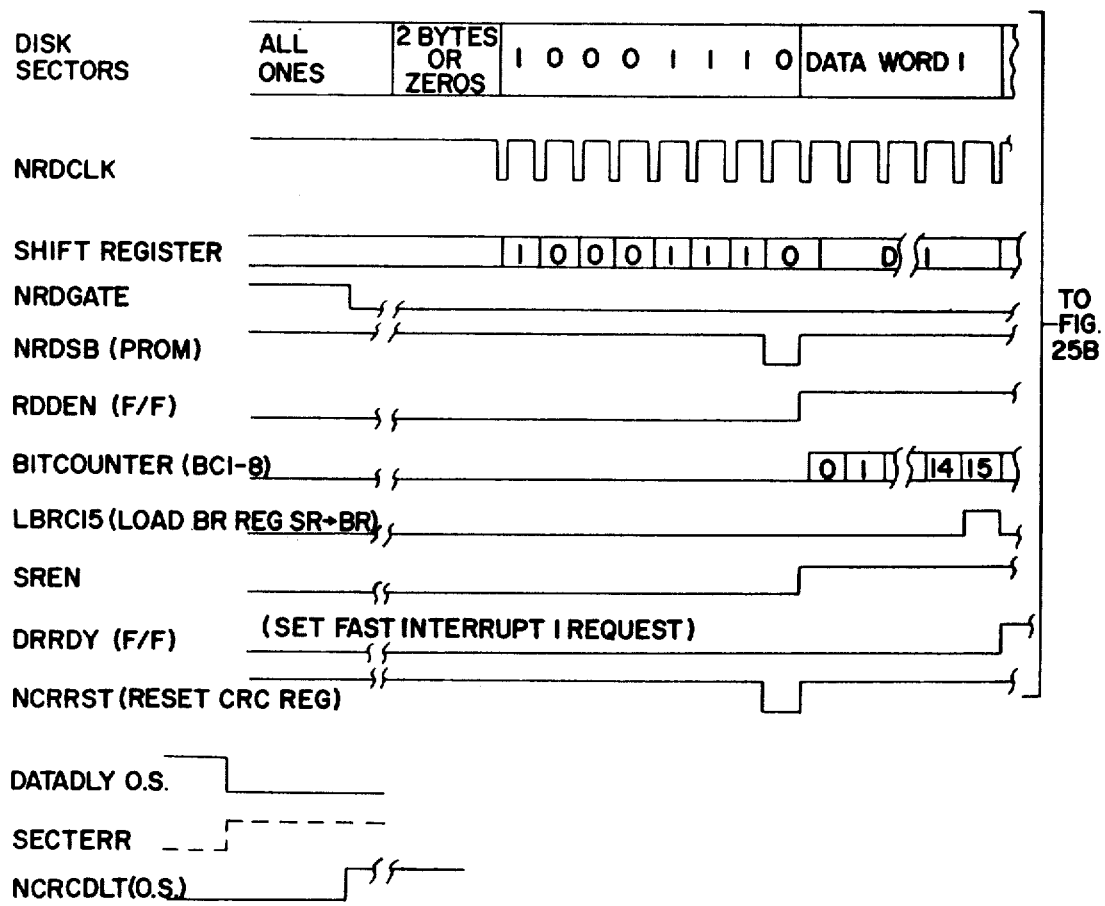
FIG. 25A through 25B is a timing diagram of the Read-Word operation.
Figure 25B:
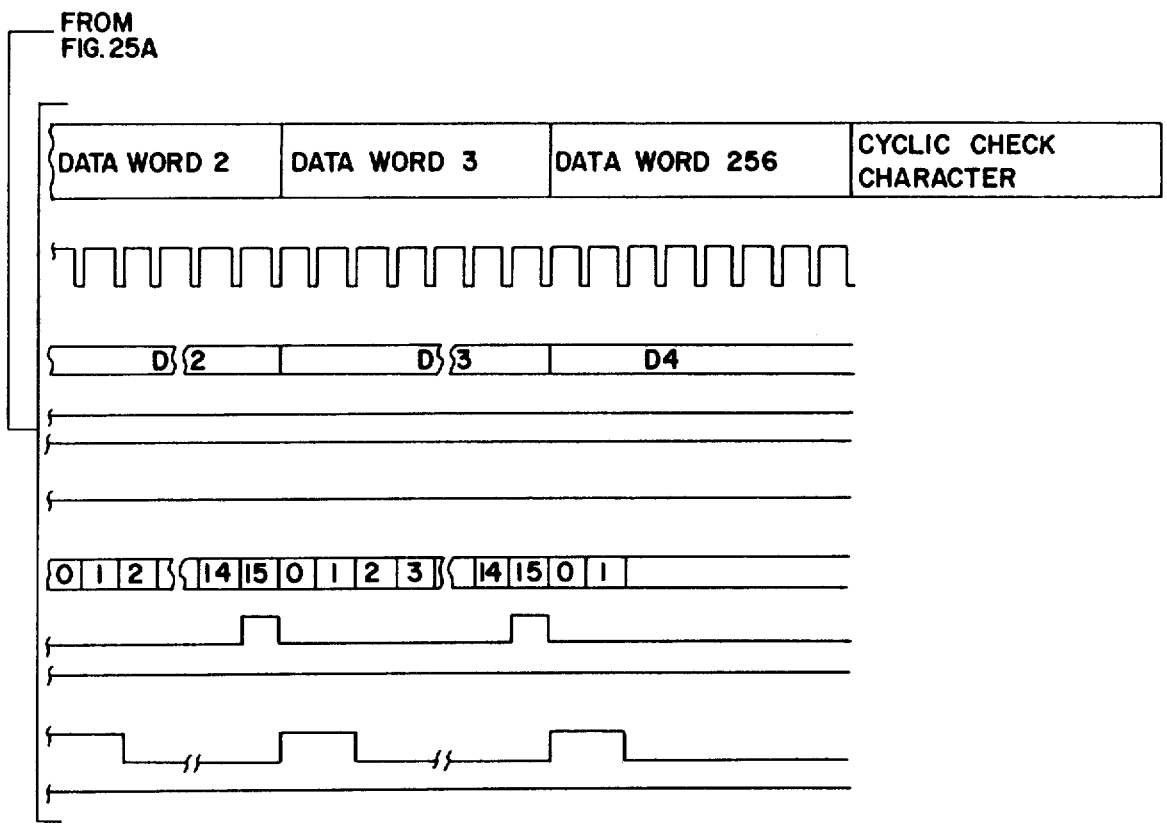

The Read Data Word operation flow is shown in FIG. 24. FIG. 25 is a timing sequence chart that describes the RDW operation. When one-shot NCRCDLY times out after the Read Header Address operation, and assuming that no sector error is detected, the Read Gate is enabled. Flip-flop IMSYNC was set during the Read Header Address operation.

NRDGATE = RDDLY + RMREN
RDDLY = NCRCDLY
RMREN = RMODE IMSYNC

The command decoder sets NRDW low and DRRDY flip-flop is reset.

E/DRRDY = NRWD
NRWD = RWD
RWD = NRDW

The sync byte preceding the data bytes is detected by the PROM gate NRDSB which sets flip-flop RDDEN and raises SREN to reset the Bit Counter Register BC1-BC8 to a count of zero. The Bit Counter is enabled at this time and begins its count.

NRDSB = RDDEN SAEQ SR00 $\overline{SR01}$ $\overline{SR02}$ $\overline{SR03}$

The first data word is read into the Shift Register via SRD. At BC15 time the entire word is in the Shift Register and Gate LBRC15 is raised to parallel transfer the contents of the Shift Register to the input Buffer BR00–BR15, and the data-ready flip-flop is set to initiate the Fast Interrupt 1.

BR00 = LBRC15 SR08
BR01 = LBRC15 SR09
BR02 = LBRC15 SR10
BR03 = LBRC15 SR11
BR04 = LBRC15 SR12
BR05 = LBRC15 SR13
BR06 = LBRC15 SR14
BR07 = LBRC15 SR15
BR08 = LBRC15 SR00
BR09 = LBRC15 SR01
BR10 = LBRC15 SR02
BR11 = LBRC15 SR03
BR13 = LBRC15 SR04
BR14 = LBRC15 SR05
BR15 = LBRC15 SR06

Note how the word from the disk, which was reversed in writing, is now restored.

| | | |
|---|---|---|
| LBRC15 | = | (RDDEN + TMODE) BC15 |

| | | |
|---|---|---|
| S/DRRDY | = | SREN NECZ15 |
| | + | ... |

FI-1 interrupt response from SCU sets flip-flop FIEN1, NENAB2 goes low and the data word is transferred to the A-Bus. The contents of the Address Register are transferred to the B-Bus.

DMASEL1 and DMASEL2 allow the Word Counter and the Address Counter to increment by one. Both Counters are clocked by PHIB1.

| | | |
|---|---|---|
| DMASEL1/2 | = | FIGN1 |
| | + | FIGN2 |
| | + | DMAADR TMODE |

The next word is shifted one bit at a time into the Shift Register and the operation described is repeated until the Word Counter reaches a count of zero raising WCEZ.

The Write Data Word microinstruction must be executed within 32 microseconds after the Read Header Address operation has been completed. If the data delay oneshot DATADLY times out without WMODE true (or RMODE true in a read data operation), or with the word count still equal to zero, a sector error has occurred and the sector error flip-flop sets causing a MUX I/O interrupt.

| | | |
|---|---|---|
| S/SECTERR | = | (WMODE + RMODE) |
| | + | WCEZ |
| C/SECTERR | = | NDATADLY |
| S/MINTREQ | = | SECTERR + ... |
| C/MINTREQ | = | PHIB3 |

Figure 26A:
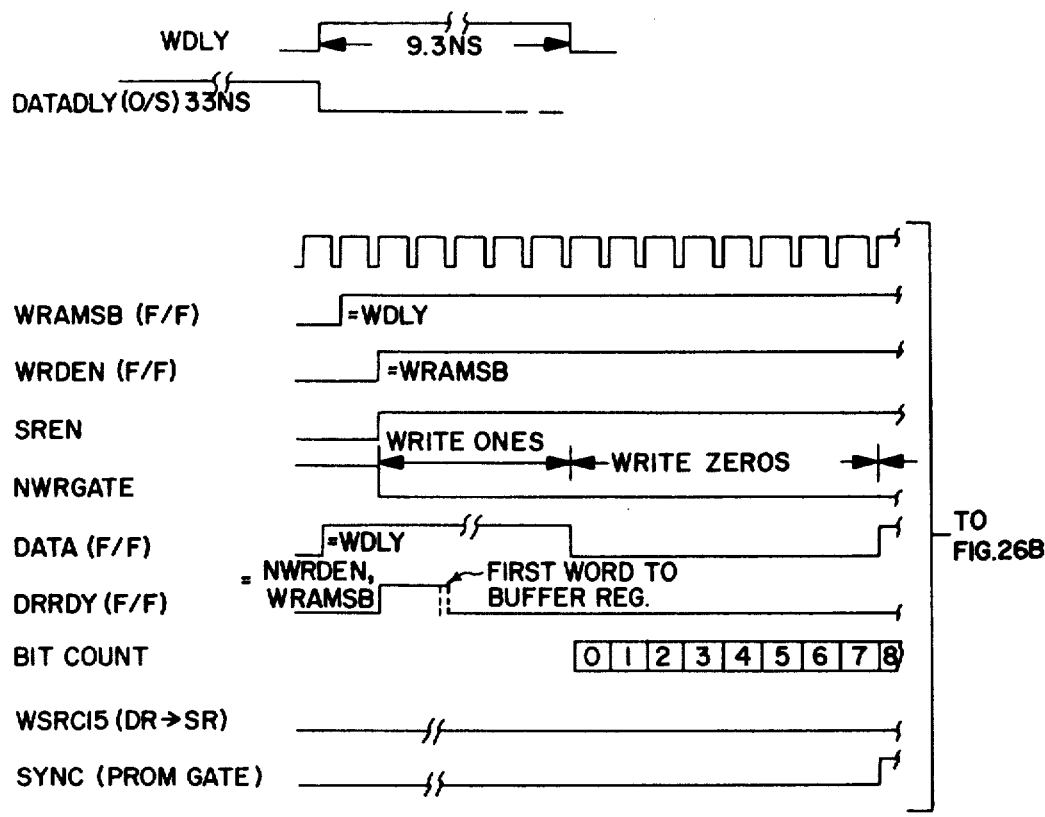
FIGS. 26A through 26B and 27 are timing diagrams of the Right-Word operation.
Figure 26B:
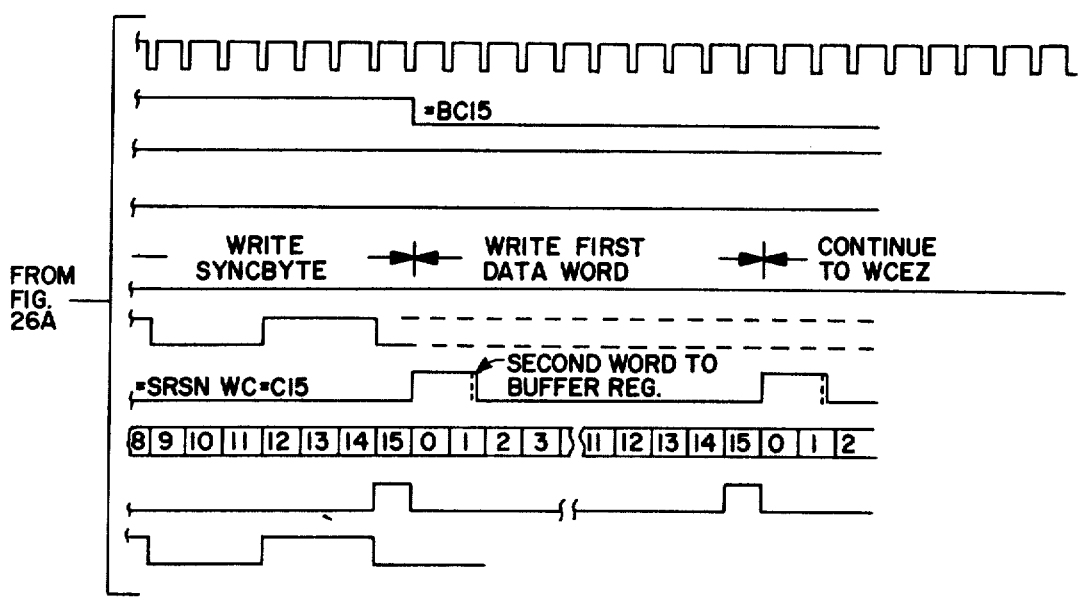
Figure 27:
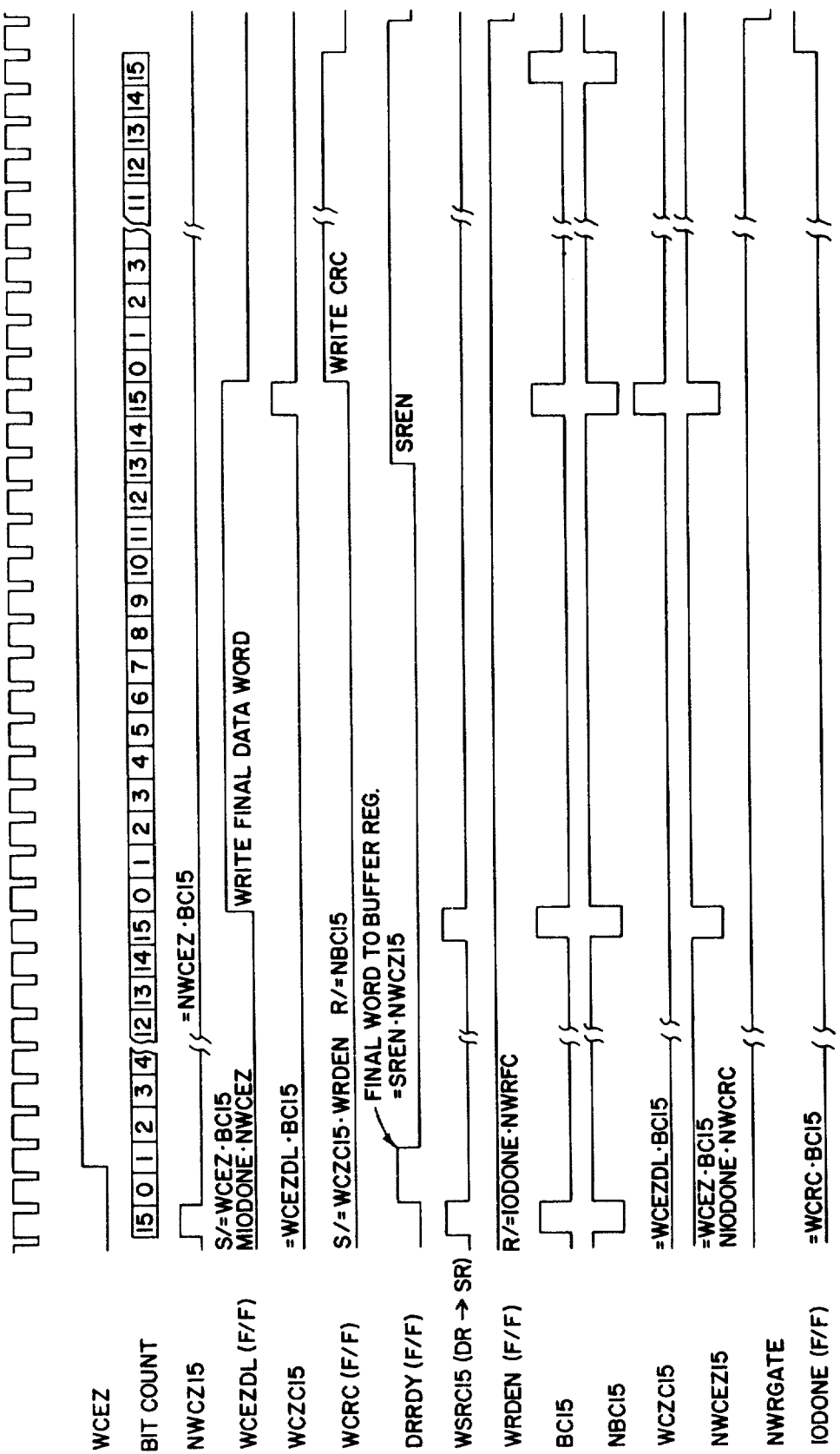

FIGS. 26 and 27, timing sequence diagrams, describe the WDW operation. At the fall of DATADLY One-Shot, One-Shot WDLY triggers for 9.3 microseconds and one clock time later the Write Sync Byte Flip-Flop WRAMSB sets. One clock time after WRAMSB sets, WRDEN Write Enable Flip-Flop sets enabling the Write and Erase Gates NWRGATE and NERGATE.

| | | |
|---|---|---|
| T/WDLY | = | WMODE DATADLY |
| | + | ... |
| S/WRAMSD | = | WDLY |
| S/WRDEN | = | WRAMSB |

NWRGATE = WRDEN WMODE
NERGATE = WRDEN WMODE

With the Write Gate enabled, ones are written on the Disk for the 9.3 microseconds that WDLY is high. The Data Ready Flip-Flop DRRDY sets to request data from the SCU memory via Fast Interrupt 2.

| | | |
|---|---|---|
| S/DRRDY | = | WRAMSB NWRDEN |
| | + | SREN NWCZ15 |
| R/DRRDY | = | NCSRST |
| NCSRST | = | RST + CSI NPHI |
| NRST | = | NRESGT + RDC NPHI |
| RDC | = | NRDC + NDISDMA |
| NDISDMA | = | EMIT25B DMAADR |
| DMASEL1/2 | = | FIEN1 + FIEN2 + DMAADR TESTMD |

When DMASEL1 and DMASEL2 go high, the contents of the Address Counter AR00–AR15 are transferred to the B-Bus and the Counter is incremented by one, clocked by PHIB1. The Word Counter also is incremented by one, clocked by PHJB1.

When the SCU obtains the word to be written on the Disk, it places the data word on the C-Bus and the word is clocked into the 16-bit Output Buffer Register DR00-DR15 by PHIB2. This occurs before one-shot WDLY times out.

When WDLY One-Shot falls, the Bit Counter is allowed to count. For the first eight counts, zeros are written on the Disk. From the ninth count (second byte of word), the PROM gate, SYNC, forces an X'8E' to be written in the sync byte position by coming true at bit counts 8, 12, 13, and 14.

```
WYNC    = BC8 BC4 BC2 BC1
        + BC8 BC4 NBC15
S/DATA  = WRAMSB NWRFC SYNC
```

After the sync byte has been written, flip-flop WRAMSB resets.

```
R/WRAMSB = NWRFC BC15
```

A bit count 15 (BC15) Gate WSRC15 goes true to parallel transfer the first data word, which has been waiting in the Output Buffer Register, to the Shift Register SR00-SR15. At the fall of BC15, DRRDY Flip-Flop is again set to request the second data word from SCU Memory via Fast Interrupt 2. The second data word remains in the Output Buffer until the first word is written and is then parallel transferred to the Shift Register by WSRC15 as the last bit of the first data word is being transferred out of the Shift Register onto the Disk.

The sequence described above and shown in FIG. 26 continues until the final word is ready to be transferred from SCU to Disk. At this time the word count reaches a count of zero (WCEZ true). The final data word and CRC word timing is shown in FIG. 27.

When the word count equals zero, DRRDY is set to transfer the final word from Memory via Fast Interrupt 2. This occurs as the next-to-final data word is about to be transferred from the Shift Register to the Disk. At BC15 time WSCR15 loads the final data word into the Shift Register and Flip-Flop WCEZDL is set and remains true for next 16 bit counts.

```
S/WCEZDL = WCEZ BC15 NIODONE
           NWCRC
R/WCEZDL = BC15
```

While WCEZDL is high, the final data word is transferred from the Shift Register via SR15 to the DATA Flip-Flop and is then written on the Disk.

As WCEZDL flip-flop resets, WCRC Flip-Flop sets and remains set for sixteen bit times.

```
S/WCRC = WZC15 WRDEN
R/WCRC = NBC15
```

During the time that WCRC is high, the DATA Flip-Flop no longer follows SR15, but accepts the cyclic character data from CR15.

```
S/DATA = WCRC CR15
```

At the conclusion of writing the CRC data, flip-flop IODONE is set to indicate the end of the operation by setting the Interrupt Request Flip-Flop MINTREQ.

One clock time later the Write Enable Flip-Flop WRDEN resets dropping SREN and disabling the Write and Erase Gates.

```
S/IODONE  = WCRC BC15
R/IODONE  = NCSRST
S/MINTREQ = CSI + ...
C/MINTREQ = PHI3
R/WRDEN   = IODONE NWRFC
SREN      = WRDEN + ...
NWRGATE   = WRDEN WMODE
NERGATE   = WRDEN WMODE
```

No CRC interrupt can occur during a Write Data Word operation.

The Read Status microinstruction (X'2') is decoded in the Command Decoder which drops NRDS. This microinstruction also causes gate NENAB2 to go high.

```
NENAB2 = RDEN
       + TESTMD DMAADR EMIT27B
       + FIEN1
```

With NRDS low and NENAB2 high, the status information is gated to the A-Bus Tri-State Multiplexer Buffer.

```
A00 = (NRDS NENAB2)  ERROR
A01 = (            )  IODONE
A02 = (            )  DRRDY
A03 = (            )  SECTERR
A04 = (            )  WCEZ
A05 = (            )  CRCFRR
A06 = (            )  WRPS
A07 = (            )  WRCKF
A08 = (            )  SKINC
A09 = (            )  ADINTLK
A10 = (            )  RDYSRW
A11 = (            )  NFRDYRC
A12 = (            )  ATTNF4
A13 = (            )  ATTNF3
A14 = (            )  ATTNF2
A15 = (NRDS NENAB2)  ATTNF1
```

ERROR is a combined error signal gate that is high when any error condition exists such as cyclic code check error, sector error, or when the address interlock or write check is set, or if a seek is incomplete.

IODONE Flip-Flop is true when a Read, Write, Write Format or Read Header Address operation has been completed but has not yet been reset by the interrupt subroutine.

DRRDY Flip-Flop is true whenever the Output Data Buffer is empty during a write operation or is full during a read operation.

SECTERR Flip-Flop is set true whenever a sector error has occurred. This can occur if a Read Data Word or Write Data Word does not occur within 32 microseconds after a Read Header operation, or if the addressed sector is not detected by the Read Head Address after one revolution of the Disk.

WCEZ is the output of the Word Counter and is true whenever the Counter has reached its maximum count to signify the final word being read or written.

CRCERR is a flip-flop that is true whenever a cyclic code check error occurs.

WRCKF is directly set by the Disk Interface Write Check signal NWRCK. Once this flip-flop is true, it cannot be reset except by a Clear Status or Reset CDDC microinstruction.

WRPS is inverted from the write protect Disk Interface signal NWRPS.

SKINC is inverted from the Seek Error disk interface signal NSKINC, and is true whenever the seek operation is incomplete because an incorrect cylinder address has been given to the Disk.

ADINTLK is inverted from the address interlock Disk Interface signal NADINTLK.

RDYSRW is inverted from the Ready to Seek, Read or Write Disk Interface signal NRDYSRW.

NFRDYRC is a signal derived from the Disk Drive. When true (or low), it signifies that the File is in the operating state.

ATTNF1 through ATTNF4 are Flip-Flops which are set true whenever an attention signal from a corresponding Disk Drive unit is true. These Flip-Flops, once set, can be reset only by a Clear Status or Reset CDDC microinstruction.

The Write Word Count microinstruction (X'3') is decoded in the Command Decoder by dropping NWWC. NWWC is tied to the parallel enable input of the Word Counter and at the rising edge of the SCU clock PHIB1, gates the contents of the C-Bus, bits 8 through 15, to the Word Counter.

```
WC128 = NWWC CB08
WC64  = NWWC CB09
WC32  = NWWC CB10
WC16  = NWWC CB11
WC8   = NWWC CB12
WC4   = NWWC CB13
WC2   = NWWC CB14
WC1   = NWWC CB15
```

The Word Counter is initially set by the program to a count that is equal to the one's complement of the number of words that is to be written on the Disk or read from the Disk. Each time either a read or write fast interrupt occurs, DMASEL1 goes high to allow the SCU clock to count the Word Counter up by one.

```
DMASEL1 = FIEN1
        + FIEN2
        + DMAADR TESTMD
```

When the Counter reaches a count of X'FF' (the one's complement of zero), the word count equals zero and output (WCEZ) of the Counter goes high. The Write Word Count microinstruction requires 700 nanoseconds if memory access is made, or 350 nanoseconds if no memory access is made.

The Read Sector Counter microinstruction reads the sector address that is current in the sector counter by placing its contents on the A-Bus, bits 8 through 15. The Command Decoder does not decode this microinstruction directly. The select input for the A-Bus Multiplexer is NRWC (Read Word Count) which remains high for the Read Sector Counter operation, and the enable input for the A-Bus Multiplexer is NENAB1 which goes low for the operation. With NRWC high and NENAB1 low, the B inputs to the A-Bus are gated.

NENAB1 = DEVSEL EMIT25 NEMIT27

Note that NENAB1 is also low for function codes X'6', X'C', and X'E'.

```
A08 = (NENAB1 NRWC) SC128
A09 = (      "     ) SC64
A10 = (      "     ) SC32
A11 = (      "     ) SC16
A12 = (      "     ) SC8
A13 = (      "     ) SC4
A14 = (      "     ) SC2
A15 = (      "     ) SC1
```

The eight most-significant bits of the A-Bus are not inhibited during this operation, and therefore the control bits are also gated to bits A00 through A07. Thus, the logic Operation for Read Sector Counter and Read Control Byte (X'C') is identical.

```
A00 = (NENAB1 NRWC) WMODE
A01 = (      "     ) RMODE
A02 = (      "     ) AWDINT
A03 = (      "     ) ARDINT
A04 = (      "     ) AMIOINT
A05 = (      "     ) TMODE
A06 = (      "     ) GND
A07 = (      "     ) GND
```

Figure 28:
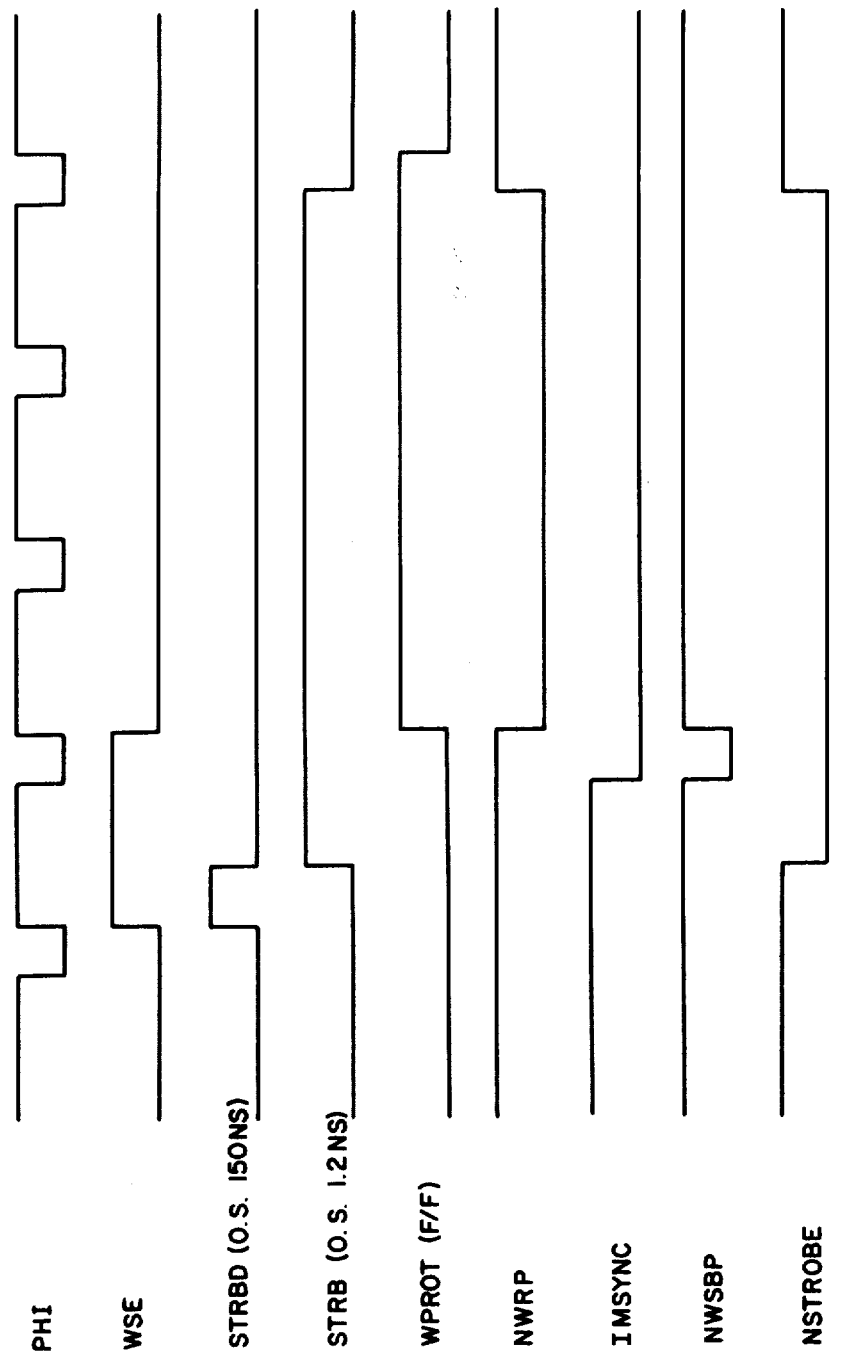
FIG. 28 is a timing diagram of the STroke Timing for the Right-Select Byte Microinstruction.

The Write Select Byte operation accepts the contents of the right byte of the C-Bus to select one of four Disk units, to select one of two Disks of the selected unit, and to select one of two Heads (or Disk surfaces) of the selected Disk. Bit C11, if a one, sets the WRPROT Flip-Flop and triggers One-Shot STRBD for 150 nanoseconds. The fall of STRBD then triggers One-Shot STRB which strobes the select byte to the Disk unit. One-shot STRB remains high for 1.2 microseconds during which time the write protect interface signal to the Disk, NWRP, goes low to prevent writing on the Disk. Stroke timing is shown in FIG. 28.

The Command Decoder drops NWSB which raises WSB. WSB, in turn, gates the C-Bus bits to the Select Register which is clocked by SCU clock PHIB2.

```
USEL1 = WSB CB12
USEL0 = WSB CB13
DSEL  = WSB CB14
HSEL  = WSB CB15
```

The four unit select interface lines NSEL1 through NSEL4 are encoded from USEL1 and USEL0.

```
NSEL1    = NUSEL1 NUSEL0
NSEL2    = NUSEL1 USEL0
NSEL3    = USEL1 NUSEL0
NSEL4    = USEL1 USEL0
NDSEL    = DSEL
NHSEL    = HSEL
T/STRB   = STRBD
T/STRBD  = STRBEN PHIB2
STRBEN   = NWSB11
         + ...
NWSB11   = WSB CB11
NSTROBE  = STRB RESTA
RESTA    = RESTR
         + TAEN
```

With CB11 a one, the Write Protect Flip-Flop WRPROT sets, clocks by PHIB2 and directly resets Flip-Flop IMSYNC.

```
S/WRPROT = NWSB11
C/WRPROT = PHIB2
R/WRPROT = NSTRB
NWSB11   = WSB C11
E/IMSYNC = NRSYNC
NRSYNC   = WSBP
         + ...
```

When the Strobe One-Shot and the Write Protect Flip-Flop are both true, the write protect interface signal to the Disk goes true (low).

NWRP = STRB WPROT

The Read Word Count microinstruction causes the Command Decoder to drop NRWC and the Multiplexer Enable signal NENAB1 also goes low. With both NRWC and NENAB1 low, the A inputs of the A-Bus Multiplexer are enabled and the contents of the Word Counter, WC128 through WC1, are gated to the right byte position of the A-Bus.

| NENAB1 | = | DEVSEL EMIT25B NEMIT27 |
|---|---|---|
| A08 | = | (NENAB1 NRWC) WC128 |
| A09 | = | ( " ) WC64 |
| A10 | = | ( " ) WC32 |
| A11 | = | ( " ) WC16 |
| A12 | = | ( " ) WC8 |
| A13 | = | ( " ) WC4 |
| A14 | = | ( " ) WC2 |
| A15 | = | ( " ) WC1 |

Ones are transferred to the right byte of the A-Bus since these inputs are always high.

The Restore microinstruction causes the Command Decoder to drop NRES which sets the RESTR Flip-Flop. With RESTR true, the restore interface line goes true (low).

```
S/RESTR = NRES
C/RESTR = PHIB2
NRESTORE = RESTR
```

The Strobe Enable Gate STRBEN goes high and the Strobe Delay One-Shot STRBD triggers at the rise of PHIB2. STRBD remains high for 150 nanoseconds. The fall of STRBD triggers the Strobe One-Shot STRB which holds the strobe interface signal true (low) for 1.2 microseconds.

```
STRBEN = NRES
         + ...
```

Flip-flop RESTR is reset at the next PHI clock after the Strobe One-Shot falls.

```
R/RESTR = NSTRB
C/RESTR = PHIB2
```

Strobe timing for this operation is the same as that for the Write Select Byte microinstruction. See FIG. 28.

The Command Decoder reacts to a Reset CDDC microinstruction by dropping NRDC. When NRDC is dropped RDC is gated with NPHI to produces a 100 microsecond pulse, NRST.

```
NRST = NRESET
       + RDC NPHI
RDC  = NRDC
       + NDISDMA
```

NRST directly resets the following flip-flops:

```
E/FIREQ1 = NRST
E/FIREQ2 = NRST
E/FIEN1 = NRST
E/FIEN2 = NRST
E/NJSJNT = NRST
E/WPROT = NRST
E/TAEN = NRST
E/RESTR = NRST
```

```
E/RDAMK = NRST
E/AMB1 = NRST
E/AMB2 = NRST
E/WCRC = NRST
E/WRDEN = NRST
E/RDDEN = NRST
E/WCEZDL = NRST
E/WCRC = NRST
```

The NRST reset signal is also gated to five other Reset Gates.

```
NCSRST = NRST + ...
NRHRST = NRST + ...
NWFRST = NRST + ...
NDDRST = NRST + ...
NRSYNC = NRST + ...
```

These gates reset the following Flip-Flops:

```
E/IMSYNC = NRSYNC
E/WRAMSB = NWFRST
E/SECTERR = NCSRST
E/DRRDY = NRRST
E/IODONE = NCSRST
E/CRCERR = NCSRST
E/SAEQ = NRHRST
E/RHAC = NRHRST
E/WRFC = NWFRST
E/ATTN1 = NCSRST
E/ATTN2 = NCSRST
E/ATTN3 = NCRST
E/ATTN4 = NCSRST
```

If the DATADLY One-Shot is true when the Reset CDDC microinstruction is executed, it is reset by NRST.

E/DATADLY = NRST

NRST reset term also clears the Control Byte Register resetting the read and write mode status bits (WMODE, RMODE), disarming the read and write fast interrupts and I/O interrupt (AWDINT, ARDINT, AMIOINT) and the test mode (TMODE).

A reset CDDC operation also occurs in the DMA address mode with a compound of 4 or C - that is, the Disarm function. The disarm DMA signal, NDISDMA, goes low and drops NRST reset term.

NDISDMA = DMAADR EMIT25B

Before the Write Format microinstruction is executed, the Unit, Cylinder, Device and Head must have been selected, the seek completed, write mode set, the multiplexed and fast interrupts armed, a work count of 26 (in one's complement) in the Word Counter, and the address of the first table word in the Address Register. The table contains 39 bytes of ones for Gap 1 preamble of Sector O. For the corresponding preamble (Gap 3) of Sectors 1 through 23, the starting address of the table should be word 08 and the word count equal to 18, since the preamble for these sectors contain only twenty three bytes of ones.

Figure 29:
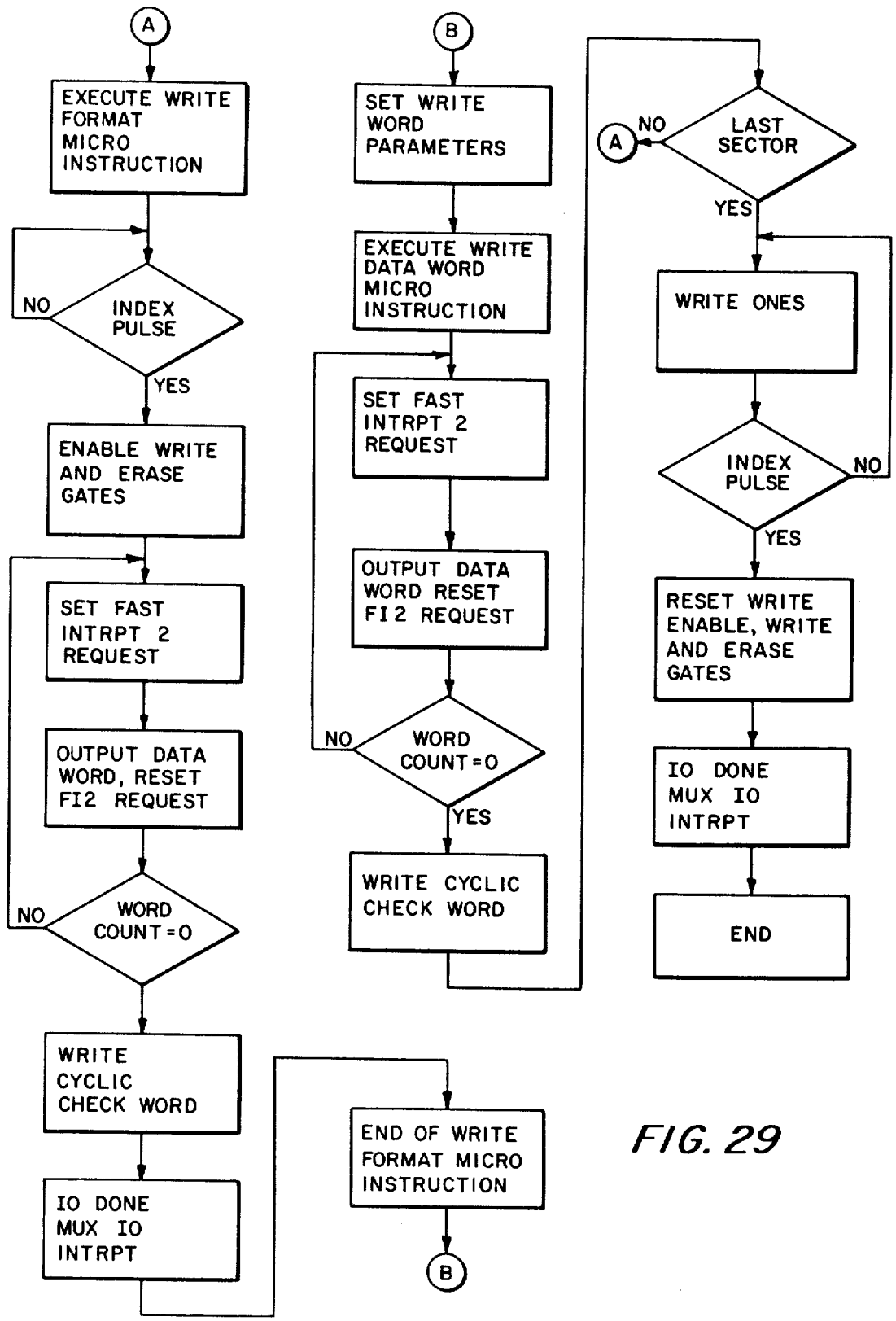
FIG. 29 describes the programming and logic flow necessary for formatting a single track.
Figure 30A:
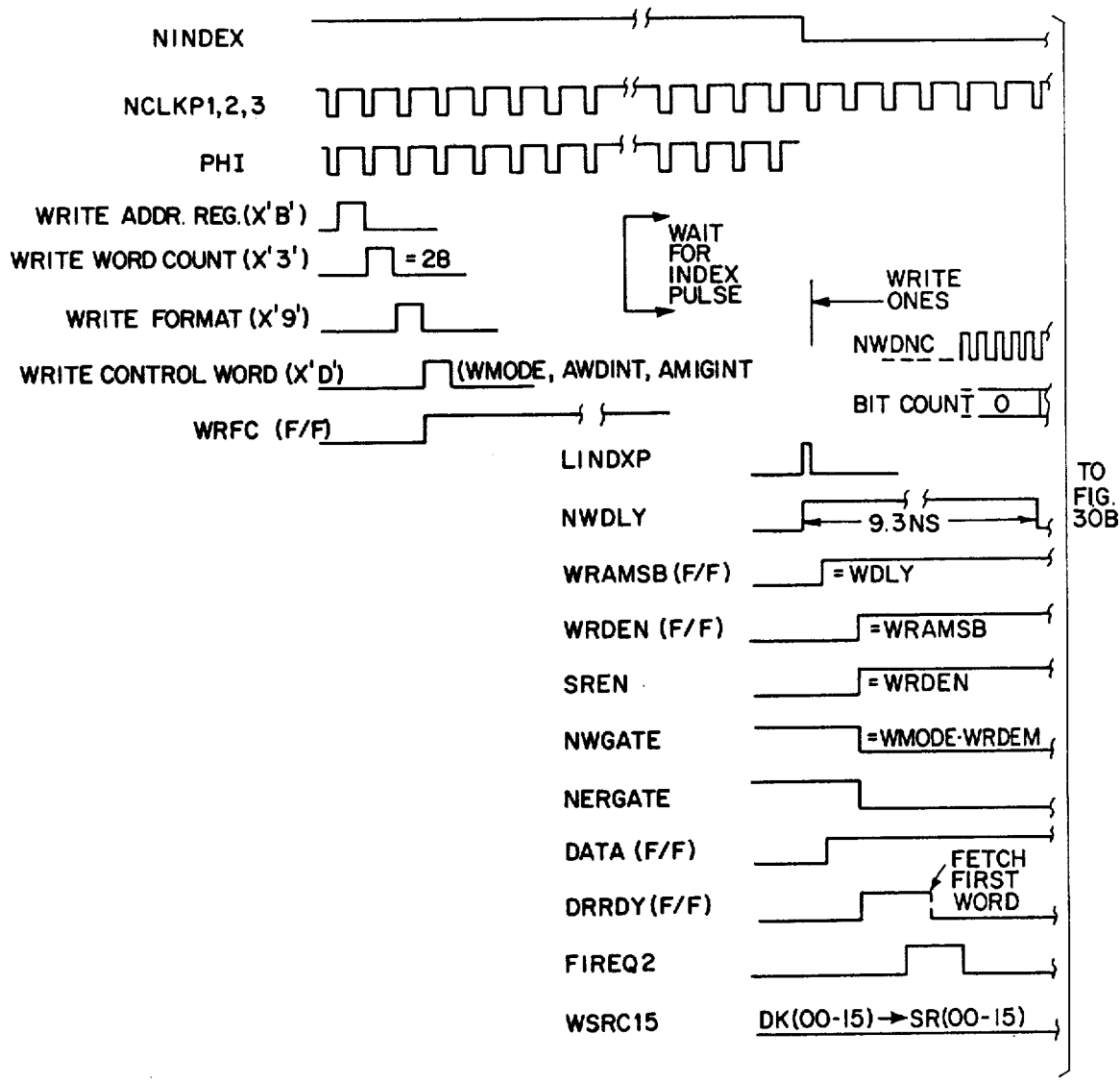
FIG 30A through 30B, 31 and 32A through 32B are timing diagrams for the Right Format operation.
Figure 30B:
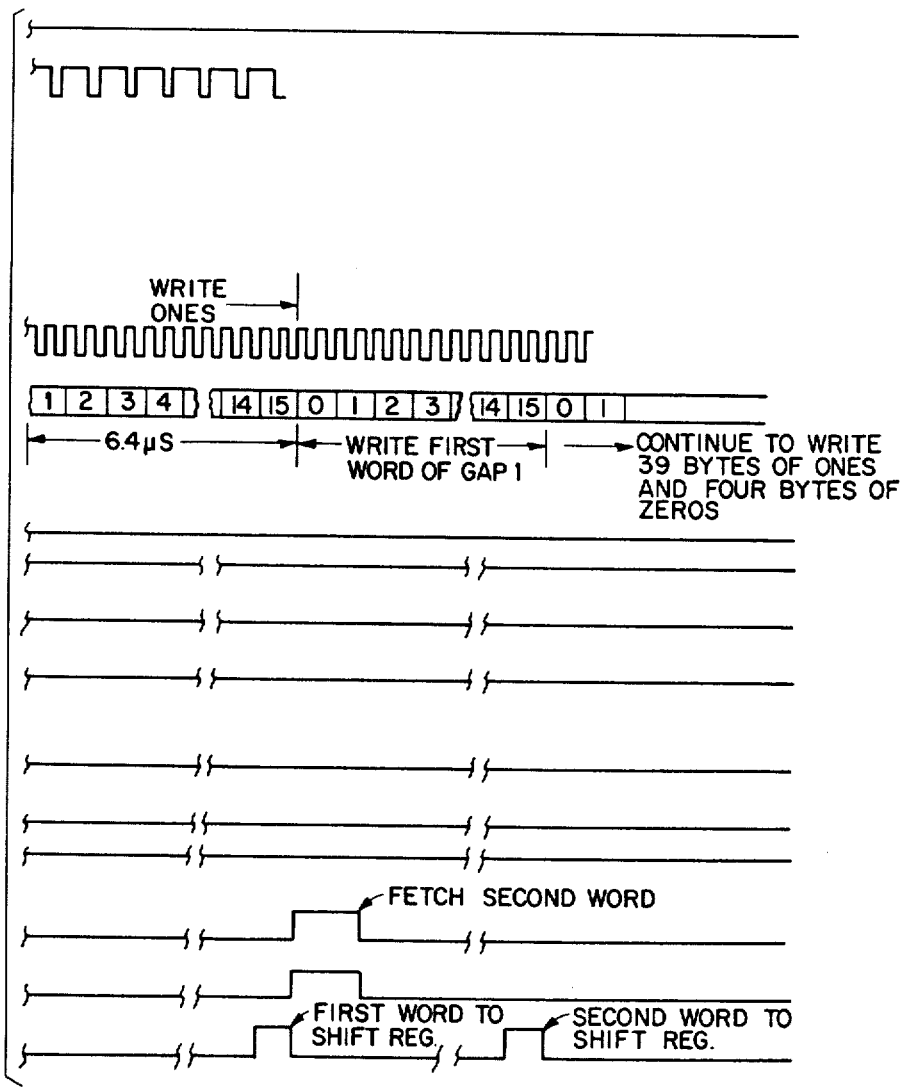
Figure 31A:
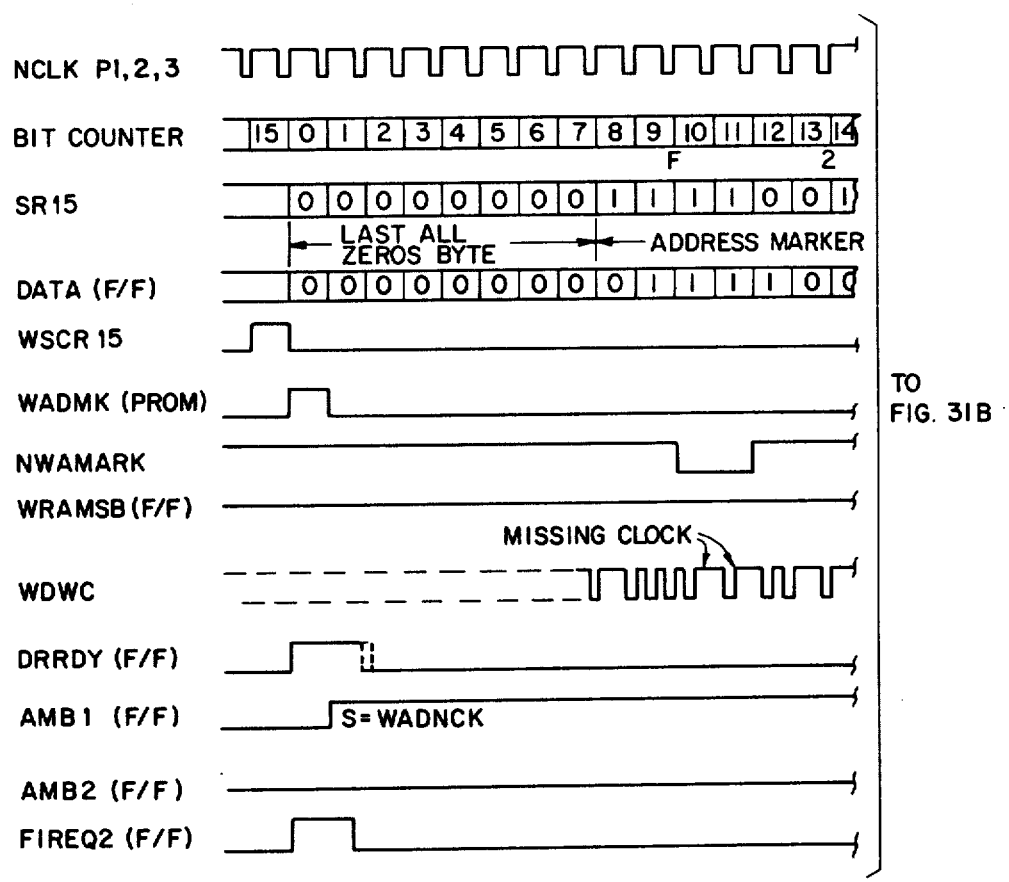
Figure 31B:
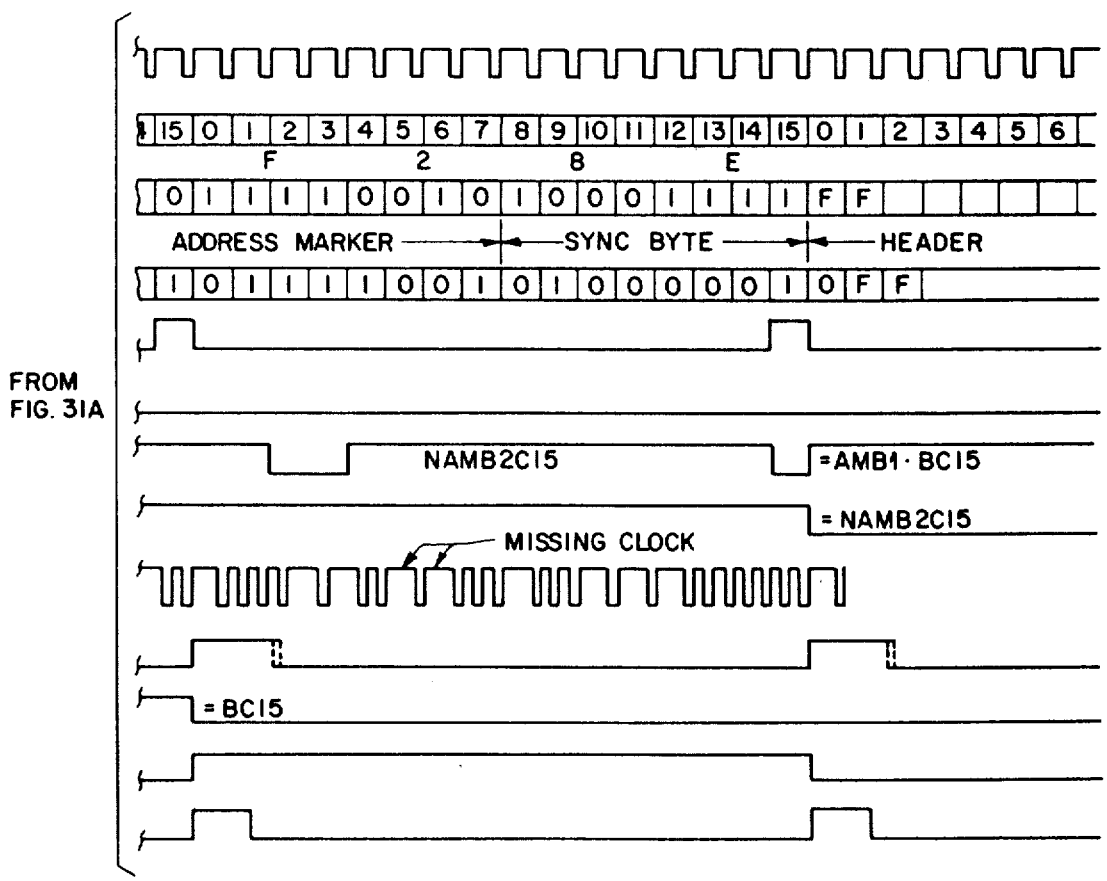
Figure 32A:
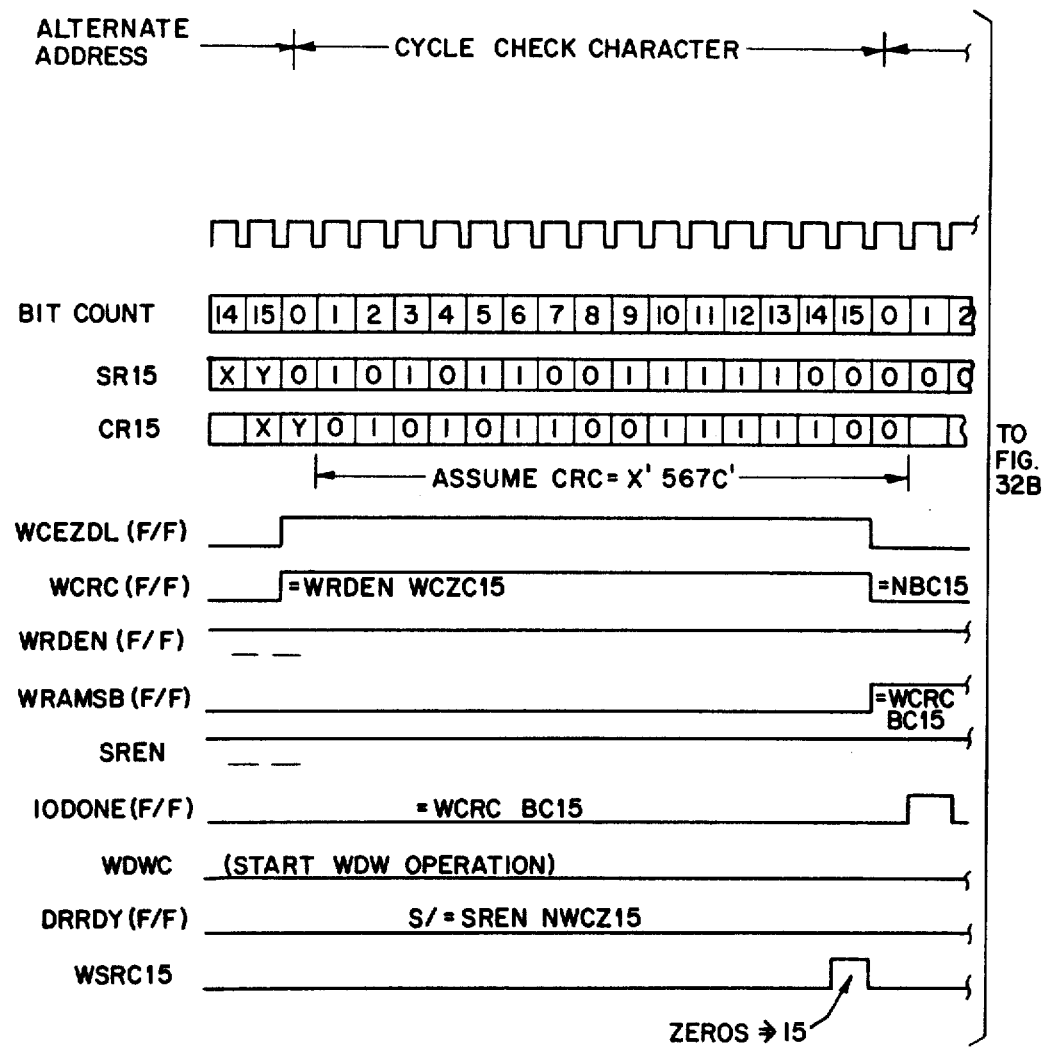
Figure 32B:
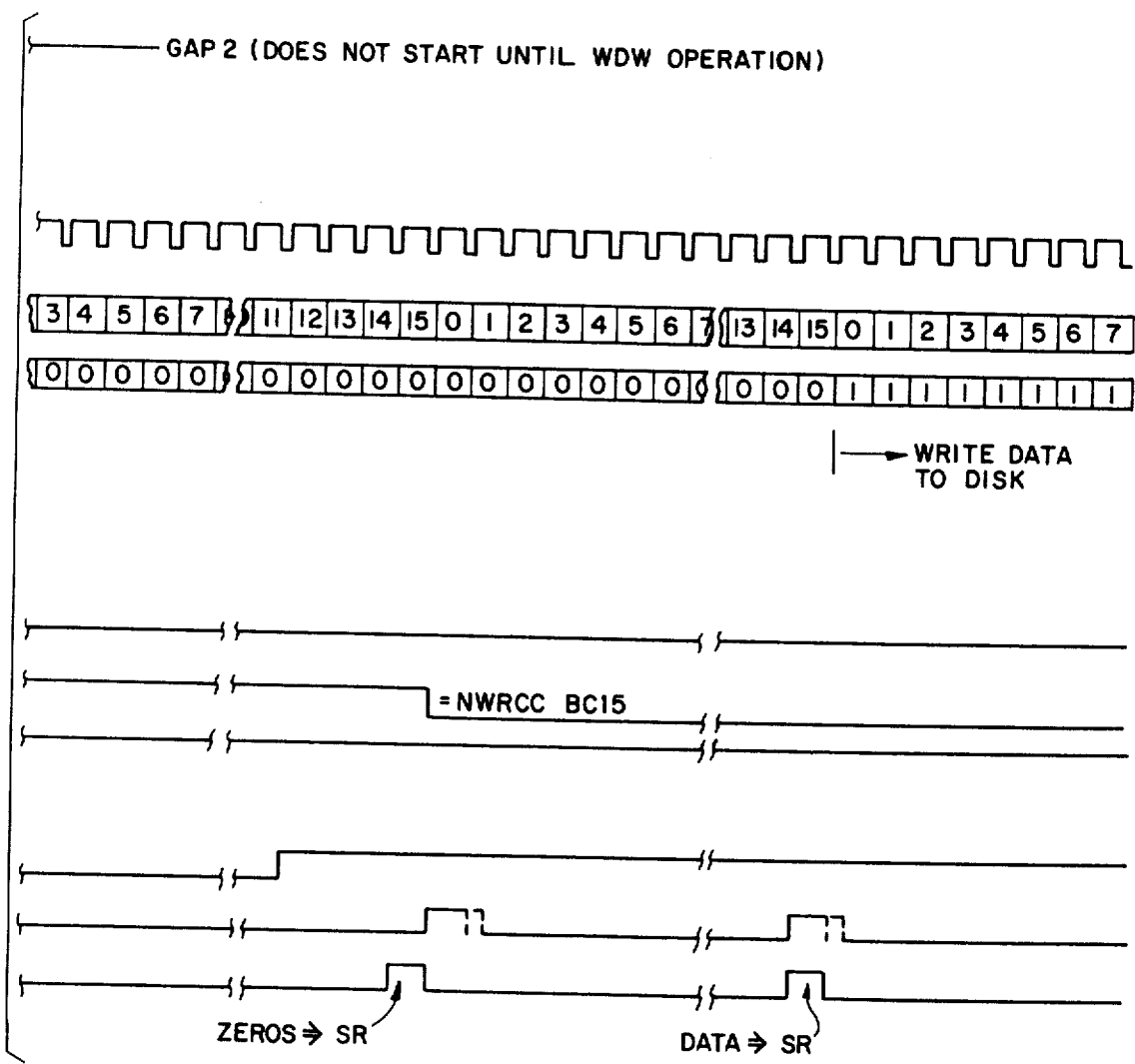

FIG. 29 describes the programming and logic flow necessary for formatting a single track. Timing for the Write Format operation is shown in FIGS. 30, 31 and 32.

The Write Format microinstruction sets write format decode output NWRF low which sets flip-flop WRFC at the next PHI clock, raising gates WRFWM and WFRH.

```
S/WRFC = NWRF
C/WRFC = PHIB3
WRFWM = WRFC WMODE
WRFH = WRFC WMODE + ...
```

The CDDC must now wait for the index pulse NINDEX. The 100 nanosecond one-shot LINDXP triggers on the leading edge of the index pulse and the fall of LINDXP triggers the 9.6 microsecond WDLY one-shot. Flip-Flop WRAMSB is set, the Write and Erase Gates are enabled, and the DATA Flip-Flop sets and is held true for the duration of WDLY One-Shot.

```
T/LINDXP = NINDEX
S/WRAMSB = WDLY
S/WRDEN = WRAMSB
S/DATA = WDLY
SREN = WRDEN
NWGATE = WMODE WRDEN
NERGATE = WMODE WRDEN
```

As long as WDLY One-Shot is true, ones are written on the Disk.

The Data-Ready Flip-Flop sets to request the first memory word via Fast Interrupt 2.

S/DRRDY = WRAMSB NWRDEN

Note that WRDEN is false until after WRAMSB has been set and is then set at the next clock pulse.

The Bit Counter starts its count after WDLY falls. At the bit count of 15, WSCR15 goes high to load the contents of the Output Buffer to the Shift Register.

WSCR15 = (TMODE + WRDEN) BC15 and the bits are shifted to the DATA Flip-Flop to be written on the Disk. As the last bit is shifted out of the SR Register at BC15 time, DRRDY Flip-Flop is again set to request the next memory word. This sequence is repeated until thirty-nine bytes of ones and four bytes of zeros are written on the Disk.

The timing for writing the address mark bytes and the sync byte is shown in FIG. 31.

The Address Counter and the Word Counter (in one's complement) are incremented each time the write fast interrupt is requested.

DMASEL1/2 = FIEN1 + FIEN2 + TESTMD
DMAADR

The final byte of zeros in the preamble and the first addrress mark byte (X'F2') are combined in a single word. This word is shifted out of the SR Register to the DATA flip-flop in the same manner as previously described. However, as the word is shifted from the Input Buffer Register to the SR Register, the PROM gate WADMK detects the presence of the byte X'F2'.

WADMK = WRAMSB WRFC $\overline{SRO0}$ SROL $\overline{SRO2}$ $\overline{SRO3}$

This is a unique combination of ones and zeros appearing in the four bit positions of the SR Register.

With WADMK true, Flip-Flop AMB1 sets at the next clock and remains true for the time required to shift the first addess mark byte to the DATA Flip-Flop. Flip-flop AMB2 is set for the next word which contains the second byte of the address mark.

```
S/AMB1 = WADMK
R/AMB1 = BC15
S/AMB2 = AMB1 BC15
R/AMB2 = NBC15
```

As the address mark byte is being gated to the DATA flip-flop, PROM Gate NWAMARK drops for two clock times inhibiting clocks from being written after the second and third bits of the X'F' character. At BC15 time of the sync word, NAMB2C15 resets flip-flop WRAMSB.

```
NAMB2C15  = AMB2 BC15
NWAMARK   = AMB1 BC8 BC4 BC2
          + AMB2 BC8 BC4 BC2
R/WRAMSB  = NAMB2C15
```

R/WRAMSB = NAMB2C15

The CDDC is now prepared to write the header. Refer to FIG. 32. The header is written on the Disk via fast interrupt requests in the same manner as the previous data. The timing diagram shows the timing for the cyclic check character and the beginning of Gap 2.

When the word Counter reaches a count of zero and the final word is written (last word of alternate address), flip-flops WCESDL and WCRC set for sixteen bit times.

```
S/WCESDL = WCEZ BC15 NWCRC NIODONE
R/WCESDL = BC15
S/WCRC = WCZ15 WRDEN
R/WCRC = NBC15
NWSBCRC = NWCRC NWSYNCB
```

During these sixteen bit times the contents of the CRC Register are gated to the DATA flip-flop via CR15.

S/DATA = WCRC CR15

At BC15 time of the CRC word, the Write Format microinstruction has been completed for this sector (up to Gap 2). Flip-flops WCEZDL and WCRC reset, IODONE sets the MUX I/O Interrupt Request Flip-flop MINTREQ. Flip-Flop WRAMSB sets in preparation for the following Write Data Word microinstruction. DATADLY triggers for 33 microseconds, and the fall of DATADLY triggers the 9.3 microsecond one-shot WDLY.

```
R/WCESDL = BC15
R/WCRC = NBC15
S/IODONE = WCRC BC15
S/MINDTREQ = IODONE + ...
S/WRAMSB = WCRC WRFC BC15
```

Figure 34A:
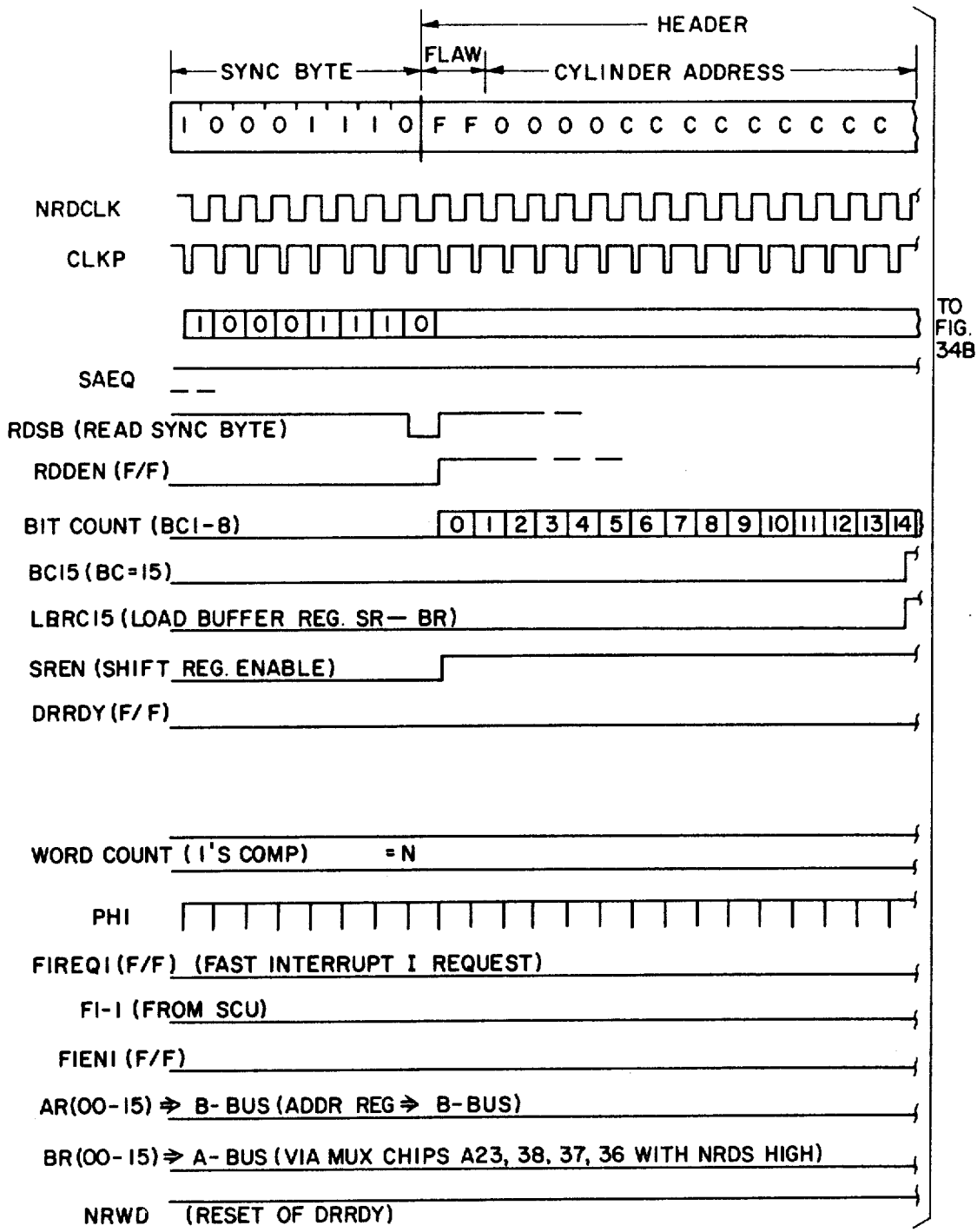
Figure 34B:
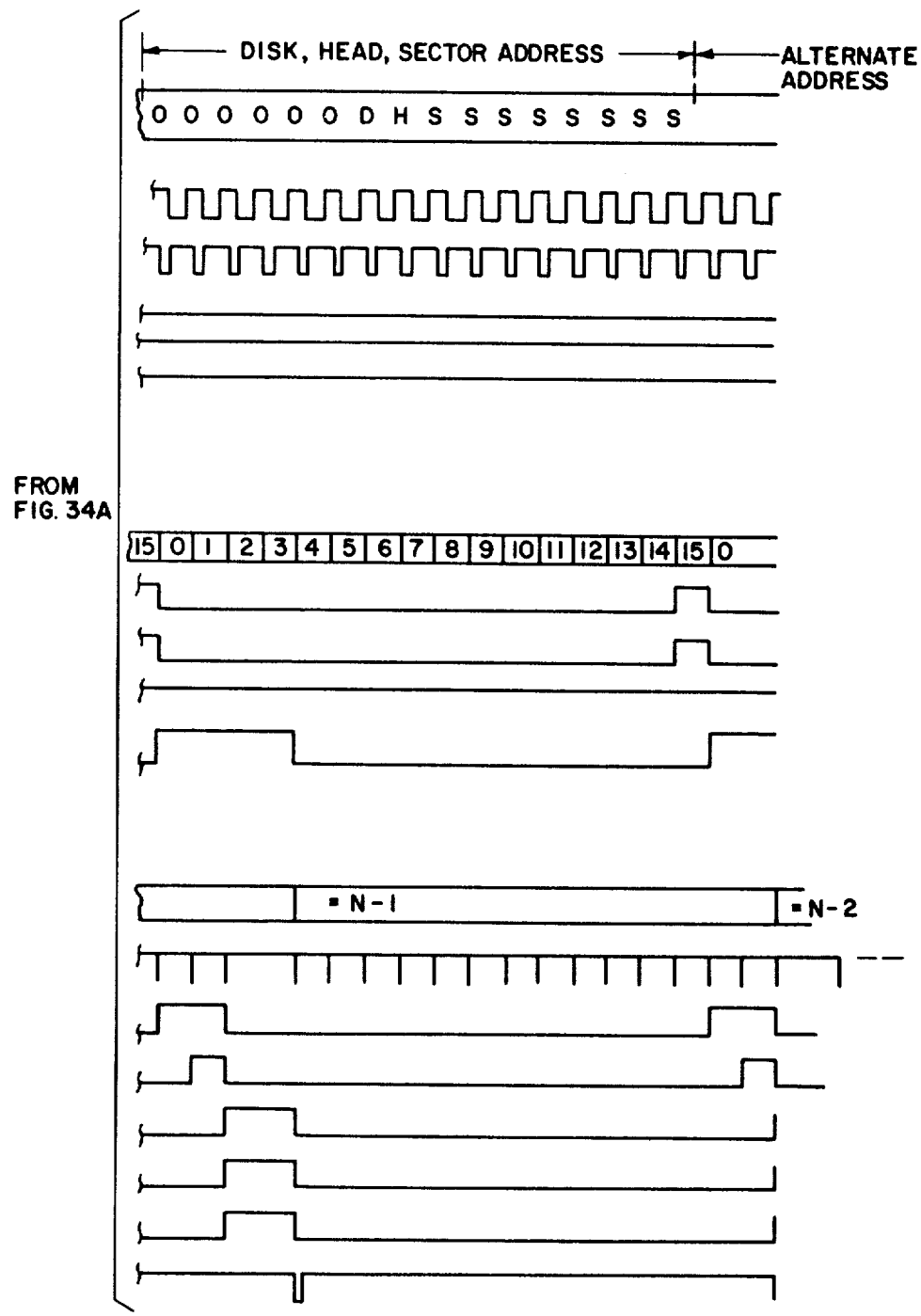
Figures 35A, 35B:
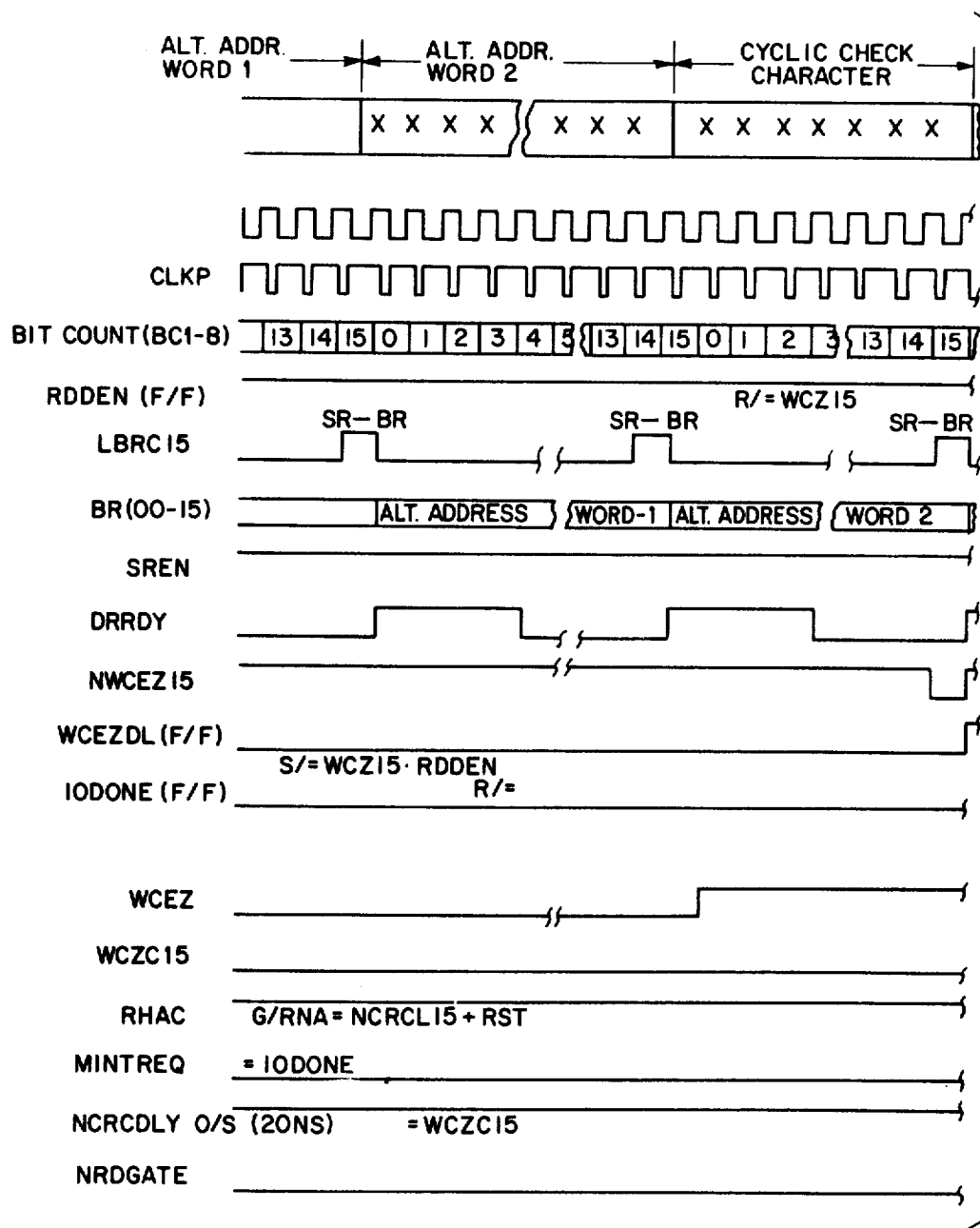
Figure 35B:
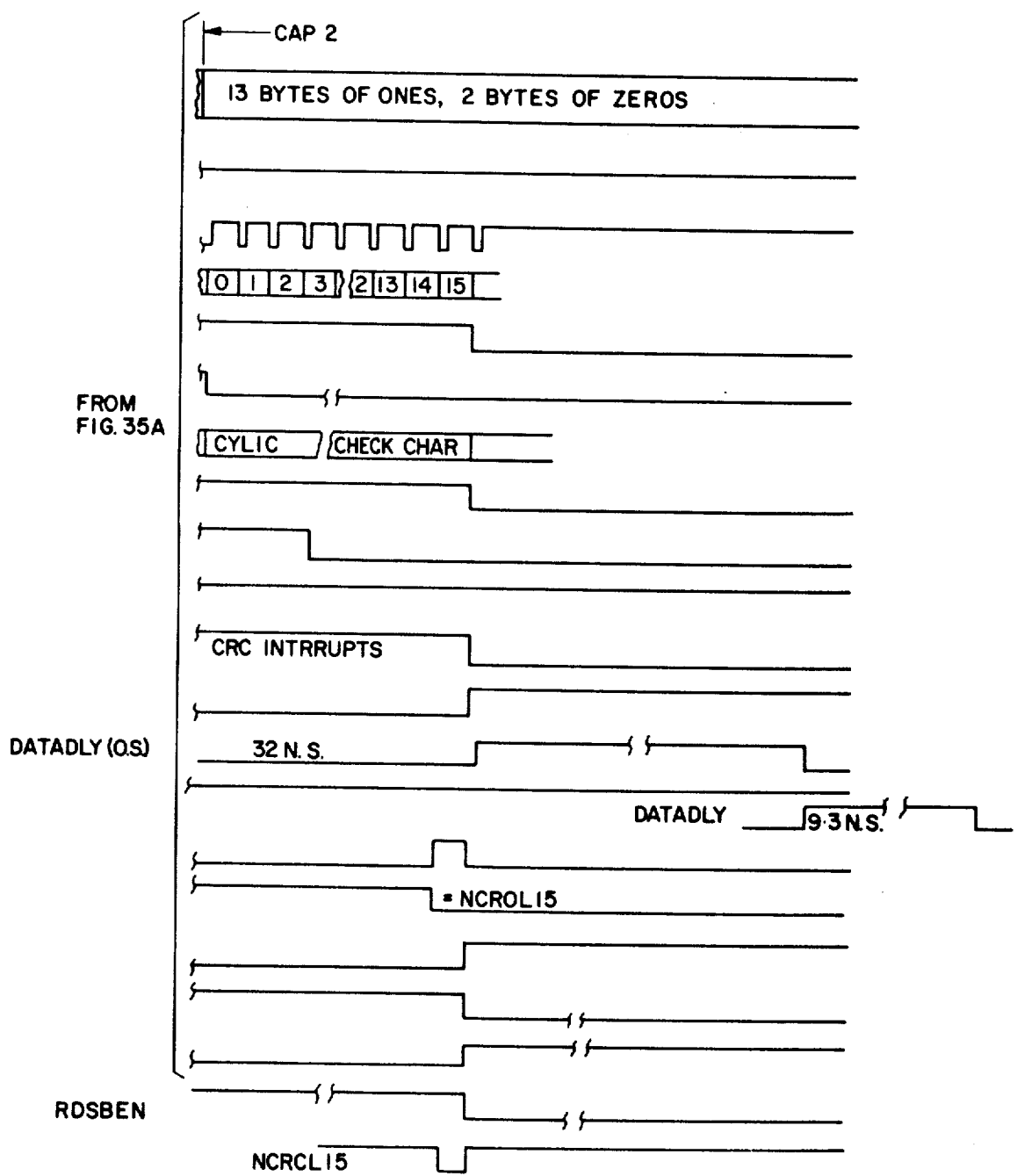

Before the Read Header Address microinstruction can be executed certain conditions must first be established. For example, in FIGS. 33 through 35, which show the timing for a RHA instruction, it is assumed that prior to starting the RHA operation the Device, Cylinder and Head have been selected, that seek has been completed, that the Read fast interrupt and the multiplexed I/O interrupt have been armed, and that the proper sector address has been written into the Address Register. Read Mode (RMODE) must also be true.

Figure 36A:
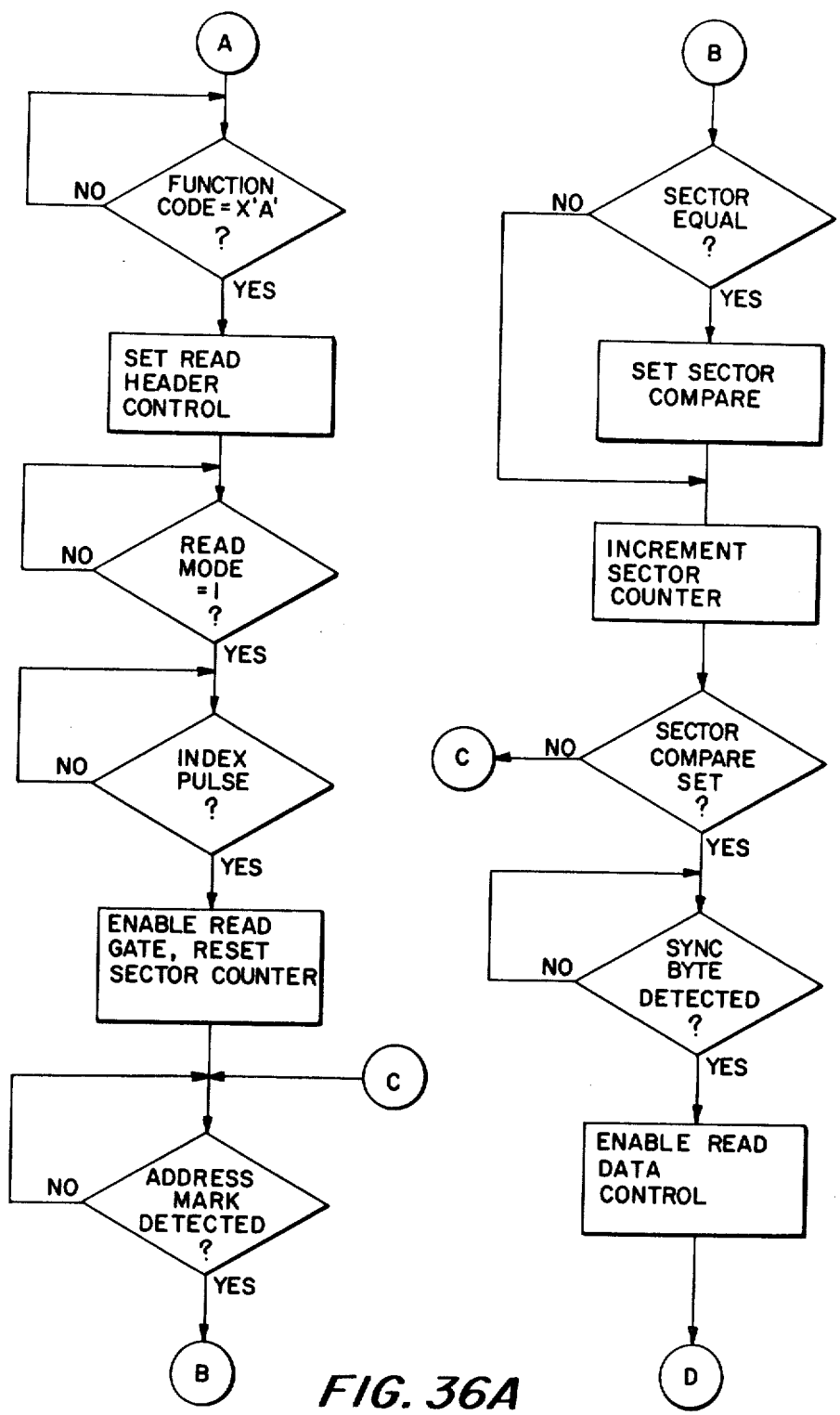
FIG. 36A through 36B is a flow chart describing the Read Header Address operation.
Figure 36B:
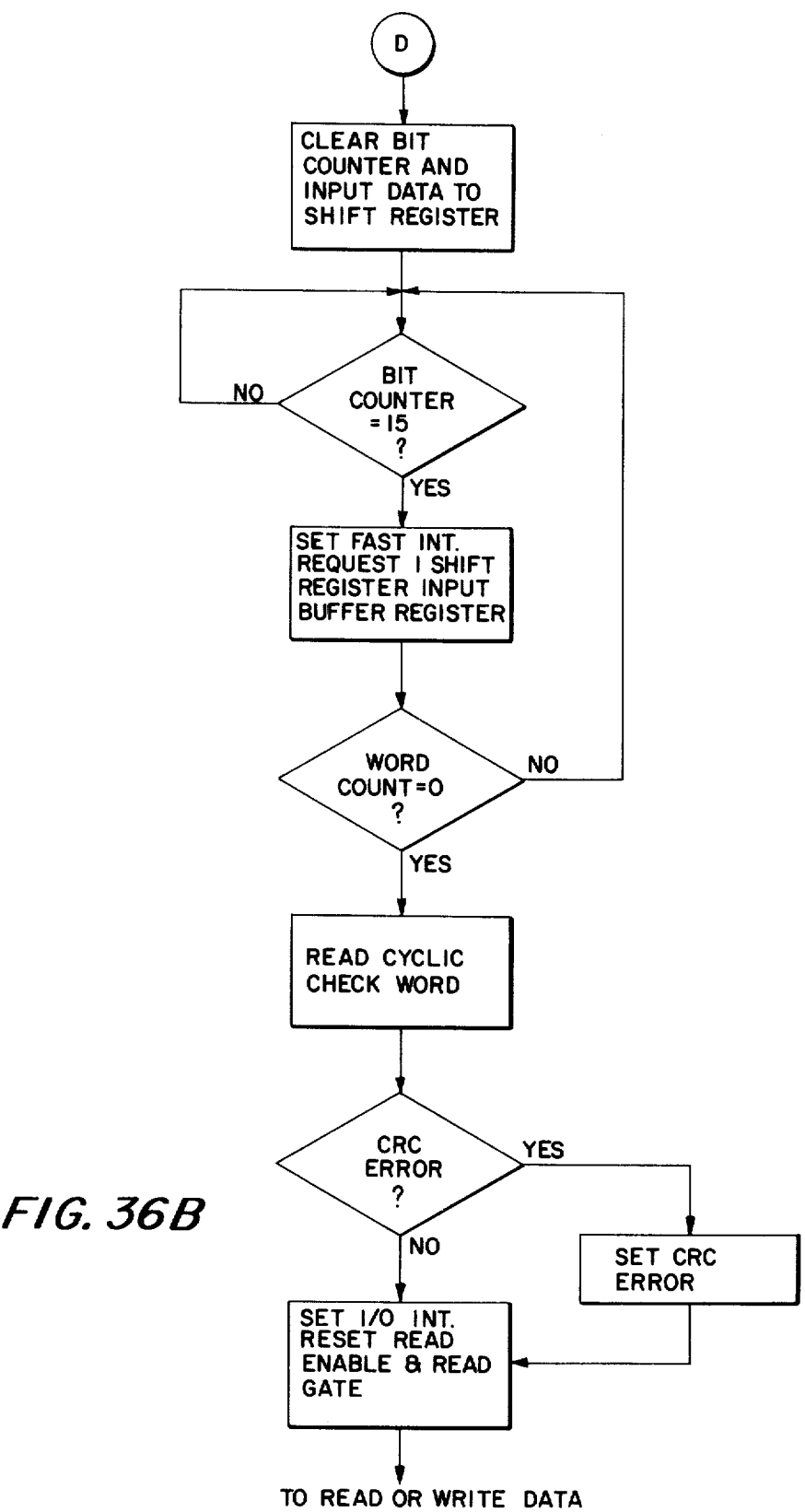
Figure 37A:
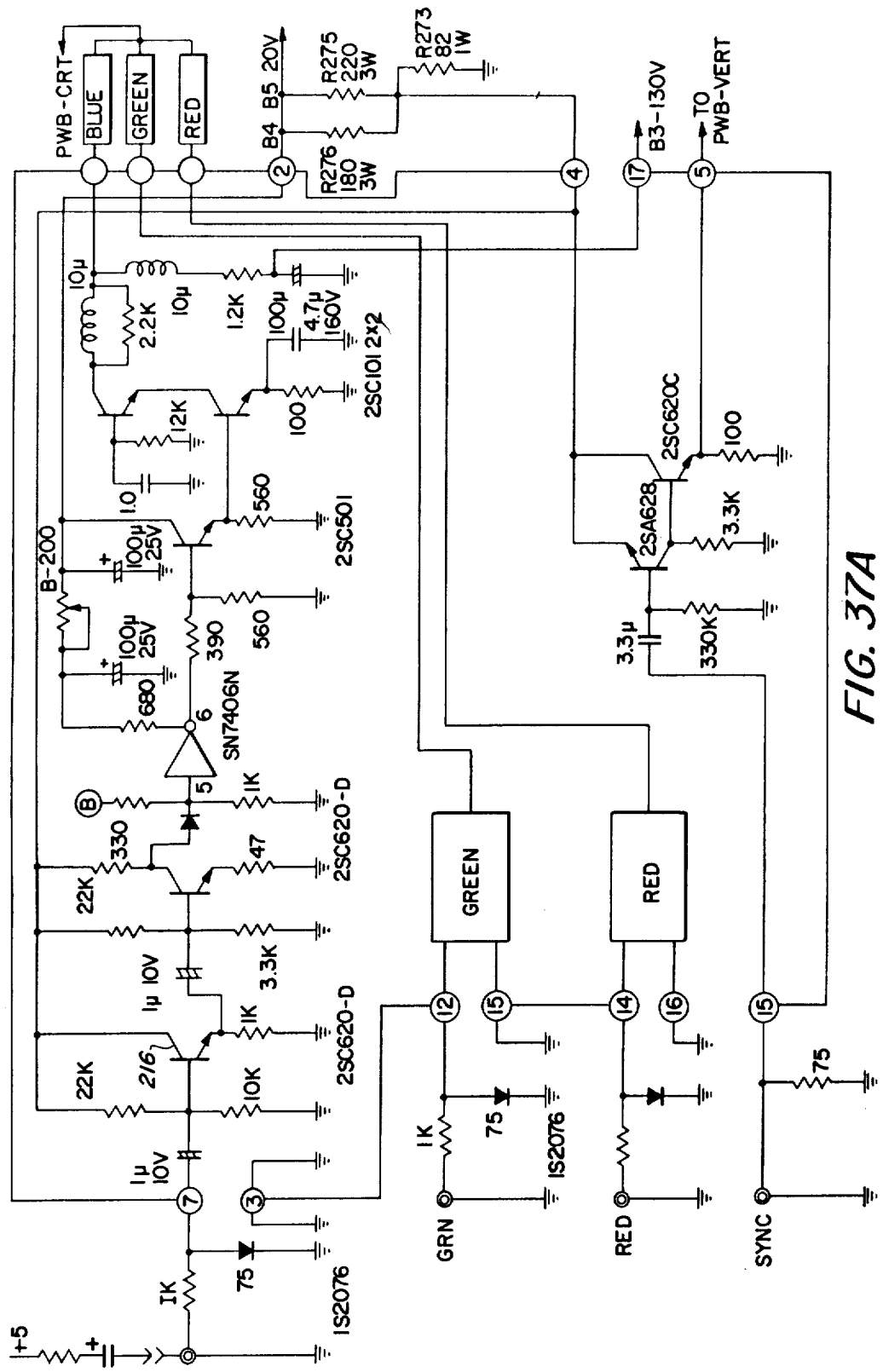
FIG. 37A through 37N is a schematic of the Display Monitor.
Figure 37B:
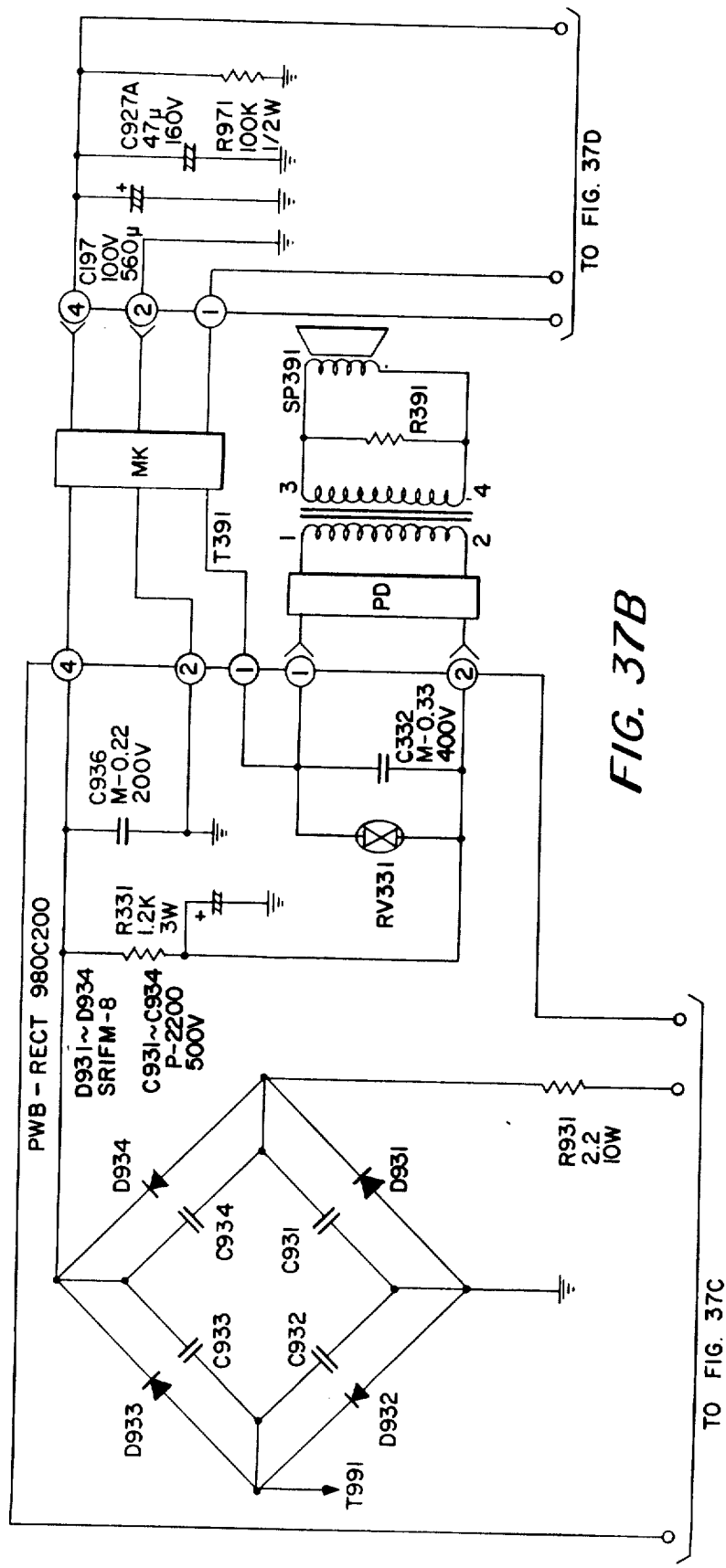
Figure 37C:
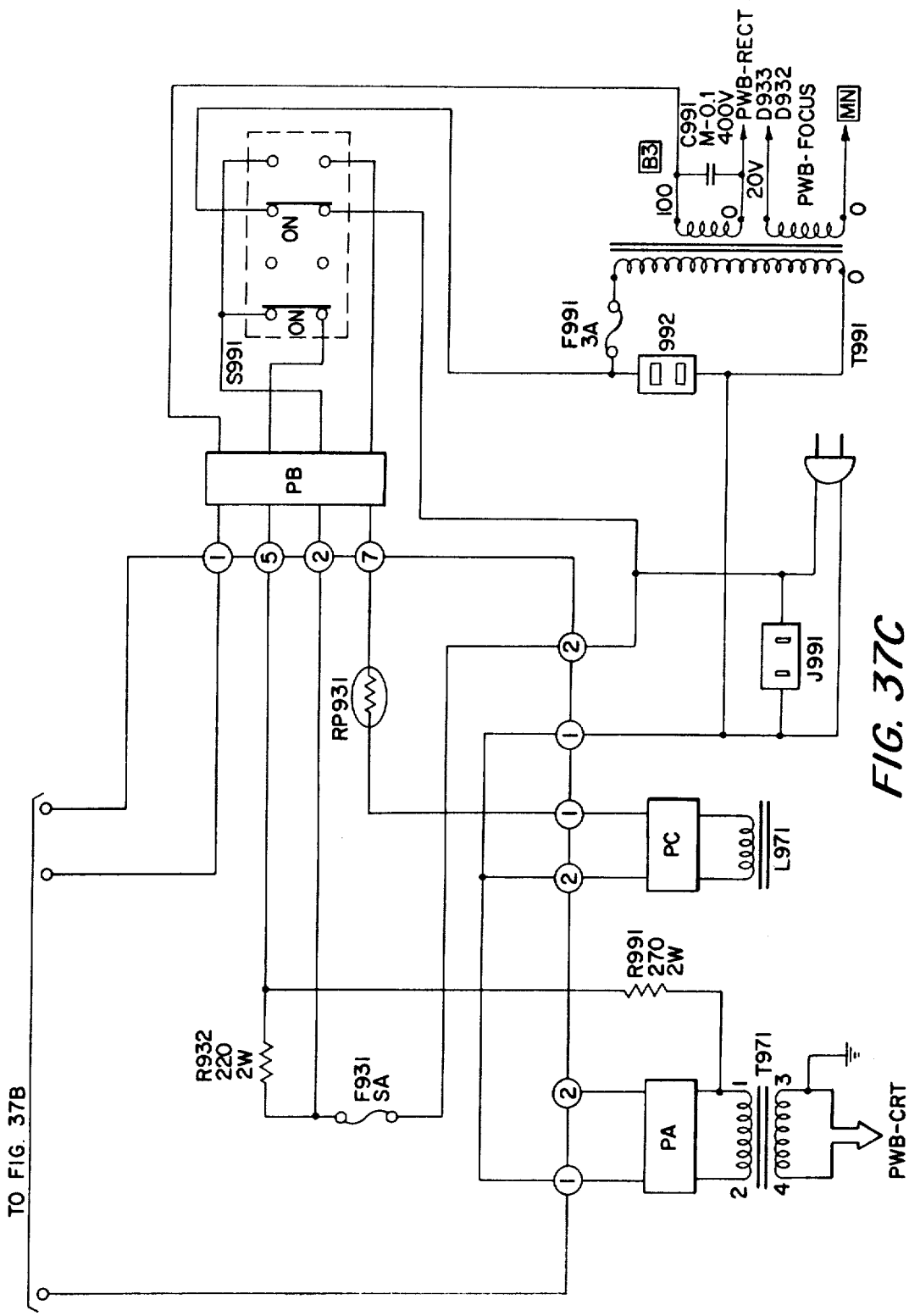
Figure 37D:
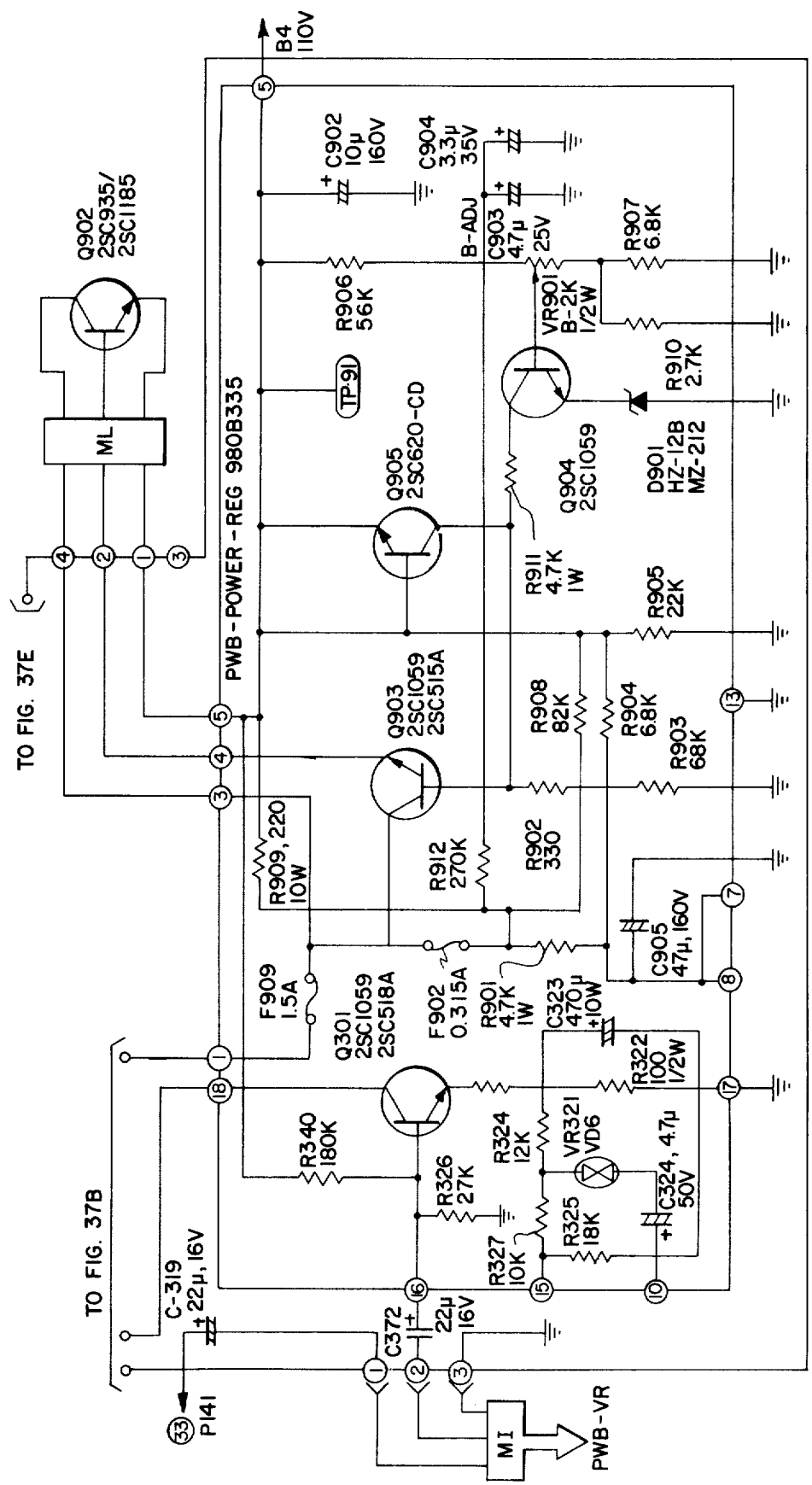
Figure 37E:
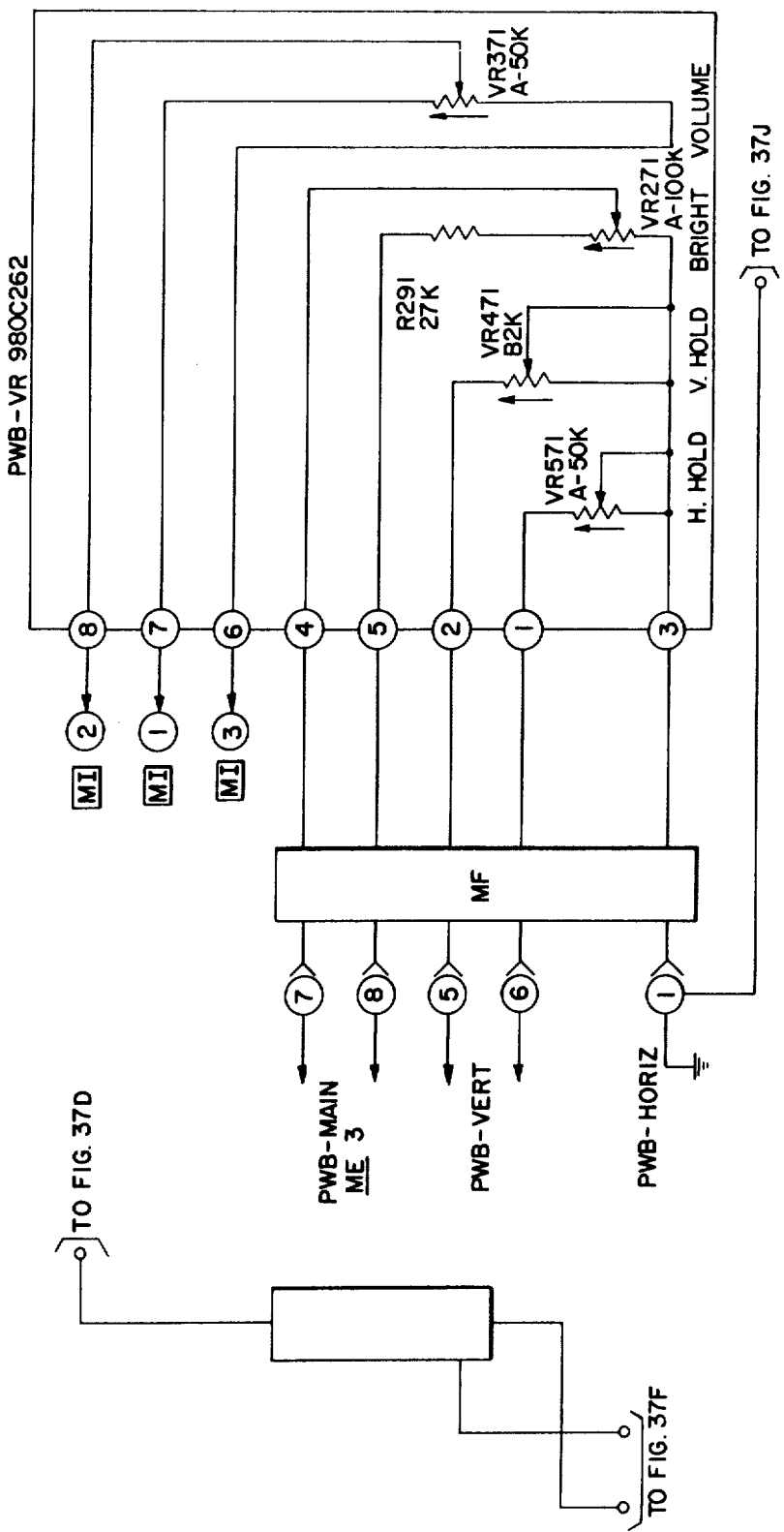
Figure 37F:
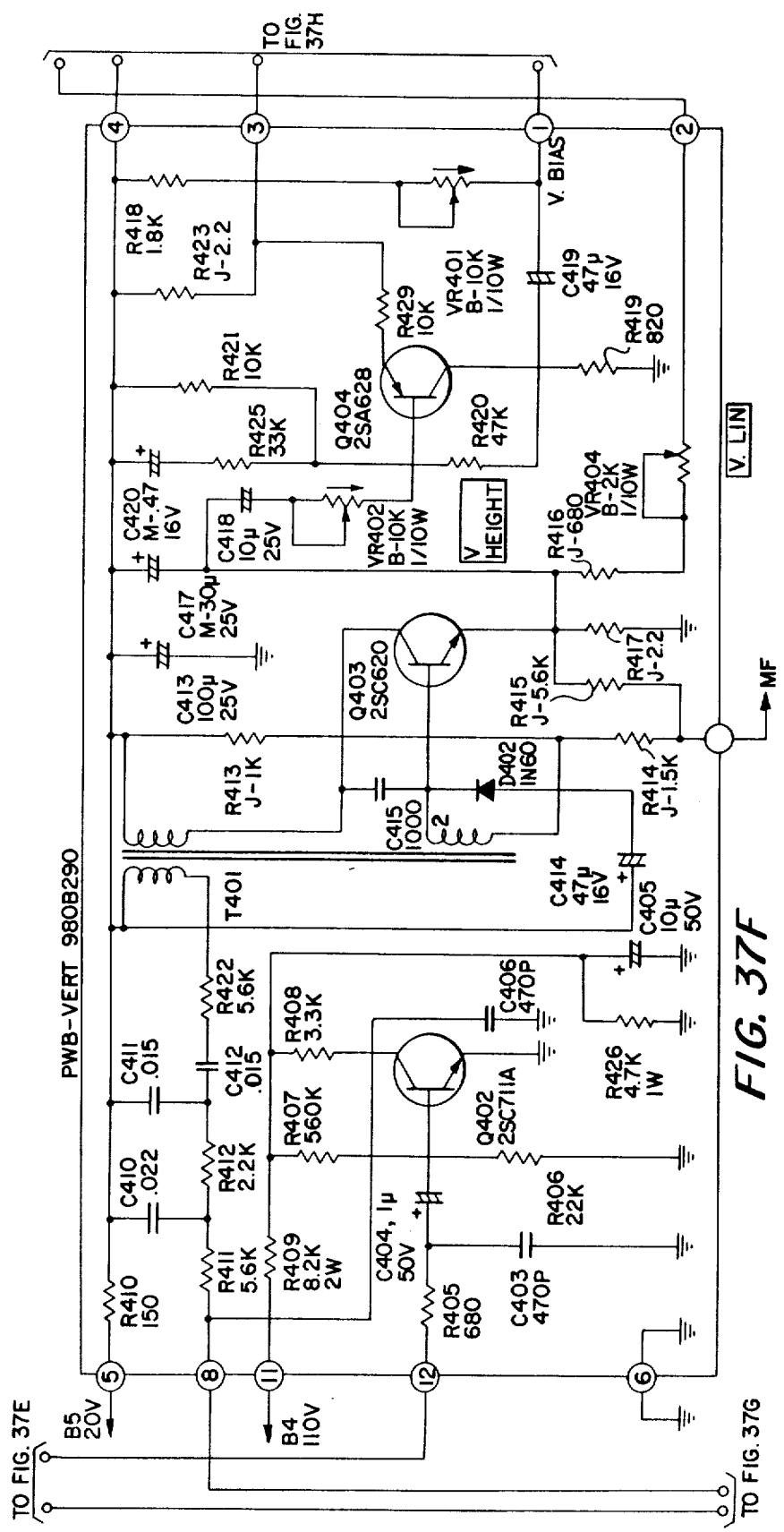
Figure 37G:
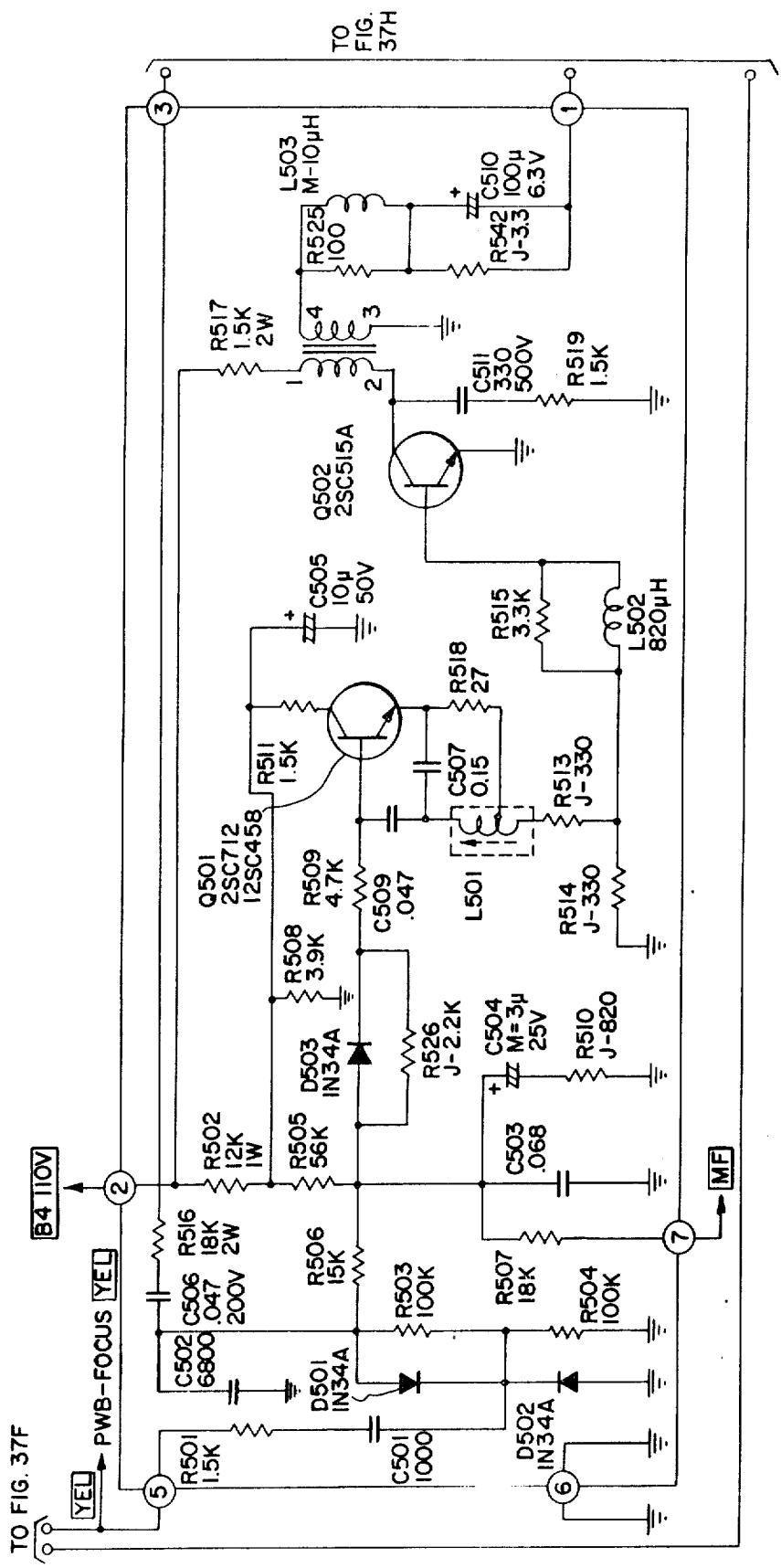
Figure 37H:
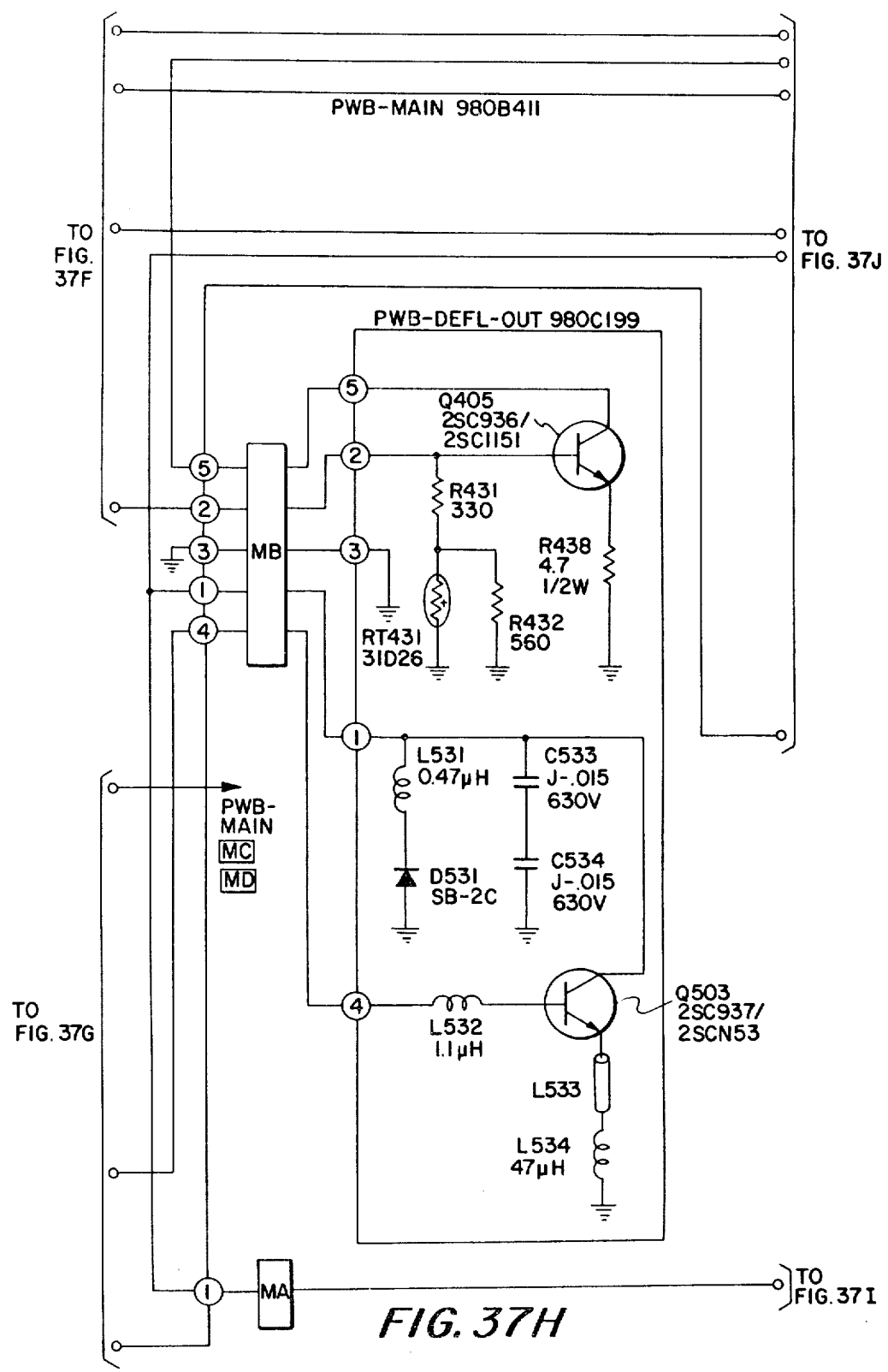
Figure 37I:
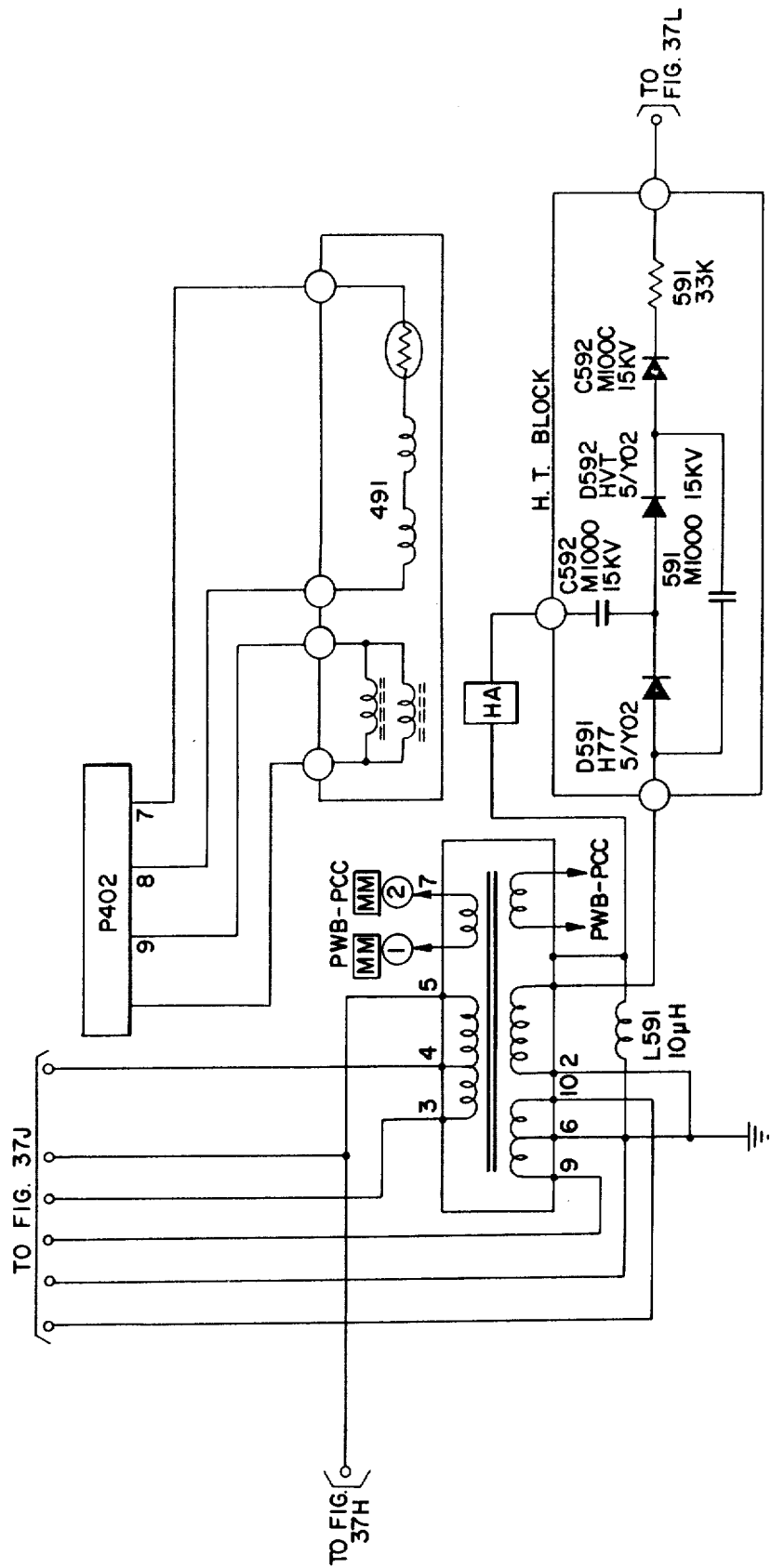
Figure 37J:
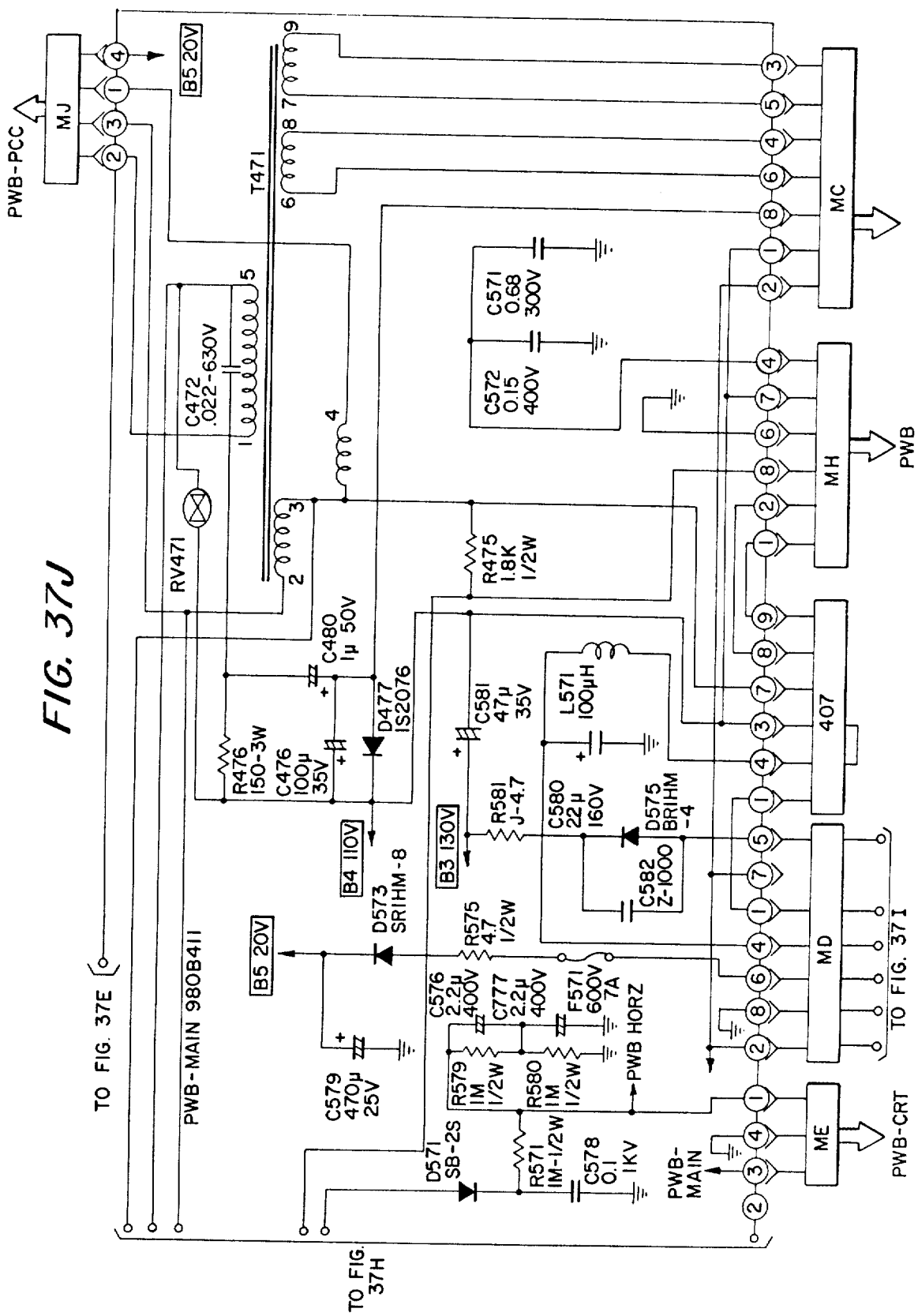
Figure 37K:
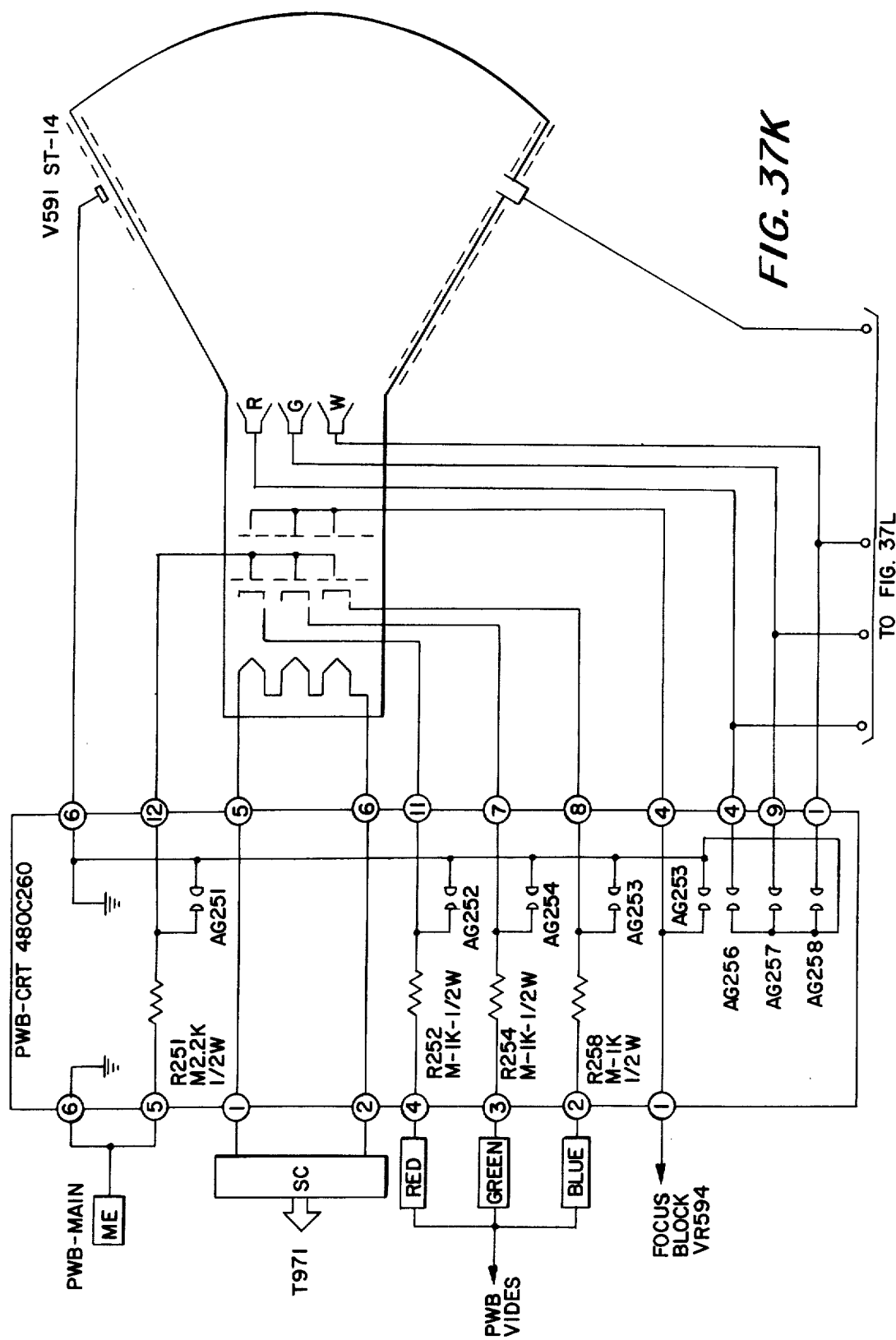
Figure 37M:
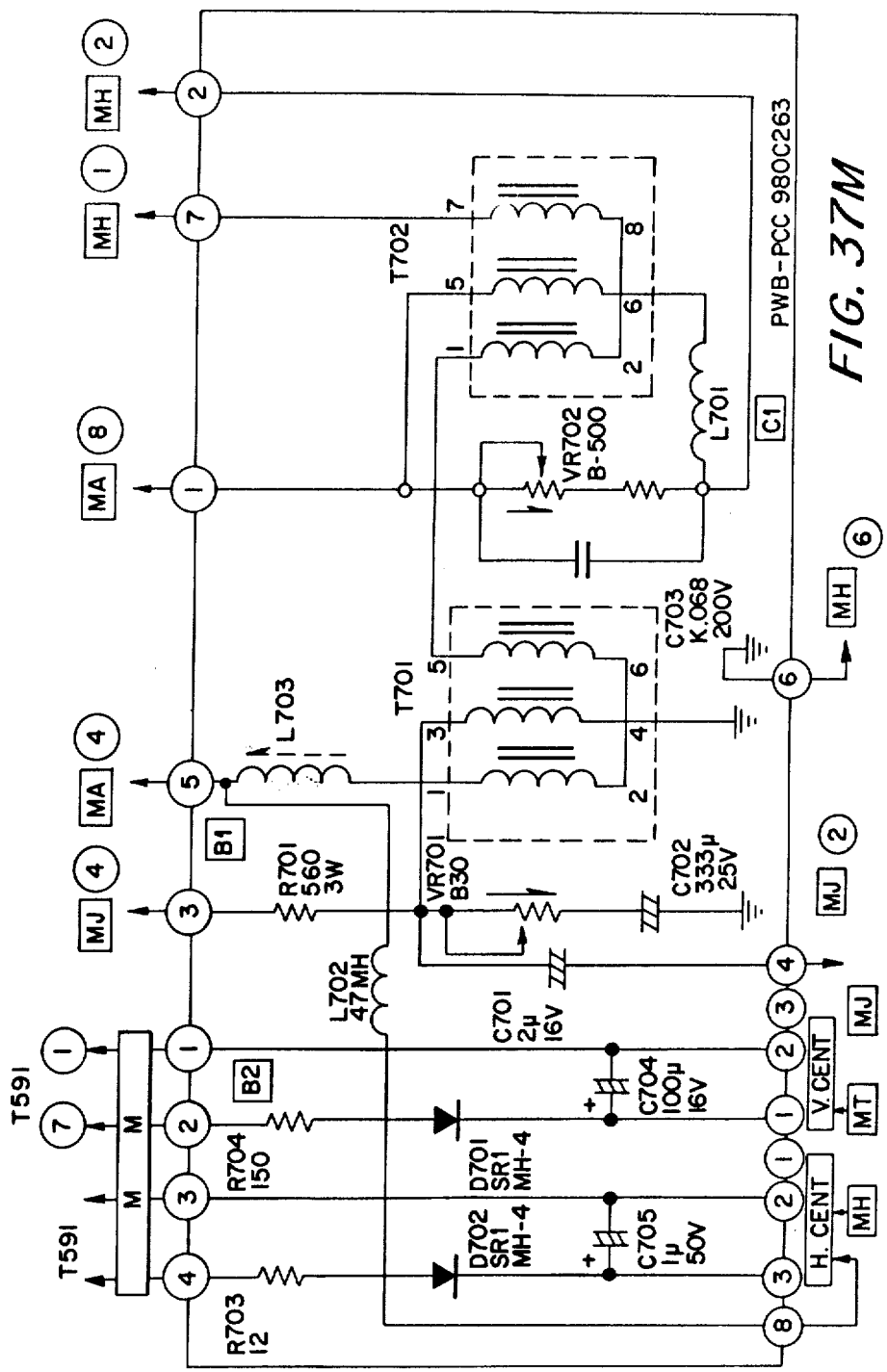
Figure 37N:
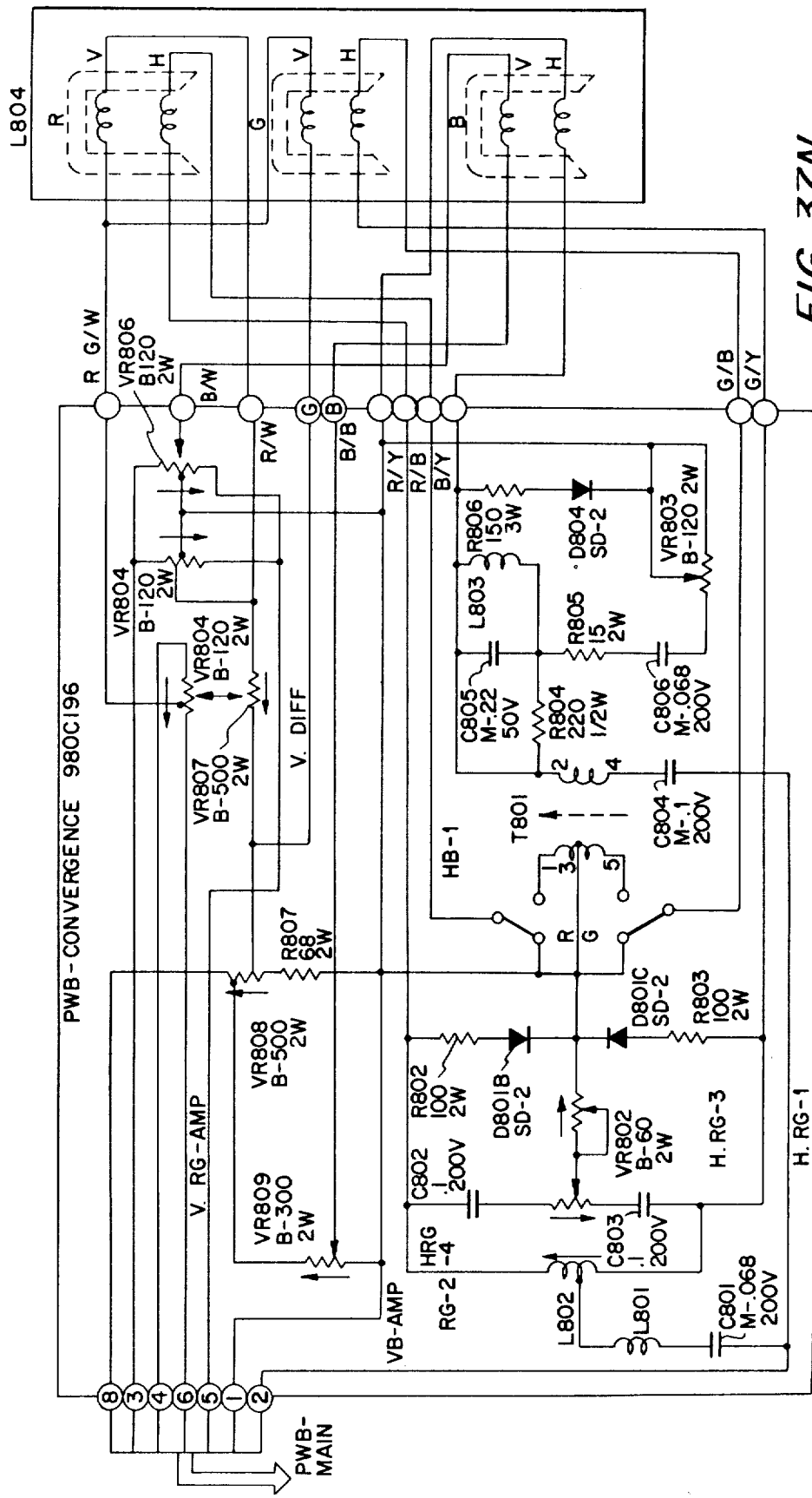

FIG. 36 is a flow chart describing the Read Header Address operation.

As the Read Header Address microinstruction is initiated, FLIP-flop RHAC is set to prepare for the operation.

```
/RHAC = NRHA
/RHAC = PHIB3
```

With RHAC true, the Controller waits until the falling edge of the forty microsecond index pulse is detected. The leading and trailing edges of the index pulse are bracketed by the 100 nanosecond one-shots, LINDXP and TINDXP. The fall of TINDXP sets flip-flop IMSYNC.

```
T/LINDXP = INDEX
T/TINDXP = NINDEX
s/IMSYNC = WFRH
c/IMSYNC = NTINDXP
```

As Gap 1 is passing by the Disk Read Head, no clock pulses are fed to the controller. The first clock pulse appears at the first bit of the Address Mark. This clock triggers One-Shot AMDET. AMDET fires for 950 nanoseconds but is retriggered each time another clock appears. Thus, as long as clocks are being read the output of AMDET is always high. When the two missing clocks occur during the first and second bytes of the Address Mark, AMDET drops, for approximately 350 nanoseconds until it is again retrigered. Each time AMDET drops, one-shot ADMCLK triggers for 100 nanoseconds. ADMCLK is used to clock flip-flop RDAMK, first setting it and then resetting it. When both ADMCLK and RDAMK are high, the comparison between the contents of the Sector Counter and the contents of the Sector Address Register is made. If they are not equal, the output of the Sector Compare Register, SCMP2, goes low. If they are equal, SCMP2 remains high and Flip-Flop SAEQ (Sector Equal) is set.

```
T/AMDET = RDCLK
T/ADMACLK = NAMKDET
S/RDAMK = IMSYNC
C/RDAMK = NADMCLK
S/SAFQ = SCMP2
C/SAEQ = NADMCLK
SCMP2 = SCMP1 (DR12-DR15 = SC8-SC1)
SCMP1 = RDAMK (DR08-DR11 = SC12-SC16)
```

At the time DRAMK and ADMCLK are both true, the Sector Counter clock, NSCCLK, increments the Sector Counter by one. In the example shown in FIG. 33, the Sector Counter is now equal to a count of one. Whenever the comparison is not made, the Sector Delay Timer SECDLY fires and remains high for 945 microseconds. As long as SECDLY is high, the Read Gate NRDGATE is de-activated and no clocks or data can be read from the Disk. SECDLY falls in Gap 3 of the following sector.

```
T/SECDLY = NSECEQ
NSECEQ = RDAMK ADMCLK NSCMP2
NSCCLK = RDAMK ADMCLK
NRDGATE = SECDLY
RDSBEN = SAEQ NWCEZ
```

Figure 33A:
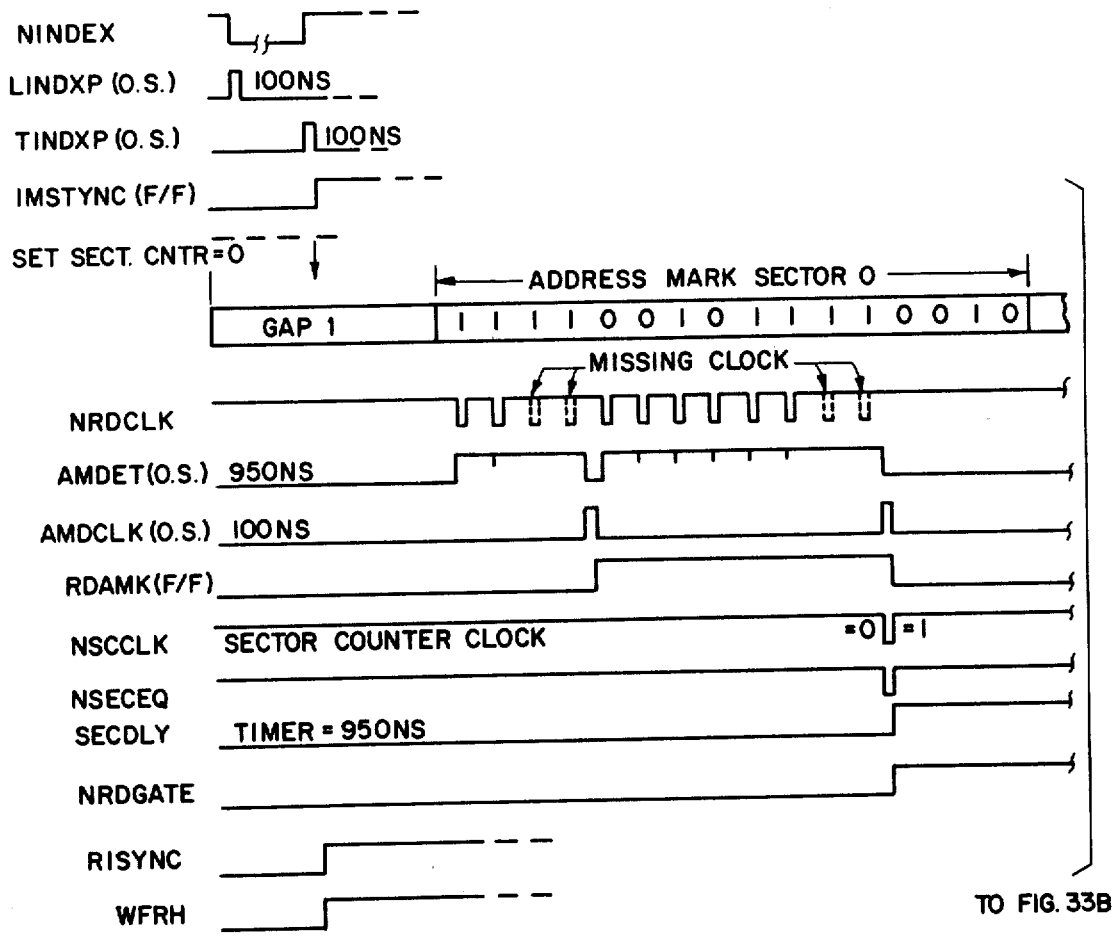
FIGS. 33A through 33B, 34, and 35A through 35B show the timing for a Read Header Address Microinstruction.
Figure 33B:
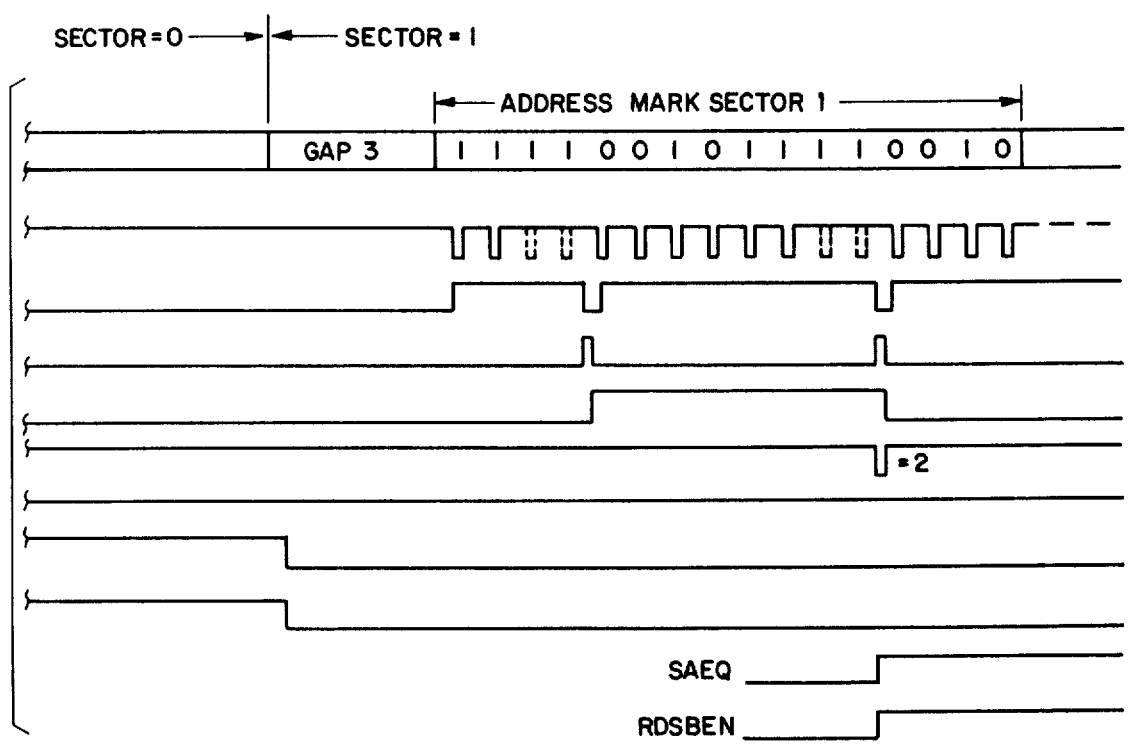

In the example shown in FIG. 33, the first clock of the Address Mark again triggers the AMDET One-Shot and the timing for sector one is the same as for sector 0. However, when the comparison of the sector address is made, NSECEQ does not drop, indicating that the contents of the Sector Counter and the contents of the Sector Address Register are equal, and flip-flop SAEQ is set. The output of Gate RDSBEN also goes high to enable reading the sync byte.

Timing for reading the sync byte and the header information is shown in FIG. 33. The sync byte contains a hexadecimal X'8E' and is detected at the end of the data shift by NRDSB term from the PROM (A35) which sets flip-flop RDDEN. Gate SREN goes high with RDDEN.

```
NRDSB = $\overline{RDDEN}$ $\overline{SR00}$ $\overline{SR01}$ $\overline{SR02}$ $\overline{SR03}$
  (PROM equation)
S/RDDEN = NRDSB
C/RDDEN = NCLKP2
```

The PROM Gate NRDSB resets the Bit Counter to zero and when SREN is true, counts the Counter up each bit time. The sixteenth count of the Bit Counter is marked by BC15 high. SREN also enables the Shift Register, allowing data to enter serially via SRD.

The first two bytes of the header are read into the Shift Register. At bit count 16 (BC15) time the Load Buffer Register Gate LBRC15 goes high transferring the data from the Shift Register to the Input Buffer Register in parallel, and the Data Ready Flip-Flop DRRDY is set.

```
LBRC15 = RDDEN BC15 NTMODE
```

DRRDY sets the fast interrupt flip-flop FIREQ1. The fast interrupt requires approximately 700 nanoseconds to complete. In the meantime, the next byte from the Disk is being read into the Shift Register. DRRDY Flip-Flop is reset at the end of the interrupt operation by NRWD. The Word Counter is incremented (it contains the one's complement of the word count) at the end of the interrupt by DMASEL . PHIB1.

```
S/DRRDY = NWZC15 SREN
R/DRRDY = NRWD
C/DRRDY = NCLKP3
S/FIREQ1 = DRRDY ARDINT NFI-1
C/FIREQ1 = PHIB3
```

After the four words of the header have been read and transferred to the SCU via the fast interrupts, the Word Counter reaches a count of zero. With WCEZ high (Word Count equals Zero) flip-flop WCEZDL sets at BC15 time and remains true for the sixteen bit times required to read the cyclic check code and determines if a read error has occurred. If a read error is detected the CRCERR Multiplexed Interrupt Error Flip-Flop will be set during the time when WCEZDL is high. If no cyclic code check error is detected, the IODONE Flip-Flop is set indicating the end of the operation. Also at this time, the one-shot CRCDLY is triggered for 20 microseconds, and the Read Gate is disabled (NRDGATE goes high).

```
S/CRCERR = WCEZDL RDDEN CR15
E/CRCERR = NCSRST
C/CRCERR = NCLKP3
S/IODONE = WCZC15 RDDEN
E/IODONE = NCSRST
T/CRCDLY = WCZC15 CLKP
RDDLY = NCRCDLY
NRDGATE = RDDLY
```

At the end of the Read Header operation Flip-Flop RDDEN and the SREN Gate go low.

```
R/RDDEN = WCZC15
C/RDDEN = NCLKP2
SREN = RDDEN
```

The Command Decoder drops NWAR when a Write Address Register microinstruction is executed. With NWAR low, the sixteen bits on the C-Bus are gated to the Address Counter Register, AR00 through AR15.

```
AR00 = NWAR CB00
AR01 = NWAR CB01
AR02 = NWAR CB02
AR03 = NWAR CB03
AR04 = NWAR CB04
AR05 = NWAR CB05
AR06 = NWAR CB06
```

```
AR07 = NWAR CB07
AR08 = NWAR CB08
AR09 = NWAR CB09
AR10 = NWAR CB10
AR11 = NWAR CB11
AR12 = NWAR CB12
AR13 = NWAR CB13
AR14 = NWAR CB14
AR15 = NWAR CB15
```

When the Read Control Byte microinstruction is executed, the CDDC drops NENAB1 and NRWC remains high. With NENAB1 low and NRWC high, the B inputs of the A-Bus Multiplexer are enabled and the contents of the control byte are gated to the left byte of the A-Bus.

```
A00 = (NENAB1 NRWC) WMODE
A01 = (       "    ) RMODE
A02 = (       "    ) AWDINT
A03 = (       "    ) ARDINT
A04 = (       "    ) AMIOINT
A05 = (       "    ) TMODE
A06 = (       "    ) GND
A07 = (NENAB1 NRWC) GND
```

The logic for the Read Control Byte microinstruction is identical to that of the Read Sector Counter microinstruction. Therefore, during the execution of this command the contents of the Sector Counter are also transferred to the right byte of the A-Bus.

The command decoder recognizes the Write Control Word microinstruction by lowering NWCW. The output of the Command Decoder is then inverted to become WCW and is applied to the Mode Control input pins, S0 and S1, of the Control Word Register. The Register holds the Read, Write and Test mode bits, Read and Write fast interrupt arm/disarm bits, and the I/O interrupt arm/disarm control bit. The C-Bus bits, CB00 through CB05, are applied to the inputs of the Control Register and are clocked by SCU clock PHIB2. Bit positions 6 and 7 of the Control Word Register are not used.

```
WMODE = WCW CB00
RMODE = WCW CB01
AWDINT = WCW CB02
ARDINT = WCW CB03
AMIOINT = CB04
TMODE = WCW CB05
```

NWCW low also raises WDR which is gated with BYTESEL-R to raise WDRRB. In order for this to happen, the A-Bus control field must be either a X'0' or a X'2'.

WDRRB is used to gate the sector address (bits 8–15) from the C-Bus to the right byte of the output Buffer Register.

```
DR08 = WDRRB CB08
DR09 = WDRRB CB09
DR10 = WDRRB CB10
DR11 = WDRRB CB11
DR12 = WDRRB CB12
DR13 = WDRRB CB13
DR14 = WDRRB CB14
DR14 = WDRRB CB15
```

When the Clear Status/Interrupts microinstruction is executed, the Command Decoder in the CDDC drops NSCI. With NCSI low, NCSRST drops for 100 nanoseconds.

```
NCSRST = CSI NPHI
CSI = NCSI
```

When NCSRST drops, the Attention Flip-Flops are reset and the write check, CRC error, sector error and the I/O done Flip-Flops are also reset. NCSI also resets the Multiplexed I/O Interrupt Request Flip-Flop.

```
E/ATTN1 = NCSRST
E/ATTN2 = NCSRST
E/ATTN3 = NCSRST
E/ATTN4 = NCSRST
E/CRCERR = NCSRST
E/SECTERR = NCSRST
E/IODONE = NCSRST
R/MINTREQ = NSCI
C/MINTREQ = PHIB3
```

When the Write Cylinder Address and Seek microinstruction is executed, the Command Decoder in the CDDC drops NWCA. With NWCA low, the Track Enable Flip-Flop TAEN is set.

```
S/TAEN = NWCA
C/TAEN = PHIB2
```

When TAEN is true, the Interface Output Gates, NTA256 through NTA1, are enabled.

The Output Buffer DR07 through DR15 receives the cylinder address from the C-Bus.

```
DR07 = (WDRLB) CB07
DR08 = (WDRRB) CB08
DR09 = (") CB09   DR10 = (WDRRB) CB10
DR11 = (") CB11
DR12 = (") CB12
DR13 = (") CB13
DR14 = (") CB14
DR15 = (") CB15
WDRLB = BYTESEL-L WDR
WDRRB = BYTESEL-R WDR
```

```
DR10   = (WDRRB) CB10
DR11   = (   "  ) CB11
DR12   = (   "  ) CB12
DR13   = (   "  ) CB13
DR14   = (   "  ) CB14
DR15   = (   "  ) CB15
WDRLB  = BYTESEL-L WDR
WDRRB  = BYTESEL-R WDR
WDR    = NWDR
       = ...
NWDR   = NWCA
```

NWDR = NWCA

The Output Buffer is clocked by PHIB2.

The most-significant address bit, DR07, is used only for the Model 44 Disk Unit.

The strobe pulse to the Disk Unit, STRB, is generated by STRBEN going high. At the rising edge of PHIB2, the Strobe Delay One-Shot fires for 150 nanoseconds.

```
STRBEN = NWCA
T/STRBD = STRBEN PHIB2
```

When STRBD falls, the Strobe One-Shot STRB fires and remains high for 1.2 microseconds to strobe the track address data to the Disk Unit.

```
T/STRB = STRBD
```

The strobe interface signal NSTROBE is gated by STRB and RESTA.

```
NSTROBE = STRB RESTA
RESTA   = NTAEN
        + ...
```

While Flip-Flop TAEN is true, the cylinder address in the Output Buffer is gated to the interface lines NTA256 through NTA1.

```
NTA256 = TAEN DR07
NTA128 = TAEN DR08
NTA64  = TAEN DR09
NTA32  = TAEN DR10
NTA16  = TAEN DR11
NTA8   = TAEN DR12
NTA4   = TAEN DR13
NTA2   = TAEN DR14
NTA1   = TAEN DR15
```

When the STRB One-Shot falls, flip-flop TAEN resets at the next SCU clock.

R/TAEN = NSTRB
C/TAEN = PHIB2

Strobe timing for this operation is the same as that for the Write Select Byte microinstruction. See FIG. 28.

The CDDC used in the preferred embodiment has been explained in detail hereinabove, but it is to be understood that any equivalent Disk Drive, System Control Unit and Disk Controller could have been used to implement this Transcriber System.

The Display Monitor is a color T.V. monitor used for displaying the text for editing and for displaying various system operation messages to the operator.

Figure 38:
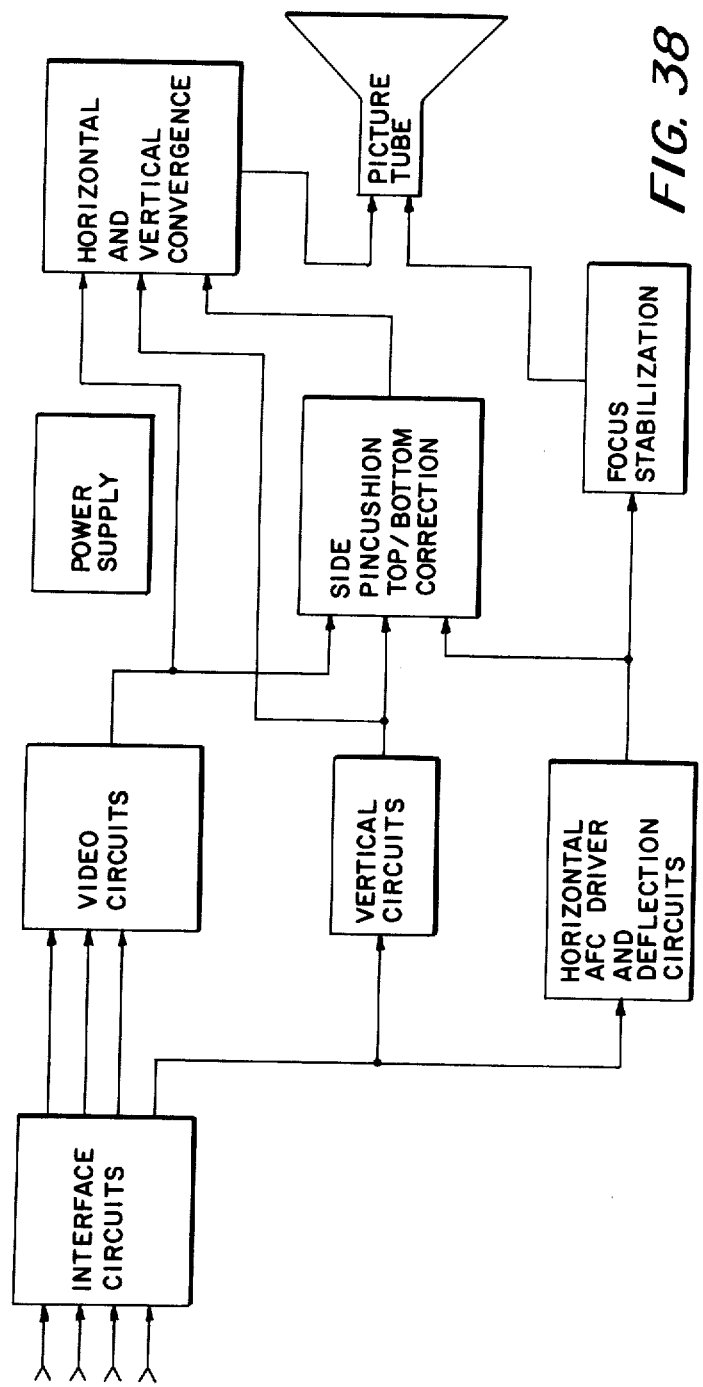
FIG. 38 is a block diagram of the Display Monitor.
Figure 39:
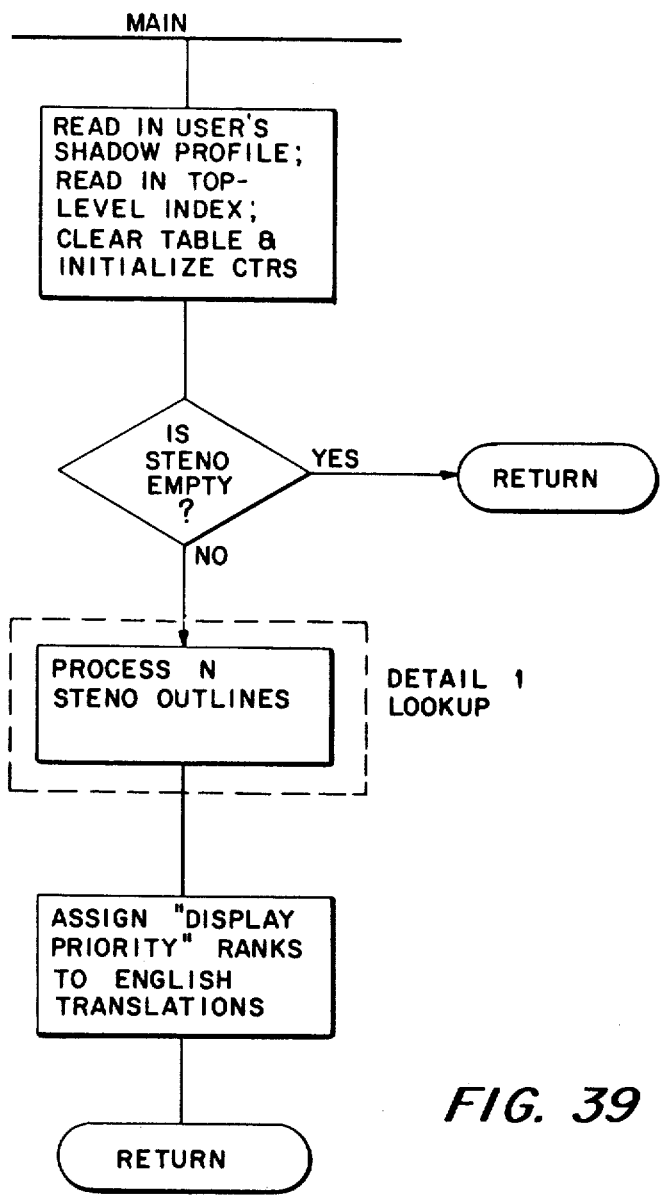
FIGS. 39 through 47 are flow charts of the Translator Module.
Figure 40:
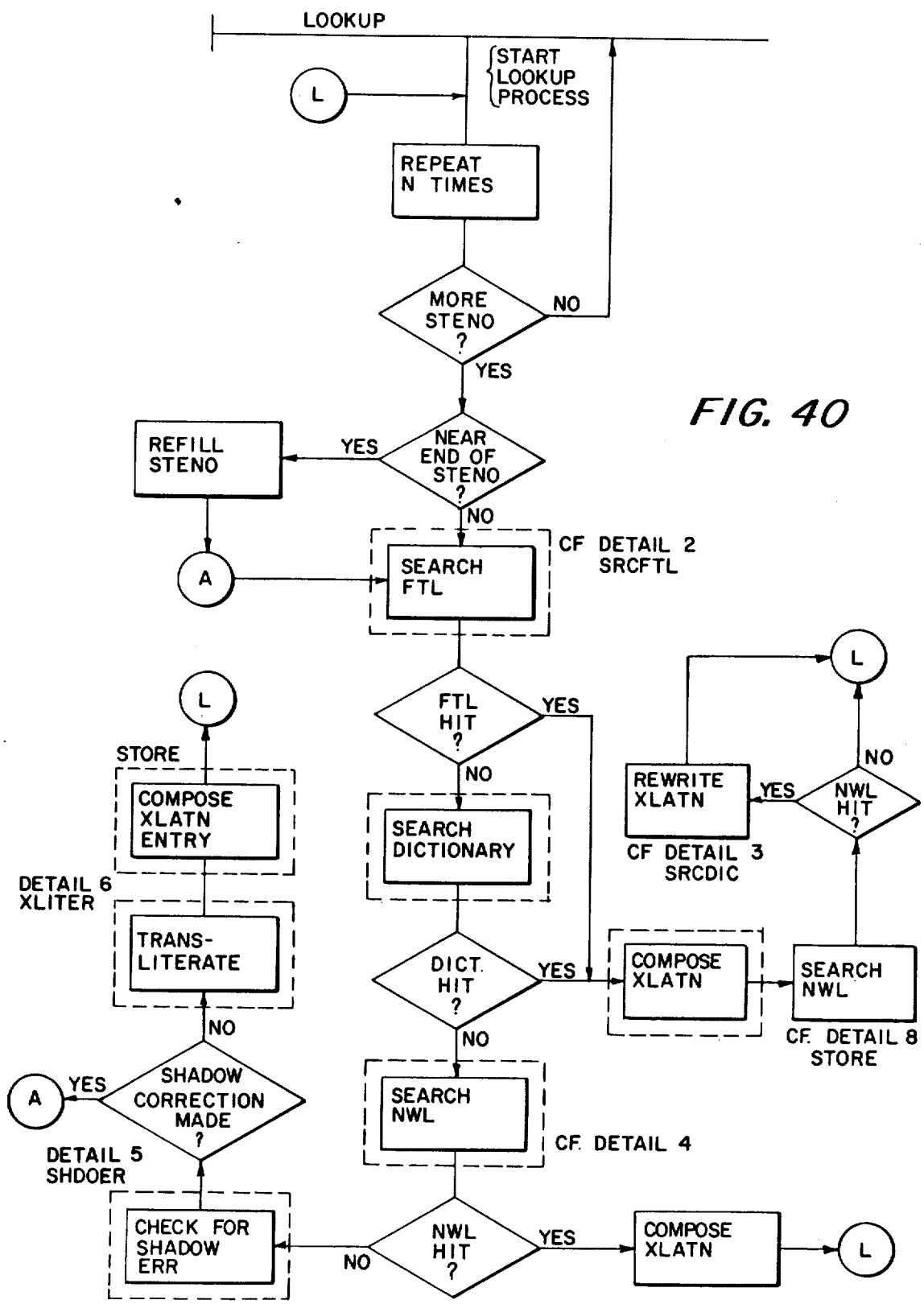
Figure 41:
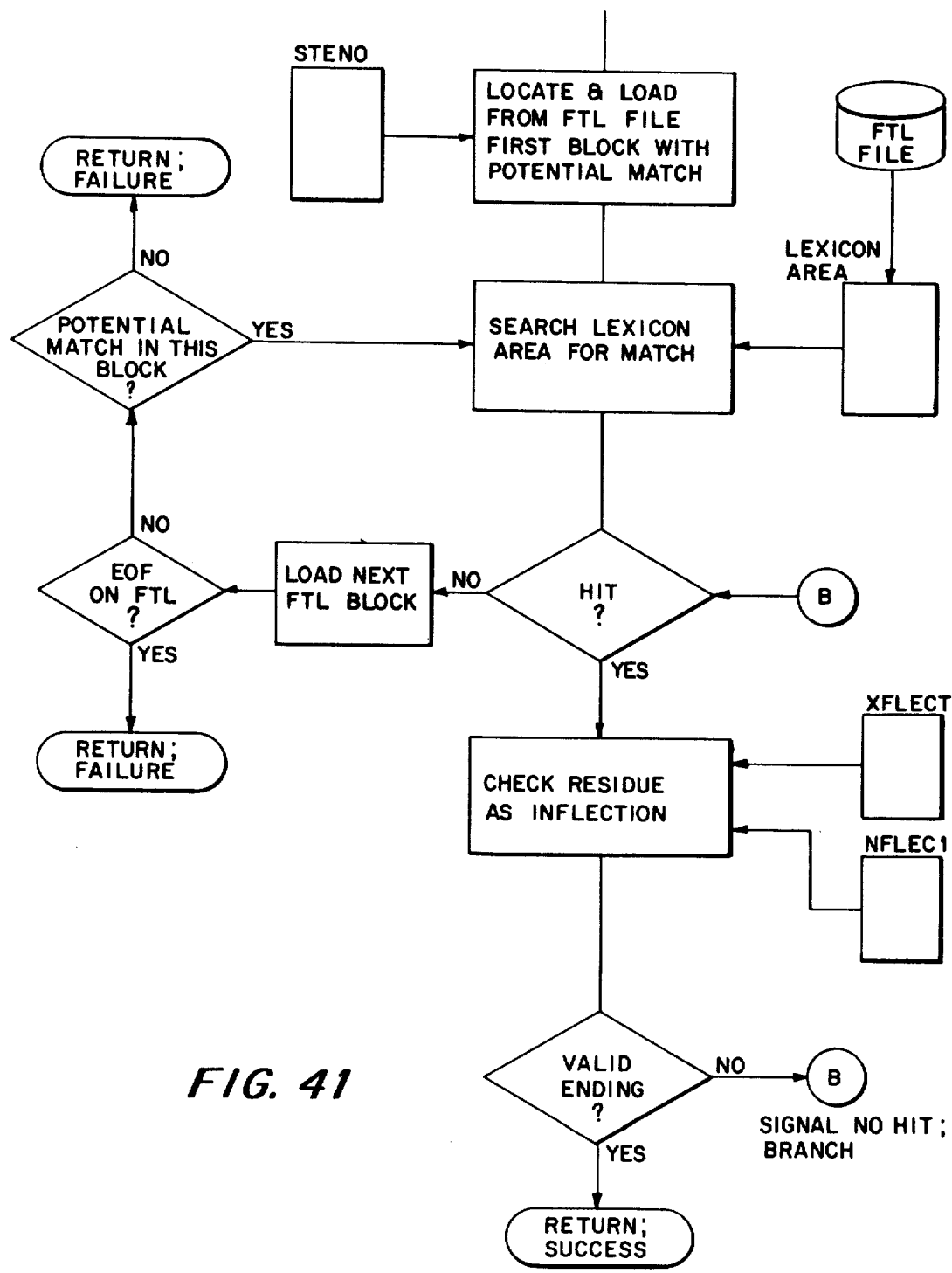
Figure 42:
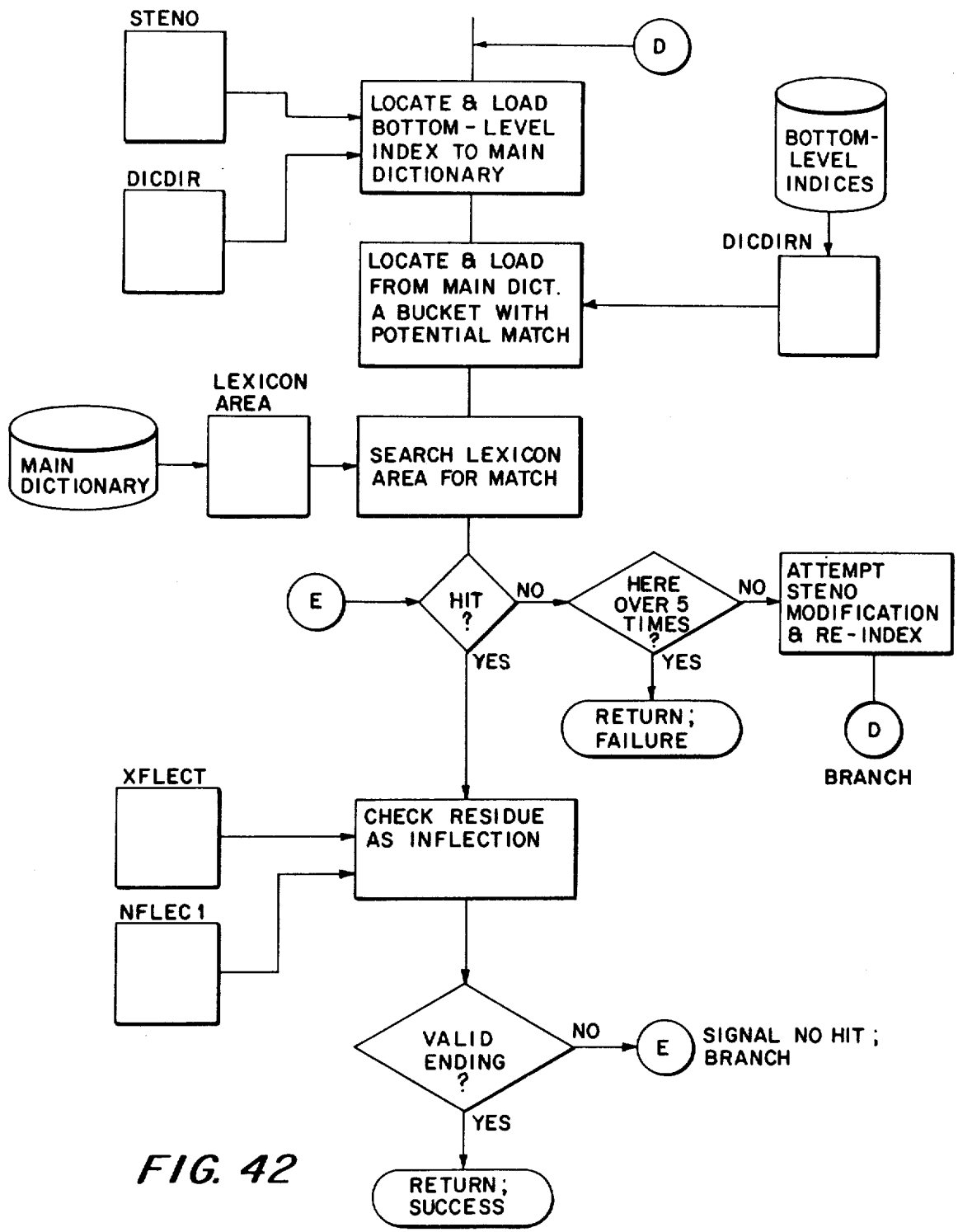
Figure 43:
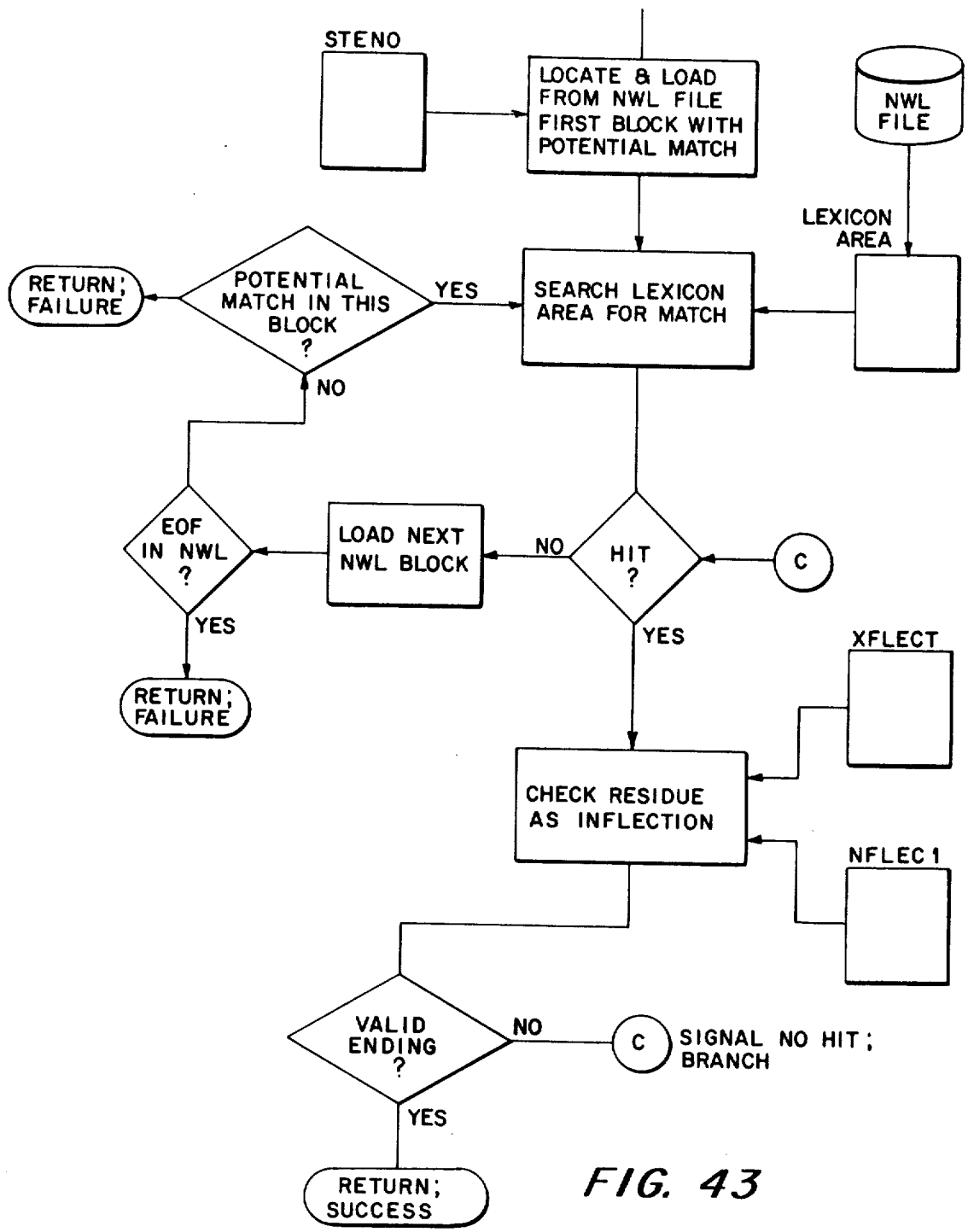
Figure 44:
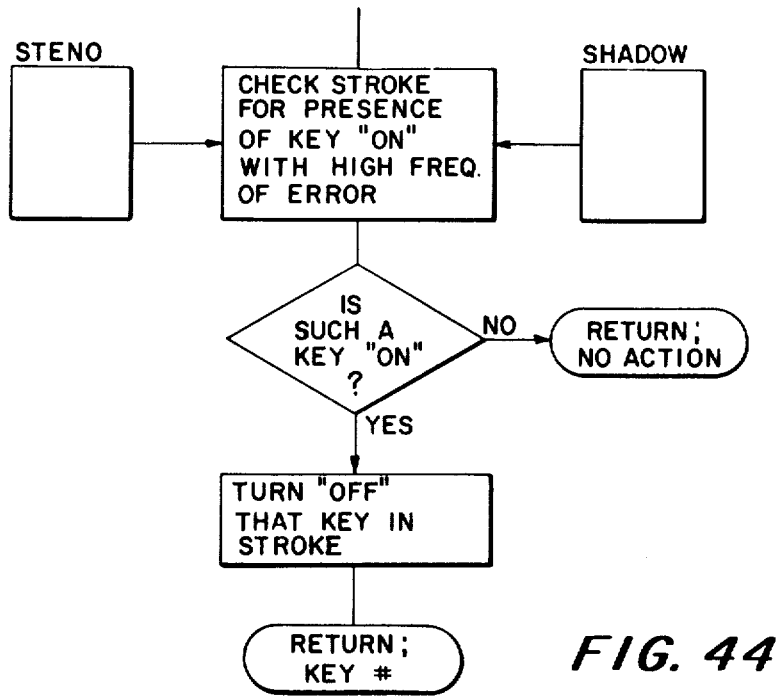
Figure 45:
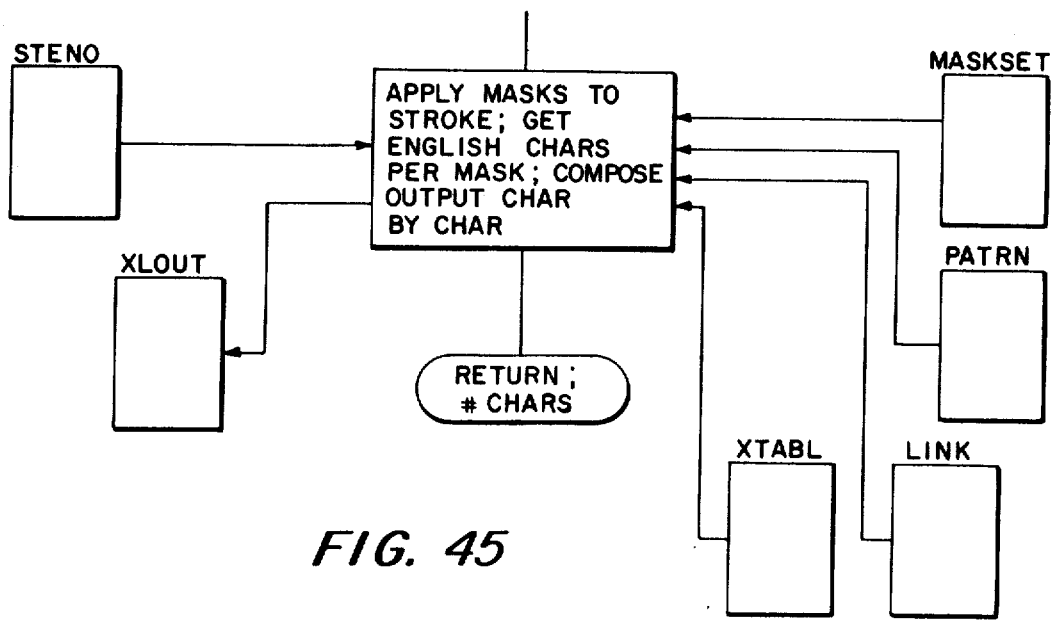
Figure 46:
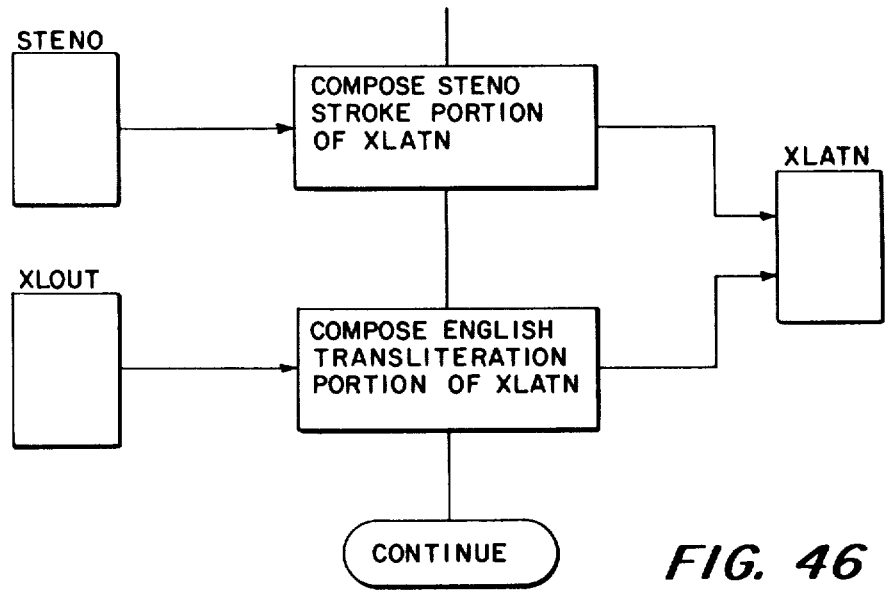
Figure 47:
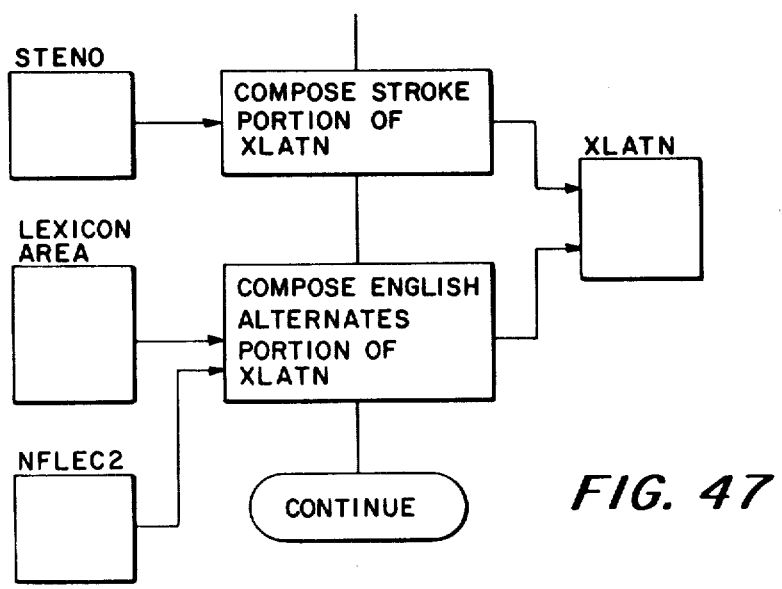

Display monitor circuits are packaged on twelve printed circuit boards (PCBs). A detailed schematic of the circuits comprising the display monitor is provided as FIG. 37. The organization of the principal circuit groups is shown by simplified block diagram in FIG. 38. Descriptions of these circuits groups are provided in the following paragraphs.

The power supply circuits are located on PCB-RECT and PCB-POWER-REG. The source voltage, which is 120 VAC, is applied across power transformer T991; the output from T991 is applied across bridge rectifier diodes, D931-D934 on PCB-RECT. The output of the rectifier is approximately 130 VDC across filter capacitors C971A and C972B.

A constant DC output voltage, independent of load current change, is maintained by the power regulator circuit on PCB-POWER-REG which includes transistors Q902-Q904. A stabilized 12V is fed to the emitter of Q904 for a reference voltage. If the base voltage of Q904 changes, the collector current of Q904 also changes. This current change varies the base voltage of Q903 which acts to correct the error. The regulator output is determined by the base voltage of Q903 and the base-emitter voltage of Q903 and Q902 which is approximately 0.7V.

Transistor Q905 provides short-circuit protection. If the 110V line is grounded, the voltage at the emitter of Q905 will be grounded causing Q905 to turn on and saturate. As a result, Q903 and Q902 turn off and remain off.

High-voltage rectification is obtained across diodes, D591-D593, which are connected to high-voltage transformer T591.

The video circuits are located on PCB-VIDEO. There are three video channels: red, green, and white. The operation of each of the channels is similar, therefore, only the red channel is described.

The red signal coupled with the controller output is added to the emitter of Q201, and Q202 functions as an emitter follower with a high input impedance. The DC component of the input signal influences the operation of IC101 which is connected to emitter follower Q204. Diode D201, which is connected to the base of Q203, functions as a clamp diode which compensates the DC component. Diode D202, which is connected in series with the emitter of Q203, is used as a detecting diode that amplifies the 0.4V video input signal. The output of Q204 is amplified by Q205 and Q206 to gain the necessary drive voltage fed to the picture tube. Transistor Q401 is used as a pre-sync amplifier.

The vertical circuits are located on PCB-VERT. They include a sync pulse amplifier, a vertical amplifier, and a driver. The 5V peak-to-peak positive going sync pulses are amplified to 26V, peak-to-peak negative going pulses. The output pulses are applied to the double integrator consisting of R411, C410, R412, and C411. The vertical sync output signal from the double integrator is added to transformer T401 and also to the base of blocking oscillator Q403. The frequency of the blocking oscillator is locked by the sync signal. The time constant for the oscillator is determined by C417 and R417. A vertical sync pulse to oscillator Q403 turns it on. Capacitor C417 discharges through Q403 during retrace time.

During trace time, C417 charges through R417 and produces a sawtooth voltage. A linearity correction signal, approximately parabolic in shape, is added to C417 by R416 and by vertical linearity control VR404, which is connected to vertical output transformer T471. The correction voltage compensates for the non-linearity of oscillator wave which is fed to the base of Q414 through height control VR402. The non-linearity of the sawtooth wave is also compensated by C420 and R425. In addition, feedback to R423 in the emitter circuit of Q404 compensates for the non-linearity that depends on the vertical output transistor (VOT) Q405. Thermistor RT431 is a temperature compensator for any changes in raster width.

Vertical output transistor Q405 amplifies the necessary drive voltage supplied to the vertical deflection yoke. The collector load of Q405 consists of the vertical output transformer, the vertical convergence circuits, and the side pincushion correction circuits. The secondary of the vertical output transformer is loaded by the top and bottom pincushion circuits and the deflection yoke.

The horizontal circuits are located on PCB-HORIZ. Horizontal sync pulses are derived from circuits on PCB-VERT. A sync pulse is selected by C501 and fed to AFC diodes D501 and D502 causing them to conduct briefly. The DC component of the voltage present at C504 depends on the conduction of the AFC diodes. The phase and frequency of the reference sawtooth signal derived from FBT is equal to that of the sync pulse. The AFC correction voltage presented at C504 is 0V. If the sawtooth signal is not equal to the sync pulse, the AFC correction voltage corrects the phase and frequency error in the referenced sawtooth signal.

The reference sawtooth signal is derived from an integrator consisting of R516, C506, and C502. The AFC correction voltage is filtered and applied to horizontal blocking oscillator consisting of Q501, C509, C507, L501, and R518. The filter network consists of R506, C503, R510, and C504. Diode D503 is temperature compensated.

As the frequency of the oscillator is proportional to the base voltage, it is controlled by the AFC correction voltage. Horizontal output driver Q502, which is inserted between the oscillator and the output circuit, provides gain compensation and stability. The collector of Q502 is coupled to a waveshaping network consisting of C511 and R519. Driver Q502 and transformer T501 drive output power transistor Q503 which turns on for approximately 30 microseconds and off for approximately 34 microseconds. When Q503 turns off, the retrace cycle begins.

The retrace time is determined by the resonant circuit consisting of C553, C554, and horizontal deflection yoke L491. When the first half cycle of the resonant frequency is over, D531 conducts and the trace cycle begins.

Before the deflection yoke current reaches zero, the Q503 output transistor switches on. During the trace time, sawtooth current flows in the deflection yoke. Inductance in series with the deflection yoke varies the amplitude of the sawtooth current. The variation of the L703 inductance determines the horizontal raster width.

The amplitude of the pulse at the collector of Q503 is stepped up by the FBT and the high voltage is obtained from the double rectifier.

The focus circuits are located on PCB-FOCUS. These circuits consist of a power regulator, a detector of high voltage variation, a detector of focus voltage variation, an error amplifier, a controller of focus voltage, and a generator of focus voltage.

The focus circuits are designed to follow the variation of the high voltage. The AC input voltage across the bridge rectifier consisting of diodes D601-D604 is connected to approximately 23VDC. This DC voltage is dropped to approximately 19V (regulated) by the power filter consisting of Q601-Q603. If the high voltage changes, it is detected by emitter followers Q603 and Q609. The error voltage through the emitter followers is delivered to the base of a differential amplifier in integrated circuit IC601. Another differential amplifier in IC601 provides additional amplification for the error voltage. The output voltage is applied to the focus voltage controller consisting of Q604 and Q605. This controller varies the input to the focus voltage generator in the same manner as the horizontal deflection circuit. The output of the focus voltage generator is proportional to the input produced by the controller. Therefore, by controlling the input voltage, the focus generator output voltage follows the changes in the high voltage. The change of focus voltage is detected by the emitter follower consisting of Q606 and Q607. The voltage through the emitter follower corrects the voltage imbalance of the differential amplifier in IC601.

The convergence circuits are located on PCB-CONVERGENCE. The vertical convergence signals are obtained using the vertical deflection current waveform and vertical pulses. The sawtooth voltage is furnished by R476 which is connected in series between the primary of vertical output tansformer T471 and B+. The vertical pulses are furnished by the secondary of the vertical output transformer. The sawtooth voltage is applied to the red convergence coil and the coil acts as an integrator. The sawtooth voltage produces a parabolic current in the coil. The amplitude of the parabolic current is varied by RED-AMP control VR809. The pulses (positive or negative) are used to shape the parabolic current. The pulses are integrated by the red coil and produce a sawtooth current. The amplitude of the sawtooth current is varied by RED-TILT control VR806.

Operation of the white and green convergence circuits follows the same principles described for red convergence. White/green AMP control VR808 adjusts the amplitude of the sawtooth voltage to both the white and green convergence coils. The sawtooth current is controlled by white/green TILT control VR805. The division of sawtooth current between the white and green coils is controlled by VR804.

A positive 250V flyback pulse is used to generate the red and white/green horizontal convergence correction circuit. This pulse from T591 is added to the integrator consisting of T801, C806, and VR803 to form a sawtooth voltage. The sawtooth voltage is applied to the red coil and a parabolic current is induced. The clamp circuit consisting of R806 and D804 makes the coil current zero when the beam is in the center of the scan. The waveshaping network consisting of L803, C805, and R801 adds the sine wave current at the second harmonic to the coil. The amplitude of the second harmonic sine wave is controlled by R804. The overall waveshape completes the red convergence.

The operation of the white and green convergence operates on the same principle as that described for the red convergence. The same flyback pulse is used to correct the white and green convergence. The pulse is converted to a sawtooth voltage by the integrator consisting of L801, C802, C803, VR801, and VR802. The sawtooth voltage is integrated by the white and green coil and induces the parabolic current in each coil. The clamp circuit for the white coil consists of R802 and D801B; the clamp circuit for the green coil consists of R803 and D801C. The white/green TILT control network consisting of L802 and VR801 controls the division of current in the white and green convergence coils.

The pincushion correction circuits are located on PCB-PCC. Side pincushion correction is used to modulate the horizontal scan current with a parabolic compensating current at the vertical rate. The correction voltage waveform is furnished by R476. This sawtooth correction voltage is applied to saturable reactor T701. The DC and parabolic current flowing through the vertical winding of T701 is integrated by C702 and VR701. Therefore, the horizontal winding, which is coupled to the horizontal yoke, is modulated by the vertical winding of T701.

The top/bottom pincushion correction is accomplished through the use of saturable reactor T702. The horizontal winding of T702 is coupled to the horizontal yoke. The voltage derived from the horizontal winding excites the tuning circuit consisting of L701 and C703 which is connected in series with the vertical yoke. This tuning waveform is applied to the vertical yoke in proper phase and amplitude to correct the top and bottom pincushion. Phase is controlled by L701 and amplitude is varied by VR702.

The Display Monitor used in the preferred embodiment has been explained in detail hereinabove but it is to be understood that any equivalent T.V. Monitor could have been used in this Keyboard Display.

The major function of the Translator is to produce English hard copy from shorthand input written on stenotype mechanical shorthand machines. Once the output of such a machine has been captured in Computer-usable form, it becomes the responsibility of the Translation subsystem to convert it into the intended English text. The translated text is then printed and/or stored for further modification. Apparatus for capturing and storing on magnetic tape shorthand machine outlines is old and well known in the art. See U.S. Pat. No. 3,892,915 and 3,557,927.

Shorthand methods vary from reporter to reporter and a reporter's notes may contain ambiguities and errors. So, in the "Translate/Edit" mode of operation, the transation software is integrated with an edit station through which the resulting errors in the tentative output may be recognized and corrected. Feedback from the editing process is routed to adaptive elements in the translation subsystem, enabling these elements to adjust to lexical and stylistic variations among reporters.

In many situations, however, finished-copy accuracy is less important than first-draft turnaround speed. In the "Instant Draft" mode, the edit station is bypassed, and the Translator subsystem feeds its tentative translation directly to the printer.

Stenographic shorthand machines are operated like common typewriters in that the keys of the machine are stroked by the operator. But while the typist strikes only a single key at a time, the stenotype reporter may strike any combination of his/her machine's 23 keys simultaneously, thus packing a great deal of information into each stroke; common words and phrases normally require only a single stroke, and very few words require more than two. Another important difference between ordinary typing and stenotypy is that word boundaries—marked by spaced in ordinary typing—are not marked by the stenotypist.

For its input, the Translation subsystem receives a stream of computer representations of stenotype strokes. It must first break this stream up into segments that correspond to English words and phrases, and retrieve the English equivalents from its dictionary of such correspondences. Actually, the segmentation of the input stream is accomplished during dictionary lookup by always seeking in the dictionary the longest entry which matches the stroke stream at the current point of interest. It is thus the dictionary which determines the segmentation of the original stroke stream, as well as providing the English equivalents for the segments. The dictionary does not in general contain complete English words or stenotype outlines. Instead, word stems are included wherever feasible, and standard suffixes are computed. The dictionary will contain, for example, "talk", but not "talked", "talks", or "talking"; the common suffixes "-ed", "-s", "-ing" are added to the output based upon the contents of the stroke stream together with a stem-ending code that accompanies each dictionary entry. The stem-ending codes tell the Translator which set of suffixes may legally be combined with a given stem, enabling the system to handle about a dozen common suffixes in all. The effect of this scheme is to greatly reduce the number of distinct entries which need to be carried in the system's dictionary, and thus to simplify dictionary maintenance, reduce storage demands, and shorten access times.

This dictionary-based segmentation and retrieval process results in a one-to-one matching of input stenotype segments (called outlines) and English equivalents, and the matched outline/English pairs are then transmitted to other system components for display, printing, storage, etc.

The following sequence of events comprise the translation operation:

1. The system reads an input block.
2. The block is translated if it is not typewriter input. If input is from a previously-translated disk file, it is re-translated but the main dictionary is not accessed.
3. The translated block is displayed if input is not from the on-line steno.
4. If the operator has depressed the EDIT key and input is not from the on-line steno, the system allows the user to edit the current block on the screen. Editing is described in Section 7.6.4.
5. The edited translation is stored on the output file.
6. If the operator has specified printer output, the block is printed at the local XST printer or at the remote Instant Draft Output Station (IDOS). The sequence is repeated until there is no more input data or until the operator presses the FINISHED key.

When translation of a document is completed, the system will request more input data. If the operator presses the FINISHED key at any time, the system returns to the Operator Control mode.

After a block of input data has been translated, the Editor will be entered if the operator has depressed The EDIT key and input is not from the on-line steno. During the edit operation for the current block, the operator can edit only the data on the screen using the word cursor and the INSERT and DELETE keys. Text editing systems are old in the art. See U.S. Pat. No. 3,786,429 and the text Language and Operations Reference Manual No. 901851-B, published by Xerox Corporation, November 1974.

The NWL and FTL are extensions to the dictionary that contain English and the corresponding stenographic outline that is used by a particular reporter. A match found in the FTL or NWL will override a match found in the dictionary. The FTL consists of high-usage words and exists primarily for performance reasons. The NWL consists of new entries created during the edit/feedback process.

This following description contains a functional specification of the software modules that serve as the basis for this preferred embodiment Translator subsystem. Each software module is described in terms of its inputs, operations, and outputs. In addition, a list is provided of other modules invoked. The descriptions are alphabetically arranged by module name. The module descriptions are correlated with a major data flow diagram which shows the relationship among the modules within the XST Probe system. See FIGS. 39 through 47.

The COMPARE subroutine matches input steno strokes against designated Favored Term List (FTL) entries. COMPARE is invoked by the SRCFTL module of FIG. 40 to carry out such comparisons. COMPARE tests for exact matches between comparands, but permits an unmatched residue of potential inflectional bits (to be tested elsewhere) on testing the final stroke of an entry. To facilitate the search of the FTL, COMPARE returns $\phi$ for a match; $-1$ if the steno comparand is smaller than the FTL entry; $+1$ if the steno comparand is greater. Residue bits are saved in the variable residue RES.

The integer function DIRE reads a selected bucket of the main dictionary from its disk residence into a core buffer area. The argument is the sequence number of the desired bucket, obtained from index searches; the argument is multiplied by the fixed bucket size in words to yield an effective random-access disk address. DIRE returns the bucket size to the calling program. The DIRE module is invoked from the SRCDIC module of FIG. 40.

The DISAMB subroutine disambiguates entries in the translation tables in which more than a single English translation appears. In Translate Mode operations, the DISAMB module is invoked from the MAIN module of FIG. 39 after the LOOKUP module has completed the raw translation of a number of steno input strokes. DISAMB scans the results which LOOKUP has deposited in XLATN. For ambiguous entries, DISAMB, assigns "priority of display" indices to the various English translations within an entry based upon usage statistics (taken from the lexicon) and priority marks assigned by the user/editor on earlier occurrences of the term. In "Edit Mode" functions, the DISAMB module is invoked to assign "priority of display" indices to XLATN entries which have been composed by the FIXUP module from NWL entries.

This module invokes IOFFSET and STENINCR.

The integer function ENDING handles the final subtasks in the process of matching input steno strokes against a lexical entry, in the FTL, main dictionary, or NWL. The ENDING module is invoked by the SRCNWL, SRCDIC, and SRCFTL modules. See FIG. 40. The argument IC is the steno-ending code taken from the lexical entry; its value, on invocations of ENDING, may range from +1 through +9; this argument indexes the pointer array XFLECT, from which the appropriate portions of the residue/ending tables NFLEC1 and NFLEC2 are designated. The argument IRES is a 1 × 2 word array in stroke-representation format, containing the residue of input stroke bits not matched against the lexical entry's final stroke; these bits are tested for validity as inflectional bits by seeking a match for them in the designated portion of the residue array NFLEC1. When IRES is empty, the next input stroke (at STENO (J+1)) is examined to see if it can be interpreted as an inflectional stroke. The argument J is a pointer to the entry in STENO which is currently under test upon invocation of ENDING. When a match is made in NFLEC1, the lexical entry is accepted as a valid match for the steno strokes in question; the appropriate English inflectional ending (including stem-final consonant-doubling) is taken from the corresponding entry in NFLEC2. Ending returns: −1 if no valid match; φ if match without suffixation; otherwise, a pointer into NFLEC1. The global variable STUSED is set to point to the last STENO entry consumed in the match.

The integer function FIND controls lexical searching during LOOKUP operations in the translate mode. The FIND module receives the single argument J, a pointer to the first unmatched entry in the STENO input array. FIND manages the searching of the FTL, main dictionary, and NWL at a level intermediate between the LOOKUP module and the lexical search modules SRCFTL, SRCDIC, and SRCNWL. FIND returns: φ if no match; +1 if a match has been found. The global variables LEXPTR and LWHERE are set by FIND to indicate the lexicon element and entry location of the match, if any.

This module invokes SRCFTL, SRCDIC and SRCNWL.

The subroutine FIXUP operates exclusively in the edit mode. The FIXUP module operates on a cycle of XLATN entries produced in earlier translate-mode operations. FIXUP seeks to match XLATN steno data against NWL entries; in always seeking the longest possible match, FIXUP is capable of extending a match across XLATN entry boundaries, to consume the steno data in an integral number of entries. On finding a match, the translation output data is replaced by data from the new match. By this means, the FIXUP module is able to propagate editing changes downstream through a body of translated material. The number of entries processed in a single cycle by the FIXUP module is determined by the system control variable HOWMNY.

This module invokes SRCNWL and UPDMRG.

The utility subroutine IOFFSET computes a pointer to the next in a set of English output alternatives within a multiple data field entry (main dictionary, FTL or NWL). Argument J is a pointer to the current alternative; argument K is the number of output characters in the current alternative. The value returned is an offset from the start of the first English data field to the next alternative within the entry. The IOFFSET module is invoked by several other modules.

The subroutine LOOKUP is the focal point of XST operations in the translate mode. The argument J is a pointer to the first unmatched stroke in the STENO array. The responsibilities of the LOOKUP module include: invoking the STINRE module to guarantee that the STENO input array is appropriately filled; invoking the FIND module to perform lexical searches against the target strokes; invoking the SHDOER module to apply stroking-error counter measures when appropriate; invoking the XLITER module to produce transliterations of unmatchable input; and composing output entries in the XLATN array at the completion of lookup operations.

This module invokes FIND, STINRE, STORE, XLITER, SHDOER and SRCNWL.

The MAIN program module serves as the root segment of the XST Translator. Global constants and variables are defined and initialized principally in MAIN. The MAIN module invokes other modules to identify the user, retrieve adaptive data elements, perform lookup operations and disambiguate raw output.

The module invokes LOOKUP and DISAMB.

The subroutine MAKNWL adds new entries to the NWL during edit mode operations. The argument J indexes the array XLATN, selecting the entry on which the new NWL entry is to be based; the argument K, if greater than zero, selects the output alternative within the J-th XLATN entry which is to be marked for display preference. The MAKNWL module returns: +1 if new NWL entry created properly; −1 if either argument was invalid (e.g., out of range), and the entry was not made. The MAKNWL module is invoked from the UPDALT or UPDTXT Subroutines.

This module invokes STENINCR.

The MODFY module contains five functions which temporarily alter input stroke data in the STENO array so as to compensate, during dictionary index searching, for the compression codes ("comma data") in the XST dictionary. For each function, the single argument J is a pointer to the first unmatched entry in the STENO array. The MODIFY functions are invoked from the SRCDIC module. They return: +1 if the associated stroke modification was made; φ if the stroke(s) were ineligible for the modification. In all cases of stroke modification, the original stroke data is saved where SRCDIC can recover them.

MODFY 2 tests the strokes at STENO(J) and STENO(J+1) for the applicability of the "/," (optional repeated consonant in initial position) code. If applicable, the major left consonants in the stroke at STENO(J+L) are deleted.

MODFY 3 checks the stroke at STENO(J) for the presence of potential inflectional bits (corresponding to the right-hand keys: −G, −S, −D, −Z). If any of these are present, the rightmost is deleted.

MODFY 4 checks the stroke at STENO(J) for the presence of a long or complex vowel (i.e., anything other than A, O, E, U, or EU). If present, the vowel bits are replaced with a minimal related vowel (e.g., AOE becomes E), to compensate for a possible "vowel-comma" encoding in the dictionary. MODFY 5 tests for the possibility of a matching "consonant-comma" encoding for the stroke at STENO(J). If present, all optional consonant bits (corresponding to the right-hand keys: −*, −B, −G) are deleted, as well as inflectional bits (see MODFY3 description).

MODFY 6 applies as many of the above four modifications as are applicable. If two or more modifications are possible, they are performed; otherwise, none is implemented, and the return is $\phi$.

The subroutine SHDOER attempts to correct suspected stroking errors in the STENO array. The argument J points to the stroke in STENO currently being matched. By the time the SHDOER module has been invoked by the LOOKUP module, all lexical searches have failed and it is temporarily assumed that the leading stroke contains an extra error bit. SHDOER examines the stenotypist's shadow-error profile in the array SHADOW, and measures the probability, for each on bit in the stroke, that the bit is due to a stroking error. If an adjustable threshold is surpassed, the corresponding bit is turned off, and lookup operations are re-attempted. The SHDOER module returns: $\phi$ if no alteration was made; otherwise, the bit position of the bit turned off. The SHDOER module is active only during translate mode operations.

The integer function SRCDIC carries out lookup operations in the main XST dictionary. The SRCDIC module is invoked by the FIND module during translate mode operations. The argument J points to the first unmatched input stroke in the STENO array. The SRCDIC module compares steno strokes starting at STENO(J) against a top-level dictionary index in the DICDIR array to locate the proper bottom-level index. SRCDIC then causes the bottom-level index to be read, and proceeds to compare the input steno material against its entries, to locate the proper dictionary bucket reference. Once located, the desired bucket is read into the DICBUF array and searched. SRCDIC returns: $\phi$ if no match; otherwise, a pointer to the matching entry in the dictionary bucket (DICBUF). Suffixation is returned in the global array SUFX, indexed by translation alternatives.

This module invokes DIRE, CNSTST, MODIFY, VWLTST and ENDING.

The subroutine SRCFTL performs a lexical search in the FTL. The argument J points to the first unmatched input stroke in the STENO array. The FTL is organized so that the stroke data in its entries appear in descending sort order. The SRCFTL module locates the appropriate family of entries (i.e., entries whose first strokes are identical), then searches the family in serial order until the first stroke in an FTL entry no longer matches the input stroke in STENO(J). SRCFTL returns: $\phi$ if no match is found; otherwise, a pointer to the matching entry in the FTL. Suffixation, if any, is returned in the global array cell SUFX(1). SRCFTL is invoked by the FIND and FIXUP modules.

This module invokes COMPARE and ENDING.

The subroutine SRCNWL performs lexical searching of the NWL, in both the translate and edit modes of operation. The argument J points to the stroke data to be matched: at STENO(J) in the translate mode, at XLATN(J) in the edit mode. As the NWL is built, its entries are sorted in descending order. The SRCNWL module performs an indexed sequential search of the NWL until the NWL entries become "smaller" than the strokes in STENO OR XLATN. In the Edit mode, the SRCNWL module is capable of extending a search across XLATN entry boundaries. SRCNWL returns: $\phi$ if no match is found; otherwise, a pointer to the matching NWL entry.

This module invokes ENDING.

The utility function STENINCR computes the displacement to the next entry in the array XLATN. The argument J is a pointer to the last used entry in XLATN. The STENINCR module returns a displacement value to the next XLATN entry in sequence.

The subroutine STINRE reads steno stroke data from an external buffer into the array STENO. The STINRE module is only active during translate mode operations. The argument J points to the first unmatched entry in STENO. The STINRE module moves the unconsumed steno strokes to the top of array STENO, then reads a new block of strokes into the array below the old strokes. The STENO array is primed by the XDS Executive program at start-up time. Invocations of this module are by LOOKUP, which calls the STINRE module whenever the number of unconsumed strokes in the steno array falls below an adjustable threshold (currently, 10 strokes). Global counters of strokes input to the Translator and the number of strokes in STENO are maintained and updated during action of this module. STINRE returns: $\phi$ if an immediate end-of-file is sensed; otherwise, +1.

The subroutine STORE executes a number of subtasks involved in the composition of English data fields in the array XLATN. The STORE module is invoked in both the translate and edit modes of operation, by the LOOKUP and FIXUP modules. The argument I designates the source dictionary in which a successful lexical search terminated (FTL, DICT, NWL); the argument J points to the proper output data entry in the "Lexicon Area" array.

The UPDATE module contains three subroutines which implement changes to the TRANSLATION array in accordance with the user's edit commands; UPDATE also invokes the MAKNWL module to build new NWL entries when appropriate. The UPDATE module is one of the XSTOSI editing support functions called into action by the XDS Executive Editor. UPDMRG sets link bits in XLATN entries to merge two or more consecutive entries into a single unit. The arguments J and K specify the first and last XLATN entries to be merged. UPDMRG returns: +1 if merge was successful; −1 if the arguments were invalid and no action took place.

UPDTXT creates data field for the J-th XLATN entry containing the English text received from the EDITOR module. UPDTXT is used to handle the new text associated with entry merging and the adding of translation alternates. The argument K is the length in characters of the new text. The argument R is a switch expressing the editor's decision about "remembering" the correction (i.e., making an NWL entry for it). UPDTXT returns: +1 if the operation succeeds; −1 if no action was taken due to arguments out of range.

UPDALT "chooses" the K-th translation output alternative for the J-th entry in array XLATN by means of reassigning display priority rankings. Argument R is a switch expressing the editor's decision about remembering the alternative choice. UPDALT returns: +1 on a successful operation; −1 if no action was taken due to bad arguments.

This module invokes IOFFSET, MAKNWL and STENINCR.

VWLTST assists in the testing of vowel bits in dictionary steno strokes against input steno strokes during LOOKUP operations in the main dictionary. VWLTST is invoked by the SRCDIC module. Argument J points to a comparand in the array STENO. Argument LEX is a lexical comparand, not a pointer. VWLTST extracts the vowel bits of comparands and compares them for a match, using a set of masking procedures to allow for permissible stroking variations specified by the comma byte of dictionary strokes.

VWLTST returns +1 to signal a successful vowel match, or $\phi$ for no match.

The subroutine XLITER is invoked by the LOOKUP module after all dictionary search and shadow-error correction measures have failed to produce a match at the current input steno stroke. The argument J is a pointer into the STENO array where the unmatched stroke resides. XLITER transliterates the bits of the steno into English characters by comparing the stroke against a table of fullword-bit-pattern masks, and transferring the corresponding English characters to the variable XLOUT whenever a bit-pattern mask matches a portion of the stroke; by applying all masks in turn, all bits of the stroke, singly and in groups, are converted to English characters. The contents of XLOUT are then used by LOOKUP in composing the English section of XLATN. XLITER returns the number of characters deposited in XLOUT.

It is understood that the above-described arrangement is merely illustrative of the principles of the invention. For example, an equivalent computer, disk drive printer or keyboard display could have been used.

While a particular embodiment of the present invention has been described and illustrated, it will be apparent to those skilled in the art that changes and modifications may be made therein without departure from the spirit and scope of the invention as claimed.

What is claimed is:

1. A transcriber system for the computer-aided translation of shorthand notes in the form of outlines that are machine readable by the system into text, and the editing of said text, comprising:
   shorthand machine means for generating said outlines,
   determining means for locating word outlines in said outlines from said shorthand machine means,
   means for translating said outlines from said determining means into text,
   means for storing said outlines and corresponding text from said translating means,
   display means for displaying said text from said translating means and said storage means, and
   editor means coupled to said display means and said translator means for generating an electronic cursor to identify a text word to be edited, and for modifying said identified word, said cursor selectively conforming for an identified text word to the word boundaries determined by said translator means.

2. The transcriber system of claim 1 wherein said editor means comprises a keyboard means for moving said cursor on said display means to identify a particular outline or a plurality of outlines and the corresponding text, and to provide information, by key depression, for changing said text.

3. The transcriber system of claim 2 further comprising printer means connected to said editor means for printing out said text.

4. The transcriber system of claim 3 further comprising:
   recorder means for recording said outlines from said shorthand machine means on a storage media, and,
   playback means for playing back said outlines from said storage media to said determining means.

5. The transcriber system of claim 4 further comprising a battery for powering said playback means and said recorder means to enable portable operation.

* * * * *